US012733653B2

(12) United States Patent
Eid et al.

(10) Patent No.: US 12,733,653 B2
(45) Date of Patent: Sep. 15, 2026

(54) SHRIMP PROCESSING APPARATUS AND METHODS

(71) Applicant: NOVA-TECH ENGINEERING, LLC, Willmar, MN (US)

(72) Inventors: Elliot D. Eid, Richmond, MN (US); Matthew R. Biel, Willmar, MN (US); Nathan A. Blum, Cosmos, MN (US); Jeff Deming, Spicer, MN (US); Roger Harkess, Willmar, MN (US); Jeremy Imdieke, Willmar, MN (US); Robert Johnson, Litchfield, MN (US); Dana Mathew Molenaar, Pennock, MN (US); Jacob Rooney, Belgrade, MN (US); Shaun Remmel, Willmar, MN (US); Marc Zinda, Spicer, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

(21) Appl. No.: 19/351,981

(22) Filed: Oct. 7, 2025

(65) Prior Publication Data

US 2026/0033502 A1 Feb. 5, 2026

Related U.S. Application Data

(63) Continuation of application No. 18/651,798, filed on May 1, 2024, now Pat. No. 12,458,034, and a continuation of application No. 17/795,574, filed as application No. PCT/US2021/016779 on Feb. 5, 2021, now Pat. No. 12,089,605.

(60) Provisional application No. 62/971,653, filed on Feb. 7, 2020.

(51) Int. Cl.
*A22C 29/00* (2006.01)
*A22C 29/02* (2006.01)

(52) U.S. Cl.
CPC .......... *A22C 29/026* (2013.01); *A22C 29/022* (2013.01); *A22C 29/023* (2013.01); *A22C 29/028* (2013.01)

(58) Field of Classification Search
CPC ... A22C 29/022; A22C 29/023; A22C 29/028; A22C 29/02
USPC .......... 452/4
See application file for complete search history.

(56) References Cited

U.S. PATENT DOCUMENTS 4,005,504 A * 2/1977 Lapeyre .............. A22C 29/026 452/5
5,839,952 A * 11/1998 Pollingue ............ A22C 29/026 452/8

* cited by examiner

*Primary Examiner* — Richard T Price, Jr.
(74) *Attorney, Agent, or Firm* — Mueting Raasch Group

(57) ABSTRACT

Shrimp processing apparatus to remove pleopods of individual shrimp, along with methods for removing pleopods of individual shrimp are described herein. The shrimp processing apparatus may be provided in systems may include one or more processing stations configured to perform one or more of the following functions on each shrimp individually: measurement of individual shrimp, heading of individual shrimp, peeling of individual shrimp, and severing the mud vein of individual shrimp.

25 Claims, 62 Drawing Sheets

SHRIMP PROCESSING APPARATUS AND METHODS

RELATED APPLICATIONS

This application is a continuation of U.S. application Ser. No. 18/651,798, filed May 1, 2024, which is a continuation of U.S. application Ser. No. 17/795,574, filed Jul. 27, 2022, now U.S. Pat. No. 12,089,605 and which is a § 371 U.S. National Stage of International Application No. PCT/US2021/016779 filed Feb. 5, 2021, which claims the benefit under U.S.C. § 119 of U.S. Provisional Application Ser. No. 62/971,653, filed 7 Feb. 2020, and titled SHRIMP PROCESSING SYSTEM, PROCESSING APPARATUS AND METHODS, all of which are incorporated herein by reference in their entireties.

U.S. application Ser. No. 18/651,798, filed May 1, 2024, is also a continuation of U.S. application Ser. No. 17/795,568, filed Jul. 27, 2022, now U.S. Pat. No. 12,029,222 and which is a § 371 U.S. National Stage of International Application No. PCT/US2021/016781 filed Feb. 5, 2021, which claims the benefit under 35 U.S.C. § 119 of U.S. Provisional Application Ser. No. 62/971,653, filed 7 Feb. 2020, and titled SHRIMP PROCESSING SYSTEM, PROCESSING APPARATUS AND METHODS, all of which are incorporated herein by reference in their entireties.

U.S. application Ser. No. 18/651,798, filed May 1, 2024, is also a continuation of U.S. application Ser. No. 17/795,587, filed Jul. 27, 2022, now U.S. Pat. No. 11,980,199 and which is a § 371 U.S. National Stage of International Application No. PCT/US2021/016786 filed Feb. 5, 2021, which claims the benefit under 35 U.S.C. § 119 of U.S. Provisional Application Ser. No. 62/971,653, filed 7 Feb. 2020, and titled SHRIMP PROCESSING SYSTEM, PROCESSING APPARATUS AND METHODS, all of which are incorporated herein by reference in their entireties.

FIELD

Shrimp processing systems including apparatus to measure, head, and/or sever the mud veins of shrimp, along with methods for measuring, heading, and mud vein severing are described herein.

BACKGROUND

The processing of shrimp for human consumption can include measurement of shrimp to properly group them according to size (with larger shrimp typically selling for more than smaller shrimp on a weight basis, e.g., pounds or kilograms). In some instances, that is the only processing performed, with consumers selecting whole shrimp and performing selected further processing at the time of preparing the shrimp for consumption.

Other shrimp processing may include removing the head of the shrimp (e.g., the carapace), removing the shell segments covering the abdomen and the associated swimmerets (e.g., pleopods), removing the mud vein of the shrimp, etc.

In many instances, the processing described above is accomplished manually—even for commercial quantities of shrimp. Automated equipment designed to perform some shrimp processing often results in relatively high losses of consumable meat which, in turn, results in reduced revenue because shrimp is typically sold by weight. For example, peeling and deveining processes may involve slitting the back or dorsal side of the abdomen of the shrimp to remove the mud vein and, optionally, the shell segments on the abdomen. Such processing often results in the loss of meat and, therefore, a loss of revenue.

SUMMARY

Shrimp processing systems including apparatus to measure, head, and/or sever the mud veins of shrimp, along with methods for measuring, heading, and mud vein severing are described herein. The shrimp processing apparatus may be provided in systems may include one or more processing stations configured to perform one or more of the following functions on each shrimp: measurement of individual shrimp, severing the mud vein of individual shrimp, and heading of individual shrimp.

The shrimp processing systems and methods described herein provide, in one or more embodiments, for the processing of shrimp at one or a plurality of processing stations, with individual shrimp being transferred between stations using a conveying system. In one or more embodiments, the shrimp processing systems may include one or more processing stations configured to perform one or more of the following functions on each shrimp: measurement of individual shrimp, severing the mud vein of individual shrimp, heading of individual shrimp, peeling of individual shrimp; separating adjacent abdominal shell segments on individual shrimp, etc.

The shrimp processing systems and methods described herein may address a number of problems associated with the processing of shrimp for human consumption. Although many of the problems associated with shrimp processing and the solutions provided by the shrimp processing systems and methods described herein may be further described below, those problems may include, for example, inability to accurately size and sort shrimp, contamination of meat by viscera located in the carapace, loss of meat during the processing, failure to remove mud veins, etc.

Shrimp processing stations in shrimp processing systems as described herein may be described as data collection stations or functional stations. Collection of data regarding the physical characteristics of shrimp may be performed at processing stations characterized as data collection stations, while one or more physical characteristics of each shrimp may be changed at processing stations characterized as functional stations. One example of a data collection station may include, for example, a station in which the length, weight, etc. of a shrimp is measured/determined. Examples of functional stations may include, for example, mud vein severing stations, heading stations, peeling stations, shell segment separation stations, etc. The specific order of processing stations may be varied, for example, one or more data collection stations may be interspersed with one or more functional stations in any selected shrimp processing systems described herein.

Although processing stations may be identified as "data collection stations" or "functional stations," a single processing station may be both a data collection station and a functional station. For example, it may be possible to both measure and sever the mud vein of a shrimp at a single processing station. Many other combinations of data collection and functional stations are possible in one or more embodiments of the shrimp processing systems and methods described herein.

The shrimp processing systems described herein may also be configured to transport each shrimp between processing stations using a conveying system connecting the processing stations. As used herein, a "conveying system" means a conveying system that is capable of transporting shrimp between processing stations without direct human intervention, i.e., the conveying system does not require a human to carry or otherwise transport the shrimp between processing stations.

One or more embodiments of the shrimp processing systems described herein may include processing stations arranged serially such that each shrimp passes through each type of processing station in the system. In such a system, the processing stations may or may not be activated as each shrimp passes through the processing station depending on whether the shrimp is to undergo the process performed at that station.

In one or more embodiments of the shrimp processing systems and methods described herein, individual shrimp may be restrained in a clamp configured to capture each shrimp proximate its tail. Accurately fixing the location of each shrimp on a clamp increases the accuracy and efficacy of a variety of processes that may be performed on each shrimp. In particular, accurately fixing the location of each shrimp allows for accurate measurement of the shrimp and location of various anatomical features that assist with processing the shrimp including, for example, severing of the mud vein at one or more selected locations, determining the size of the shrimp, removing the head of the shrimp (and any attached anatomical features), removing the shell of the shrimp, removing the pleopods of each shrimp, separating adjacent shell segments of each shrimp, etc.

In one or more embodiments of clamps used to restrain shrimp in shrimp processing systems and/or methods as described herein, the clamp may be configured to force the tail/uropod of the shrimp to fan open, with the opened tail assisting with retention of the shrimp by the clamp. In particular, the opened tail may resist removal of the shrimp from the clamp until such removal is desired.

In one or more embodiments of the shrimp processing systems and methods described herein in which the individual shrimp are measured to determine their size, the processing systems and methods may involve selectively processing the individual shrimp based on their size and/or sorting the shrimp after processing based on their size. In other words, the shrimp processing systems and methods described herein may allow for selective processing (e.g., peeling, heading, etc.) of shrimp of one or more sizes, while allowing other shrimp of one or more different sizes to pass through the processing system with the shell and/or head intact. Furthermore, shrimp of different sizes may be automatically sorted based on the size of the shrimp and, in the case of selective processing, whether those shrimp have been shelled, headed, etc. In still other embodiments, even shrimp of the same size may be selectively processed (e.g., shelled, headed, etc.) to allow for the sale of either shelled or shell-on as desired.

One type of shrimp processing station described herein may be described as a severing station in which the mud veins of individual shrimp are severed at selected locations along the abdomen of the shrimp. Severing the mud vein may facilitate removal of the mud vein from each shrimp during, for example, removal of the head/carapace from the abdomen of the shrimp, with the mud vein remaining attached to the viscera in the carapace of the shrimp as the carapace (and its associated anatomical features) is separated from the abdomen of the shrimp. In shrimp processing systems and methods in which the heading is performed by a machine (such as, e.g., the heading stations described herein), severing of the mud vein in each shrimp before heading may facilitate automated processing of the shrimp by providing shrimp that are substantially free of mud veins.

Even in situations in which the heading is not performed by a machine but is, rather, performed manually, severing the mud vein prior to removal of the head of the shrimp may also facilitate removal of the mud vein with the carapace (and its associated anatomical features) to provide shrimp that are substantially free of mud veins.

As discussed herein, one or more embodiments of the processing systems and methods described herein may include a processing station in which the shrimp are each individually measured to determine their size. When combined with a processing station in which the mud veins of individual shrimp are severed, measuring each shrimp prior to the severing may assist in accurately severing the mud veins at one or more selected locations along the abdomens of the shrimp. While shrimp length can be used to determine the weight of the shrimp, shrimp length can also provide the location between selected shell segments on the abdomen of the shrimp and/or the location of the junction between the carapace and the abdomen. The location of the junction between, for example, the fifth and sixth shell segments on the abdomen of the shrimp can be generally correlated with the overall length of the shrimp. In one or more embodiments, the mud veins of shrimp may be severed at or near the junction between the fifth and sixth shell segments (or between the rearmost shell segment and an adjacent shell segment located closer to the carapace of the shrimp for shrimp that have more than six abdominal shell segments). Although severing of the mud vein at other selected locations is also possible, the junction between the rearmost and adjacent shell segments (for example, fifth and sixth shell segments) provides for removal of substantially all of the mud vein as the carapace is removed from the shrimp.

One or more embodiments of the shrimp processing systems described herein may also include a processing station in the form of a heading station in which the carapace and the viscera located therein is removed from the shrimp. Removal of the carapace using the heading stations and methods described herein also removes the anatomical features associated with the carapace such as, e.g., the short and long antennae, the scaphocerite, chela, rostrum, and many, if not all of the perciopods. Moreover, the carapace and the viscera located therein are mechanically removed (as opposed to hydrodynamic removal used in some automated approaches) in a manner that avoids contamination of the meat by the viscera upon removal. In one or more embodiments of heading stations and methods described herein, the heading station may operate by determining the location of a junction between the carapace and the abdomen of each shrimp such that no significant portion of meat of the abdomen is removed along with the carapace.

Further, one or more embodiments of the heading stations and methods described herein may result in retention of additional meat (sometimes referred to as neck meat) on the abdomen of the shrimp. That additional meat adds to the weight of the shrimp and, therefore, may increase revenue generated by the sale of shrimp processed using the shrimp processing systems and methods described herein.

One or more embodiments of the shrimp processing systems described herein may also include a processing station in the form of a peeling station in which the abdominal shell segments are removed from the dorsal side of the abdomen of shrimp (the abdominal somites) as well as removing the pleopods (swimmerets) along with the perciopods (walking legs) found on the ventral side of the abdomen of shrimp. In one or more alternative embodiments, the peeling station may only remove the pleopods (swimmerets) along with the perciopods (walking legs) found on the ventral side of the abdomen of shrimp, leaving the shell segments on the dorsal side of the abdomen of shrimp intact. Doing so may provide shrimp that better retain flavor and/or firmness during storage, cooking, etc.

One potential advantage of the peeling stations and methods described herein is that the peeling process can, in one or more embodiments, be performed on raw shrimp held after harvesting for a significantly reduced amount of time (e.g., 2 hours or less, 1 hour or less, etc.) as compared to many peeling processes in which raw shrimp must be held after harvesting for relatively long periods of time (e.g., 24 hours or more) to improve the shell removal process. Holding raw shrimp after harvest for longer periods of time to improve peeling can, in some instances, result in loss of salable product due to spoilage, etc. In addition, holding raw shrimp after harvesting for longer periods of time to improve peeling can potentially be detrimental to firmness and flavor of the shrimp.

One or more embodiments of the shrimp processing systems described herein may include a processing station in the form of a shell segment separation station in which adjacent abdominal shell segments on the dorsal side of the abdomen of shrimp are separated. Separation of adjacent abdominal shell segments on the dorsal side of the abdomen of shrimp may assist with removal of the abdominal shell segments in, for example, a peeling station as described herein. In the absence of separation of adjacent abdominal shell segments on the dorsal side of the abdomen of a shrimp, some peeling processes may result in tearing or incomplete removal of one or more shell segments that are desired to be removed from the abdomen of a shrimp. In particular, it may be advantageous to separate the rearmost abdominal shell segment (that is, the shell segment closest to the tail of a shrimp) and the adjacent abdominal shell segment (that is, the shell segment located closer to the carapace of a shrimp) such that the adjacent abdominal shell segment and all shell segments located closer to the carapace can be cleanly removed without tearing of either the rearmost abdominal shell segment or the adjacent abdominal shell segment.

Although the processing stations described herein are discussed in connection with a shrimp processing system that includes two or more of the processing stations described herein, it should be understood that each processing station may, alone, constitute one or more aspects of the present invention. In other words, the invention may consist entirely of, in one aspect, a measuring station. In another aspect, the invention may consist entirely of a mud vein severing station. In another aspect, the invention may consist entirely of a heading station. In still another aspect, the invention may consist entirely of a peeling station. In still another aspect, the invention may consist entirely of an adjacent abdominal shell separation station. In yet another aspect, the invention may consist entirely of a clamp configured to retain a shrimp. In still other aspects, the invention may consist entirely of methods of performing one or more processes on a shrimp, e.g., measuring a shrimp, severing the mud vein of a shrimp at a selected location, heading a shrimp, separating adjacent abdominal shell segments on a shrimp, removing the pleopods and pereiopods found on the ventral side of the abdomen of a shrimp, peeling a shrimp, sorting shrimp, etc.

In a first aspect, one or more embodiments of a clamp configured to restrain a shrimp as described herein includes: a pair of jaws positioned on a base, wherein the pair of jaws comprises a first jaw and a second jaw facing each other across a clamping axis extending between the first jaw and the second jaw, wherein the first jaw comprises a first jaw face and the second jaw comprises a second jaw face, wherein the first jaw face faces the second jaw face along the clamping axis, wherein the first jaw face and the second jaw face define a receiving slot between the first jaw face and the second jaw face, wherein a distance between the first jaw face and the second jaw face across the receiving slot in a direction aligned with the clamping axis narrows when moving away from the base between the first jaw face and the second jaw face along a compression axis, wherein the compression axis extends through the base between the first jaw face and the second jaw face. The clamp further includes a spring member operably attached to the first jaw, the spring member configured to resist movement of the first jaw away from the second jaw along the clamping axis and the spring member configured to resist movement of the first jaw away from the base along a compression direction aligned with the compression axis, wherein a shrimp located between the pair of jaws is compressed against the base between the pair of jaws by the spring member and the first jaw.

In one or more embodiments of a clamp according to the first aspect, the clamp further comprises a body attached to the base, and wherein the spring member comprises an arm extending between the first jaw and the body, the arm configured to provide a compression force to the first jaw in response to movement of the first jaw away from the base in a direction aligned with the compression axis.

In one or more embodiments of a clamp according to the first aspect, the clamp further comprises a body attached to the base, and wherein the spring member comprises an arm extending between the first jaw and the body, the arm configured to provide a clamping force to the first jaw in response to movement of the first jaw away from the second jaw along the clamping axis.

In one or more embodiments of a clamp according to the first aspect, the clamp further comprises a body attached to the base, and wherein the spring member comprises an arm extending between the first jaw and the body, the arm configured to provide a compression force to the first jaw in response to movement of the first jaw away from the base in a direction aligned with the compression axis, and the arm configured to provide a clamping force to the first jaw in response to movement of the first jaw away from the second jaw along the clamping axis.

In one or more embodiments of a clamp according to the first aspect, the first jaw is configured to rotate about a first rotation axis extending between the first jaw and the base when a shrimp is located between the first jaw face and the second jaw face, and wherein, optionally, the first rotation axis extends through the arm extending between the first jaw and the body. In one or more embodiments, the first jaw comprises a first jaw standoff located proximate the first jaw face, wherein the first jaw standoff is located between the first jaw face and an outside portion of the first jaw, wherein the outside portion of the first jaw is spaced from the base to provide clearance for rotation of the first jaw about the first rotation axis.

In one or more embodiments of a clamp according to the first aspect, the spring member operably attached to the first jaw comprises a first spring member and the clamp comprises a second spring member operably attached to the second jaw, the second spring member configured to resist movement of the second jaw away from the first jaw along the clamping axis and the second spring member configured to resist movement of the second jaw away from the base along the compression direction aligned with the compression axis, wherein a tail of a shrimp located between the pair of jaws is forced against the base between the pair of jaws by the first spring member, the first jaw, the second spring member, and the second jaw. In one or more embodiments, the clamp further comprises a body attached to the base, and wherein the second spring member comprises an arm extending between the second first jaw and the body, the arm of the second spring member configured to provide a compression force to the second jaw in response to movement of the second jaw away from the base in a direction aligned with the compression axis. In one or more embodiments, the clamp further comprises a body attached to the base, and wherein the second spring member comprises an arm extending between the second jaw and the body, the arm of the second spring member configured to provide a clamping force to the second jaw in response to movement of the second jaw away from the first jaw along the clamping axis. In one or more embodiments, the clamp further comprises a body attached to the base, and wherein the second spring member comprises an arm extending between the second jaw and the body, the arm of the second spring member configured to provide a compression force to the second jaw in response to movement of the second jaw away from the base in a direction aligned with the compression axis, and the arm of the second spring member configured to provide a clamping force to the second jaw in response to movement of the second jaw away from the first jaw along the clamping axis.

In one or more embodiments of a clamp according to the first aspect, the second jaw is configured to rotate about a second rotation axis extending between the second jaw and the base when a shrimp is located between the first jaw face and the second jaw face, and wherein, optionally, the second rotation axis extends through the arm extending between the second jaw and the body. In one or more embodiments, the second jaw comprises a second jaw standoff located proximate the second jaw face, wherein the second jaw standoff is located between the second jaw face and an outside portion of the second jaw, wherein the outside portion of the second jaw is spaced from the base to provide clearance for rotation of the second jaw about the second rotation axis.

In one or more embodiments of a clamp according to the first aspect, a distance between the body and the receiving slot in a direction transverse to the clamping axis is selected to allow the tail of a shrimp captured in the clamp to be positioned between the receiving slot and the body.

In one or more embodiments of a clamp according to the first aspect, a distance between the body and the receiving slot in a direction transverse to the clamping axis is 4 or more, 6 or more, 8 or more, 10 or more times, 14 or more, 16 or more, 18 or more, or 20 or more times a slot width measured at a midpoint between the base and the narrowest portion of the receiving slot as measured along the clamping axis direction, and, optionally, wherein the distance between the body and the receiving slot in the direction transverse to the clamping axis is 24 or less, 22 or less, 20 or less, 18 or less, or 16 or less times the slot width measured at a midpoint between the base and the narrowest portion of the receiving slot as measured along the clamping axis direction.

In a second aspect, one or more embodiments of a method of restraining a shrimp as described herein includes: providing a clamp comprising a first jaw and a second jaw positioned on a base, wherein the first jaw faces the second jaw, and wherein the first jaw and the second jaw define a receiving slot between the first jaw and the second jaw; inserting a shrimp into the receiving slot between the first and second jaws such that the tail of the shrimp is located on a clamp side of the first and second jaws and the carapace of the shrimp is located on a processing side of the first and second jaws; and forcing the tail of the shrimp towards the base using the first jaw after inserting the shrimp into the receiving slot between the first and second jaws.

In one or more embodiments of methods of restraining shrimp according to the second aspect, forcing the tail of the shrimp towards the base using the first jaw causes the tail to form a splayed tail fan on the clamp side of the first and second jaws.

In one or more embodiments of methods of restraining shrimp according to the second aspect, forcing the tail of the shrimp towards that base using the first jaw comprises applying a persistent compressive force on the shrimp in a compression direction aligned with a compression axis extend through base and the receiving slot between the first and second jaws using the first jaw after inserting the shrimp into the receiving slot.

In one or more embodiments of methods of restraining shrimp according to the second aspect, forcing the tail of the shrimp towards the base using the first jaw comprises applying a persistent compressive force on the shrimp in a compression direction aligned with a compression axis extend through base and the receiving slot between the first and second jaws using the second jaw after inserting the shrimp into the receiving slot.

In one or more embodiments of methods of restraining shrimp according to the second aspect, forcing the tail of the shrimp towards the base using the first jaw comprises applying a persistent compressive force on the shrimp in a compression direction aligned with a compression axis extend through base and the receiving slot between the first and second jaws using the first jaw and the second jaw after inserting the shrimp into the receiving slot.

In one or more embodiments of methods of restraining shrimp according to the second aspect, the method comprises applying a persistent clamping force on the shrimp along a clamping direction aligned with a clamping axis extending through the first and second jaws using the first jaw after inserting the shrimp into the receiving slot.

In one or more embodiments of methods of restraining shrimp according to the second aspect, the method comprises applying a persistent clamping force on the shrimp along a clamping direction aligned with a clamping axis extending through the first and second jaws using the second jaw after inserting the shrimp into the receiving slot.

In one or more embodiments of methods of restraining shrimp according to the second aspect, the method comprises applying a persistent clamping force on the shrimp along a clamping direction aligned with a clamping axis extending through the first and second jaws using the first jaw and the second jaw after inserting the shrimp into the receiving slot.

In one or more embodiments of methods of restraining shrimp according to the second aspect, the clamp comprises a body, and wherein the first jaw is connected to the body through a first arm, and wherein the first jaw rotates about a first rotation axis located above the base extending between the first jaw and the body when inserting a shrimp into the receiving slot. In one or more embodiments, the second jaw is connected to the body through a second arm and the second jaw is attached to the body through a second arm, and wherein the second jaw rotates about a second rotation axis located above the base and extending between the second jaw and the body when inserting a shrimp into the receiving slot.

In a third aspect, one or more embodiments of a mud vein severing apparatus as described herein includes: a vein severing module comprising a blade comprising a sharpened working edge and a blade actuator configured to move the blade between a stored position and a severed position; an optional measurement module configured to measure a length of a shrimp held in a clamp moving through the measurement module along a measurement direction; a controller operably connected to the blade actuator and the optional measurement module, wherein the controller is configured to: optionally receive a signal indicative of the length of the shrimp from the measurement module; and activate the blade actuator to move the blade from the stored position to the severed position when a shrimp is in a selected severing location, wherein the blade actuator moves the blade along a severing path generally transverse to the measurement direction.

In a fourth aspect, one or more embodiments of a method of severing a mud vein of a shrimp as described herein includes: positioning a shrimp in a selected severing location; and moving a blade through the shrimp along a severing path oriented generally transverse to a length of the shrimp as measured from a carapace to a tail of the shrimp, wherein the blade passes through a shell of the shrimp at a selected depth proximate a junction between a rearmost abdominal shell segment and an adjacent abdominal shell segment of the shrimp, wherein the rearmost abdominal shell segment is located between the adjacent abdominal shell segment and the tail of the shrimp.

In a fifth aspect, one or more embodiments of a shrimp heading apparatus as described herein includes: a heading restraint positioned opposite a working surface; a heading restraint actuator configured to move the heading restraint between a stored position and restraint position relative to the working surface, wherein the heading restraint is spaced from the working surface to allow for positioning of a shrimp between the heading restraint and the working surface when the heading restraint is in the stored position, and wherein the heading restraint is closer to the working surface when the heading restraint is in the restraint position than when the heading restraint is in the stored position such that the heading restraint is configured to force a shrimp located between the heading restraint and the working surface against the working surface when the heading restraint is in the restraint position; a spoon; a spoon actuator configured to move the spoon along a spoon path between a ready position and finish position relative to the heading restraint, wherein a working portion of the spoon is proximate a carapace side of the heading restraint when the spoon is in the ready position and wherein the working portion of the spoon is spaced away from the carapace side of the heading restraint when the spoon is in the finish position such that the working portion of the spoon is configured to separate a head of a shrimp on the working surface from an abdomen of the shrimp when the spoon moves from the ready position to the finish position; and a controller operably connected to the heading restraint actuator and the spoon actuator, the controller configured to: operate the heading restraint actuator to move the heading restraint from the stored position to the restraint position, operate the spoon actuator to move the spoon along the spoon path from the ready position to the finish position after operating the head restraint actuator to move the heading restraint to the restraint position, and operate the heading restraint actuator to return the heading restraint to the stored position after operating the spoon actuator to move the spoon to the finish position.

In a sixth aspect, one or more embodiments of a method of removing a head of a shrimp, the method comprising: restraining an abdomen of a shrimp in a fixed position on a working surface; moving a spoon through the shrimp proximate a carapace junction of the shrimp, wherein the carapace junction is located between a carapace and a first abdominal segment of the shrimp; and moving the spoon away from the abdomen while restraining the abdomen of the shrimp in the fixed position on the working surface, wherein moving the spoon away from the abdomen separates the carapace of the shrimp from the abdomen of the shrimp.

In a seventh aspect, one or more embodiments of a shrimp peeling apparatus as described herein includes: a lower roller assembly comprising a first lower roller, a second lower roller, and a lower roller assembly drive operably connected to the first and second lower rollers, wherein the lower roller assembly drive is configured to rotate the first lower roller about a first lower roller axis and rotate the second lower roller about the second lower roller axis, wherein the first lower roller axis is aligned with the second lower roller axis; an upper roller assembly comprising a first upper roller, a second upper roller, and an upper roller assembly drive operably connected to the first and second upper rollers, wherein the upper roller assembly drive is configured to rotate the first upper roller about a first upper roller axis and rotate the second upper roller about the second upper roller axis, wherein the first upper roller axis is aligned with the second upper roller axis, and wherein the first upper roller extends from a tail end to a head end along the first upper roller axis, and further wherein the second upper roller extends from a tail end to a head end along the second upper roller axis; a roller shuttle configured to move one or both of the lower roller assembly and the upper roller assembly between a receiving position and an operating position, wherein the lower roller assembly and the upper roller assembly are located farther from each other in a direction transverse to the first lower roller axis and the first upper roller axis when the lower roller assembly and the upper roller assembly are in the receiving position than when the lower roller assembly and the upper roller assembly are in the operating position; and a controller operably connected to the lower roller assembly drive, upper roller assembly drive, and the roller shuttle, the controller configured to: operate the roller shuttle to move one or both of the lower roller assembly and the upper roller assembly between the receiving position and the operating position; operate the lower roller assembly drive to rotate the first lower roller about the first lower roller axis over a first capture arc and rotate the second lower roller about the second lower roller axis over a second capture arc, wherein the first lower roller and second lower roller rotate in opposite directions over their respective capture arcs; operate the roller shuttle to move the lower roller assembly and the upper roller assembly from the receiving position to the operating position after rotating the first lower roller and second lower roller in opposite directions over their respective capture arcs; operate the upper roller assembly drive to rotate the first upper roller about the first upper roller axis over a first peeling arc and rotate the second upper roller about the second lower roller axis over a second peeling arc, wherein the first upper roller and the second upper roller rotate in opposite directions over their respective peeling arcs after the roller shuttle moves the lower roller assembly and the upper roller assembly from the receiving position to the operating position; and operate the lower roller assembly drive to rotate the first lower roller about the first lower roller axis over a first removal arc and rotate the second lower roller about the second lower roller axis over a second removal arc, wherein the first lower roller and the second lower roller rotate in opposite directions over their respective removal arcs while the lower roller assembly and the upper roller assembly are in the operating position; wherein the controller is configured to operate upper roller assembly drive to rotate the upper first and second upper rollers in opposite directions over their respective peeling arcs while operating the lower roller assembly drive to rotate the first and second lower rollers in opposite directions over their respective removal arcs.

In an eighth aspect, one or more embodiments of a shrimp processing apparatus in the form of peeling apparatus configured to remove pleopods and/or swimmerets from shrimp as described herein includes: a lower roller assembly comprising a first lower roller, a second lower roller, and a lower roller assembly drive operably connected to the first and second lower rollers, wherein the lower roller assembly drive is configured to rotate the first lower roller about a first lower roller axis and rotate the second lower roller about the second lower roller axis, wherein the first lower roller axis is aligned with the second lower roller axis; an upper assembly; a roller shuttle configured to move one or both of the lower roller assembly and the upper assembly between a receiving position and an operating position, wherein the lower roller assembly and the upper assembly are located farther from each other in a direction transverse to the first lower roller axis and the first upper roller axis when the lower roller assembly and the upper assembly are in the receiving position than when the lower roller assembly and the upper assembly are in the operating position; and a controller operably connected to the lower roller assembly drive and the roller shuttle, the controller configured to: operate the roller shuttle to move one or both of the lower roller assembly and the upper assembly between the receiving position and the operating position; operate the lower roller assembly drive to rotate the first lower roller about the first lower roller axis over a first capture arc and rotate the second lower roller about the second lower roller axis over a second capture arc, wherein the first lower roller and second lower roller rotate in opposite directions over their respective capture arcs; operate the roller shuttle to move the lower roller assembly and the upper assembly from the receiving position to the operating position after rotating the first lower roller and second lower roller in opposite directions over their respective capture arcs; and operate the lower roller assembly drive to rotate the first lower roller about the first lower roller axis over a first removal arc and rotate the second lower roller about the second lower roller axis over a second removal arc, wherein the first lower roller and the second lower roller rotate in opposite directions over their respective removal arcs while the lower roller assembly and the upper assembly are in the operating position.

In a ninth aspect, one or more embodiments of a method of peeling a shrimp as described herein may include: capturing at least one pleopod attached to an abdomen of a shrimp between a first lower roller and a second lower roller by rotating each of the first and second lower rollers over a capture arc, wherein the first and second lower rollers are rotated in opposite directions; contacting the abdominal shell segments of the shrimp with a first upper roller and a second upper roller after rotating the first and second lower rollers over their respective capture arcs; rotating the first upper roller over a first peeling arc and rotating the second upper roller over a second peeling arc, wherein the first and second upper rollers are rotated in opposite directions over their respective peeling arcs; and rotating the first lower roller over a first removal arc and rotating the second lower roller over a second removal arc, wherein the first lower roller and the second lower roller rotate in opposite directions over their respective removal arcs; wherein, after contacting the abdominal shell segments of the shrimp with a first upper roller and a second upper roller, the method comprises rotating the first and second upper rollers over their respective peeling arcs while rotating the first and second lower rollers over their respective removal arcs.

In a tenth aspect, one or more embodiments of a method of peeling a shrimp to remove only its pleopods and/or swimmerets as described herein may include: capturing a plurality of pleopods attached to an abdomen of a shrimp between a first lower roller and a second lower roller by rotating each of the first and second lower rollers over a capture arc, wherein the first and second lower rollers are rotated in opposite directions; contacting the abdominal shell segments of the shrimp with an upper assembly after rotating the first and second lower rollers over their respective capture arcs; and rotating the first lower roller over a first removal arc and rotating the second lower roller over a second removal arc after contacting the abdominal shell segments of the shrimp with the upper assembly, wherein the first lower roller and the second lower roller rotate in opposite directions over their respective removal arcs.

In an eleventh aspect, one or more embodiments of a shell segment separator apparatus as described herein may include: a first shell segment retainer positioned opposite a working surface; a second shell segment retainer positioned opposite the working surface; a first retainer actuator operably connected to the first shell segment retainer and configured to move the first shell segment retainer from a ready configuration to a retention configuration, wherein the first shell segment retainer is configured to allow for positioning of a shrimp between the first shell segment retainer and the working surface when the first shell segment retainer is in the ready configuration, and wherein the first shell segment retainer is configured to retain a first shell segment of a shrimp located between first shell segment retainer and the working surface in a selected location on the working surface when the first shell segment retainer is in the retention configuration; a second retainer actuator operably connected to the second shell segment retainer and configured to move the second shell segment retainer from a ready configuration to a retention configuration, wherein the second shell segment retainer is configured to allow for positioning of a shrimp between the second shell segment retainer and the working surface when the second shell segment retainer is in the ready configuration, and wherein the second shell segment retainer is configured to retain a second shell segment of a shrimp located between second shell segment retainer and the working surface in a selected location relative to the second shell segment retainer when the second shell segment retainer is in the retention configuration; a separation actuator operably connected to the second shell segment retainer, the separation actuator configured to move one or both of the first shell segment retainer and the second shell segment retainer between an initial position and a separation position relative to each other, wherein the second shell segment retainer is located further away from the first shell segment retainer when the first shell segment retainer and the second shell segment retainer are in the separation position than when the first shell segment retainer and the second shell segment retainer are in the initial position, wherein one or both of the first shell segment retainer and the second shell segment retainer move along a processing axis when moving between the initial position and the separation position; and a controller operably connected to the first retainer actuator, the second retainer actuator, and the separation actuator, wherein the controller is configured to: operate the first retainer actuator to move the first shell segment retainer from the ready configuration to the retention configuration; operate the second retainer actuator to move the second shell segment retainer from the ready configuration to the retention configuration; and operate the separation actuator to move one or both of the first shell segment retainer and the second shell segment retainer such that the first shell segment retainer and the second shell segment retainer move from the initial position to the separation position after operating the first retainer actuator to move the first shell segment retainer from the ready configuration to the retention configuration and after operating the second retainer actuator to move the second shell segment retainer from the ready configuration to the retention configuration.

In a twelfth aspect, one or more embodiments of a method of separating adjacent shell segments on an abdomen of a shrimp as described herein may include: retaining a first shell segment on an abdomen of a shrimp, wherein the first shell segment is optionally retained in a fixed location relative to a processing axis, and wherein the abdomen of the shrimp is aligned with the processing axis; and moving a second shell segment on the abdomen of the shrimp away from the first shell segment in a direction aligned with the processing axis while, optionally, retaining the first shell segment in the fixed location, wherein the second shell segment is adjacent the first shell segment; wherein the first shell segment and the second shell segment remain attached to the abdomen of the shrimp after moving the second shell segment away from the first shell segment.

In a thirteenth aspect, one or more embodiments of a shrimp processing system as described herein may include: a plurality of clamps, wherein each clamp of the plurality of clamps is configured to hold a shrimp proximate a tail of the shrimp; a plurality of processing stations comprising at least one data collection station capable of collecting data regarding a shrimp held in each clamp of the plurality of clamps and at least one functional station capable of changing the shrimp held in each clamp of the plurality of clamps; a conveying system connecting the plurality of processing stations, the conveying system configured to move the plurality of clamps between the plurality of processing stations; and a controller operably connected to the conveying system and the plurality of processing stations, the controller configured to: operate the conveying system such that the plurality of clamps are moved through the plurality of processing stations; and selectively activate each processing station of the plurality of processing stations.

In one or more embodiments of the shrimp processing systems described herein, the plurality of clamps are magnetically attached to the conveying system.

In one or more embodiments of the shrimp processing systems described herein, the conveying system comprises a plurality of clamp mounts, wherein the plurality of clamps are attached to the conveying system through the plurality of clamp mounts. In one or more embodiments, two or more clamps of the plurality of clamps are attached to each clamp mount of the plurality of clamp mounts.

In one or more embodiments of the shrimp processing systems described herein, the clamp mounts are magnetically attached to the conveying system.

In one or more embodiments of the shrimp processing systems described herein, the conveying system comprises a plurality of mounting bosses, wherein each clamp mount comprises one or more blocks, wherein each block is configured to attach to one mounting boss of the plurality of mounting bosses. In one or more embodiments, the mounting boss and the block of one or more attached pairs of mounting bosses and blocks each comprise a pair of permanent magnets, wherein the pairs of permanent magnets in the mounting boss and the attached block form closed magnetic fields. In one or more embodiments, the mounting boss and the block of one or more attached pairs of mounting bosses and blocks are attached to each other using one or more of: mechanical fasteners, adhesives, and interlocking mechanical connections.

In one or more embodiments of the shrimp processing systems described herein, the conveying system comprises one or more belts extending between the plurality of processing stations, wherein the one or more belts moved through the plurality of processing stations along a conveying direction, and wherein the plurality of mounting bosses are attached to the one or more belts, and further wherein the plurality of mounting bosses are cantilevered over the one or more belts to which the plurality of mounting bosses are attached. In one or more embodiments, the plurality of mounting bosses cantilevered over the one or more belts to which the plurality of mounting bosses are attached are cantilevered over the one or more belts along their leading edges as defined by the conveying direction.

In one or more embodiments of the shrimp processing systems described herein, the plurality of mounting bosses cantilevered over the one or more belts to which the plurality of mounting bosses are attached are cantilevered over the one or more belts along their trailing edges as defined by the conveying direction.

In one or more embodiments of the shrimp processing systems described herein, the conveying system advances the plurality of clamps from a loading end to an ejection end, and wherein the conveying system comprises an ejection station at the ejection end, the ejection station configured to eject shrimp held in the plurality of clamps from the plurality of clamps.

In one or more embodiments of the shrimp processing systems described herein, the ejection station comprises a plurality plungers, wherein each plunger of the plurality of plungers comprises a retracted position an ejection position, and wherein movement of the plunger from the retracted position to the ejection position in the presence of a shrimp held in a clamp at the ejection station forces the shrimp from the clamp. In one or more embodiments, the plunger is configured to act on an abdominal segment adjacent the clamp.

In one or more embodiments of the shrimp processing systems described herein, each clamp of the plurality of clamps comprises: a pair of jaws positioned on a base, wherein the pair of jaws comprises a first jaw and a second jaw facing each other across a clamping axis extending between the first jaw and the second jaw, wherein the first jaw comprises a first jaw face and the second jaw comprises a second jaw face, wherein the first jaw face faces the second jaw face along the clamping axis, wherein the first jaw face and the second jaw face define a receiving slot between the first jaw face and the second jaw face, wherein a distance between the first jaw face and the second jaw face across the receiving slot in a direction aligned with the clamping axis narrows when moving away from the base between the first jaw face and the second jaw face along a compression axis, wherein the compression axis extends through the base between the first jaw face and the second jaw face; and a spring member operably attached to the first jaw, the spring member configured to resist movement of the first jaw away from the second jaw along the clamping axis and the spring member configured to resist movement of the first jaw away from the base along a compression direction aligned with the compression axis, wherein a shrimp located between the pair of jaws is compressed against the base between the pair of jaws by the spring member and the first jaw.

In one or more embodiments of the shrimp processing systems described herein, a data collection station of the plurality of processing stations comprises a measurement station configured to measure a length of a shrimp held in each clamp of the plurality of clamps.

In one or more embodiments of the shrimp processing systems described herein, a functional station of the plurality of processing stations comprises a mud vein severing apparatus configured to sever a mud vein of a shrimp.

In one or more embodiments of the shrimp processing systems described herein, a functional station of the plurality of processing stations comprises a heading apparatus configured to remove a head of a shrimp.

In one or more embodiments of the shrimp processing systems described herein, a functional station of the plurality of processing stations comprises a peeling apparatus configured to remove a shell of a shrimp.

In one or more embodiments of the shrimp processing systems described herein, a functional station of the plurality of processing stations comprises a shell segment separator apparatus configured to separate a pair of adjacent shell segments of a shrimp.

In one or more embodiments of the shrimp processing systems described herein, the plurality of processing stations comprises two or functional stations selected from the group of: a mud vein severing apparatus configured to sever a mud vein of a shrimp, a heading apparatus configured to remove a head of a shrimp, a peeling apparatus configured to remove a shell of a shrimp, and a shell segment separator apparatus configured to separate a pair of adjacent shell segments of a shrimp.

In one or more embodiments of the shrimp processing systems described herein, the at least one data collection station comprises a measurement module configured to measure a length of a shrimp held in a clamp of the plurality of clamps moving through the measurement module along a measurement direction, the measurement module comprising a non-contact sensor configured to detect the clamp and a shrimp held in the clamp, the non-contact sensor operably connected to the controller to deliver signals indicative of energy received by the non-contact sensor, wherein the controller is further configured to: identify a junction between a clamp and a shrimp held in the clamp when moving a shrimp held in the clamp through the non-contact sensor based on a signal received from the non-contact sensor; determine a length of a shrimp held in a clamp after identifying the junction between a clamp and a shrimp held in a clamp based at least in part on a signal received from the non-contact sensor; and optionally, determine a weight of a shrimp held in a clamp after determining the length of a shrimp held in a clamp based at least in part on the length of a shrimp held in a clamp. In one or more embodiments, the controller is configured to identify a junction between a clamp and a shrimp when the signal received from the non-contact sensor reaches or falls below a selected clamp threshold value.

In one or more embodiments of the shrimp processing systems described herein, the controller is configured to determine a length of a shrimp when the signal received from the non-contact sensor reaches or exceeds a selected antenna threshold value.

In one or more embodiments of the shrimp processing systems described herein, the non-contact sensor comprises an optical sensor or an ultrasonic sensor.

In one or more embodiments of the shrimp processing systems described herein, the controller is configured to operate the non-contact sensor to calibrate the non-contact sensor before every shrimp held in a clamp passes through the non-contact sensor in the measurement direction.

In one or more embodiments of the shrimp processing systems described herein, the controller is configured to operate the non-contact sensor to calibrate the non-contact sensor after a selected number of shrimp held in a clamp pass through the non-contact sensor in the measurement direction.

In one or more embodiments of the shrimp processing systems described herein, the controller comprises a central controller controlling the conveying system and the plurality of processing stations.

In a fourteenth aspect, one or more embodiments of a method of processing shrimp as described herein may include: loading individual shrimp into each clamp of a plurality of clamps to provide a plurality of loaded clamps, wherein each loaded clamp restrains only one individual shrimp at a time; transporting each loaded clamp between a plurality of processing stations using a conveying system connecting the plurality of processing stations; collecting data on each shrimp in the plurality of loaded clamps in at least one processing station of the plurality of processing stations; and performing one or more actions on each shrimp in the plurality of loaded clamps in at least one processing station of the plurality of processing stations.

In one or more embodiments of methods of processing shrimp as described herein, the method comprises: loading individual shrimp into each clamp of a plurality of clamps to provide a plurality of loaded clamps, wherein each loaded clamp restrains only one individual shrimp at a time; transporting each loaded clamp between a plurality of processing stations using a conveying system connecting the plurality of processing stations; collecting data on each shrimp in the plurality of loaded clamps in at least one processing station of the plurality of processing stations; and performing one or more actions on each shrimp in the plurality of loaded clamps in at least one processing station of the plurality of processing stations.

In one or more embodiments of methods of processing shrimp as described herein, the plurality of clamps are arranged in groups of two or more clamps on the conveying system, wherein transporting each loaded clamp between the plurality of processing stations comprises simultaneously transporting the groups of two or more clamps between the plurality of processing stations.

In one or more embodiments of methods of processing shrimp as described herein, the plurality of processing stations are arranged in groups of two or more processing stations, wherein the method comprises: transporting the groups of two or more clamps between the groups of two or more processing stations; collecting data on the shrimp in each group of two or more clamps at each group of two more processing stations configured to collect data before transporting each group of two or more clamps out of the group of two or more processing stations; and performing one or more actions on the shrimp in each group of two or more clamps at each group of two or more processing stations configured to perform one or more actions before transporting each group of two or more clamps out of the group of two or more processing stations configured to perform one or more actions.

In one or more embodiments of methods of processing shrimp as described herein, collecting data comprises measuring a length of each shrimp and, optionally, assigning a weight to each shrimp based at least in part on the length of each shrimp. In one or more embodiments, measuring the length of each shrimp comprises measuring the length of each shrimp according to any one of the methods of measuring shrimp as described herein.

In one or more embodiments of methods of processing shrimp as described herein, performing one or more actions on each shrimp comprises severing a mud vein at a selected location on each shrimp, wherein the method comprises identifying the selected location based at least in part on the length of each shrimp.

In one or more embodiments of methods of processing shrimp as described herein, performing one or more actions on each shrimp comprises severing a mud vein at a selected location on each shrimp.

In one or more embodiments of methods of processing shrimp as described herein, performing one or more actions on each shrimp comprises removing a head from each shrimp.

In one or more embodiments of methods of processing shrimp as described herein, performing one or more actions on each shrimp comprises severing a mud vein on each shrimp proximate a tail of the shrimp before removing the head from each shrimp.

In one or more embodiments of methods of processing shrimp as described herein, performing one or more actions on each shrimp comprises severing a mud vein on each shrimp proximate a tail of the shrimp and, optionally, removing a head from each shrimp after severing the mud vein.

In one or more embodiments of methods of processing shrimp as described herein, the method comprises identifying a carapace junction between the carapace and the abdomen of each shrimp before removing the head from each shrimp. In one or more embodiments, identifying the carapace junction and removing the head of the shrimp are performed at a single processing station.

In one or more embodiments of methods of processing shrimp as described herein, performing one or more actions on each shrimp comprises removing abdominal shell segments from each shrimp.

In one or more embodiments of methods of processing shrimp as described herein, performing one or more actions on each shrimp comprises removing one or more pleopods from each shrimp.

In one or more embodiments of methods of processing shrimp as described herein, performing one or more actions on each shrimp comprises simultaneously removing abdominal shell segments and one or more pleopods from each shrimp.

In a fifteenth aspect, one or more embodiments of a method of measuring shrimp held in a clamp comprise: moving a shrimp held in a clamp through a non-contact sensor along a measurement direction; identifying a junction between the clamp and the shrimp when moving a shrimp held in the clamp based on a signal received from the non-contact sensor; determining a length of the shrimp held in the clamp after identifying the junction between a clamp and a shrimp held in a clamp based at least in part on a signal received from the non-contact sensor as the shrimp passes through the non-contact sensor; and optionally, determining a weight of the shrimp held in the clamp after determining the length of the shrimp, the weight being based at least in part on the length of the shrimp.

In one or more embodiments of methods of measuring shrimp according to the fifteenth aspect, the junction between the clamp and the shrimp comprises determining when the signal received from the non-contact sensor reaches or falls below a selected clamp threshold value.

In one or more embodiments of methods of measuring shrimp according to the fifteenth aspect, determining the length of the shrimp comprises determining when the signal received from the non-contact sensor reaches or exceeds a selected antenna threshold value indicting that at least one antenna of the shrimp is passing through the non-contact sensor.

In one or more embodiments of methods of measuring shrimp according to the fifteenth aspect, the non-contact sensor comprises an optical sensor or an ultrasonic sensor.

In one or more embodiments of methods of measuring shrimp according to the fifteenth aspect, the method further comprises calibrating the non-contact sensor before every shrimp held in a clamp passes through the non-contact sensor in the measurement direction.

In one or more embodiments of methods of measuring shrimp according to the fifteenth aspect, the method further comprises calibrating the non-contact sensor after a selected number of the shrimp pass through the non-contact sensor in the measurement direction.

In a sixteenth aspect, one or more embodiments of a clamp configured to restrain a shrimp as described herein may include: a pair of jaws positioned on a base, wherein the pair of jaws comprises a first jaw and a second jaw facing each other across a clamping direction; wherein the first jaw comprises a first jaw face and the second jaw comprises a second jaw face, wherein the first jaw face faces the second jaw face across the clamping direction; wherein the first jaw face and the second jaw face define a receiving slot between the first jaw face and the second jaw face, wherein a distance between the first jaw face and the second jaw face in the clamping direction narrows when moving away from the base between the first jaw face and the second jaw face in a compression direction transverse to the clamping direction; biasing means operably attached to the pair of jaws, the biasing means resisting movement of the first jaw away from the second jaw along the clamping direction and the biasing means resisting movement of the first jaw away from the base along the compression direction, wherein a tail of a shrimp located between the pair of jaws is compressed against the base between the pair of jaws by the first jaw.

In a seventeenth aspect, one or more embodiments of a clamp configured to restrain a shrimp as described herein may include: a pair of jaws positioned on a base, wherein the pair of jaws comprises a first jaw and a second jaw facing each other across a clamping direction; wherein the first jaw and the second jaw define a receiving slot between the first jaw and the second jaw, wherein a width of the receiving slot in the clamping direction narrows when moving away from the base between the first jaw and the second jaw in a compression direction transverse to the clamping direction; wherein the clamp is configured to apply a clamping force and a compression force to a tail of a shrimp located between the pair of jaws, wherein the clamping force acts in the clamping direction and wherein the compression force urges the tail towards the base.

As used herein, the term “shrimp” should be construed to refer to crustaceans harvested for human consumption that are referred to as either shrimp or prawns in, for example, the sub-orders Picocyemata (Shrimp) and Dendrobranchiata (Prawns). Further, because the physical characteristics of shrimp capable of being processed using the shrimp processing systems and methods described herein can vary widely, any dimensions discussed herein are provided only as a general guide and further refinement of any such dimensions may be required to optimize operation of the shrimp processing systems and methods described herein based on for example, the size, species, and/or general conditions of shrimp being processed.

If used herein, relational terms such as above, below, top, bottom, etc. are (unless otherwise specified in this description and/or the claims) used only to facilitate description of the various features of the shrimp processing systems and methods described herein and should not be construed to require any specific orientation of the shrimp processing systems, the shrimp being processed by the systems, and/or the methods described herein.

If used herein, the term "substantially" has the same meaning as "significantly," and can be understood to modify the term that follows by at least about 75%, at least about 90%, at least about 95%, or at least about 98%. The term "not substantially" as used herein has the same meaning as "not significantly," and can be understood to have the inverse meaning of "substantially," i.e., modifying the term that follows by not more than 25%, not more than 10%, not more than 5%, or not more than 2%.

Numeric values used herein include normal variations in measurements as expected by persons skilled in the art and should be understood to have the same meaning as "approximately" and to cover a typical margin of error, such as +5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The above summary of the invention is not intended to describe each embodiment or every implementation of the shrimp processing systems, processing stations, and methods described herein. Rather, a more complete understanding of the invention will become apparent and appreciated by reference to the following description of illustrative embodiments and claims in view of the accompanying figures of the drawing.

Figure 1A:
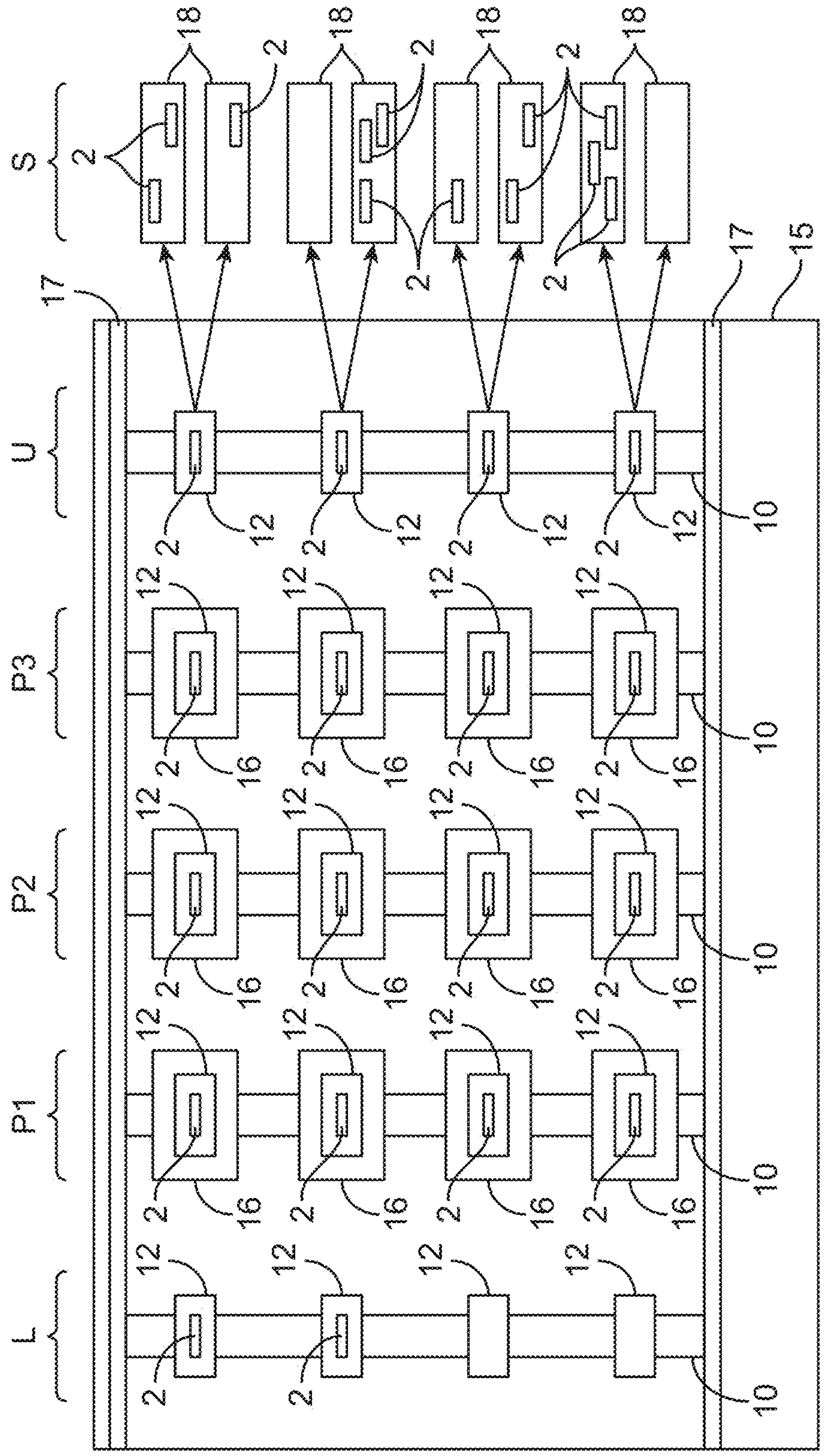
FIG. 1A is a block diagram of one illustrative embodiment of a shrimp processing system as described herein.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DESCRIPTION OF ILLUSTRATIVE EMBODIMENTS

In the following description, reference is made to the accompanying figures of the drawing which form a part hereof, and in which are shown, by way of illustration, specific embodiments. It is to be understood that other embodiments may be utilized and changes may be made without departing from the scope of the present invention.

FIG. 1A is a block diagram of one illustrative embodiment of a modular shrimp processing system as described herein. The shrimp processing system includes a series of stations at which one or more functions may be performed. In the depicted illustrative embodiment, the left most station L may be described as a loading station in which shrimp 2 are loaded onto clamps 12 such that each shrimp 2 can be retained and processed by the depicted shrimp processing system.

In the depicted embodiment, a plurality of clamps 12 are provided on a clamp mount 10. In one or more alternative embodiments, however, each clamp 12 may be individually moved through a shrimp processing system as described herein, i.e., the clamp mount 10 carrying a plurality of clamps 12 is optional.

FIG. 1A also depicts a conveying system 15 used to move the clamp mounts 10 through the shrimp processing system. In the depicted embodiment, conveying system 15 uses a pair of conveying elements 17 to which clamp mounts 10 are attached which can be used to move the clamp mounts 10 through the groups of processing stations to process shrimp loaded on the clamps. The conveying elements 17 may be in the form of, for example, belts, chains, etc. as used in any suitable conventional conveying equipment. Although the depicted embodiment of conveying system 15 includes to conveying elements 17, other embodiments of conveying systems used in shrimp processing systems as described herein may include only one conveying element or three or more conveying elements as needed to move clamps 12 through the shrimp processing system.

The shrimp processing system further includes a series of groups P1, P2, P3 of processing stations 16 at which one or more processes may be performed on each shrimp 2 loaded onto clamps 12 as the shrimp pass through the processing system. It may be preferred that the number of processing stations 16 in each group P1, P2, P3 match the number of clamps 12 provided on each clamp mount 10 (which, in the depicted embodiment, includes four clamps 12 and four processing stations 16 in each group), although this is not necessary in all embodiments of shrimp processing systems as described herein.

The conveying system 15 may, in one or more embodiments, deliver or move clamps 12 into selected locations in each of the processing stations 16 such that the equipment at each of the processing stations 16 can be operated based on having clamps 12 carrying shrimp 2 at those selected locations. Each successive clamp 12 is moved into each selected location in the processing stations 16 to assist the processing stations in accurately processing shrimp held in the clamps 12. Moving clamps 12 carrying shrimp into selected locations in the processing stations 16 can be distinguished from shrimp processing systems and methods in which shrimp are moved through a shrimp processing system without control over the location of the shrimp (for example, systems in which shrimp are entrained in water, etc.). As discussed herein, for example, many of the processing stations 16 are designed to act on specific features found in the shrimp in the clamps 12 and accurately locating those features as successive shrimp are moved into each selected location assists in effective and efficient processing of shrimp using the shrimp processing systems described herein.

An unloading station U is located after the groups P1, P2, P3 of processing stations at which shrimp 2 may be unloaded/released from the clamps 12 on each clamp mount 10 after passing through the groups P1, P2, P3 of processing stations.

The illustrative embodiment of the shrimp processing system depicted in FIG. 1A also includes an optional sorting station S at which shrimp 2 may be separated into bins or other containers 18 based on one or more characteristics such as, e.g., weight, length, shelled, unshelled, etc.

In the depicted embodiment, the conveying system 15 advances the clamps 12 from the loading end L to the unloading station U. In one or more embodiments, the conveying system may include ejection stations at the unloading station U that are configured to eject shrimp from the clamps 12. In one or more embodiments, the ejection stations may be a set of plungers acting on shrimp 2 located in clamps 12.

Figure 1B:
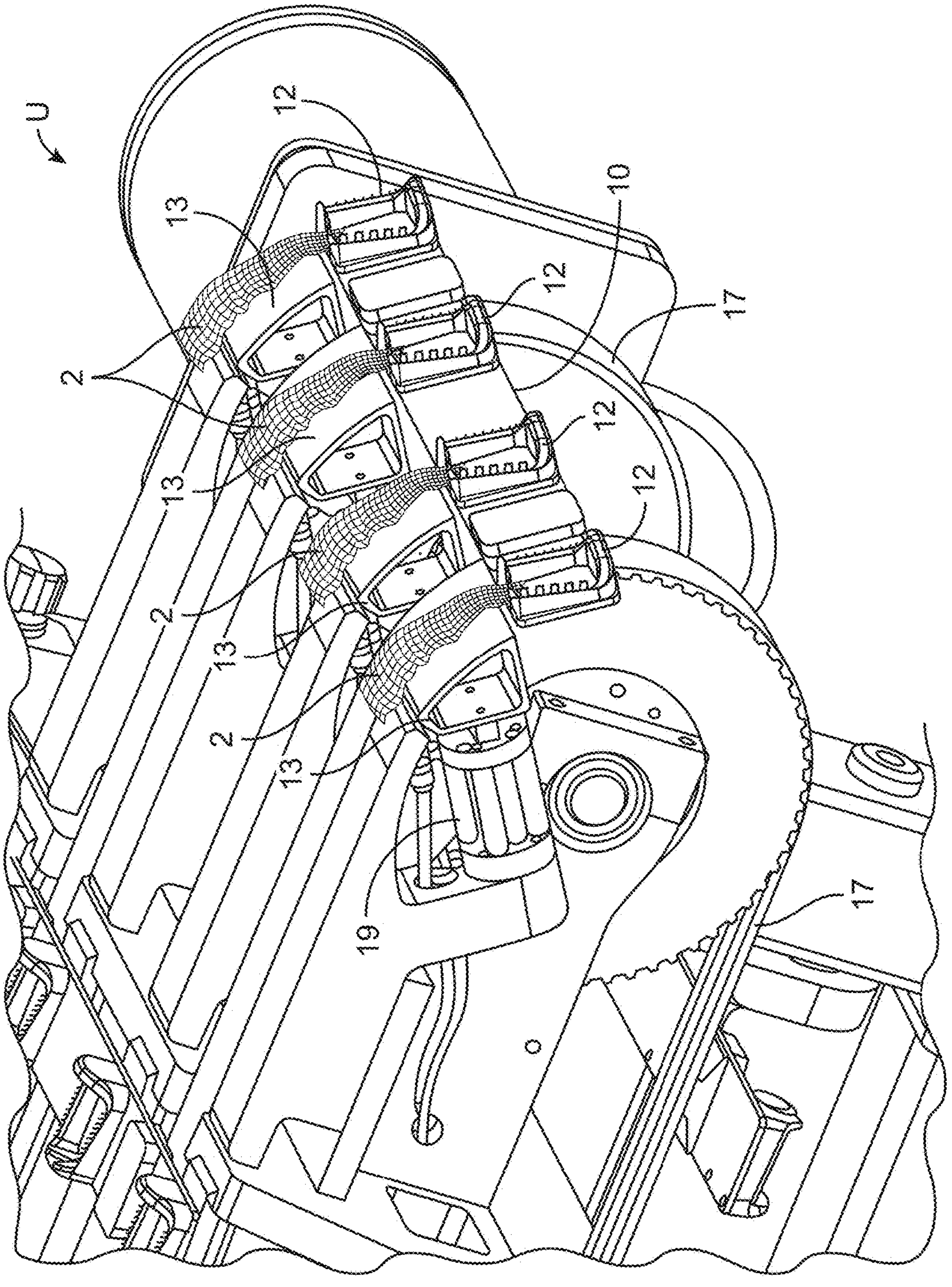
FIG. 1B is a perspective view of one illustrative embodiment of an unloading station that may be used to unload or eject shrimp that have been processed in the shrimp processing systems described herein.
Figure 1C:
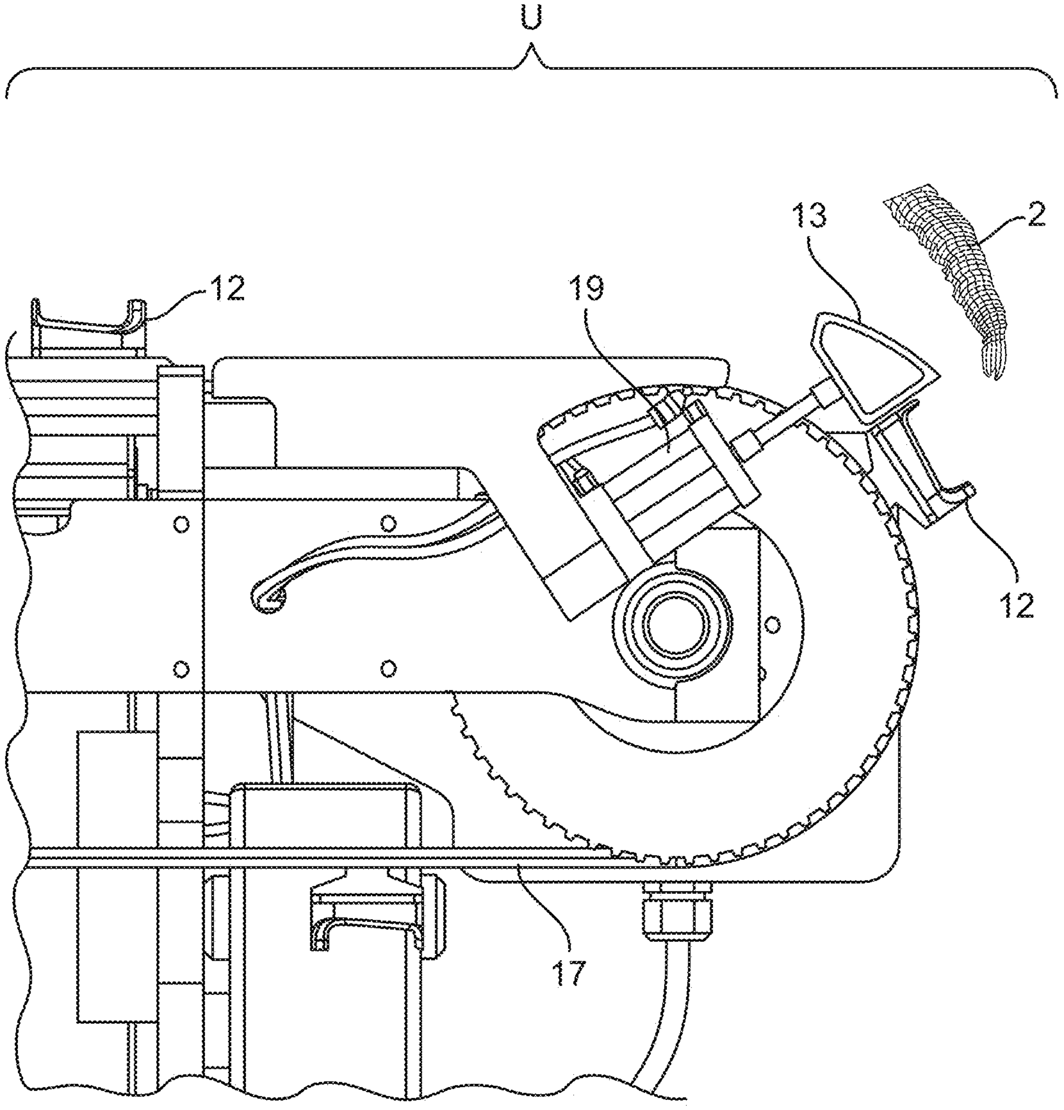
FIG. 1C is a side view of the unloading station depicted in FIG. 1B after ejection/unloading of a shrimp from a clamp as described herein.

FIGS. 1B and 1C depict one illustrative embodiment of a set of plungers in one illustrative embodiment of an unloading station U that may be used to eject or remove shrimp 2 from clamps 12 that, as discussed herein, may be carried on a clamp mount 10 using conveying elements 17. The plungers 13 are mounted to force shrimp 2 out of clamps 12 using an actuator 19 (e.g., a piston operated hydraulically, pneumatically, using a solenoid, etc.). The actuator 19 is retracted in FIG. 1B as the shrimp 2 carried in clamps 12 are moved into position. When the shrimp 2 are in position on the plungers 13, the actuators 19 may be actuated to force the shrimp 2 out of the clamps 12 as depicted in, e.g., FIG. 1C. In the depicted illustrative embodiment, the plungers 13 may be described as having arcuate surfaces that act on the ventral surfaces of the shrimp 2 to, preferably, reduce or eliminate damage to the shrimp 2 during the unloading/ejection process. In one or more embodiments, the actuators 19 may be operably connected to a control system used to operate the conveying system 15 and/or any other apparatus used in the shrimp processing systems described herein.

Figure 2:
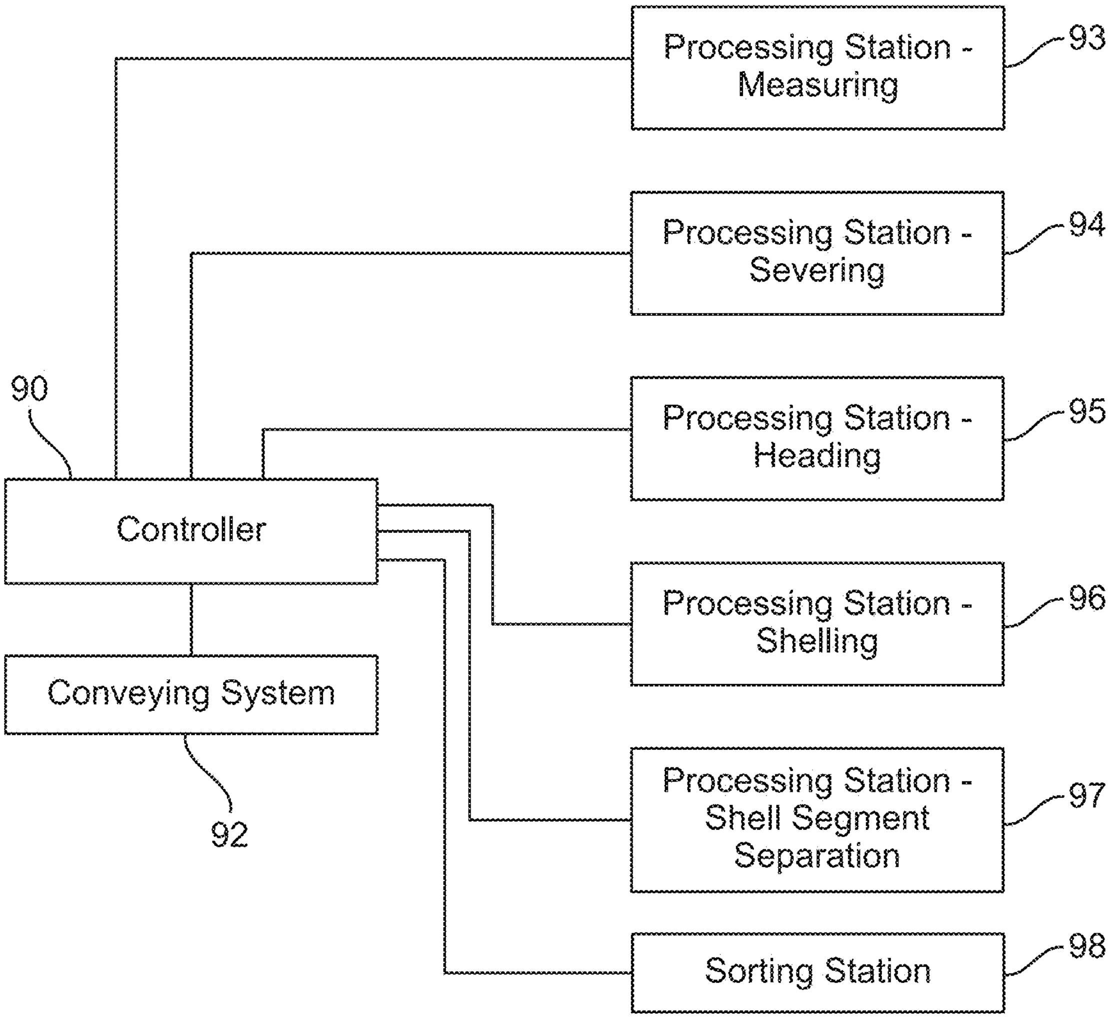
FIG. 2 is a block diagram of a control system that may be implemented in one illustrative embodiment of a shrimp processing system as described herein.

With reference to FIG. 2, one illustrative embodiment of a control system used to control operation of a shrimp processing system as described herein is depicted. The control system includes a controller 90 that is operably connected to processing stations of a shrimp processing system. The depicted illustrative shrimp processing system includes a processing station for measuring 93, a processing station for severing mud veins 94, a processing station for heading shrimp 95, a processing station for peeling shrimp 96 (where peeling may include removing abdominal shell segments on the dorsal surface along with removing pleopods and perciopods from the ventral surface, or removing the pleopods and perciopods from the ventral surface while leaving the shell segments on the dorsal surface intact), a processing station for separating adjacent abdominal shell segments on shrimp 97, and an ejection/sorting station 98. The shrimp processing system also includes a conveying system 92 operably connected to the controller as well as being operably connected to each of the processing stations to move clamps carrying shrimp through the various processing stations as described herein.

Although the controller 90 depicted in connection with the illustrative embodiment of a shrimp processing system of FIG. 2 is in the form of a single controller in which all control functions may be performed by a single controller (although backup and/or redundant controllers may be provided to assist in the case of failure of a primary controller), one or more alternative embodiments of shrimp processing systems may include a distributed set of controllers, with those processing stations requiring a controller having a dedicated controller and, potentially, a network may be used to interconnect the various controllers to facilitate processing of shrimp by the shrimp processing system.

The controllers used in one or more embodiments of shrimp processing systems as described herein may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the apparatus (e.g., keyboards, touchscreens, mice, trackballs, etc.), as well as display devices configured to convey information to a user (e.g., monitors (which may or may not be touchscreens), indicator lights, etc.).

Although depicted as being separate in FIG. 2, it should be understood that one or more processing stations may be combined in one or more embodiments of shrimp processing systems as described herein. For example, group P1 of processing stations in the shrimp processing system depicted in FIG. 1A may be configured to both measure shrimp 2 and sever the mud veins of the shrimp 2 restrained on clamps 12 in each of the processing stations 16 in that group (thus performing both functions described for processing stations 93 and 94 in the system as depicted in FIG. 2). Other combinations of processing steps may also be incorporated into single processing stations.

Furthermore, some processes such as, e.g., measuring, may be performed more than once on each shrimp. For example, in one or more embodiments, shrimp may be measured as a part of the process for severing the mud veins in shrimp passing through the shrimp processing system and may be measured again to assist with other processing such as, e.g., heading, sorting, shell segment separation, etc.

Although all of the different shrimp processing apparatus described herein may preferably be incorporated into a single shrimp processing system or method, it should be understood that any single apparatus described herein may be used in a standalone configuration in which only the functions performed by a specific apparatus are performed on each shrimp passing through that apparatus or method. For example, a single station may be provided for heading shrimp that is not preceded by a mud vein severing apparatus or measurement apparatus or method. Similarly, a single station may be provided for peeling shrimp that have not been processed by a heading apparatus or that have had their heads removed by another process or apparatus before being delivered to a peeling apparatus as described herein.

Further, any two or more of the different shrimp processing apparatus described herein may be incorporated into the shrimp processing systems and methods as described herein. For example, a shrimp processing system or method as described herein may include a measurement apparatus and a mud vein severing apparatus, with the measurement apparatus and the mud vein severing apparatus being provided as either separate processing stations in the shrimp processing system or combined in an integrated processing station of a shrimp processing system.

In another variation, a shrimp processing system or method as described herein may include a measurement apparatus and a shell segment separator apparatus as described herein, with the measurement apparatus and the shell segment separation apparatus provided as either separate processing stations in the shrimp processing system or combined in an integrated processing station of a shrimp processing system.

In another variation, a shrimp processing system or method as described herein may include a measurement apparatus and a heading apparatus as described herein, with the measurement apparatus and the heading apparatus provided either as separate processing stations in the shrimp processing system or combined in an integrated processing station of a shrimp processing system.

The methods of processing shrimp as described herein, whether used with the processing systems described herein or not, may include loading individual shrimp into each clamp of a plurality of clamps to provide a plurality of loaded clamps, with each loaded clamp restraining only one individual shrimp at a time. The method may further include transporting each loaded clamp carrying a shrimp between a plurality of processing stations using a conveying system that connects the processing stations. In one or more methods, the method may include collecting data on each shrimp in the loaded clamps in at least one processing station of the plurality of processing stations. In one or more methods, the method may include performing one or more actions on each shrimp in the plurality of loaded clamps in at least one processing station of the plurality of processing stations.

In one or more embodiments of the methods described herein, the clamps may be arranged in groups of two or more clamps on the conveying system, wherein transporting each loaded clamp between the plurality of processing stations includes simultaneously transporting the groups of two or more clamps between the plurality of processing stations.

In methods in which the processing stations are arranged in groups of two or more processing stations, the methods described herein may include transporting the groups of two or more loaded clamps between the groups of two or more processing stations, and collecting data on the shrimp in each group of the two or more clamps at each group of two or more processing stations configured to collect data before transporting each group of two or more clamps out of the group of two or more processing stations. Further, the method may include performing one or more actions on the shrimp in each group of two or more clamps at each group of two or more processing stations configured to perform one or more of the actions before transporting each group of two or more clamps out of the group of two or more processing stations configured to perform the one or more actions.

In one or more methods of processing shrimp as described herein, collecting data may include measuring a length of each shrimp when, for example, each shrimp is located in a clamp as described herein. In one or more embodiments of the methods described herein a weight may be assigned to each shrimp based at least in part on the length of each shrimp as measured in one or more methods as described herein.

One or more methods of processing shrimp as described herein may include performing actions such as, for example, severing a mud vein in each shrimp at a selected location on the shrimp. In one or more embodiments, the method may include identifying the selected location at which the mud vein is to be severed based at least in part on the length of each shrimp as measured in one or more methods of processing shrimp as described herein.

One or more of methods of processing shrimp as described herein may include removing a head from each shrimp, with the head optionally being removed after severing a mud vein on each shrimp proximate a tail of the shrimp. Removal of the head according to one or more methods of processing shrimp as described herein may include identifying a carapace junction between the carapace and the abdomen of each shrimp before removing the head from each shrimp.

One or more methods of processing shrimp as described herein may include separating adjacent abdominal shell segments found on the dorsal surface of the abdomen of shrimp before removing the abdominal shell segments from the shrimp.

One or more methods of processing shrimp as described herein may include simultaneously removing abdominal shell segments along with one or more pleopods from each shrimp. One or more methods of processing shrimp as described herein may include removing one or more pleopods from each shrimp while leaving the abdominal shell segments intact.

Illustrative examples of shrimp processing systems and methods of processing shrimp are presented below in connection with a variety of illustrative examples of shrimp processing stations and the methods performed at those stations. It should be understood that the processing stations and the methods performed at those stations are only illustrative examples of processing stations and methods that may be used in a processing system as described herein in connection with FIGS. 1-2 and that other alternative processing stations and methods may be used in a shrimp processing system as described herein.

Figure 3:
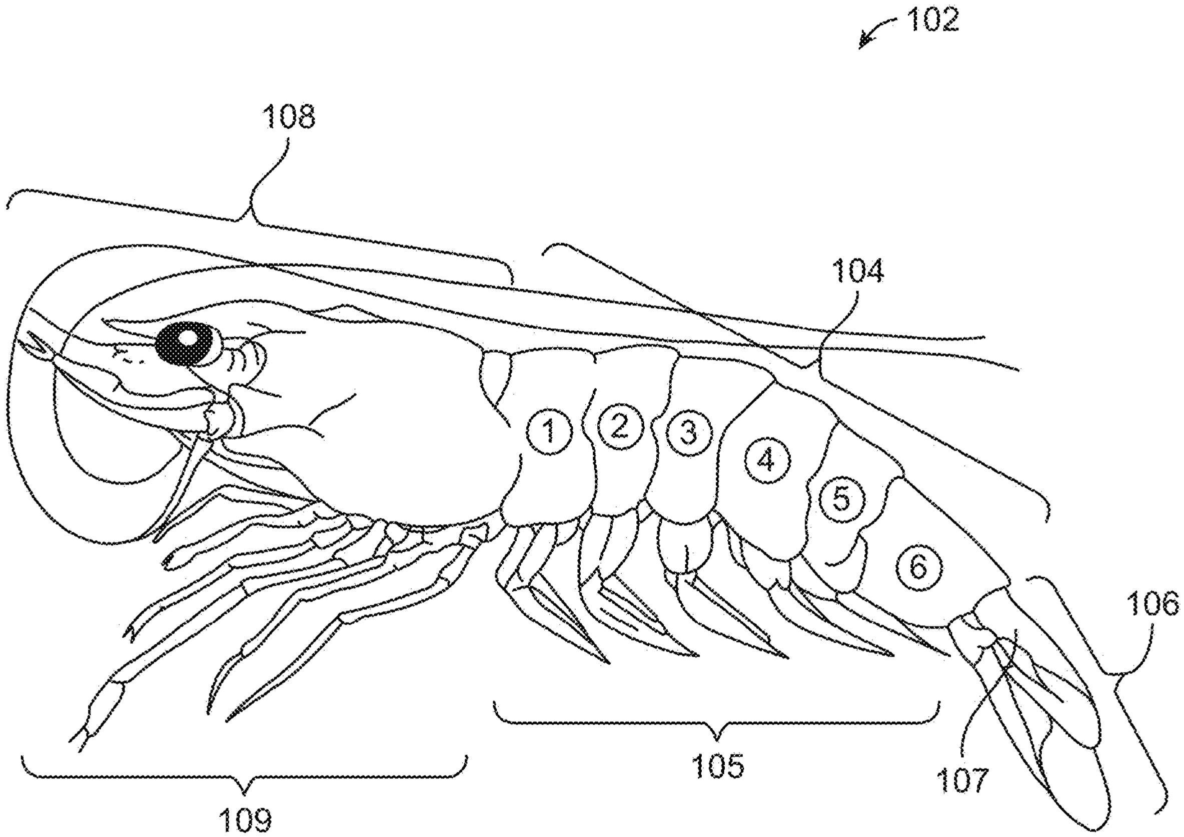
FIG. 3 depicts one illustrative embodiment of a shrimp that may be processed using one or more embodiments of the shrimp processing systems and methods as described herein.

To assist with discussion of the shrimp processing stations and methods performed at them, one example of a shrimp that may be processed using the shrimp processing systems and methods described herein is depicted in FIG. 3 along with a description of the various anatomical features of the shrimp. The depicted shrimp 102 includes an abdomen 104 terminating in a tail/uropod 106 (although the proper name for this anatomical feature is the uropod, for simplicity it will be referred to simply as the "tail" herein). An appendage referred to as the telson 107 sits above the dorsal surface of the tail 106. Although the depicted shrimp 102 includes an abdomen 104 having six segments, other shrimp that may be processed using shrimp processing systems as described herein may have more or fewer segments forming the abdomen of the shrimp.

The head or carapace 108 of the shrimp 102 is attached to the abdomen 104 at the opposite end from the tail 106. The carapace 108 contains the viscera of the shrimp 102 and also carries various features such as antennae, rostrum, etc. Removal of the head or carapace 108 using the processing systems and methods described herein results in removal of the features attached directly to the carapace 108.

The shrimp 102 also includes appendages in the form of pleopods 105 (sometimes referred to as swimmerets) attached to the ventral side of the abdomen 104. Additional appendages 109 are also attached to the ventral side of the shrimp 102 forward of the abdomen 104, i.e., the ventral side of the carapace 108. Those appendages 109 may include, for example, the pereiopods (sometimes referred to as "walking legs") and chela. Removal of the head or carapace 108 using the processing systems and methods described herein typically results in removal of at least some of the appendages 109 attached to the ventral side of the carapace 108.

The abdomen 104 includes six segments located between the carapace 108 and the tail/uropod 106 and telson 107. The segments are numbered starting at the carapace 108 and proceeding towards the tail 106, with the abdominal segment closest to the carapace 108 being referred to as the first segment and the abdominal segment closest to the tail 106/telson 107 being referred to as the sixth segment. Each abdominal segment includes a shell segment on the dorsal side of the abdomen.

The shrimp processing systems and methods described herein rely on processing of individual shrimp being retained and moved through the systems for individual processing. In one or more embodiments, each shrimp may be retained proximate its tail/uropod using a clamp, although other locations for restraining shrimp for processing in the shrimp processing systems and methods described herein are also contemplated.

Shrimp Processing System Clamps and Methods

Figure 4:
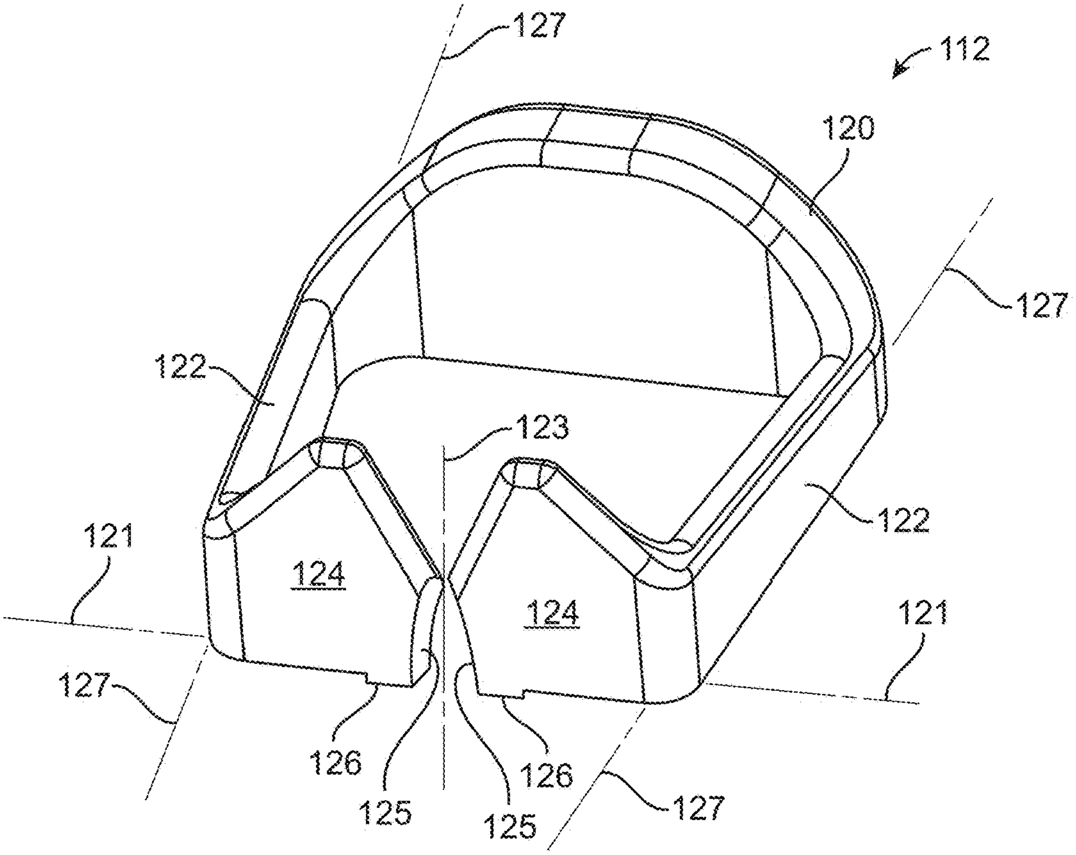
FIG. 4 is a perspective view of one illustrative embodiment of a clamp that may be used to restrain shrimp as described herein.
Figure 5:
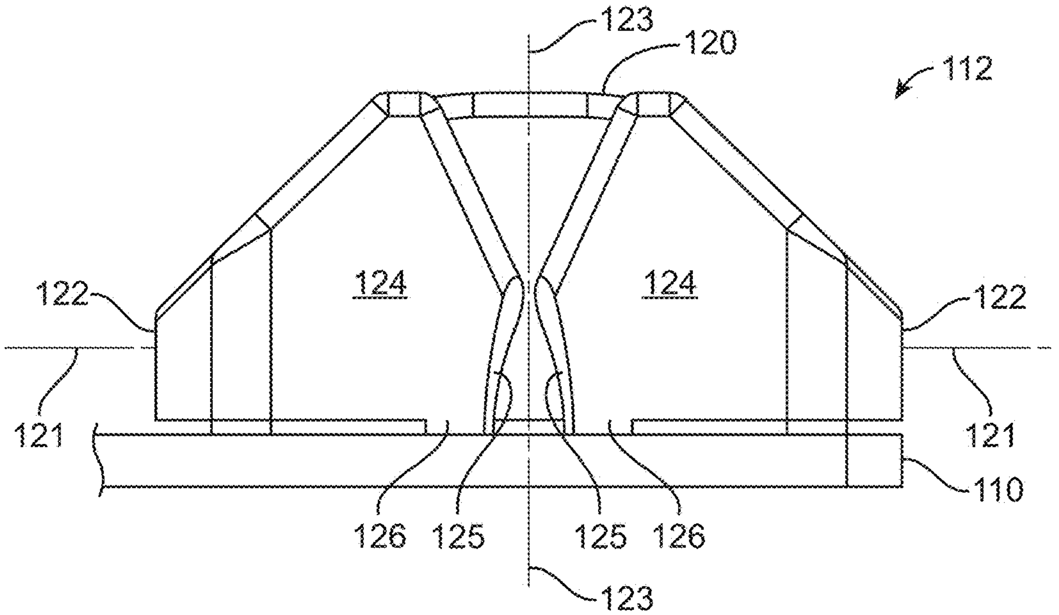
FIG. 5 is an enlarged front view of the clamp of FIG. 4 in a direction transverse to both axes 121 and 123.
Figure 6:
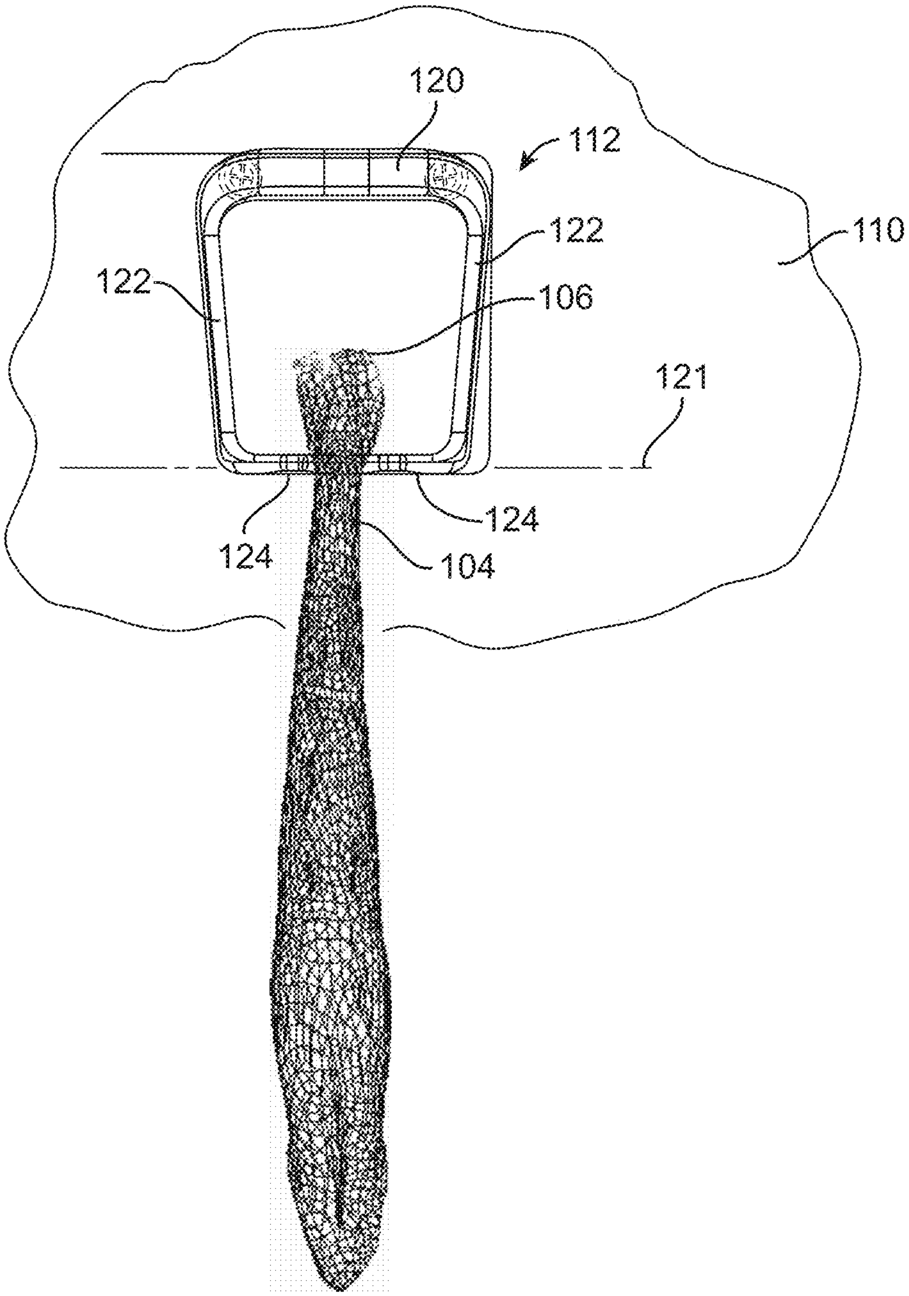
FIG. 6 is a top plan view of the clamp of FIG. 4 with a shrimp retained therein.

FIGS. 4-6 depict one illustrative embodiment of a clamp that may be used in one or more illustrative embodiments of shrimp processing systems and methods described herein. The clamp 112 is configured to capture and retain a shrimp proximate the tail. The depicted embodiment of clamp 112 is only one example of a clamp that may be used to capture and retain shrimp processed in the shrimp processing systems and methods described herein.

The illustrative embodiment of clamp 112 is located on a base 110 (see, e.g., FIG. 5). Although the base 110 is shown as being separate and distinct from the clamp 112, in one or more embodiments, the base 110 may form an integral part of the clamp 112.

The clamp 112 includes a body 120 attached to the base 110 along with a pair of arms 122 extending away from the body 120 with arms 122 connecting a pair of jaws 124 to the body 120 through arms 122. Each of the jaws 124 includes a jaw face 125 with the jaw faces 125 on the opposing jaws 124 facing each other along a clamping axis 121 that extends between the jaws 124.

The jaw faces 125 on each of the jaws 124 define a receiving slot between the jaw faces 125. In one or more embodiments, a distance between the jaw faces 125 across the receiving slot in a direction aligned with the clamping axis 121 narrows when moving away from the base 110 between the jaw faces 125 along a compression axis 123, with the compression axis 123 extending through the base 110 between the jaw faces 125 (in other words, through the receiving slot between the jaw faces 125).

In the depicted illustrative embodiment of clamp 112, one or both of the arms 122 connecting each of the jaws 124 to the body 120 function as a spring member operably attaching the jaws 124 to the body 120. In one or more embodiments, one or both of the spring members/arms 122 resists movement of the attached jaw 124 away from the opposing jaw along the clamping axis 121. In one or more embodiments, one or both of the spring members/arms 122 also resists movement of the attached jaw 124 away from the base 110 along the compression direction aligned with the compression axis 123. As a result, a shrimp located in the receiving slot between the jaw faces 125 of jaws 124 is compressed against the base 110 by one or both of the jaws 124.

With reference to FIG. 6, the distance between the body 120 and the receiving slot defined between the faces 125 of jaws 124 in a direction transverse to both the clamping axis 121 and the compression axis 123 may be selected to allow the tail 106 of a shrimp captured in the clamp 112 to be positioned between the receiving slot and the body 120 of the clamp 112. In one or more embodiments, the distance between the body 120 and the receiving slot may be 4 or more, 6 or more, 8 or more, 10 or more, 12 or more, 14 or more, 16 or more, 18 or more, or 20 or more times the receiving slot width measured at a midpoint between the base 110 and the narrowest portion of the receiving slot as measured along a direction aligned with the clamping axis 123. In one or more embodiments, the distance between the body 120 and the receiving slot may be 24 or less, 22 or less, 20 or less, 18 or less, or 16 or less times the receiving slot width measured at the midpoint between the base 110 and the narrowest portion of the receiving slot as measured along a direction aligned with the clamping axis 123.

Again, with reference to FIG. 6, the compression force along compression axis 123 may, in addition to assisting and retaining the shrimp in position in clamp 112, also force the base of the tail 106 of the shrimp against the base 110 on which clamp 112 is located. That action may, in one or more embodiments, force the tail 106 of the shrimp to fan out or splay as seen in FIG. 6. As a result, the leading edges of the tail 106, when splayed, may act against the jaws 124 of clamp 112 to further assist in resisting removal of the shrimp from the clamp 112 in a direction transverse to both the clamping axis 121 and the compression axis 123.

Another optional feature depicted in connection with clamp 112 is found in the standoffs 126 on each of the jaws 124. Raising the jaws 124 off the base 110 may, in one or more embodiments, provide clearance between the arms 122 and the base 110 such that the jaws 124 are able to rotate about rotation axes 127 extending through the arms 122 that extend from the jaws 124 to the body 120 (see, for example, the rotation axes 127 depicted in FIG. 4). Rotation of the jaws 124 about the rotation axes 127 may, in one or more embodiments, keep a center of pressure imposed on shrimp of different sizes by the jaws 124 above a centerline at which the jaws 124 of the clamp 112 contact the differently sized shrimp.

It should be understood that rotation of the jaws 124 may occur even in the absence of standoffs 126. Further, it should be understood that although both the jaws 124 in the depicted embodiment of clamp 112 may rotate about their respective rotation axes 127, in one or more embodiments, only one of the jaws 124 may be configured to rotate about a rotation axis 127.

In one or more embodiments of clamps for restraining shrimp as described herein, the clamp 112 may be constructed of a polymeric material providing sufficient strength and resilience to form both the arms 122 as well as the jaws 124 in a manner that provides the functions described herein for clamp 112. Alternatively, the clamp 112 may be constructed of a variety of components assembled together to provide the various features and their functions of a clamp capable of restraining a shrimp as described herein. For example, arms 124 could be formed of spring steel or some other resilient material that is different from the material used for the body 120 and/or the jaws 124 of the clamp 112. Other variations such as, e.g., an over molded spring-steel mechanism, will also be known to those of skill in the art.

In one or more embodiments of methods of restraining shrimp as described herein, the method may include providing a clamp having first and second jaws positioned on a base, with the jaws defining a receiving slot therebetween, inserting a shrimp into the receiving slot such that the tail of the shrimp is located on a clamp side of the jaws and the carapace of the shrimp is located on a processing side of the jaws. Although not required, the method may, in one or more embodiments, further include forcing the tail of the shrimp towards the base such that the tail forms a splayed tail fan on the clamp side of the jaws.

Described with respect to the illustrative embodiment of clamp 112, the method may include providing clamp 112 having first and second jaws 124 on base 110. The jaws 124 define a receiving slot therebetween. Inserting a shrimp into the receiving slot such that the tail of the shrimp 106 is located on a clamp side of the jaws 124 (in other words, the side of the jaws 124 facing the body 120 of clamp 112) while the carapace of the shrimp is located on a processing side of the jaws 124 (in other words, the side of the jaws 124 facing away from the body 120 of the clamp 112). In the depicted embodiment, the abdomen 104 of the shrimp is also located on the processing side of the jaws 124 because the jaws 124 act against the shrimp at the junction between the tail 106 and the abdomen 104. In one or more embodiments, the jaws 124, along with the spring members/arms 122 act to force the shrimp towards or against the base 110 such that the tail forms a splayed tail fan on the clamp side of the jaws 124. A splayed tail fan may further resist removal of the shrimp from the clamp 112 in a direction transverse to both the clamping axis 121 and the compression axis 123.

In one or more embodiments of the methods of restraining a shrimp in a clamp as described herein, the compressive force on the shrimp towards the base along the compression axis 123 may be described as a persistent compressive force. In other words, the force may be present as long as the shrimp is retained in the clamp. The compressive force provided by the clamp may, in one or more embodiments, be assisted when the jaws of the clamp widen when approaching the base on which the clamp is positioned (or narrow when moving away from the base on which the clamp is positioned) because the force vectors applied to the shrimp by angled faces of the jaws of the clamp may assist in providing a compressive force to the shrimp as described herein by virtue of their shape.

Moreover, one or more embodiments of the methods of restraining shrimp in a clamp as described herein may involve rotation of one or both of the jaws of the clamp as discussed above in connection with the illustrative embodiment of clamp 112. In particular, the clamp 112 includes a body 120 and a first jaw 124 connected to the body 120 through a first arm 122 as well as a second jaw 124 connected to the body 120 through a second arm 122. One or both of the jaws 124 may, in one or more embodiments, rotate about a rotation axis 127 located above the base 110 and extending between the rotating jaw 124 and the body 120 when inserting a shrimp into the receiving slot formed between the first and second jaws 124.

Figure 7:
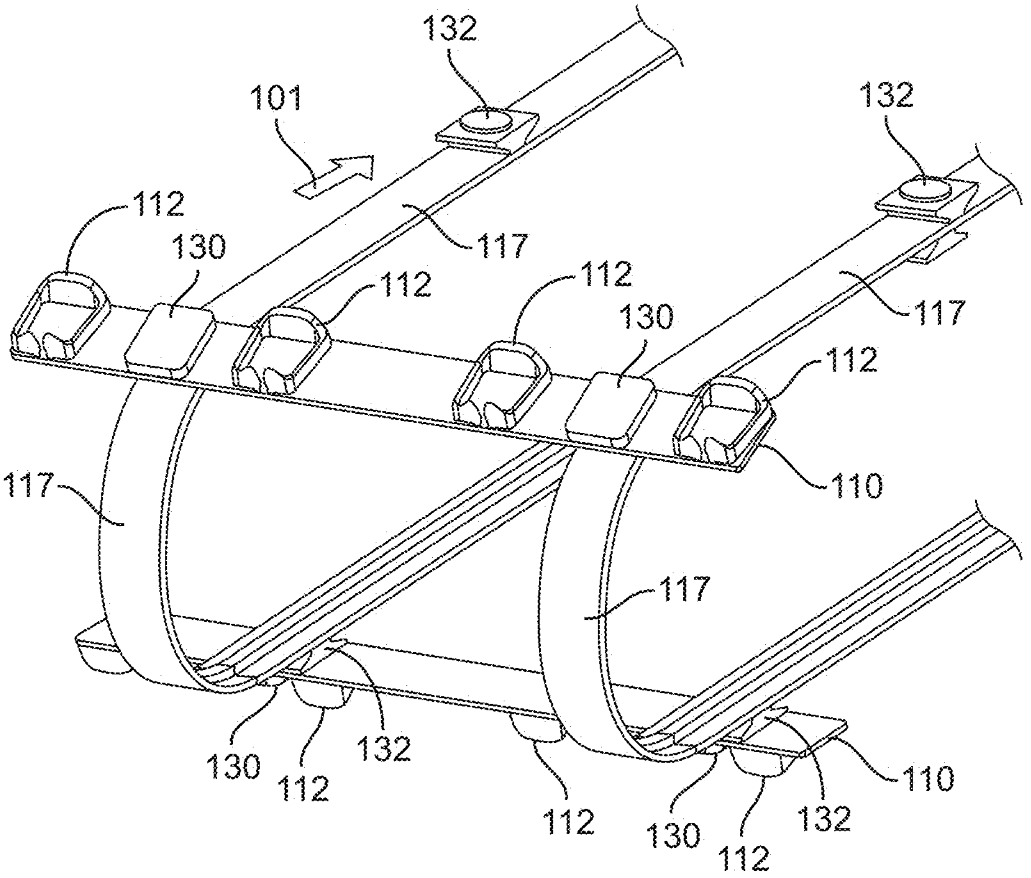
FIG. 7 is a perspective view of one portion of a shrimp processing system including illustrative embodiments of clamps mounted on illustrative embodiments of clamp mounts that are, in turn, attached to illustrative embodiments of conveying elements of a conveying system to facilitate movement of shrimp through a processing system according to the methods described herein.

FIG. 7 is a perspective view of a set of clamps 112 that may be used in one or more embodiments of a shrimp processing system as described herein. The group of clamps 112 may be described as being attached to a clamp mount 110, with a plurality of the clamp mounts 110 being attached to conveying elements 117 of a conveying system used to move the clamps 112 mounted on the clamp mounts 110 through a shrimp processing system as described herein. In the depicted embodiment, conveying elements 117 are in the form of belts that may be driven by any suitable mechanism to move the clamp mounts 110 and clamps 112 located thereon through a shrimp processing system as described herein.

Although the depicted illustrative embodiments of clamp mounts 110 carry four clamps 112, it should be understood that clamp mounts 110 may carry only one clamp, two clamps, three clamps or five or more clamps depending on the number of processing stations in a given shrimp processing system. Further, although FIG. 7 depicts to conveying elements 117, it should be understood that a conveying system used to advance clamps 112 and any clamp mounts 110 through a shrimp processing system as described herein may include as few as one conveying element or three or more conveying elements depending on the specific design of the conveying system.

Further, although the conveying elements 117 are in the form of belts, it should be understood that conveying elements used in shrimp processing systems as described herein may take any of a variety of forms common to conveying systems including, but not limited to, belts, chains, etc.

In the depicted illustrative embodiment, the conveying elements 117 carry mounting bosses 132 with each of the clamp mounts 110 including corresponding mounting blocks 130, with each block 130 configured to attach to a mounting boss 132 on the conveying elements 117. The blocks 130 may attached to the mounting bosses 132 by any suitable technique or combination of techniques including, for example, mechanical fasteners, adhesives, clamps, interference fits, mechanical interlocks, etc.

Figure 8:
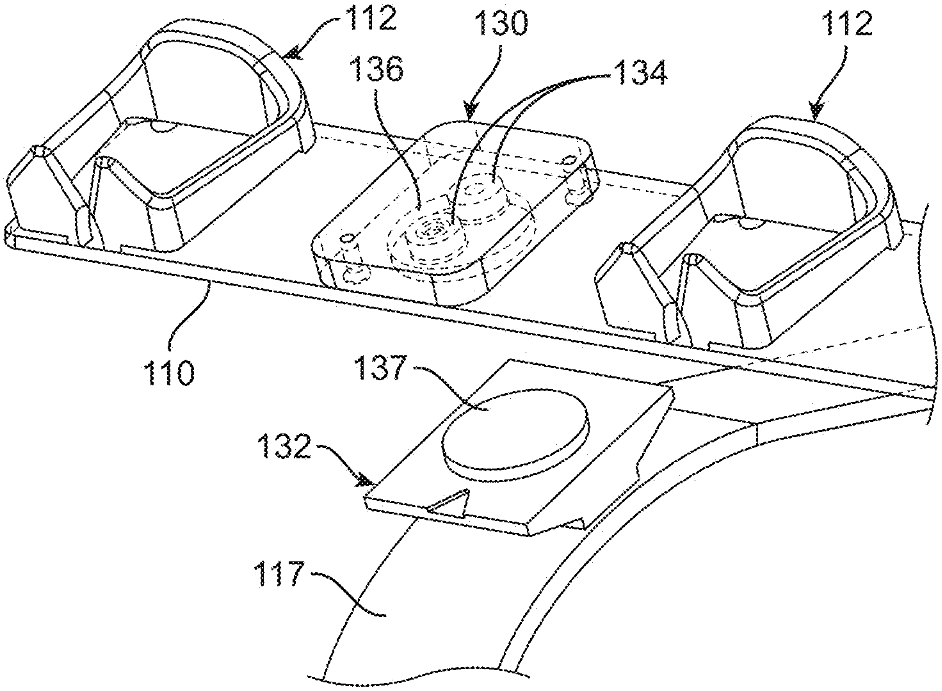
FIG. 8 is an exploded diagram depicting one illustrative embodiment of structures used to attach clamp mounts to conveying elements in one or more embodiments of shrimp processing systems as described herein.
Figure 9:
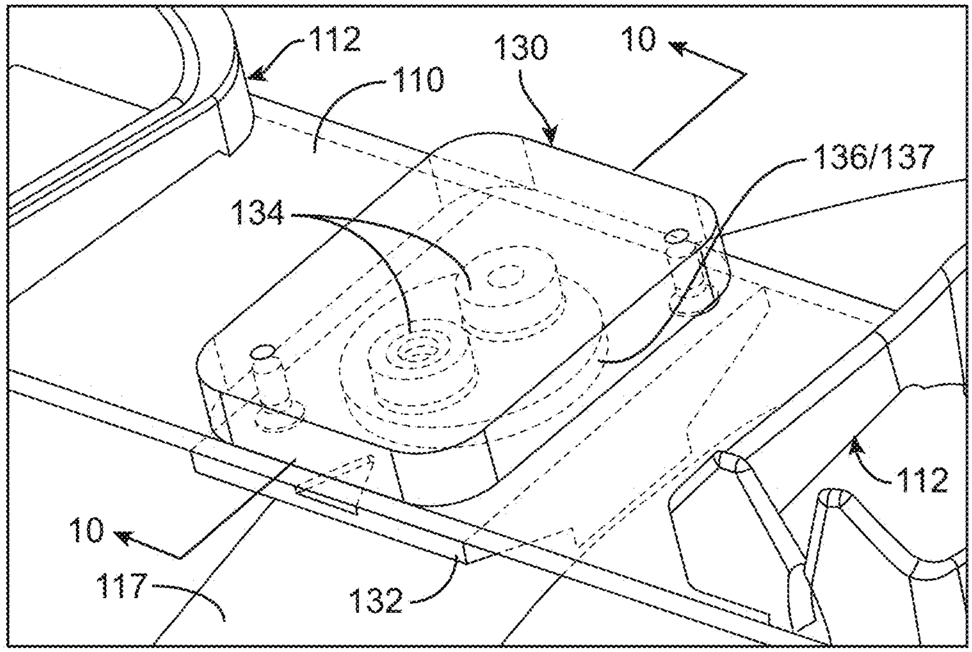
FIG. 9 is an enlarged view of the structures of FIG. 8 after assembly with portions of the structures depicted as being transparent to allow visualization of components located therein.
Figure 10:
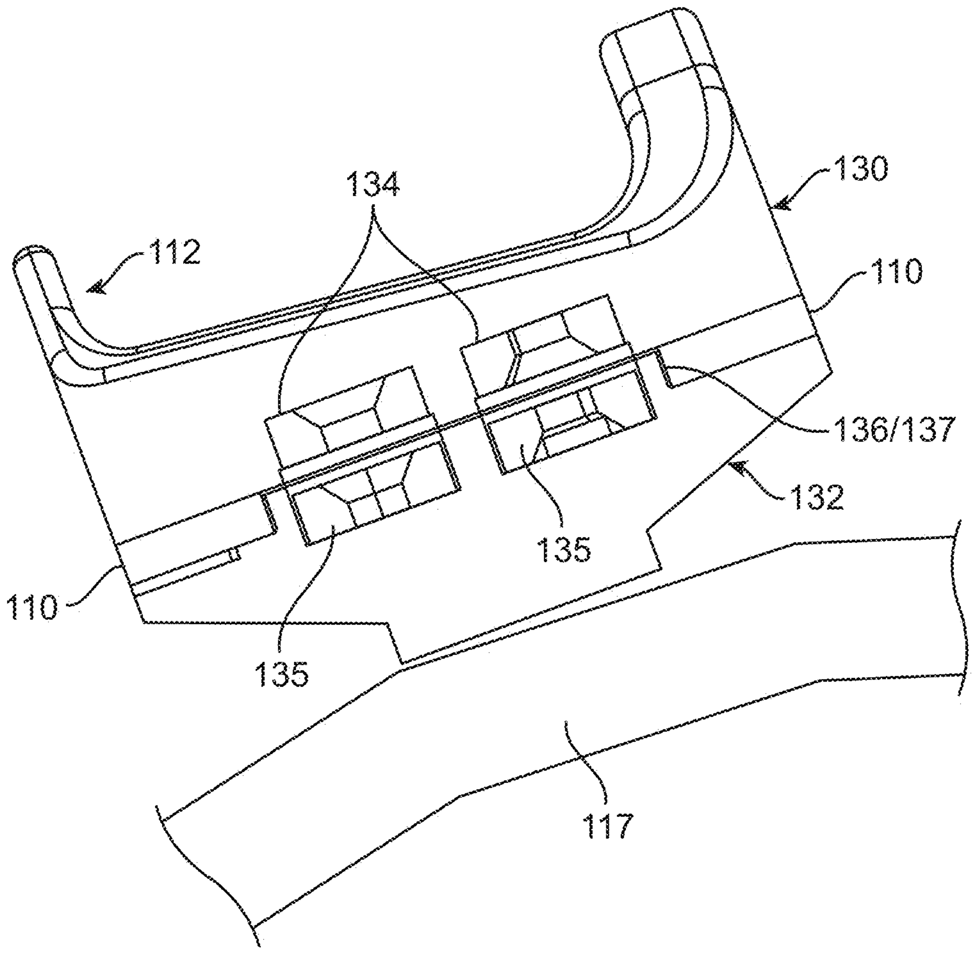
FIG. 10 is an enlarged cross-sectional view of FIG. 9 taken along line 10-10 in FIG. 9.

Referring to FIGS. 8-10, one illustrative embodiment of a set of mounting bosses 132 and blocks 130 used to attach a clamp mount 110 to a conveying element 117 is depicted in more detail. In the depicted illustrative embodiment, the mounting bosses 132 and blocks 130 are attached to each other using magnetic attraction. In particular, each of the mounting bosses and blocks carry permanent magnets to retain the blocks 130 on the mounting bosses 132 which, in turn, retains the clamp mounts 110 on the conveying elements 117 for movement through a shrimp processing system as described herein.

With reference to FIGS. 8-9, the mounting blocks 130 (which are shown as transparent to allow visualization of the components contained therein) is attached to the clamp mount 110 using, in the depicted embodiment, a pair of mechanical fasteners. The mounting block also includes a pair of magnets 134 positioned above a mating feature 136 formed in clamp mount 110.

The mating feature 136 is designed to mate with a complementary mating feature 137 on mounting boss 132 to assist in both alignment and retention of the clamp mount 110 to the mounting boss 132 on conveying element 117. Although mating feature 136 is depicted in the form of a recess/well/aperture and complementary mating feature 137 on mounting boss 132 is depicted in the form of a protrusion, it will be understood that any pair of complementary mating features found on the clamp mount 110 and the mounting boss 132 may provide the same functionality as the illustrative pair of complementary mating features depicted in FIGS. 8-9.

With reference to FIG. 10, which is a cross-sectional view of the clamp mount 10, mounting boss 132, and mounting block 130 taken along line 10-10 in FIG. 9, it can be seen that, in the depicted illustrative embodiment, the mounting boss 132 includes a complementary pair of magnets 135 positioned to magnetically attract magnets 134 in mounting block 130 attached to the clamp mount 110. It may be preferred that pairs of magnets 134 and 135 be provided in both the mounting block 130 and the mounting boss 132 such that the magnets 134 and 135 form close magnetic fields to reduce the likelihood that magnetic fields associated with the mounting blocks 130 and mounting bosses 132 can affect any electrical or magnetic components of a shrimp processing system as described herein. The relationship between the complementary mating features 136 and 137 on the clamp mount 110 and mounting boss 132 can also be seen in the cross-sectional view of FIG. 10.

The use of magnets and complementary mating features as seen in FIGS. 8-10 may, in one or more embodiments, provide a relatively easy to clean connection system for retaining clamp mounts 110 in position on conveying elements 117 of shrimp processing systems as described herein. Many other structures and/or techniques of retaining clamp mounts on conveying elements of a conveying system will, however, be understood as being suitable for use in place of the depicted illustrative embodiment of mounting blocks 130, clamp mounts 110 and mounting bosses 132 described in connection with FIGS. 8-10.

Figure 11:
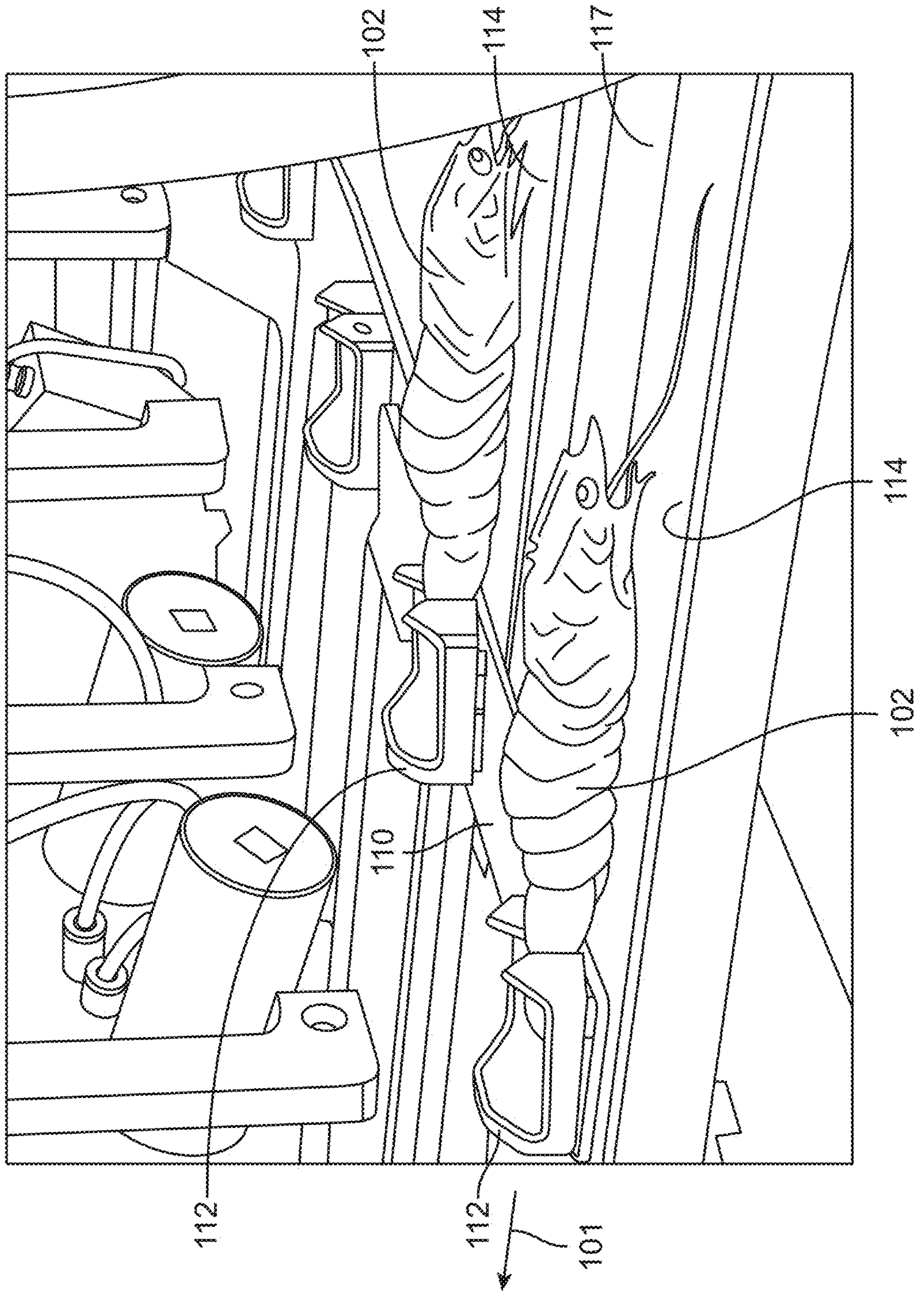
FIG. 11 depicts shrimp retained in clamps on a clamp mount as depicted in FIGS. 7-10.

With reference to FIGS. 7 and 11, another optional feature of one or more embodiments of a shrimp processing system as described herein can be seen in the offset between the conveying elements 117 and the clamps 112 used to retain and move shrimp through a processing system. In particular, FIG. 11 depicts a pair of shrimp 102 retained in clamps 112 attached to a clamp mount 110 that is moved along a processing direction 101 using conveying element 117. Shrimp 102 are supported during movement along the processing direction 101 by working surfaces 114 which are located on opposite sides of conveying element 117. Those working surfaces are able to support shrimp 102 retained in clamps 112 because the conveying elements 117 are not aligned with the clamps 112 along the processing direction 101.

Supporting restrained shrimp on working surfaces 114 that are separate and different from the conveying elements

117 may, in one or more embodiments, provide the ability to improve cleanliness and hygiene of a shrimp processing system because the working surfaces 114 may be separately cleaned and/or replaced during use to limit contamination and improve hygiene.

Figure 12:
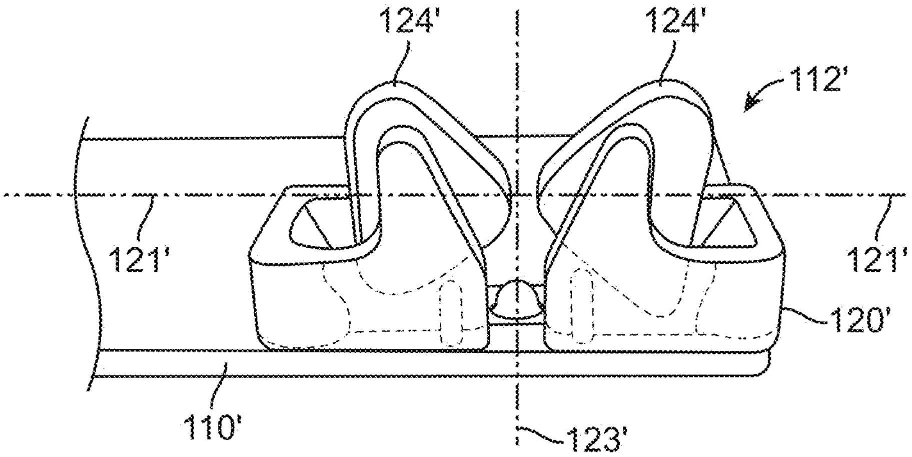
FIGS. 12-13 depict one alternative embodiment of a clamp and clamp mount system that may be used in connection with the processing systems and methods described herein.
Figure 13:
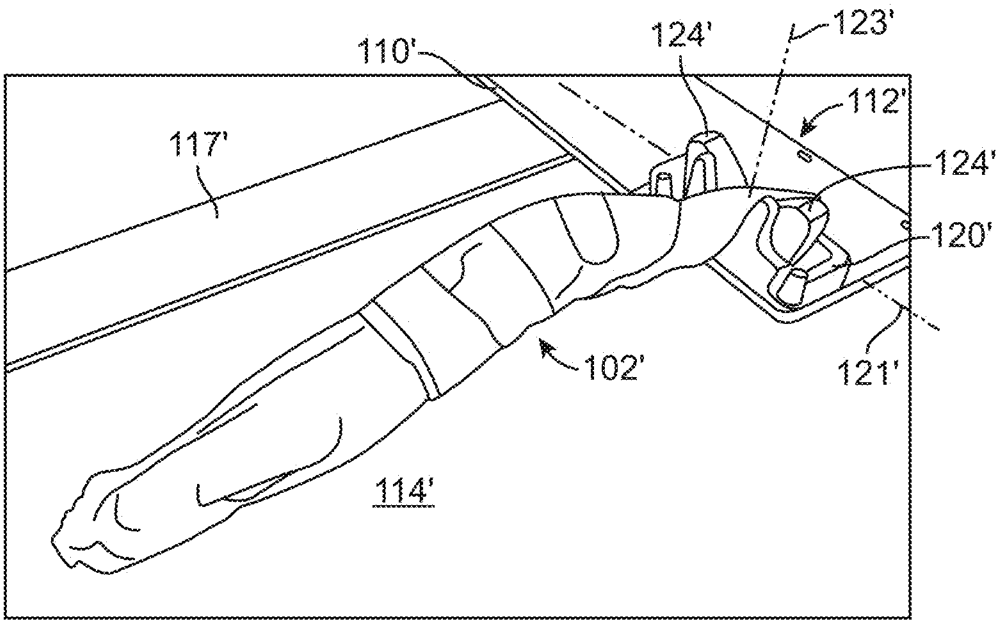

Although one illustrative embodiment of clamps that can be used to restrain shrimp as described herein within a shrimp processing system is depicted in the preceding figures, it should be understood that other alternative clamps can be used to provide for restraint and movement of shrimp in processing systems as described herein. One illustrative embodiment of an alternative clamp 112' that may be used in one or more shrimp processing systems as described herein is depicted in FIGS. 12-13. The clamp 112' includes jaws 124' mounted on a body 120' that are spring-loaded to move towards each other. The shape and spring-loaded mounting of jaws 124' provide for a clamping force along a clamping axis 121' and, preferably, a compression force along a compression axis 123' extending through the receiving slot located between opposing jaws 124'.

With reference to FIG. 13, the clamps 112' may also be provided on a clamp mount 110' for movement through a conveying system using a conveying element 117' that is offset from clamps 112' such that shrimp 102' can be supported on a working surface 114' that is offset from the conveying element 117'.

Figure 14:
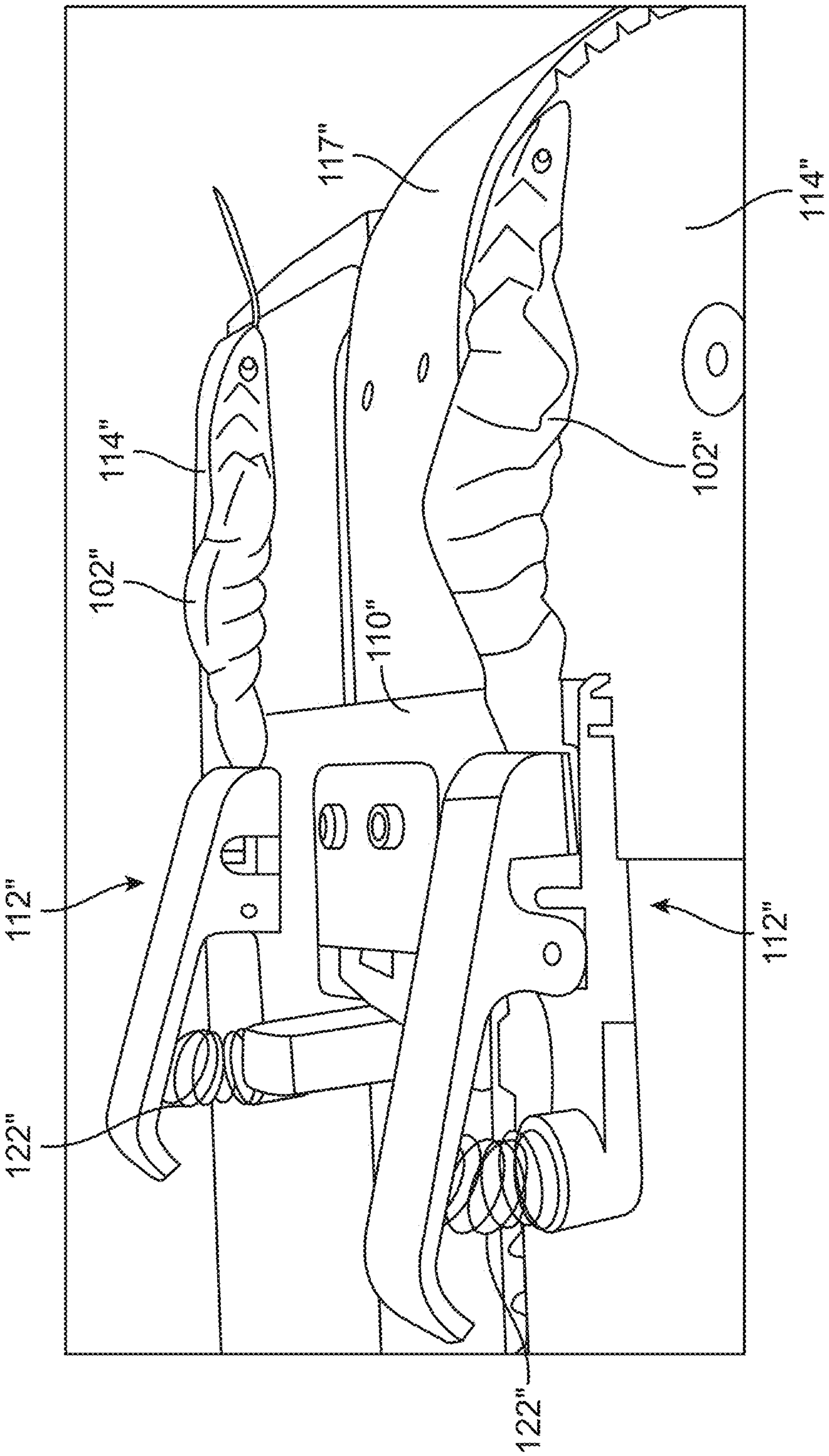
FIG. 14 depicts another alternative embodiment of a clamp and clamp mount system that may be used in connection with the processing systems and methods described herein.

Another alternative illustrative embodiment of clamps 112" is depicted in FIG. 14 with clamps 112" being carried on a clamp mount 110". Each of the clamps 112" is depicted as restraining a shrimp 102" on a working surface 114", while the clamp mount 110" carrying clamps 112" is moved through a processing system using conveying element 117" positioned between the working surfaces 114". Clamps 112" include spring elements 122" used to provide pressure on the shrimp 102" to retain the shrimp 102" in the clamps 112".

It should be understood that FIGS. 12-14 depict only two alternative illustrative embodiments of clamps that may be used to retain shrimp in a processing system for processing according to the methods described herein. Many other clamps may be used to restrain shrimp for processing in the systems and methods described herein.

Measuring and Mud Vein Severing Apparatus & Methods

Among the processing stations that may be found in one or more embodiments of shrimp processing systems as described herein are stations that may be used to measure shrimp and stations that may be used to sever the mud vein of shrimp. In one or more embodiments, the same processing station may be used to both measure shrimp and sever the mud vein of shrimp.

Figure 15:
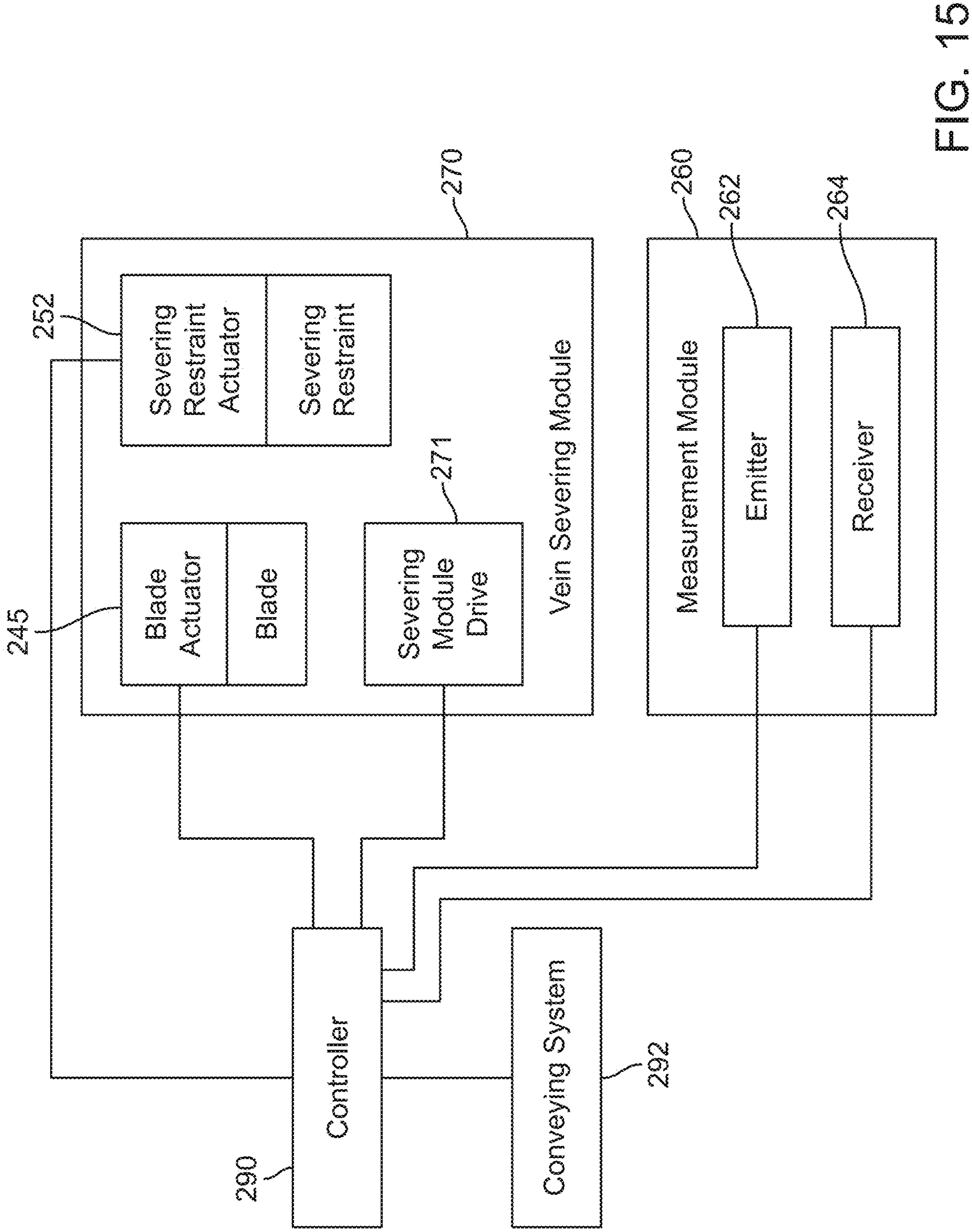
FIG. 15 is a block diagram of a control system that may be implemented in one illustrative embodiment of an integrated measurement and mud vein severing apparatus used in one or more shrimp processing systems as described herein.

FIG. 15 is a schematic block diagram depicting components that may be found in one such system configured to both measure shrimp and sever the mud vein in the shrimp. The depicted station includes a measurement module 260 and a vein severing module 270 along with a controller 290 and conveying system 292.

The measurement module 260 may preferably be a non-contact measurement module that is configured to measure shrimp without requiring physical contact with the shrimp. In one or more embodiments, the measurement module 260 may include an emitter 262 and a receiver 264 that, together, emit and receive energy such as, e.g., optical energy, ultrasonic energy, etc. Although depicted separately, the emitter 262 and receiver 264 may be combined in a transceiver that relies on reflected energy to measure shrimp.

The vein severing module 270 may include a variety of components including a severing module drive 271, a severing restraint actuator 252 (operably connected to a severing restraint), and a blade actuator 245 (operably connected to a blade). The severing module drive 271, severing restraint actuator 252, and blade actuator 245 may each be connected to the controller 292 control movement of the vein severing module 270, the severing restraint actuator 252, and the blade actuator 245.

Control over the conveying system 292 by the controller 290 may be used to move shrimp into and out of the measurement module 260 and/or the vein severing module 270.

Although the controller 290 depicted in connection with the illustrative embodiment of a shrimp measurement and mud vein severing apparatus as depicted in FIG. 15 is in the form of a single controller in which all control functions may be performed by a single controller (although backup and/or redundant controllers may be provided to assist in the case of failure of a primary controller), one or more alternative embodiments of shrimp measurement and mud vein severing apparatus may include a distributed set of controllers, with those portions of the apparatus requiring a controller having a dedicated controller and, potentially, a network may be used to interconnect the various controllers to facilitate processing of shrimp by the measurement and mud vein severing apparatus. Further, the controller 290 (or any other controllers used in a mud vein severing apparatus as described herein) may be separate from or integrated into a system controller such as, e.g., controller 90 depicted in connection with a control system used to control a shrimp processing system as depicted in FIG. 2.

The controllers used in one or more embodiments of shrimp measurement and mud vein separating apparatus as described herein may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the apparatus (e.g., keyboards, touchscreens, mice, trackballs, etc.), as well as display devices configured to convey information to a user (e.g., monitors (which may or may not be touchscreens), indicator lights, etc.).

One illustrative embodiment of a mud vein severing apparatus 240 is depicted in FIGS. 16-25E and one illustrative embodiment of a measurement module 260 is depicted in FIGS. 26-30. Although the mud vein severing apparatus 240 and the measurement module 260 could, in one or more embodiments, be integrated into a single processing station of the groups of processing stations (e.g., group P1) described above in connection with the illustrative shrimp processing system depicted in FIGS. 1A and 2, they are depicted separately in FIGS. 16-30 because they can also be provided as separate processing stations.

The vein severing apparatus 240 of the processing station depicted in FIGS. 16-23 is positioned above the working surface 214 on which shrimp 202 are located for processing. In one or more embodiments, the shrimp 202 may be restrained in a clamp 212 such that the tail 206 of the shrimp 202 is located on one side of the clamp while the remainder of the shrimp 202 is located on the opposite side of the clamp 212. As discussed herein, the clamp 212 may be moved to a selected location relative to the vein severing apparatus 240 such that each shrimp processed by the vein severing apparatus 240 is located in the same selected position.

The processing station is supported above the working surface 214 (and any shrimp 202 located thereon) on a frame

242, with the components of the processing station being located on a carriage 244 that moves along slide 243 aligned with axis 241. The depicted embodiment of carriage 244 includes side plates extending downward from an upper portion of the carriage 244, although many other variations in support structures may be possible. Axis 241, along which carriage 244 moves is, in one or more embodiments, preferably aligned with processing axis 211 passing through the working surface 214. As a result, movement of the carriage 244 along slide 243/axis 241 results in movement of the carriage 244 and its components along the processing axis 211 to facilitate positioning of the components in the processing station with one or more selected locations on a shrimp 202 positioned on the working surface 214.

The vein severing module of the depicted integrated measurement and mud vein severing apparatus includes a blade assembly 248 and a blade actuator 245 configured to move the blade assembly 248 between a stored position and a severed position. More specifically, the blade assembly 248 is mounted on a blade carriage 246, with the blade carriage 246 being moved by the blade actuator 245 to move the blade assembly 248 between its stored position and severed position. The blade actuator 245 may be in the form of a dual acting air actuator/piston, although many other mechanisms may be used to provide the reciprocating motion needed to move the blade actuator 245 and blade assembly 248 between its stored and severed positions, for example, double acting pistons, single acting pistons, spring mechanisms, hydraulic actuators, motors, magnetic drivers, etc.

The blade carriage 246 moves along a blade carriage axis 247 when moving the blade assembly 248 between its stored position and severed position and, as a result, the severing direction along which the blade assembly 248 moves is aligned with the blade carriage axis 247. In one or more embodiments the severing direction/blade carriage axis 247 may be transverse to the processing direction 211.

The vein severing module also includes a severing restraint 250 configured to fix a position of a shrimp 202 held in a clamp 212 on the working surface 214. The severing restraint 250 is operably attached to a severing restraint actuator 252 that is configured to move the severing restraint 250 between a withdrawn position as seen in, for example, FIG. 16, and a restraint position as seen in, for example, FIG. 17. A shrimp 202 held in a clamp 212 in a selected severing location on working surface 214 is restrained by the severing restraint 250 when the severing restraint 250 is in the restraint position.

Figure 16:
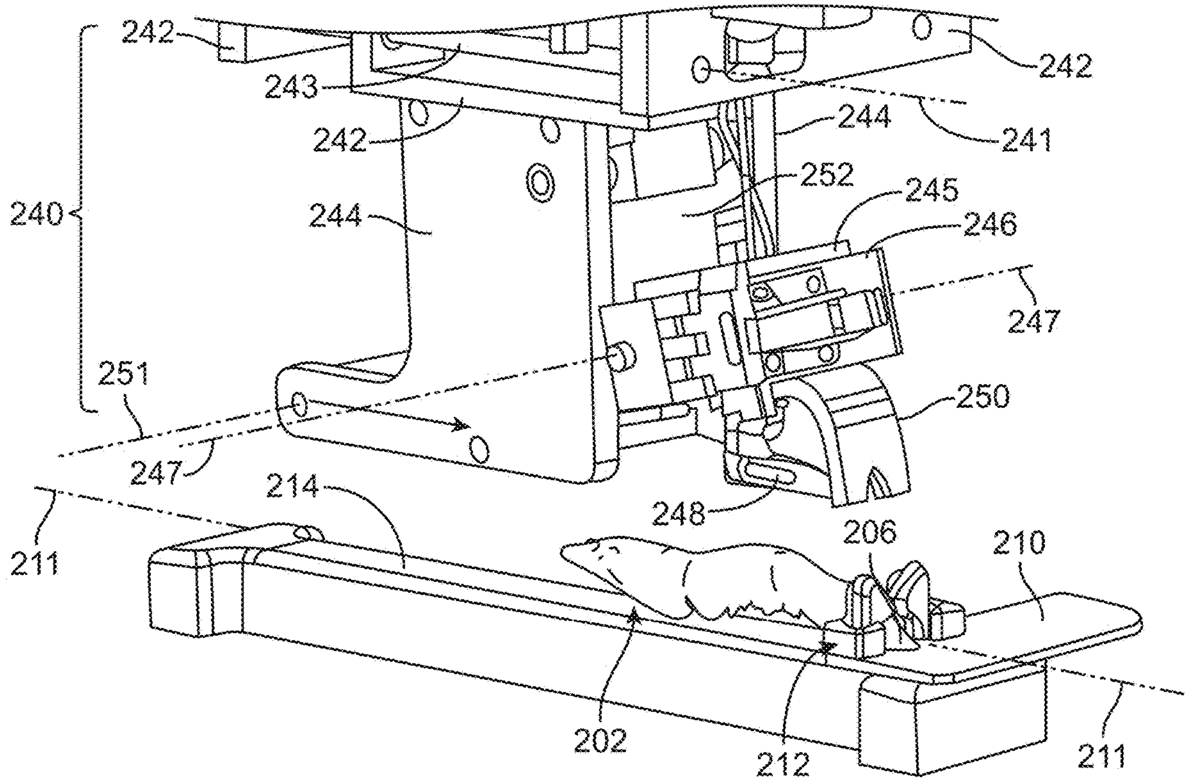
FIGS. 16-21 depict various views of one illustrative embodiment of a mud vein severing apparatus as described herein.
Figure 17:
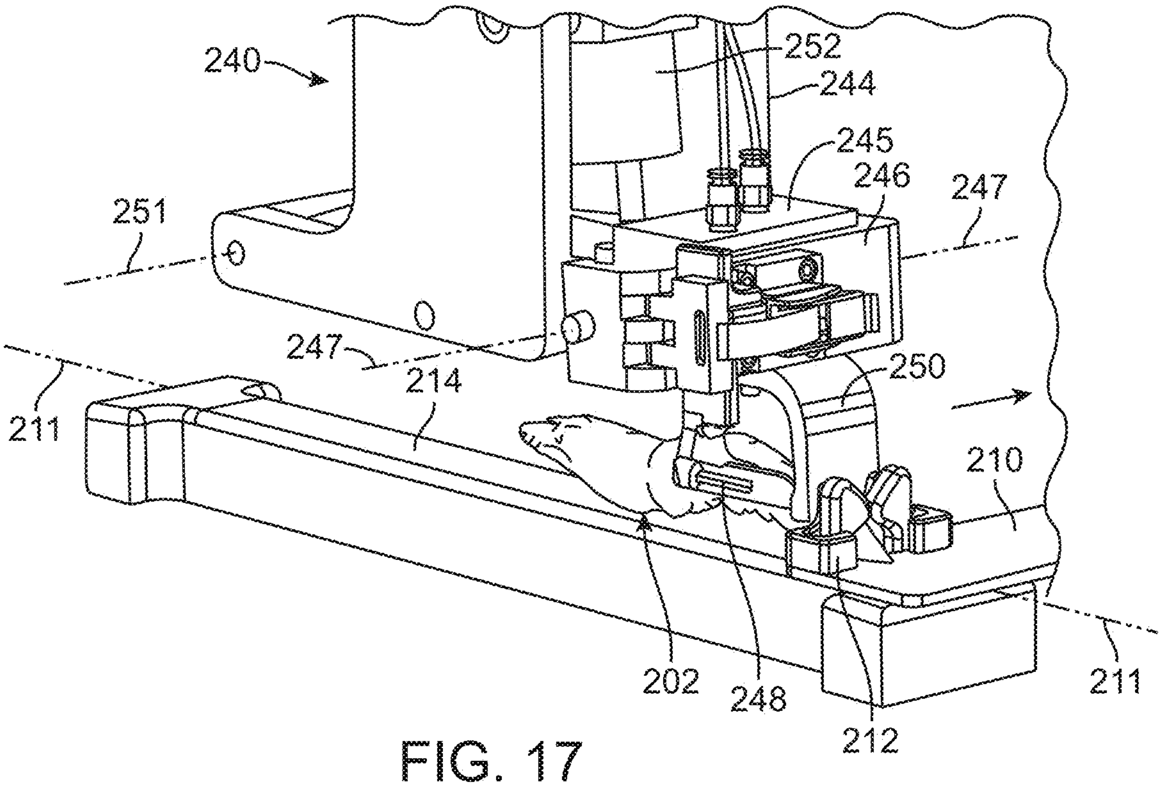

In the depicted embodiment, severing restraint actuator 252 causes severing restraint 250 to rotate about an axis 251 when moving between the withdrawn position as seen in FIG. 16 and the restraint position as seen in FIG. 17. In one or more embodiments the severing restraint actuator may be in the form of a limited force single acting piston that applies a smaller downward force when moving the severing restraint 250 into the restraint position and a larger upward or retraction force when moving the severing restraint 250 from the restraint position back to the withdrawn position. The smaller downward force may be selected so that the severing restraint 250 does not unduly damage the shrimp when the severing restraint is in its restraint position. In one or more embodiments the upward or retraction force may be provided by a spring located within the severing restraint actuator 252.

Although the depicted illustrative embodiment of severing restraint actuator 252 is in the form of a single acting limited force piston, many other mechanisms may be used to provide the reciprocating motion needed to move the severing restraint 250 between its withdrawn and restraint positions, for example, double acting pistons, single acting pistons, spring mechanisms, hydraulic actuators, motors, magnetic drivers, etc.

A sequence of operations for the mud vein severing processing station depicted in FIG. 16 can be described with reference to FIGS. 16-21. In FIG. 16, a shrimp 202 restrained in a clamp 212 carried on a clamp mount 210 is moved into a selected severing location on working surface 214. The shrimp 202, clamp 212, and clamp mount 210 are moved along a processing direction aligned with processing axis 211 to place the shrimp 202 in the selected severing location on working surface 214. The blade assembly 248 on blade carriage 246 is in the stored position and the severing restraint 250 is in its withdrawn position in FIG. 16.

Figure 18:
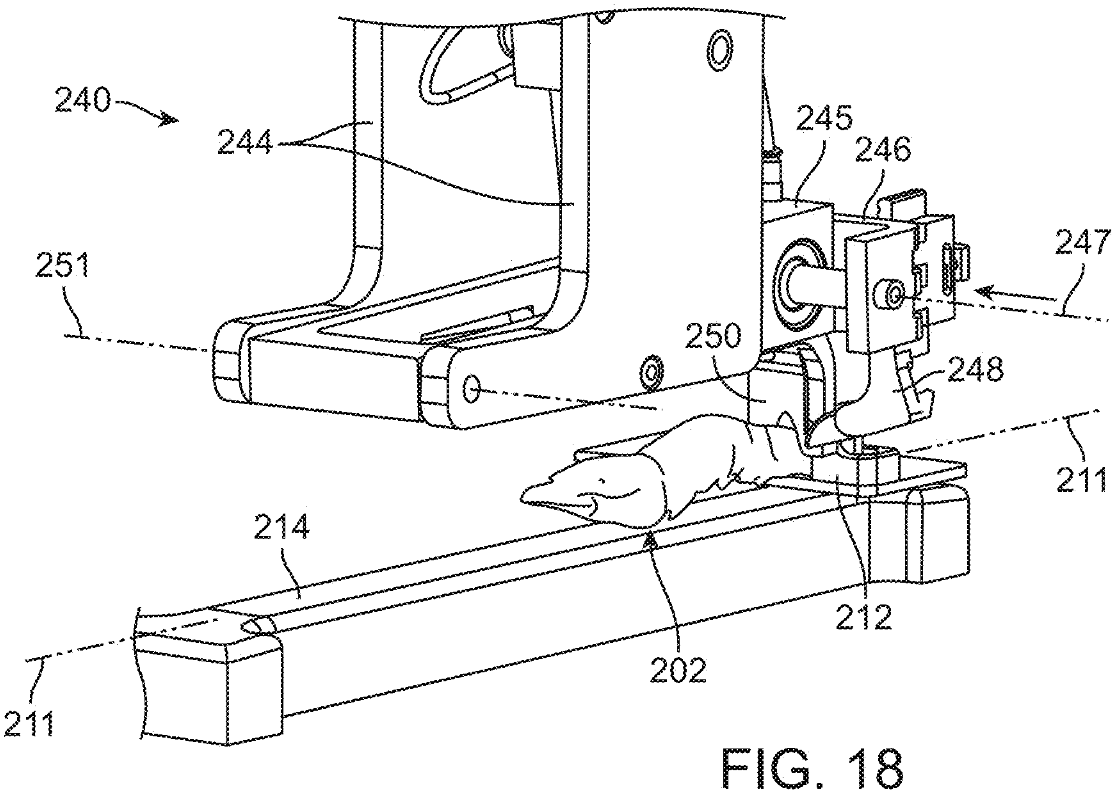

With the shrimp 202 in the selected severing location on working surface 214, the severing restraint actuator 252 may be operated to move the severing restraint 250 from its withdrawn position in FIG. 16 toward the working surface on which shrimp 202 is restrained by clamp 212 so that the severing restraint 250 is in the restraint position as seen in FIGS. 17-18. The severing restraint 250 is located between the blade assembly 248 and the clamp 212 restraining a shrimp 202 when a shrimp 202 held in the clamp 212 is in the selected severing location on working surface 214 and the severing restraint 250 is in the restraint position as seen in FIGS. 17-18.

When in the restraint position as depicted in FIG. 17-18, the illustrative embodiment of severing restraint 250 is positioned on the abdomen of the shrimp 202 proximate the clamp 212 restraining the shrimp 202. It should, however, be understood that other locations for severing restraint 250 may be possible in alternative embodiments of severing apparatus as described herein. Also seen in FIGS. 17-18, the blade assembly 248 on blade carriage 246 is in the stored position (which, in FIG. 17 is shifted to the right along blade carriage axis 247).

Figure 19:
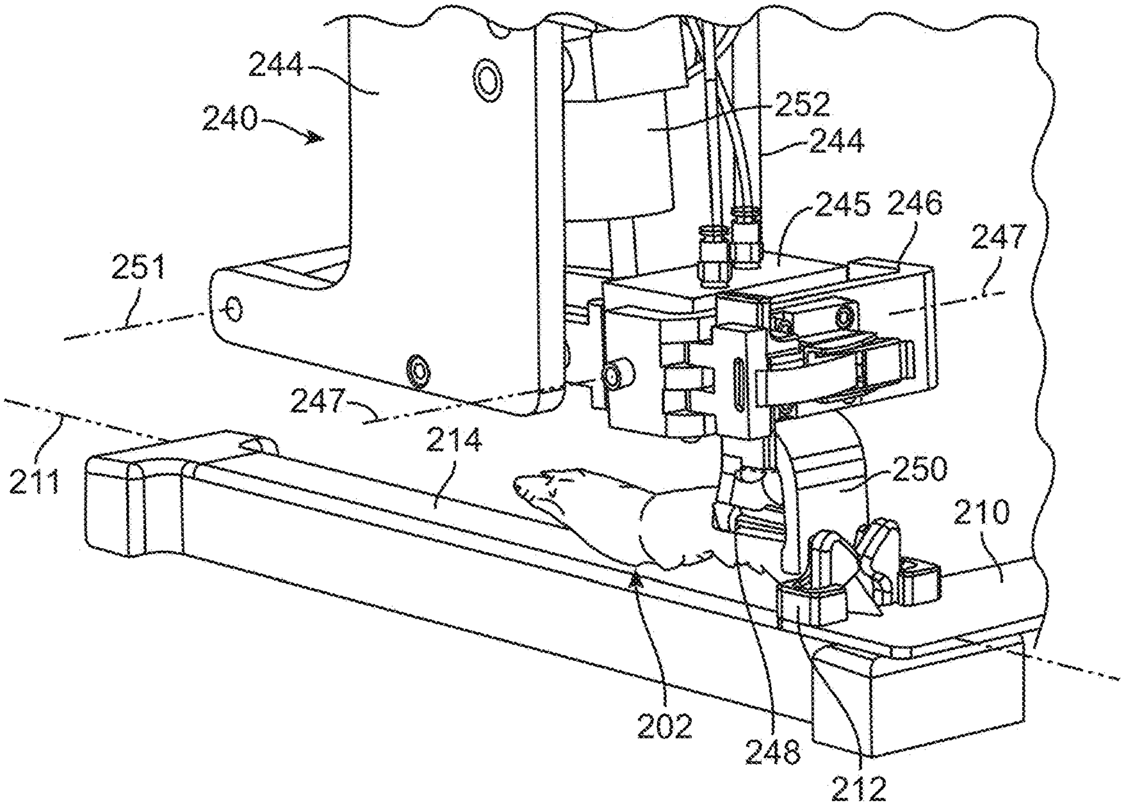
Figure 20:
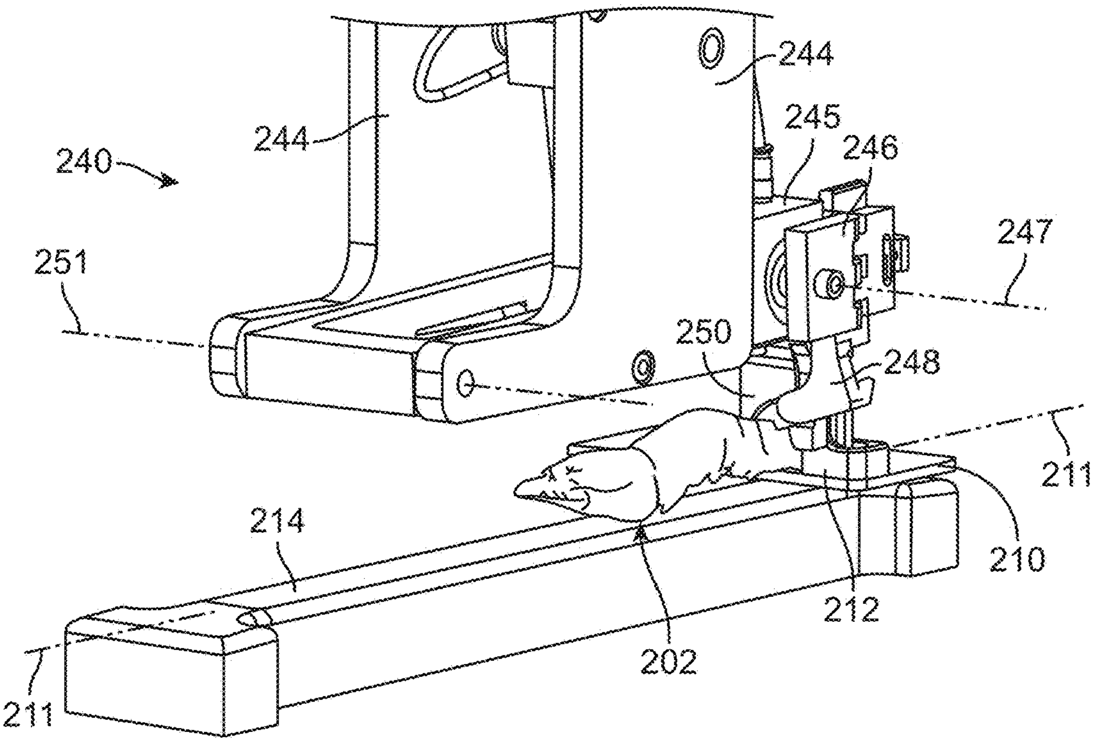

With the shrimp 202 in the selected severing location on working surface 214 and the severing restraint 250 in the restraint position as seen in FIGS. 17-18 to restrain a shrimp on the working surface 214, the blade actuator 245 can be activated to move the blade assembly 248 from its stored position to its severed position as seen in FIGS. 19-20. Movement of the blade assembly 248 from its stored position to its severed position using blade actuator 245 along the severing direction aligned with blade carriage axis 247 moves the blade assembly 248 generally transverse to the processing direction aligned with processing axis 211. During that movement, blade assembly 248 passes through the abdomen of the shrimp 202 restrained on working surface 214 by clamp 212 as well as severing restraint 250. That movement of blade assembly 248 preferably severs the mud vein in shrimp 202.

While the shrimp 202 remains in the selected severing location on working surface 214 and the severing restraint 250 remains in the restraint position as seen in FIGS. 19-20, the blade actuator 245 is preferably activated to move the blade assembly 248 from its severed position back to its stored position (as seen in, for example, FIGS. 17-18). Movement of the blade assembly 248 from its severed position to its stored position using the blade actuator 245 while the shrimp 202 remains restrained by both the severing restraint 250 and the clamp 212 may prevent unwanted movement of the shrimp 202 during return of the blade assembly 248 to its stored position.

Figure 21:
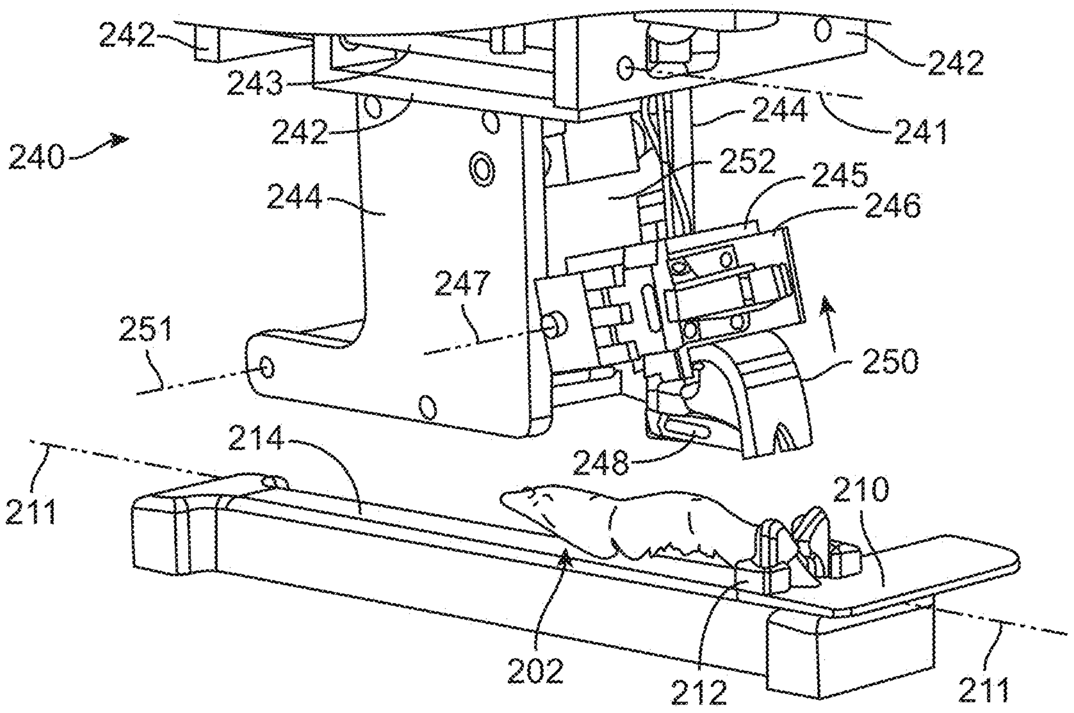

With the shrimp 202 remaining in the selected severing location on working surface 214, the severing restraint 250 may be retracted upwardly away from the working surface 214 from its restraint position (as seen in, e.g., FIGS. 17-20) to its withdrawn position as seen in FIGS. 16 and 21. Movement of the severing restraint 250 may be accomplished using the severing restraint actuator 252 as described herein. Further, movement of the severing restraint 250 may also result in movement of the blade actuator 245, blade carriage 246, and blade assembly 248 away from the working surface 214 and the shrimp 202 located thereon.

Although the depicted embodiment of the mud vein severing apparatus 240 uses a fixed blade that is moved relative to a shrimp, one or more alternative embodiments of the mud vein severing apparatus as described herein may include rotary blades, water jets, etc. that may be used to sever the mud veins in shrimp as described herein.

Figure 22:
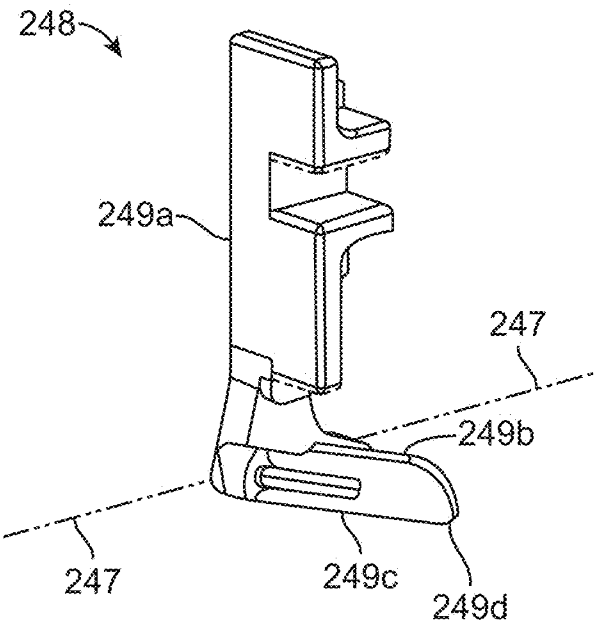
FIG. 22 depicts one illustrative embodiment of a blade that may be used in one or more embodiments of a mud vein severing apparatus as described herein.
Figure 23:
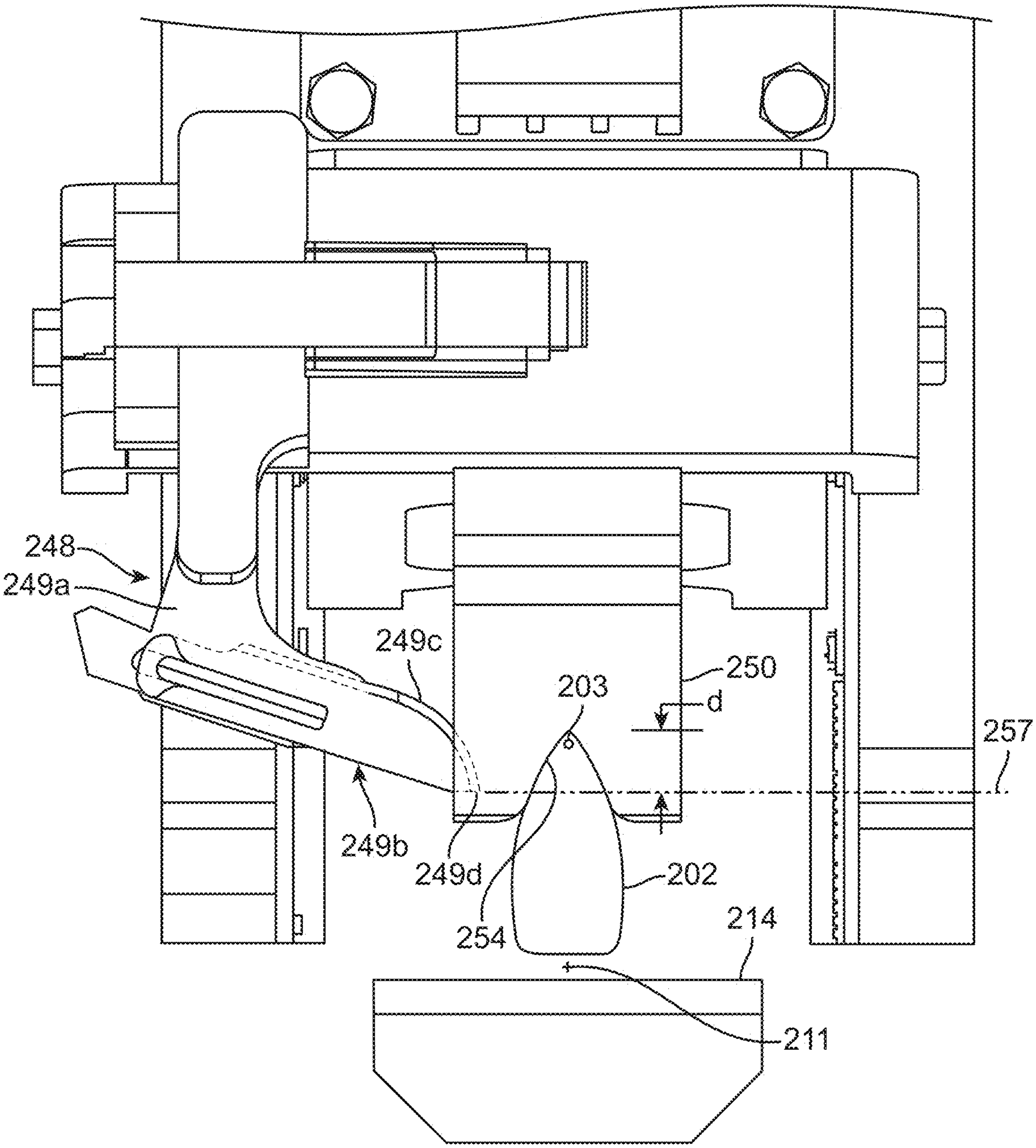
FIG. 23 depicts the severing restraint of the mud vein severing apparatus depicted in FIGS. 16-21 in position on a larger shrimp (with the shrimp being depicted in a cross-sectional view).
Figure 24:
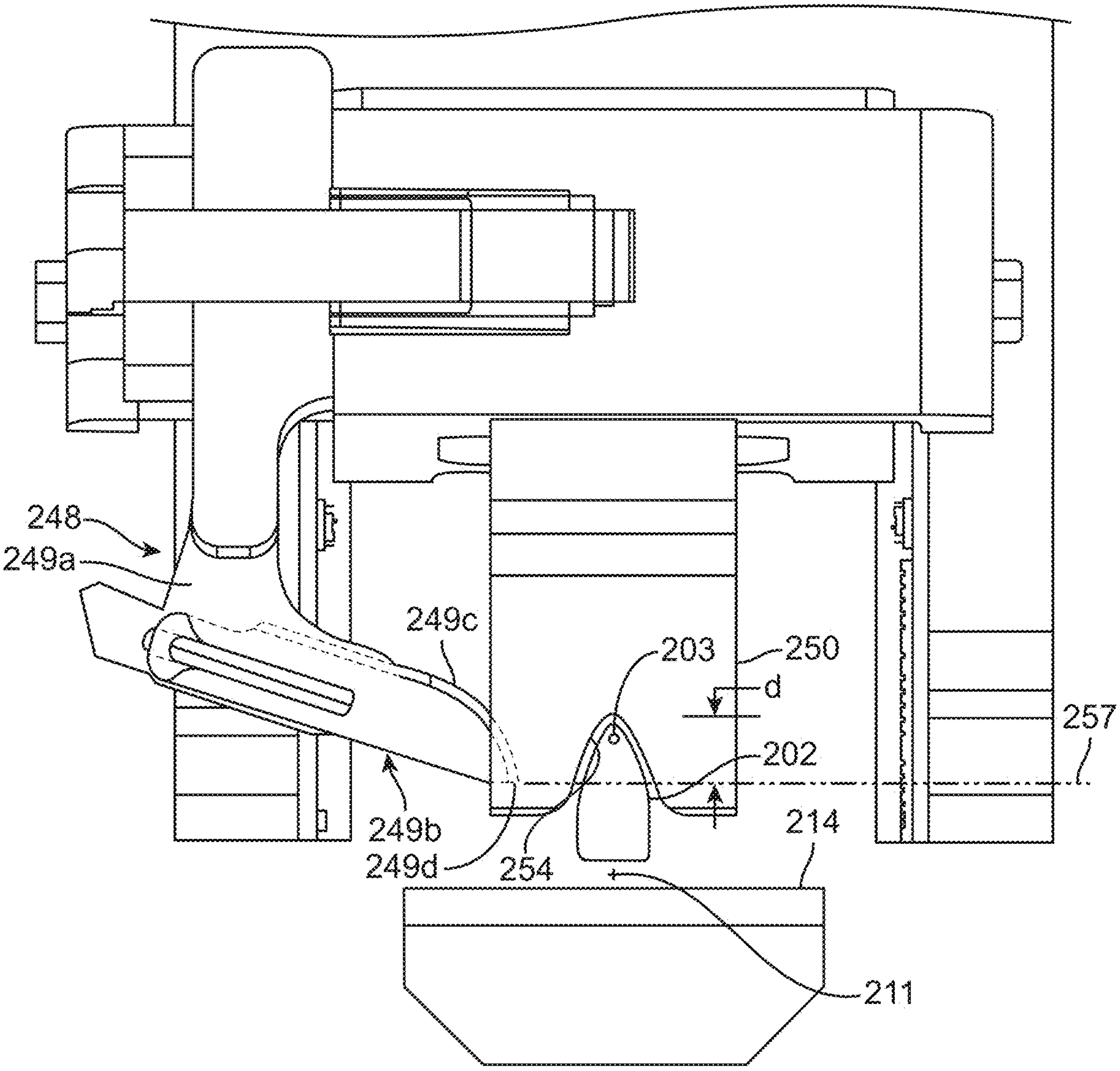
FIG. 24 depicts the severing restraint of the mud vein severing apparatus depicted in FIG. 23 in position on a smaller shrimp (with the shrimp also being depicted in a cross-sectional view).

FIG. 22 depicts one illustrative embodiment of a blade assembly 248 used in a mud vein severing apparatus as described herein. In particular, blade assembly 248 may be in the form of a blade holder 249*a* and a replaceable blade 249*b* that can be attached to blade holder 249*a*. In one or more embodiments, the blade 249*b* may be in the form of a #10 scalpel blade or other conventional cutting instrument to allow for easy and quick replacement of the blade as needed. FIGS. 23-24 depict the blade 249*b* in an enlarged view where can be seen that the blade 249*b* includes a cutting edge 249*c*, with the blade 249*b* being attached to a holder 249*a* of the blade assembly 248. In one or more embodiments, the cutting edge 249*c* of the blade 249*b* faces upwards or away from the ventral side of a shrimp in the selected severing location as the blade moves along the severing path.

In the depicted illustrative embodiment, the cutting edge 249*c* of the blade 249*b* is a curved edge. The curved edge of the blade 249*b* may reduce the likelihood of fracture of the blade during use in severing the mud veins of shrimp processed by the shrimp processing systems described herein.

In one or more embodiments, it may be preferred that the blade assembly 248 move from its stored position to its severed position in a direction that results in a slicing action of the mud vein in a shrimp 202. With reference to FIGS. 16-21, shrimp 202 restrained in a selected severing location on working surface 214 are generally aligned along processing axis 211 such that movement of the blade assembly 248 along a severing direction aligned with the blade actuator axis 247 provides the desired slicing action of a mud vein in the shrimp 202 when the severing direction/blade actuator axis 247 is oriented generally transverse to the processing axis 211.

FIGS. 23-24 depict the relative positions of the severing restraint 250 in position on a pair of differently sized shrimp 202 to illustrate the adaptation provided by the notch 254 in severing restraint 250 based on shrimp of different sizes. As discussed herein and, as depicted in FIGS. 23-24, the path of the cutting edge 249*c* of the blade 249*b* is fixed relative to the severing restraint 250. In other words, the cutting edge 249*c* of the blade 249*b* passes the same portion of the notch 254 in severing restraint 250 regardless of the size of the shrimp 202.

In particular, FIG. 23 depicts a larger shrimp 202 in a selected severing position and aligned with the processing axis 211 on a working surface 214 of a shrimp processing system as described herein. FIG. 24 depicts a smaller shrimp 202 in a selected severing position and aligned with the processing axis 211 on a working surface 214 of a shrimp processing system as described herein The shrimp 202 are both shown in cross-section with the mud vein 203 located proximate the dorsal side of the shrimp 202.

FIGS. 23-24 depict the ability of the notch 254 in severing restraint 250 to assist in determining a height of the ventral side of the shell of the shrimp and setting a cutting depth relative to that height for a blade of a mud vein severing apparatus as described herein. Axis 257 depicted in FIGS. 23-24 may, for example, be indicative of the path of a blade used to sever a mud vein of a shrimp relative to the notch 254. In particular, axis 257 may be indicative of the path of the lowermost end 249*d* of the cutting edge 249*c* of the blade assembly 248. The axis 257 is generally parallel with the severing direction/blade actuator axis 247 along which the blade assembly 248 is moved during the severing process.

With reference to FIGS. 23-24, axis 257 may define a cutting depth d along a vertical axis extending through the working surface 214 and the shrimp 202. Defining the cutting depth relative to the dorsal side of the shrimp shell using a notched severing restraint such as, for example, severing restraint 250 may assist in assuring that cutting depths on shrimp restrained in a selected severing location as described herein are deep enough to sever the mud vein, without undesirably cutting too deeply into a shrimp being processed by the mud vein severing apparatus.

As noted above, FIG. 24 depicts a smaller shrimp 202 in the selected severing position and also aligned with the processing axis 211 on the working surface 214 of a shrimp processing system as described herein. FIG. 24 also depicts the axis 257 along which the lowermost end 249*d* of the cutting edge 249*c* moves as the blade 249*b* passes through the smaller shrimp 202 to sever the mud vein 203.

A comparison of FIGS. 23 and 24 shows that the axis 257 along which the lowermost end 249*d* of the cutting edge 249*c* moves to sever the mud veins 203 in both the larger and smaller shrimp 202 is in the same position relative to the severing restraint 250 regardless of the size of the shrimp. In both instances, however, the cutting edge 249*c* of the blade 249*b* of the blade assembly 248 is in position low enough to sever the mud veins 203 of the shrimp 202.

Fixing the height of the path of the blade 249*b* relative to the severing restraint 250 provides for accurate and repeatable severing of mud veins in shrimp of relative widely varying sizes because the mud veins 203 are located closer to the dorsal side of shrimp as a percentage of the "height" of the abdomen of the shrimp 202 in larger shrimp as compared to smaller shrimp (compare, for example, the locations of the mud veins 203 of the larger shrimp in FIG. 23 and the smaller shrimp in FIG. 24).

Another feature that can be visualized with reference to FIGS. 23 and 24 is that the cutting edge 249*c* of the blade 249*b* will, in most instances, force the mud veins 203 of both the larger and smaller shrimp 202 away from the ventral sides and towards the dorsal sides of the shrimp 202 (i.e., away from the working surface 214 against which the ventral surfaces of the larger and smaller shrimp 202 face). That lifting action can, in some instances, assist with severing of the mud veins 203 which can, in some instances, be relatively tough and/or elastic. Although the lifting action occurs with a curved cutting edge, it will be understood that a similar lifting action could be achieved with a straight cutting edge that also faces away from the ventral side of the shrimp 202.

As discussed herein, the severing restraint 250 used in one or more embodiments of the mud vein severing apparatus described herein preferably includes a notch 254. The notch 254 is configured to receive a shrimp 202 held in a clamp 212 in the selected severing location on working surface 214 as described herein. In addition to assisting with restraint of a shrimp positioned in the notch 254, the notch also provides positioning for a blade used to sever the mud vein of a shrimp as described herein.

FIGS. 25A-25E illustrate various features regarding the depicted illustrative embodiment of notch 254. In particular, the notch 254 may be described as extending inwardly from leading edges 255 of restraint 250 towards a notch end 256 along a notch axis 253. Notch axis 253 may preferably be transverse to the processing axis 211 when the restraint 250 is in its restraint position proximate a working surface as described herein. Furthermore, the notch 254 may preferably be wider proximate the leading edges 255 of restraint 250 and narrow when approaching the notch end 256 distal from those leading edges.

In one or more embodiments, the notch 254 may preferably have a beveled surface 258 that widens when moving in one direction along processing axis 211. This feature is seen in, for example, FIGS. 25B-25E. Because of the beveled surface 258, the notch 254 is wider on one side of severing restraint 250 than on the opposite side of severing restraint 250. In one or more embodiments, that widening may preferably correlate with the widening of the abdomen of a shrimp when moving from the tail of the shrimp towards its carapace and, as a result, may assist in restraining shrimp when the severing restraint 250 is in its restraint position on a shrimp.

Figure 25A:
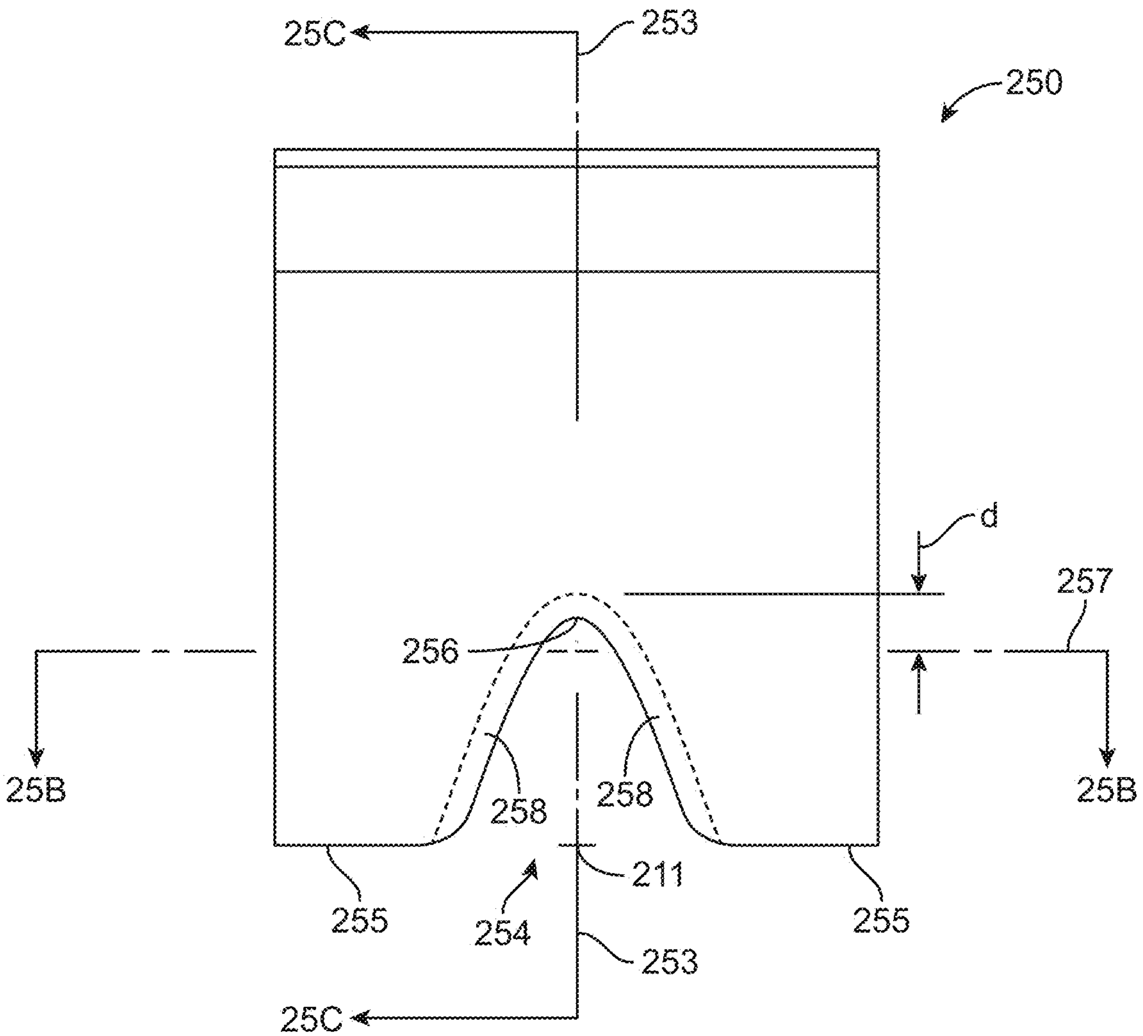
FIG. 25A depicts one illustrative embodiment of a severing restraint that may be used in one or more embodiments of a mud vein severing apparatus as described herein.
Figure 25B:
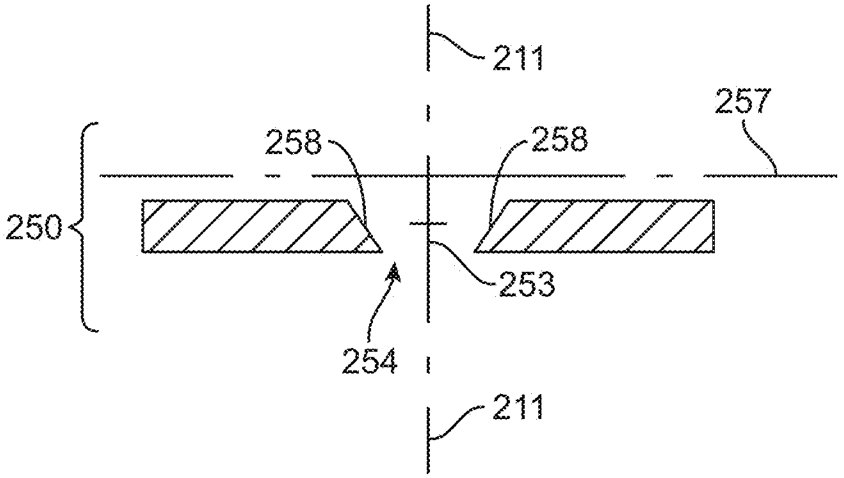
FIG. 25B is a cross-sectional view of the severing restraint of FIG. 25A taken along line 25B-25B in FIG. 25A.
Figure 25C:
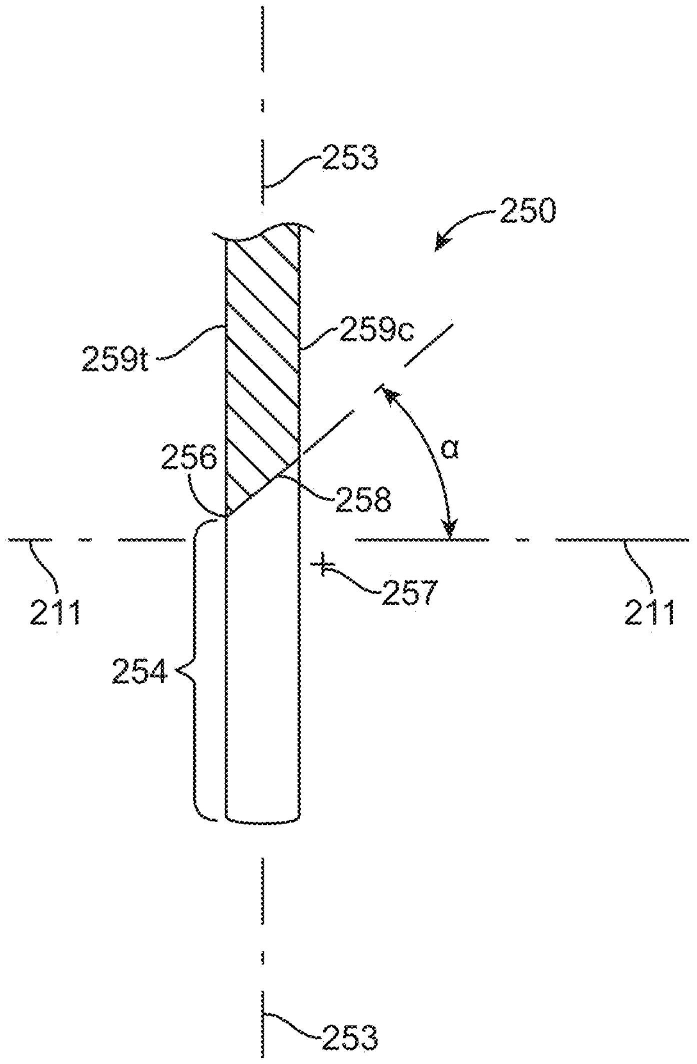
FIG. 25C is an enlarged cross-sectional view of the severing restraint of FIG. 25A taken along line 25C-25C coextensive with axis 253 in FIG. 25A.

FIG. 25C is an enlarged cross-sectional view of the severing restraint 250 taken along the notch axis 253. As can be seen in this figure, the beveled surface 258 forming the notch 254, in addition to changing the width of the notch 254 as seen in FIG. 25B, also changes the height or depth of the notch 254 between the tail side 259*t* and the carapace side 259*c* of the severing restraint 250. In one or more embodiments, the beveled surface 258 may define an Angle $\alpha$ (alpha) relative to the processing axis 211. In one or more embodiments the angle $\alpha$ (alpha) may be 15 or more, 30 or more, 45 or more, or 60 or more degrees at a lower end and 75° or less, 60° or less, 45° or less, or 30° or less at an upper end.

Figure 25D:
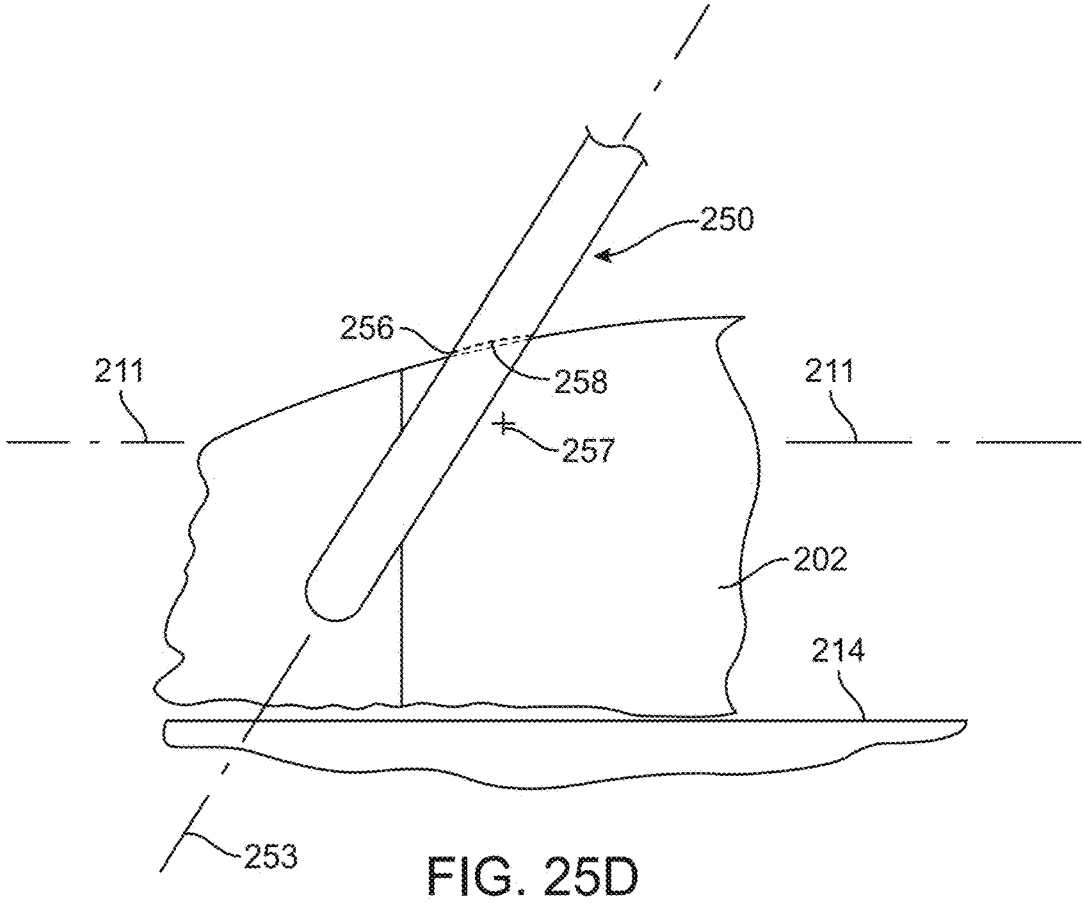
FIG. 25D is a side view depicting the severing restraint of FIG. 25A in position on a larger shrimp.
Figure 25E:
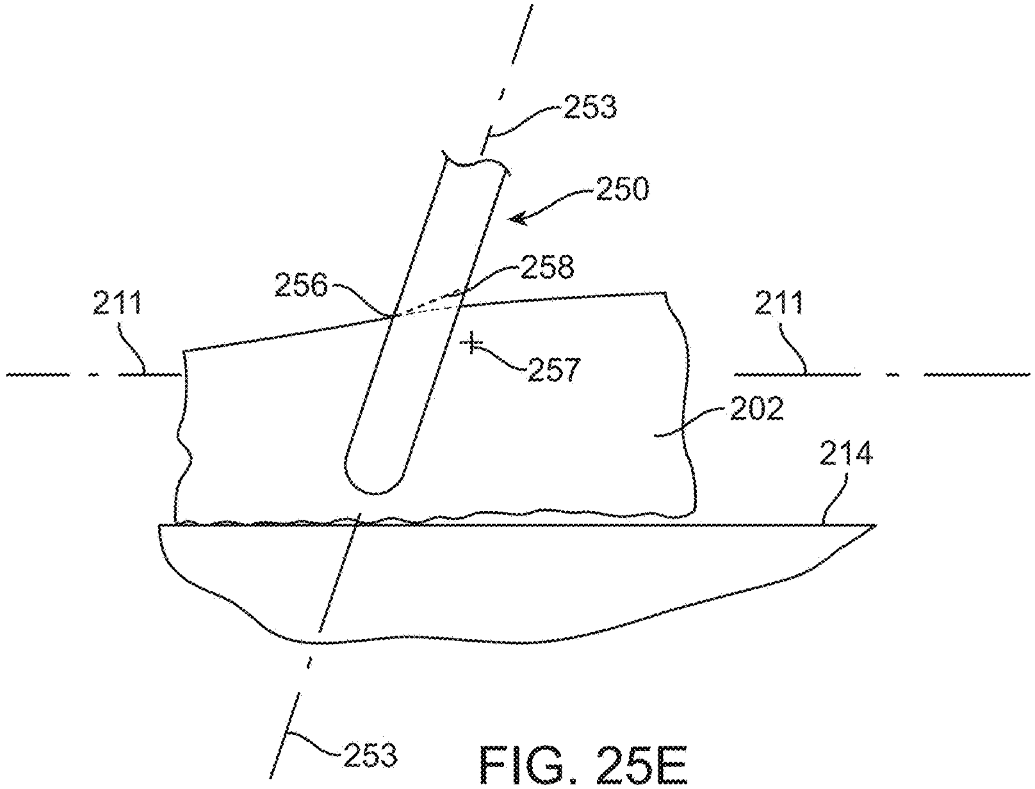
FIG. 25E is a side view depicting the severing restraint of FIG. 25A in position in a smaller shrimp to illustrate the effect of the beveled surface of the notch on larger and smaller shrimp as discussed herein.

FIGS. 25D and 25E depict the severing restraint 250 on two differently sized shrimp 202 to illustrate the effect that the beveled surface 258 may have when placing the severing restraint 250 on differently sized shrimp. In FIG. 25D a larger shrimp 202 is depicted with a ventral surface facing the working surface 214. In embodiments in which the severing restraint 250 is rotated into position (see, for example, the mud vein severing apparatus depicted in FIGS. 16-21), the angle of the severing restraint 250 (as represented by the notch axis 253) may be less vertical when placed on a larger shrimp as seen in FIG. 25D as compared to the more vertical angle of the severing restraint 250 when placed on a smaller shrimp as seen in FIG. 25E.

That change in angular orientation of the severing restraint 250 on differently sized shrimp may be, at least in part, accommodated by the beveled surface 258 of the notch 254 in one or more embodiments of a severing restraint as described herein. Moreover, the accommodation made by the beveled surface 258 on larger shrimp may, in one or more embodiments, also assist in moving the axis 257, which defines the cutting depth as discussed above in connection with FIGS. 23-24, farther down or deeper into the shrimp 202 on the larger shrimp and, conversely, moving the axis 257 upward towards the dorsal side of the shrimp 202 on smaller shrimp.

One illustrative embodiment of the components that may be used to provide a measurement module that may be used to measure shrimp in one or more embodiments of a shrimp processing system as described herein are depicted in FIGS. 26-30. Although described and depicted separately, in one or more embodiments of processing stations described herein, a mud vein severing apparatus and a shrimp measurement module may be integrated into the same processing station. In one or more embodiments, the measurement modules described herein may preferably use a noncontact sensor configured to measure the length of a shrimp held in a clamp moving through the measurement module along a measurement direction. In general, the measurement direction will align with the processing direction as defined by processing axis 211.

Regardless of whether or not the measurement module is integrated into the same processing station as a mud vein severing apparatus, the measurement module may preferably be positioned such that shrimp moving through a shrimp processing system as described herein are measured before, or at least as, they reach the selected severing location at which the mud vein is severed. Doing so can allow the system to use the length of the shrimp to properly position the mud vein severing apparatus with respect to each shrimp for accurate and efficient severing of the mud veins of shrimp processed using the shrimp processing systems described herein.

Figure 26:
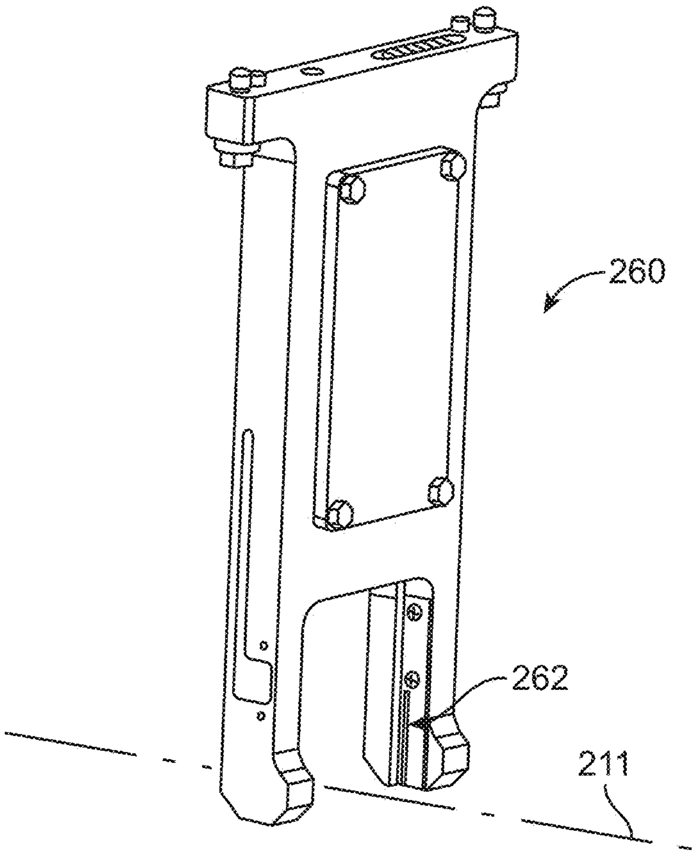
FIG. 26 is a perspective view of one illustrative embodiment of a measurement module that may be used in one or more embodiments of a shrimp processing system as described herein.
Figure 28:
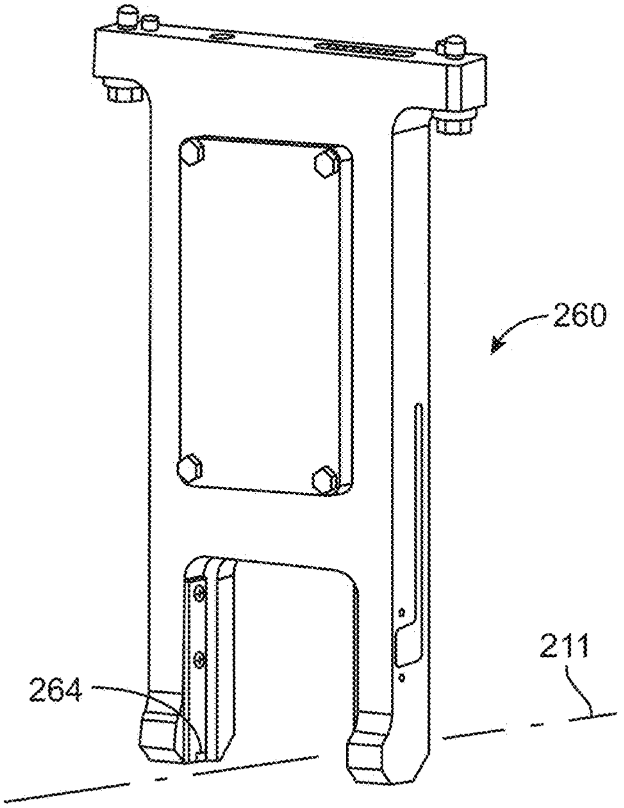
FIG. 28 is a perspective view of one illustrative embodiment of a measurement module that may be used in one or more embodiments of a shrimp processing system as described herein.

With reference to FIGS. 26 and 28, the measurement module components are located on opposite sides of the measurement direction/processing axis 211 such that shrimp moving along the processing axis 211 pass between the components of the measurement module. In particular, the depicted illustrative embodiment of the measurement module includes an emitter 262 and a receiver 264 positioned on opposite sides of the processing axis 211. The specific embodiment of emitter 262 is in the form of an array of infrared emitters which generate a multipath light beam, while the receiver 264 receives that emitted energy and uses it to determine the length of a shrimp passing between the emitter 262 and the receiver 264.

Figure 27:
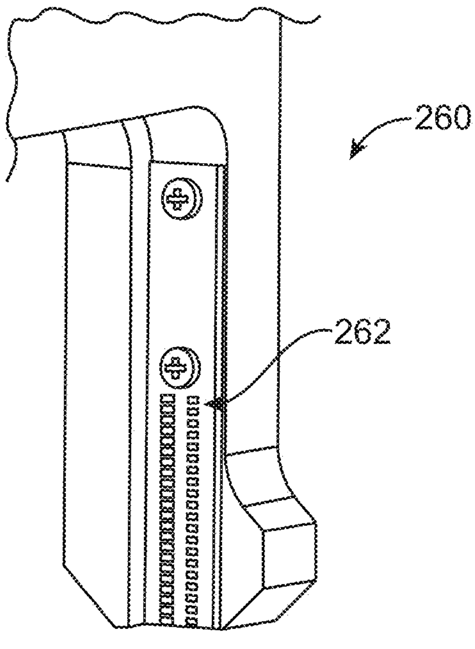
FIG. 27 is an enlarged view of a portion of the measurement module depicted in FIG. 26.
Figure 29:
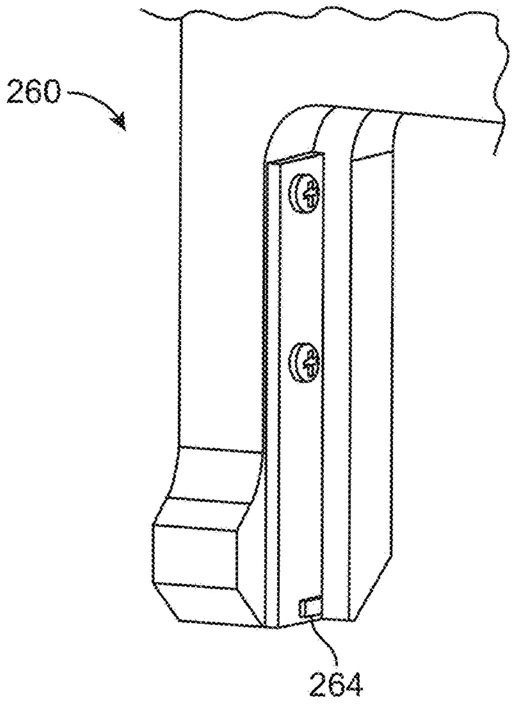
FIG. 29 is an enlarged view of a portion of the measurement module depicted in FIG. 28.
Figure 30:
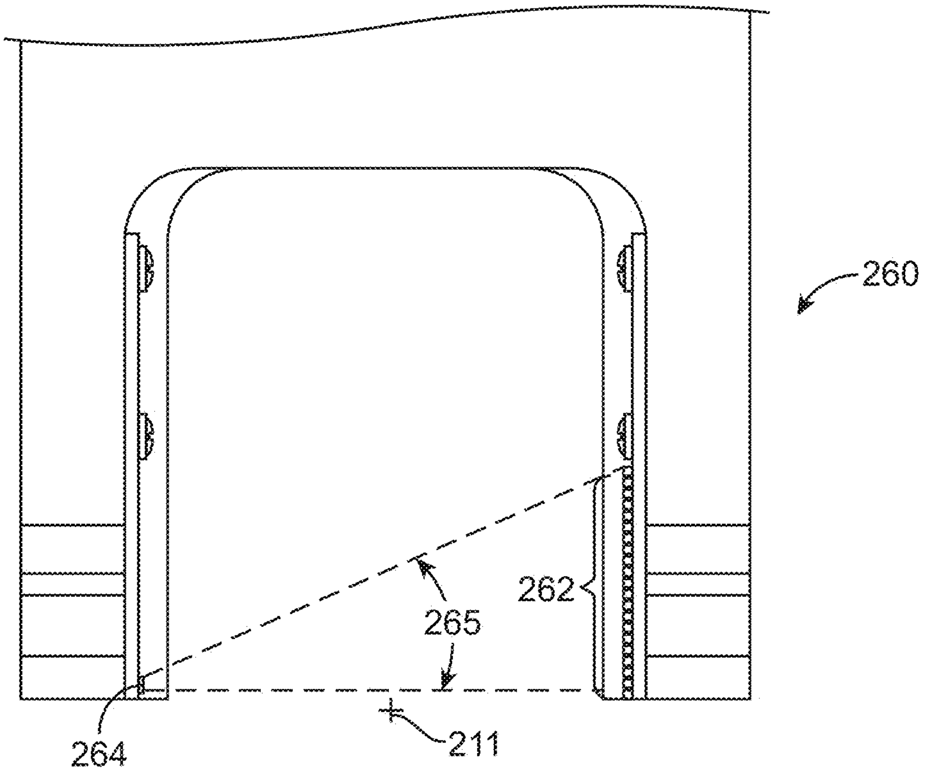
FIG. 30 depicts the measurement module of FIGS. 26-29 in a view illustrating the distribution of energy between an emitter and receiver in the depicted illustrative embodiment of a measurement module used in a shrimp processing system as described herein.

With reference to FIGS. 26-27 & 30, the array of emitters forming emitter 262 (arranged vertically in FIGS. 26-27) in the depicted embodiment emit light generally across the opening between the emitter 262 and receiver 264. With reference to FIGS. 28-30, the receiver 264 may, in one or more embodiments, have an aperture over which light emitted by the emitters 262 is received such that only light within the depicted fan shaped distribution of energy 266 between the emitter 262 and receiver 264 is received by the receiver 264.

In operation, it may be preferred to calibrate the noncontact sensor before a shrimp held in a clamp passes through the noncontact sensor in the measurement direction. In one or more embodiments, it may be preferred to calibrate the noncontact sensor before every shrimp held in a clamp passes through the noncontact sensor in the measurement direction. Calibration of the noncontact sensor before each shrimp held in a clamp passes through the noncontact sensor may provide for more robust and accurate measurement of shrimp passing through the noncontact sensor. In one or more alternative embodiments, it may be preferred to calibrate the noncontact sensor after a selected number of shrimp have passed through the noncontact sensor (as opposed to calibrating the noncontact sensor before every shrimp passes through the noncontact sensor).

During the measurement process, the emitter 262 continuously emits optical energy across the gap between the emitter 262 and the receiver 264 while a shrimp restrained in a clamp passes between the emitter 262 and receiver 264 along the processing axis 211. The controller to which the emitter 262 and receiver 264 are operably attached monitors the energy received by the receiver 264 to identify a junction between the clamp and a shrimp held in the clamp when moving a shrimp held in a clamp through the noncontact sensor. That junction can, in one or more embodiments, be detected by identifying a selected portion of a clamp such as, for example, the leading edge of the clamp restraining a shrimp as the clamp and shrimp pass between the emitter 262 and receiver 264 along the processing axis 211 when the amount of energy emitted by the emitter 262 reaching the receiver 264 falls below a selected clamp threshold value indicating blockage of the energy consistent with the clamp passing between the emitter 262 and receiver 264.

As the shrimp and clamp continue to pass between the emitter 262 and receiver 264, the controller continues to monitor the energy received by the receiver 264. While the shrimp is located between the emitter 262 and receiver 264 the amount of energy received by the receiver 264 is reduced due to blockage by the abdomen and carapace of the shrimp. As, however, the carapace of the shrimp passes between the emitter 262 and receiver 264, the amount of energy received by the receiver 264 increases as the carapace completes its passage between the emitter 262 and receiver 264.

A shrimp length measurement value is determined when the amount of energy reaching the receiver 264 increases to a level above a selected antenna threshold at which point the carapace of the shrimp has passed between the emitter 262 and receiver 264 (referred to as an antenna threshold because, presumably, only antenna of the shrimp may be located between the emitter 262 and receiver 264 after the carapace has passed between those components).

Because the controller is also operably connected to the conveying system (see, e.g., controller 290 and conveying system 292 in FIG. 15) used to move the shrimp restrained in clamps through the measurement module between the emitter 262 and receiver 264, the length of the shrimp can be determined based on the distance traveled by the shrimp using the conveying system. In particular, the distance traveled by a shrimp in the time between identification of the leading edge of the clamp (as determined by the energy received by the receiver 264 falling below a selected clamp threshold) and identification of the end of the carapace of the shrimp (as determined by the energy received by the receiver 264 rising above a selected antenna threshold) is used as a measurement of the length of the shrimp.

Although one illustrative embodiment of a measurement module may rely on infrared energy emitted and received by a noncontact sensor, other forms of noncontact sensing may be used in place of and/or in addition to infrared energy emission and detection. For example, noncontact sensing may be performed using ultrasonic energy, optical energy outside of the infrared range, imaging systems (using one or more cameras, etc.), capacitive sensing, imaging systems (using one or more cameras, etc.), etc. In still other alternative embodiments, contact sensing may be used to determine the length of the shrimp using, for example, mechanical followers, fluid jets, etc.

With length of the shrimp determined, the controller may, optionally, be configured to determine a weight of the shrimp based at least in part on the length of the shrimp. In some embodiments, the weight of a shrimp held in a clamp may be based entirely on the length of the shrimp as measured using a measurement module as described herein.

Further, with the length of the shrimp determined, that information may be used to position the vein severing apparatus relative to that specific shrimp such that the vein severing apparatus can sever the mud vein of the shrimp at a selected location on the shrimp. With reference to FIG. 3, it may be preferred to sever the mud vein of a shrimp 102 proximate a junction between a rearmost abdominal shell segment and an adjacent abdominal shell segment of the shrimp, wherein the rearmost abdominal shell segment is located between the adjacent abdominal shell segment and the tail of the shrimp. For example, in a shrimp 102 having an abdomen with six segments, it may be preferred to sever the mud vein proximate a junction between the fifth shell segment and sixth shell segment in the abdomen 104. Severing the mud vein at that location may result in removal of substantially all of the mud vein, with only the portion of the mud vein located in the rearmost/sixth abdominal segment (width that portion of the mud vein sometimes referred to as the "hind gut") remaining when the majority of the mud vein is removed from the abdomen 104 between the rearmost/sixth abdominal segment and the carapace of the shrimp 102.

Because the length of the shrimp 202 is known, the general location of the junction between the rearmost and adjacent (for example, fifth and sixth) shell segments is also known because the location of that junction is related to the length of the shrimp 202 and the vein severing module can be positioned properly such that the blade severs the mud vein proximate the junction between the rearmost and adjacent (for example, fifth and sixth) shell segments.

As discussed above in connection with FIGS. 16-23, the illustrative processing station depicted in those figures includes a carriage 244 configured to move along axis 241 which is aligned with processing axis 211 along which shrimp 202 is positioned on working surface 214. Carriage 244 can be moved using a vein severing module drive (see, e.g., severing module drive 271 in FIG. 15). Although not shown in FIGS. 16-23, the vein severing module drive (271) operably attached to the carriage 244 to move carriage 244 may take any suitable form including, for example, electric motors, hydraulic motors, pistons (hydraulic and/or pneumatic), solenoids, etc.

Moving carriage 244 also moves the blade assembly 248 along the processing axis 211 because blade actuator 245 and blade carriage 246 are both mounted on carriage 244 along with the severing restraint 250 and its associated components. As a result, with knowledge of the location of blade assembly 248 relative to carriage 244 and a measurement of the shrimp 202 located in the selected severing location on the working surface 214 providing the general location of the junction between the fifth and sixth shell segments on the shrimp 202, the mud vein severing apparatus depicted in FIGS. 16-23 can position the blade assembly 248 such that the blade assembly 248 severs the mud vein proximate the selected junction on the shrimp 202 when moving from its stored position to its severed position as described herein.

Heading Apparatus & Methods

As discussed herein, one or more embodiments of the shrimp processing systems and methods described herein may include a processing station and methods of heading individual shrimp. As used herein, "heading" of a shrimp means removal of the head/carapace (and substantially all of the viscera located therein) from the abdomen of a shrimp. In one or more embodiments, the shrimp may be restrained on a working surface during heading using a heading restraint, with the heading restraint being, in one or more embodiments, positioned at the junction between the abdomen and the carapace of the shrimp (referred to herein as the "carapace junction").

In one or more embodiments, the head of the shrimp be removed in a manner that also results in removal of a significant portion of the mud vein, but removal of the mud vein during heading is not required. Removal of the mud vein during heading may be facilitated if the mud vein is severed at a selected location along the abdomen before heading the shrimp. In one or more embodiments, the mud vein may, as described herein, be severed proximate a junction between the rearmost and adjacent (for example, fifth and sixth) shell segments on the abdomen before heading the shrimp.

The shrimp processing systems and methods described herein involve a heading process performed on each shrimp individually while the shrimp is restrained by a head restraint acting on the shrimp at a location proximate the carapace junction. In one or more embodiments, the shrimp may also be restrained by a clamp acting on its abdomen between the carapace junction and the tail, but that additional restraint is not required for the heading process. For example, in one or more embodiments, the shrimp may be restrained by a clamp acting on the abdomen of the shrimp proximate its tail.

Figure 31:
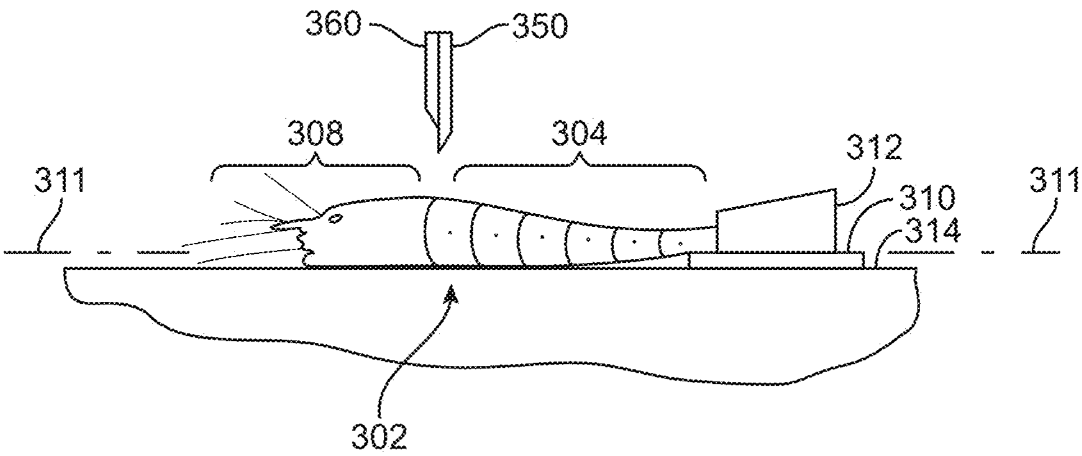
FIGS. 31-33 depict stages in one illustrative embodiment of heading of a shrimp as described herein.
Figure 32:
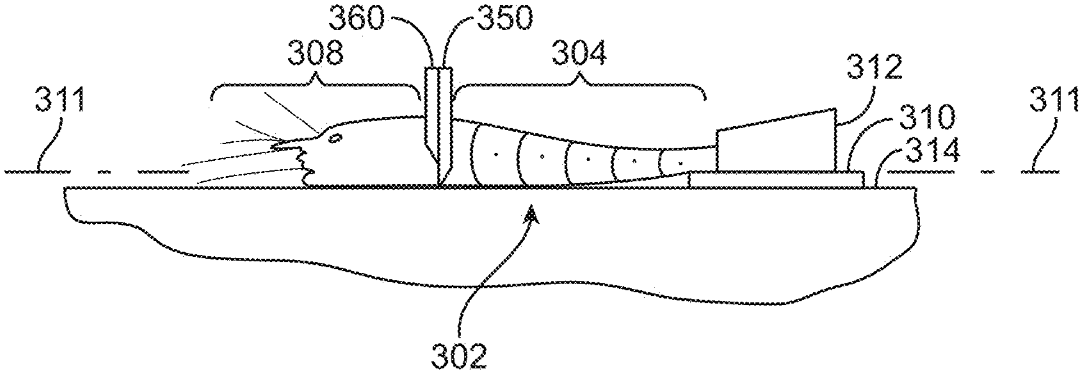
Figure 33:
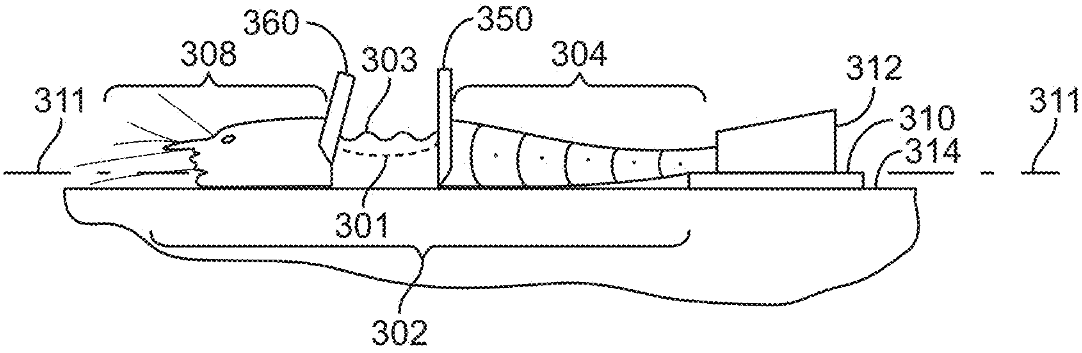
Figure 34:
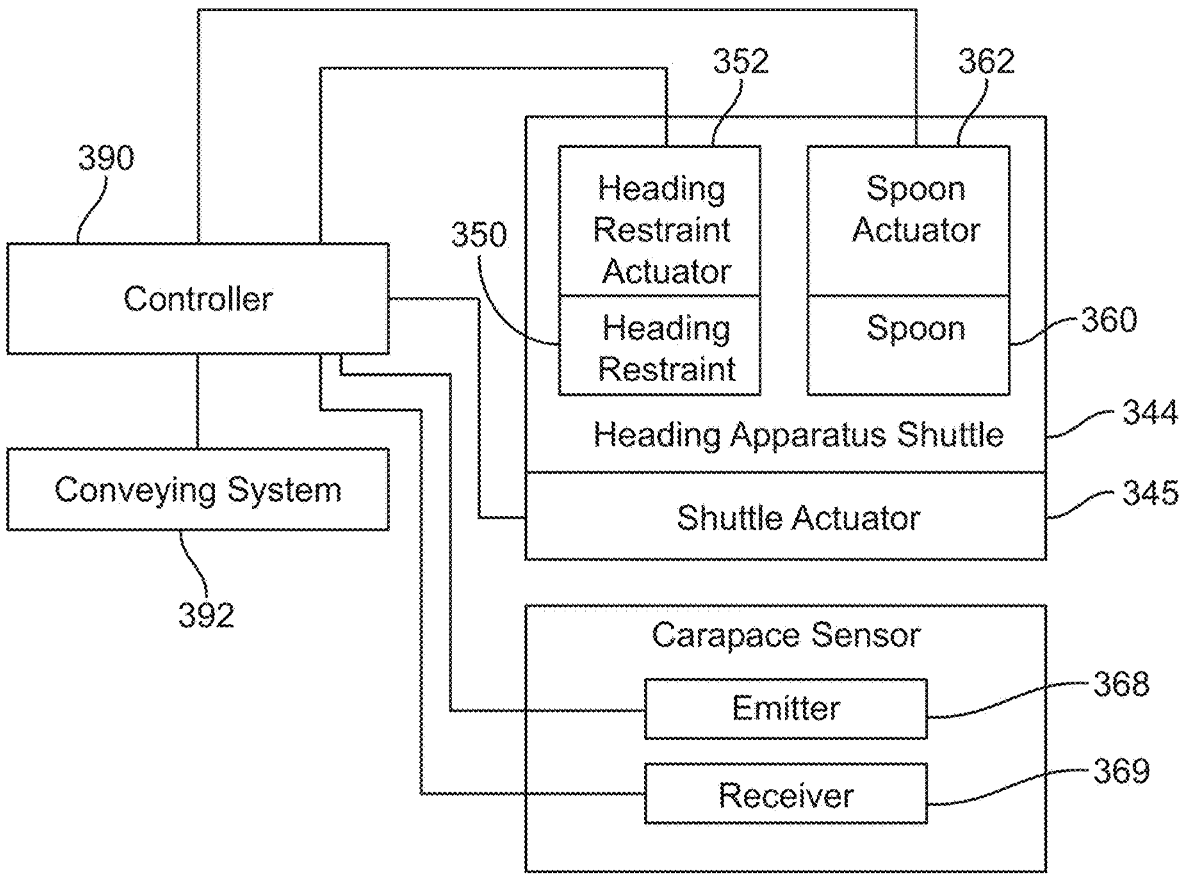
FIG. 34 is a schematic block diagram of components in one illustrative embodiment of a shrimp heading apparatus as described herein.

FIGS. 31-33 are simplified diagrams depicting one illustrative embodiment of a heading process and apparatus as described herein, while FIG. 34 depicts a heading apparatus in the form of a schematic block diagram. As depicted in FIG. 31, a shrimp 302 is positioned on a working surface 314. The shrimp 302 is positioned such that it extends along a processing axis 311 away from a clamp 312 attached to a clamp mount 310. More specifically, the shrimp 302 is restrained by clamp 312 proximate its tail, such that the abdomen 304 and carapace 308 of the shrimp extend away from the clamp 312 on the working surface 314.

A heading restraint 350 is positioned opposite the working surface 314. The heading restraint as depicted in FIG. 31 is located in its stored position such that the shrimp 302 can be positioned between the heading restraint 350 and the working surface 314. A spoon 360 is also depicted in FIG. 31 with the spoon 360 being in its ready position in which the spoon 360 is located proximate a carapace side of the heading restraint 350 (where the carapace side of the heading restraint 350 is the side of the heading restraint facing the carapace 308 of the shrimp 302).

The heading restraint 350 is depicted in its restraint position in FIG. 32 which is closer to the working surface 314 than when the heading restraint 350 is in its stored position as seen in FIG. 31. When moved to its restraint position, the heading restraint 350 is configured to force the shrimp 302 located between the heading restraint 350 and the working surface 314 against the working surface 314. The spoon 360 remains in its ready position proximate the carapace side of the heading restraint 350 in FIG. 32. In the illustrative embodiment depicted in FIGS. 31-32, the heading restraint 350 and spoon 360 may sever the shrimp 302 at a location proximate its carapace junction 303 (that is, the junction 303 between the abdomen 304 and the carapace 308 of the shrimp).

With reference to FIG. 33, the heading restraint 350 remains in its restraint position as seen in FIG. 32, while the spoon 360 has been moved to its finish position spaced away from the carapace side of the heading restraint 350. Moving the spoon 360 from its ready position as seen in FIG. 32 to its finish position as seen in FIG. 33 separates the head/carapace 308 of the shrimp 302 on the working surface 314 from the abdomen 304.

Also depicted in FIG. 33 is that the spoon 360 (more particularly a working portion of the spoon 360), moves away from the abdomen 304 and heading restraint 350 along a spoon path 301. In the depicted embodiment, at least a portion of the spoon path 301 is arcuate. Further, in the depicted embodiment, the working portion of the spoon 360 moves closer to the working surface 314 as the spoon 360 moves away from the abdomen 304 of the shrimp and heading restraint 350.

In one or more embodiments, separation of the carapace 308 from the abdomen 304 of the shrimp 302 may also result in removal of at least a portion of the mud vein 303 from the abdomen 304 of the shrimp 302. Removal of the mud vein 303 may be facilitated if the mud vein is severed within the abdomen 304 before the carapace 308 of the shrimp is removed from the abdomen 304 of the shrimp 302. As discussed herein, for example, it may be desirable to sever the mud vein 303 in the abdomen 304 proximate the junction between the rearmost and adjacent (for example, fifth and sixth) shell segments on abdomen 304.

Described in a different manner, the heading process as depicted in FIGS. 31-33 may be described as a method in which the abdomen 304 of the shrimp 302 is restrained in a fixed position on a working surface 314 and moving a spoon 360 through the shrimp proximate a carapace junction 303 of the shrimp 302 (the carapace junction 303 being located between the carapace 308 and a first abdominal segment in the abdomen 304 of the shrimp 302). Moving the spoon 360 through the shrimp proximate the carapace junction 303 may involve moving the spoon 360 towards the working surface 314. The method further includes moving the spoon 360 away from the abdomen 304 while restraining the abdomen 304 of the shrimp 302 in the fixed position on the working surface 314.

With reference to FIG. 34, one illustrative embodiment of a heading apparatus as described herein is depicted in a schematic block diagram in which a heading restraint 350 and heading restraint actuator 352 are carried on a heading apparatus shuttle 344 along with a spoon 360 and spoon actuator 362.

The shuttle actuator 345 is operably connected to the controller 390, with the shuttle actuator 345 being used to move the shuttle such that the spoon 360 and heading restraint 350 are positioned at a selected location on a shrimp during the heading process. The heading restraint actuator 352 is operably connected to the controller 390, with the heading restraint actuator being used to move the heading restraint between its stored position and its restraint position as described herein. The spoon actuator is operably connected to the controller 390, with the spoon actuator 362 being used to move the spoon 360 from its ready position to its finish position to remove the carapace of a shrimp restrained by the heading restraint 350.

Controller 390 is also, in one or more embodiments, operably connected to an optional carapace sensor to assist with identification of the carapace junction as described herein. In one or more embodiments of shrimp processing systems as described herein in which a measurement module is used to measure the shrimp being processed, that measurement may be used to identify the area in which the carapace junction is likely located to speed identification of the carapace junction as described herein. In one or more alternative embodiments, the location of the carapace may be determined based on the measured length of the shrimp using, e.g., the measurement apparatus and methods described herein. In the depicted illustrative embodiment, the carapace sensor includes an emitter 368 and a receiver 369, with the emitter 368 emitting energy received by the receiver 369. Variations in the amount of energy received by the receiver can be used to identify the carapace junction as described herein.

Conveying system 392 is also operably attached to the controller 390, with the conveying system being used to move individual shrimp into position on a working surface where the shrimp may be acted on by the heading restraint 350 and spoon 360 as described herein.

Although the controller 390 depicted in connection with the illustrative embodiment of a heading apparatus as depicted in FIG. 34 is in the form of a single controller in which all control functions may be performed by a single controller (although backup and/or redundant controllers may be provided to assist in the case of failure of a primary controller), one or more alternative embodiments of shrimp heading apparatus may include a distributed set of controllers, with those portions of the apparatus requiring a controller having a dedicated controller and, potentially, a network may be used to interconnect the various controllers to facilitate processing of shrimp by the heading apparatus. Further, the controller 390 (or any other controllers used in a heading apparatus as described herein) may be separate from or integrated into a system controller such as, e.g., controller 90 depicted in connection with a control system used to control a shrimp processing system as depicted in FIG. 2.

The controllers used in one or more embodiments of heading apparatus as described herein may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the apparatus (e.g., keyboards, touchscreens, mice, trackballs, etc.), as well as display devices configured to convey information to a user (e.g., monitors (which may or may not be touchscreens), indicator lights, etc.).

Figure 35:
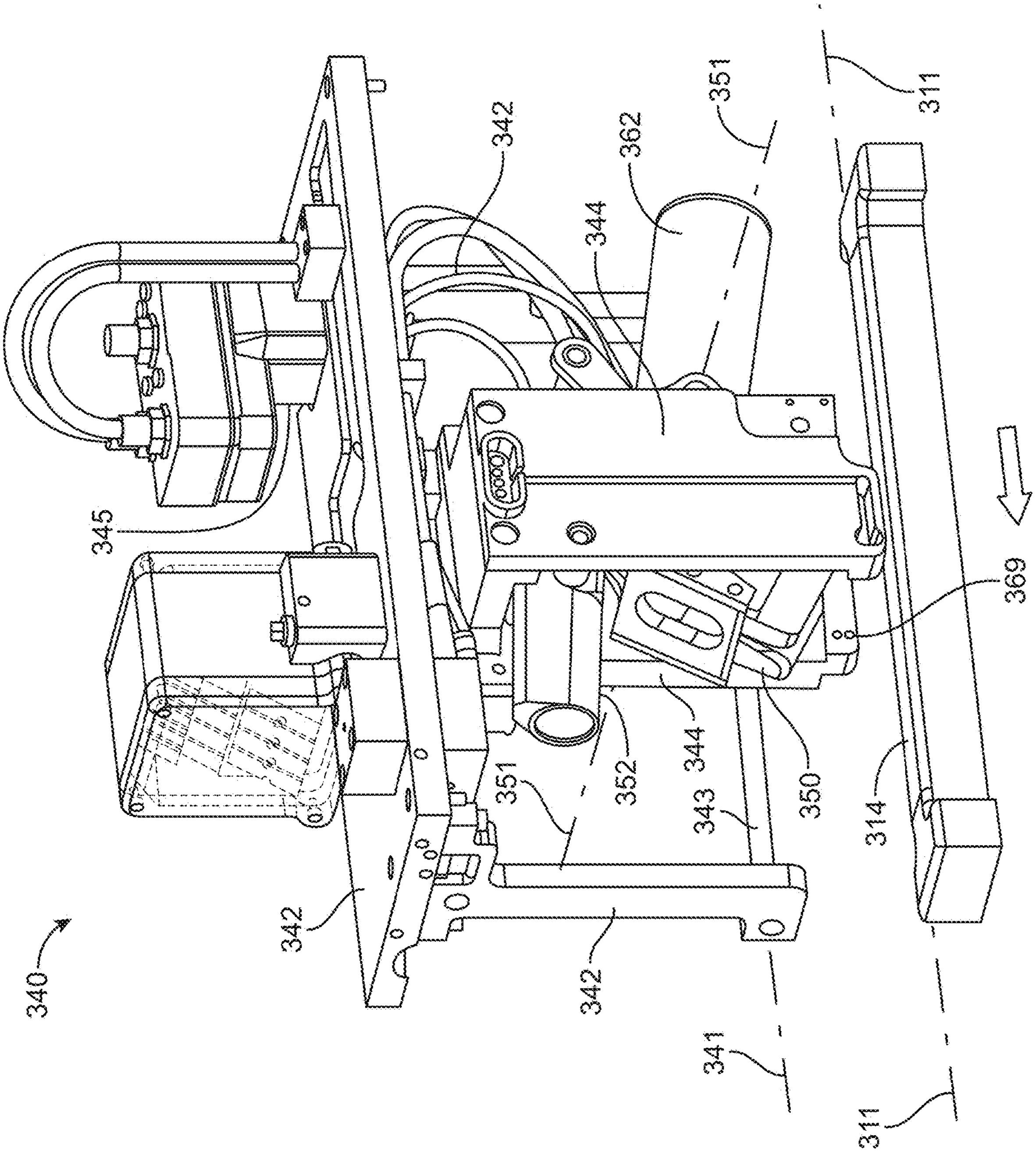
FIG. 35 is a perspective view of one illustrative embodiment of a shrimp heading apparatus as described herein.

One illustrative embodiment of a heading apparatus that may be used in one or more embodiments of shrimp processing systems and methods described herein is depicted in FIG. 35. The depicted heading apparatus 340 is positioned above the selected heading location above the working surface 314 located along a processing axis 311. As described herein, individual shrimp are moved into a selected heading location along the processing axis 311 in the direction of the arrow located below working surface 314 and axis 311 so that they are located on the working surface 314 in a position, for example, a selected heading location, to be acted on by the heading apparatus 340.

The heading apparatus includes a heading apparatus 344 supported on a frame 342 above the working surface 314. The shuttle 344 in the depicted illustrative embodiment is configured to move along a shuttle axis 341 aligned with the processing axis 311. In one or more embodiments, the shuttle 344 may move along one or more slides 343 aligned with shuttle axis 341. Shuttle 344 may be moved using a shuttle actuator 345 operably connected to the shuttle 344 using any suitable drive system.

The illustrative embodiment of heading apparatus 340 also includes a heading restraint 350 position above the working surface 314 and a heading restraint actuator 352 operably connected to move the heading restraint 350 between a stored position (as seen in FIG. 35) and a restraint position (as seen in, for example, FIGS. 46-47 (described more completely below)). In the depicted illustrative embodiment, movement of the heading restraint 350 from its stored position to its restraint position involves rotating the heading restraint 350 about axis 351. Although not visible in FIG. 35, the heading apparatus includes a spoon operably connected to a spoon actuator 362 used to move the spoon from its ready position to its finish position as described herein.

Also depicted in FIG. 35 is one portion of an optional carapace sensor that may be used to determine where shuttle 344 is positioned to properly place heading restraint 350 on a shrimp located on the working surface 314. In particular, a receiver 369 of a noncontact carapace sensor system is depicted along one side of shuttle 344 in FIG. 35.

Figure 36:
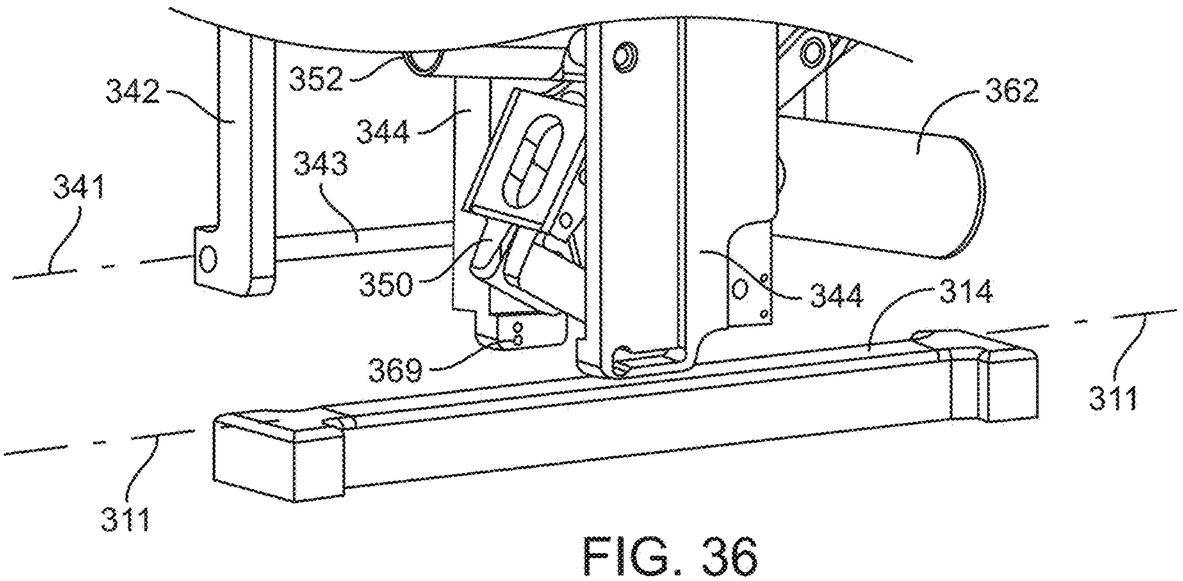
FIGS. 36-37 are enlarged views of portions of the shrimp heading apparatus depicted in FIG. 35.
Figure 37:
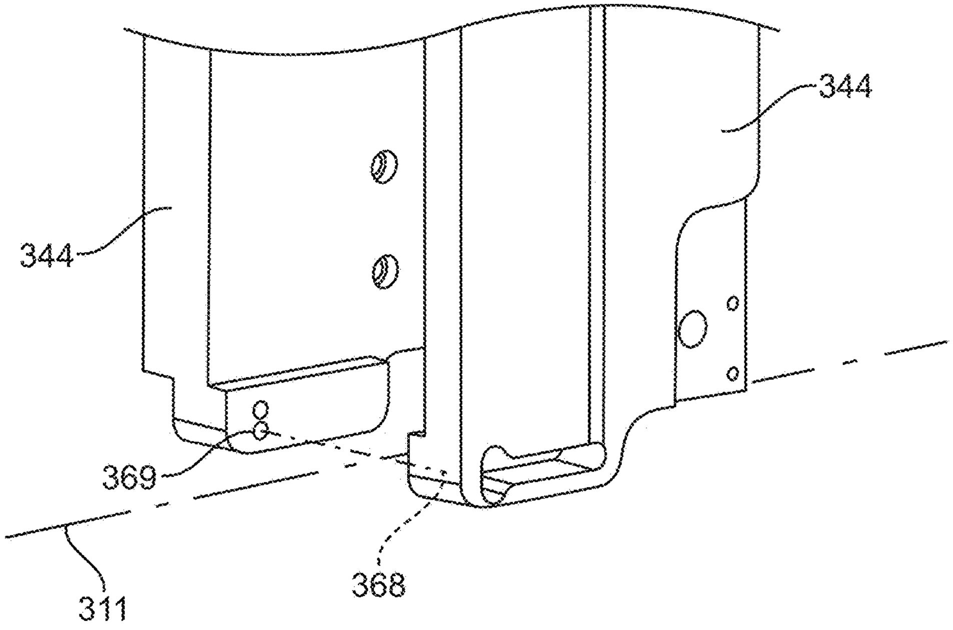

FIGS. 36-37 are enlarged views of portions of the heading apparatus 340 depicted in FIG. 35. In particular, FIG. 36 depicts the heading restraint 350 along with a portion of heading restraint actuator 352, both of which are carried by shuttle 344 supported by frame 342 for movement along slide 343 defining shuttle axis 341. Spoon actuator 362 is also depicted in FIG. 36 along with working surface 314 which extends along processing axis 311 as described herein. 341.

FIG. 37 is a slightly more enlarged view depicting receiver 369 of a noncontact carapace sensor system along with a projection of a beam path (depicted in a broken line) emanating from an emitter 368 and directed towards the receiver 369. The emitter 368 and receiver 369 of the carapace sensor system are, in the depicted embodiment, carried on the shuttle 344 as seen in, for example, FIGS. 36-37. The beam path may, in one or more embodiments, preferably be transverse to the processing axis 311 as depicted in FIG. 37. Movement of the shuttle 344 along the processing axis 311 after a shrimp is located in a selected heading location on the working surface 314, therefore, moves the carapace sensor system relative to the shrimp to accurately detect the carapace junction as described herein.

Figure 38:
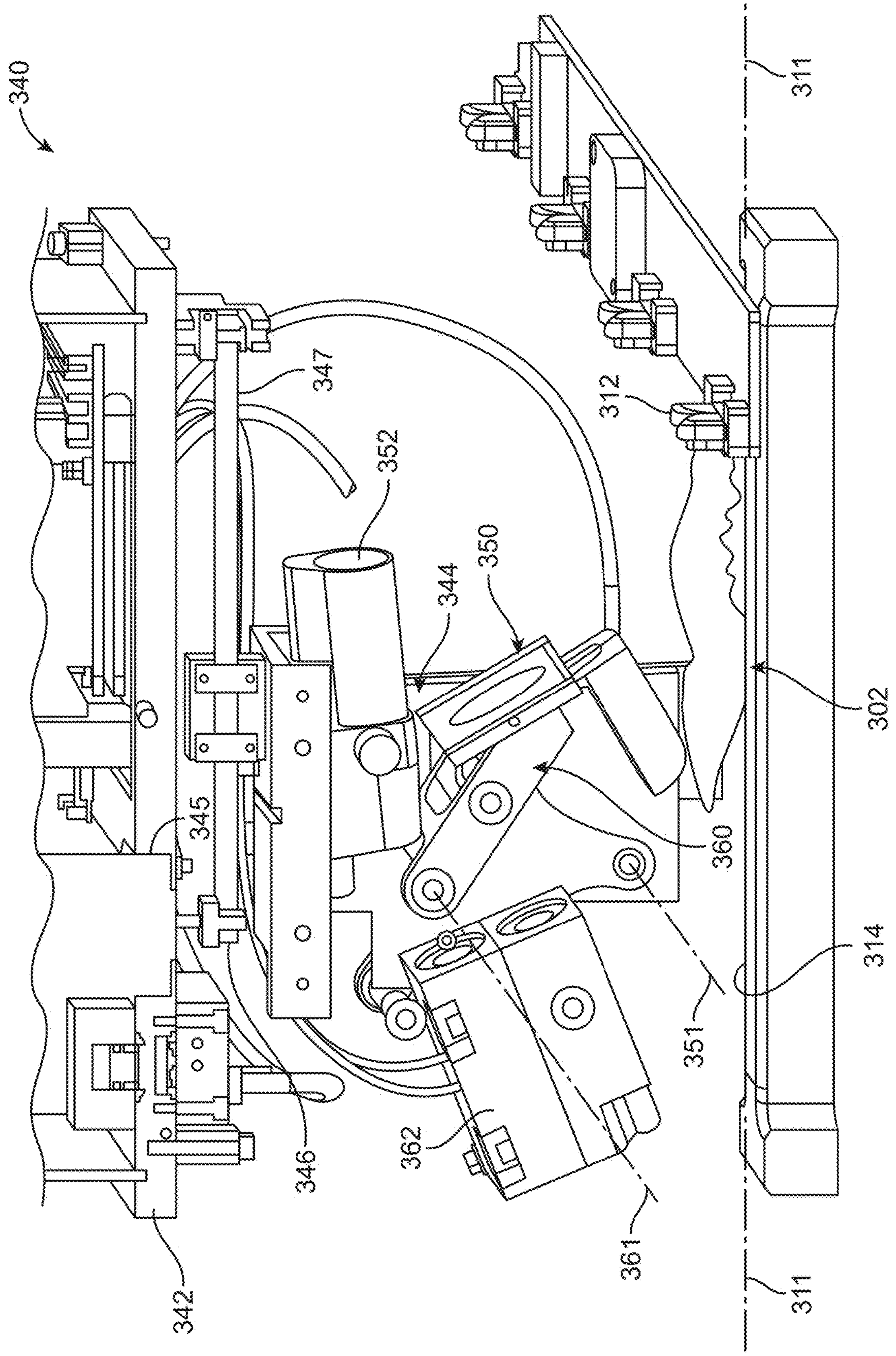
FIG. 38 is an opposite side perspective view of the shrimp heading apparatus of FIG. with a portion of the shuttle removed to expose components located within the shuttle of the shrimp heading apparatus.

FIG. 38 is a view of the heading apparatus 340 taken from the opposite side as depicted in FIG. 35 with one side of the shuttle 344 removed to expose components located within shuttle 344. FIG. 38 also includes a shrimp 302 located on working surface 314 in what can be referred to as a selected heading location on working surface 314. Shrimp 302 is restrained by a clamp 312 carried on a clamp mount 310 in a manner similar to other clamps and clamp mounts as described herein.

Also exposed by removal of one side of shuttle 344 are a drive gear 346 operably connected to the depicted illustrative embodiment of shuttle actuator 345 along with a belt 347 used to move shuttle 344 along the processing axis 311 as needed to properly position the heading restraint 350 above shrimp 302 located in the selected heading position on working surface 314. Although a belt 347 and drive gear 346 are used in the depicted embodiment of shuttle actuator 345, many other mechanisms could be used to move the shuttle 344 as described herein (for example, a lead screw and follower, a rack and pinion, etc.). Heading restraint 350 is, as described herein, rotated about heading restraint axis 351 using heading restraint actuator 352 to move heading restraint 350 between its stored and restraint positions as described herein (with the heading restraint 350 being located in its stored position in FIG. 38).

Other features exposed by removal of a portion of shuttle 344 are a spoon 360 along with spoon actuator 362. Spoon actuator 362 is operably connected to spoon 360 to rotate spoon 360 about spoon axis 361 in the depicted illustrative embodiment of heading apparatus 340.

Figure 39:
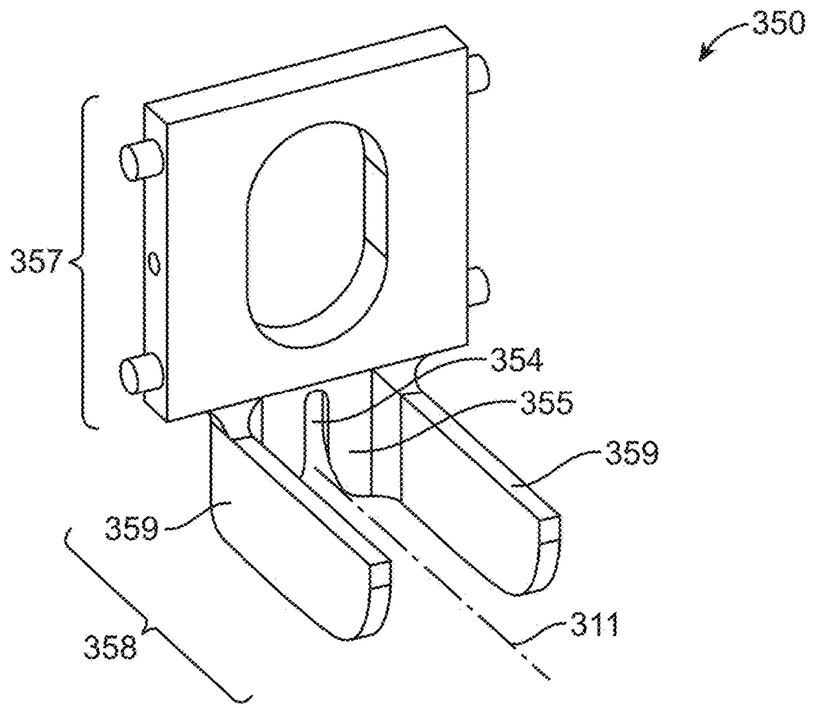
FIGS. 39-41 depict one illustrative embodiment of a heading restraint that may be used in one or more embodiments of a shrimp heading apparatus as described herein.
Figure 40:
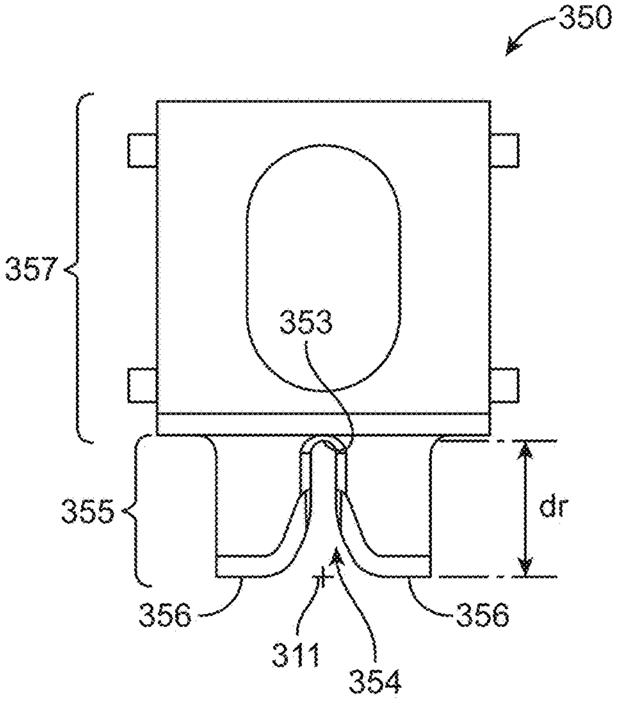
Figure 41:
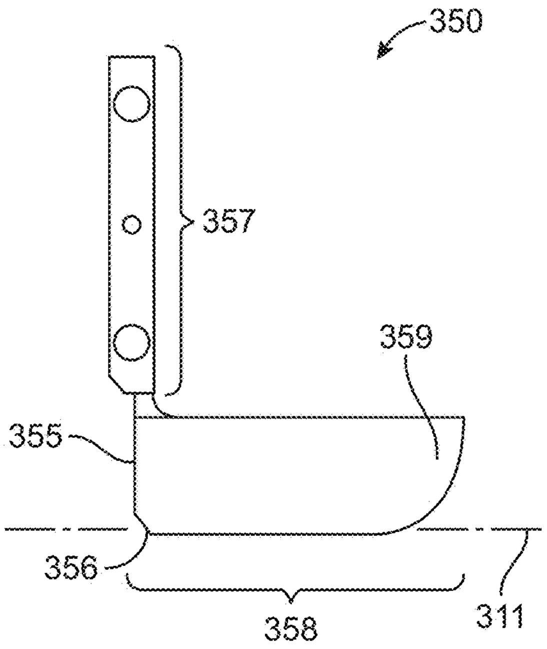

FIGS. 39-41 depict various views of one illustrative embodiment of a heading restraint 350 that may be used in one or more embodiments of a heading apparatus as described herein. The heading restraint 350 includes a contact portion 355 configured to contact and at least partially sever a shrimp located on a working surface proximate the carapace junction of the shrimp when the heading restraint is in its restraint position as described herein. Contact portion 355 extends downwardly from mounting portion 357 used to mount the heading restraint 350 in the heading apparatus 340.

The depicted illustrative embodiment of heading restraint 350 also includes a guide 358 extending away from the contact portion 355 of the heading restraint 350 along the direction of processing axis 311. In the depicted illustrative embodiment, the guide 358 is in the form of a pair of wings 359 extending away from the contact portion 355 of heading restraint 350.

Another optional feature depicted in connection with the illustrative embodiment of heading restraint 350 is a beveled edge 356 located on contact portion 355, with the beveled edge 356 facing the working surface 314 when the heading restraint 350 is in its restraint position. The beveled edge 356 may facilitate passage of the contact portion 355 of the heading restraint 350 through a shrimp as the heading restraint 350 is moved from its stored position to its restraint position as described herein.

Heading restraint 350 also includes an optional restraint notch 354 located in contact portion 355 with the restraint notch 354 terminating at end 353. Restraint notch 354 opens towards a working surface and a shrimp located thereon when heading restraint 350 is in its restraint position relative to a working surface 314 as described herein. In one or more embodiments, restraint notch 354 may provide clearance for a mud vein of a shrimp during the heading process such that the mud vein is not severed by the contact portion of the heading restraint 350 when the heading restraint 350 is moved into its restraint position.

In one or more embodiments, the restraint notch 354 may have a depth dr measured between the beveled edge 356 and the notch end 353 in a direction transverse to the processing axis 311. The depth dr may, in one or more embodiments, be long enough such that the heading restraint 350 can be used with shrimp of a variety of sizes while still providing the functions of restraint during heading as well as reducing the likelihood of severing the mud vein during heading.

Figure 42:
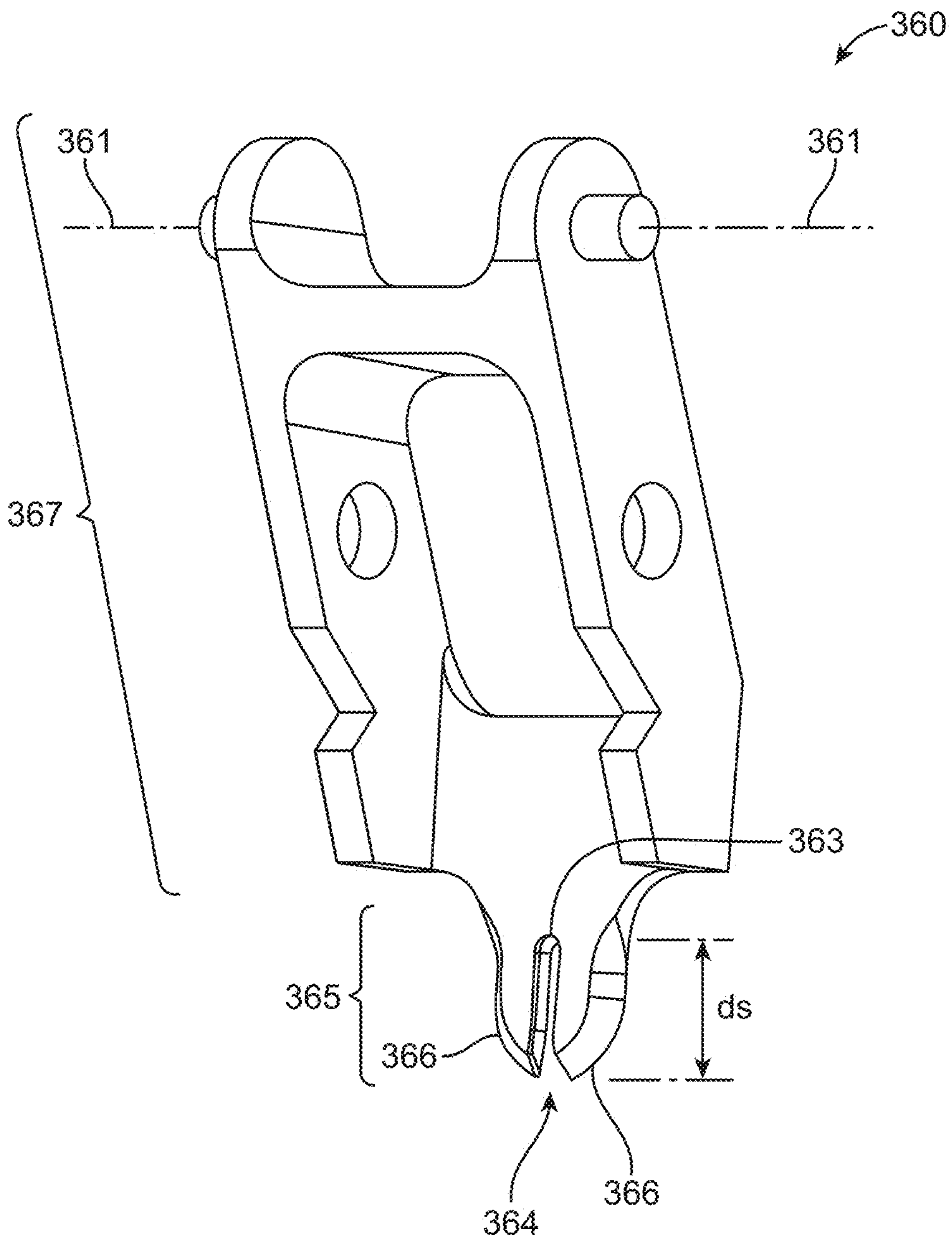
FIG. 42 is an enlarged view of one illustrative embodiment of a spoon used in one or more embodiments of a heading apparatus as described herein.
Figure 43:
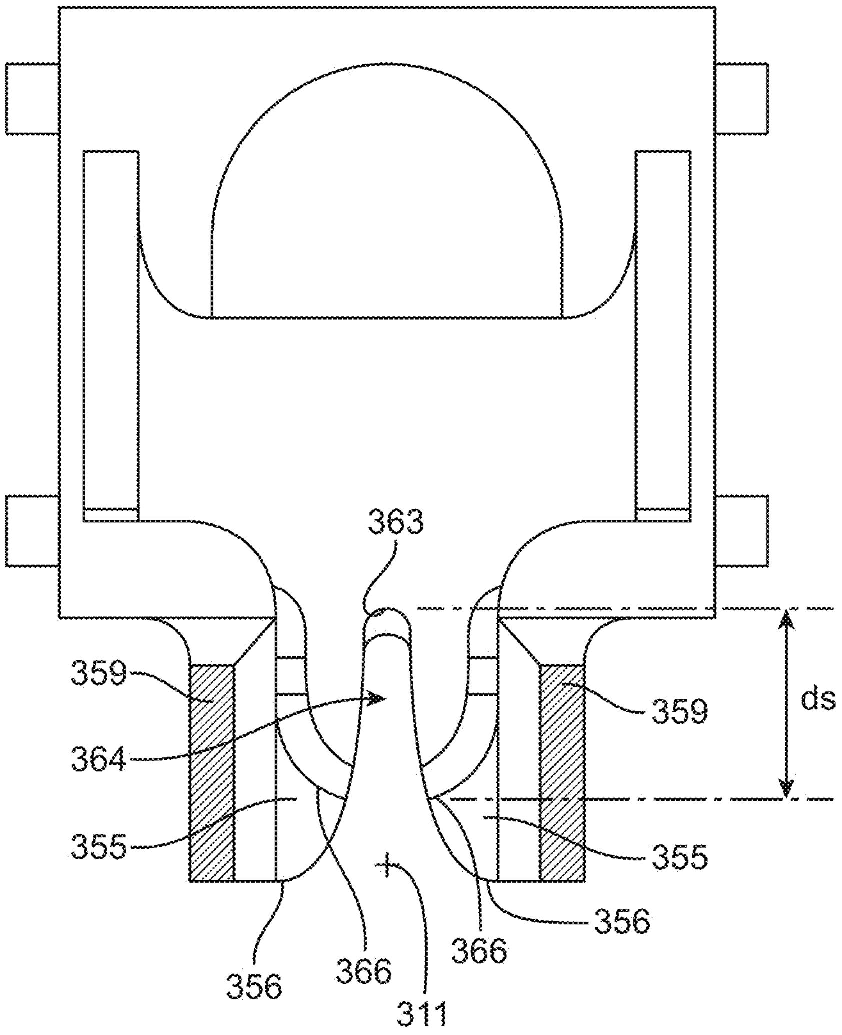
FIG. 43 is an enlarged view of a portion of the spoon depicted in FIG. 42 located within a guide on a heading restraint used in one or more embodiments of a heading apparatus as described herein.

FIG. 42 depicts one illustrative embodiment of a spoon 360 that may be used in one or more embodiments of a heading apparatus as described herein. FIG. 43 depicts an enlarged view of a portion of the spoon 360 when in the ready position proximate the contact portion 355 of a heading restraint as described herein, with the working portion 365 of the spoon located within the guide defined by the wings 359 of heading restraint 350.

The working portion 365 of spoon 360 is configured to contact and at least partially sever a shrimp located on a working surface proximate the carapace junction of the shrimp when the spoon 360 is in its ready position and the heading restraint 350 is in its restraint position as described herein. The working portion 365 of spoon 360 extends downwardly from mounting portion 367 used to mount the spoon 360 in the heading apparatus 340. In one or more embodiments, the mounting portion 367 of the spoon 360 may include features (such as, e.g., pins or posts as seen in FIG. 42) configured to define and a spoon axis 361 about which spoon 360 rotates when moving from its ready position to its finish position.

The illustrative embodiment of spoon 360 depicted in FIG. 42 includes an optional beveled outer edge 366 located on the working portion 365 of the spoon 360. A portion of the beveled outer edge 366 faces the working surface 314 when the spoon 360 is in its ready position and the heading restraint 350 is in its restraint position. The beveled outer edge 366 may facilitate passage of the working portion 365 of the spoon 360 through a shrimp as the heading restraint 350 is moved from its stored position to its restraint position while the spoon 360 is in its ready position as described herein.

Spoon 360 also includes an optional spoon notch 364 located in working portion 365, with the spoon notch 364 terminating at end 363. Spoon notch 364 opens towards a working surface and a shrimp located thereon when spoon 360 is in its ready position and heading restraint 350 is in its restraint position relative to a working surface 314 as described herein. In one or more embodiments, spoon notch 364 may provide clearance for a mud vein of a shrimp during the heading process such that the mud vein is not severed by the working portion 365 of the spoon 360 when the spoon is in the ready position and the heading restraint 350 is moved into its restraint position.

In one or more embodiments, the spoon notch 364 may have a depth ds measured from the opening of the notch 364 to the end 363 of spoon notch 364 (that is, in a direction along a length of the spoon notch 364). In one or more embodiments, the opening of the spoon notch 364 may be defined by a line extending between the junctions of the beveled outer edge 366 with the opening of the spoon notch 364. The depth ds of spoon notch 364 may, in one or more embodiments, the long enough such that the spoon 360 can be used with shrimp of a variety of sizes while still providing the functions of separating the carapace during heading, as well as reducing the likelihood of severing the mud vein during heading.

In one or more embodiments, the spoon notch 364 may have a depth ds measured from a distal end of the working portion 365 of the spoon 360 (where the distal end of the working portion of the spoon 360 may be defined by a line connecting the junctions of the beveled outer edge 366 at the opening of notch 364) to the end 363 of notch 364 that is 10 millimeters or more, and, optionally, wherein the depth of the spoon notch is 20 millimeters or less. The width of the notch proximate a midpoint of the depth of the notch 364 may be, for example, 2 millimeters or more on the lower end and 4 millimeters or less on the upper end. When the spoon 360 is in its ready position and the heading restraint 350 is in its restraint position, the depth ds of the spoon notch 364 can be measured along a length of the notch in a direction transverse to the processing axis 311 extending along working surface 314 as seen in, for example, FIG. 32.

With reference to FIGS. 39-41 and 43, one or more embodiments of the spoon and heading restraint having a guide used in one or more embodiments of a heading apparatus as described herein may include a spoon having a spoon width that is less than a guide width of the guide. This relationship can be seen in, for example, FIG. 43, where working portion 365 of spoon 360 fits within the guide as defined by wings 359 extending away from contact portion 355 of heading restraint 350.

In one or more embodiments, the spoon width and the guide width may be measured at the widest point of the working portion of the spoon located in the guide (which may also be described as being in a direction transverse to a path of the working portion of the spoon when the working portion of the spoon is moving away from the contact portion of the heading restraint as the spoon moves from the ready position to the finish position as described herein. In one or more embodiments, the maximum width of the working portion of the spoon located in the guide may be described as having a width that is 50% or more, 60% or more, 70% or more, 80% or more, or 90% of the guide width at that location. In one embodiment, the width of the working portion of the spoon may be approximately 16 millimeters in a guide width of approximately 22 millimeters.

In one or more embodiments of the heading apparatus as described herein including a heading restraint having a contact portion with a beveled edge and a working portion of a spoon having a beveled outer edge, the beveled outer edge 366 of the working portion 365 of the spoon 360 and the beveled edge 356 of the contact portion 355 of the heading restraint 350 are adjacent each other when the spoon 360 is in the ready position such that the working portion 365 of spoon 360 is proximate the contact portion 355 of the heading restraint 350. In such an arrangement, that bevels on the beveled outer edge 366 of the spoon 360 and the beveled edge 356 of the heading restraint 350 face away from each other such that the working portion 365 of the spoon 360 and the contact portion 355 of the heading restraint 350 form a double bevel edge when the spoon 360 is in the ready position.

Figure 44:
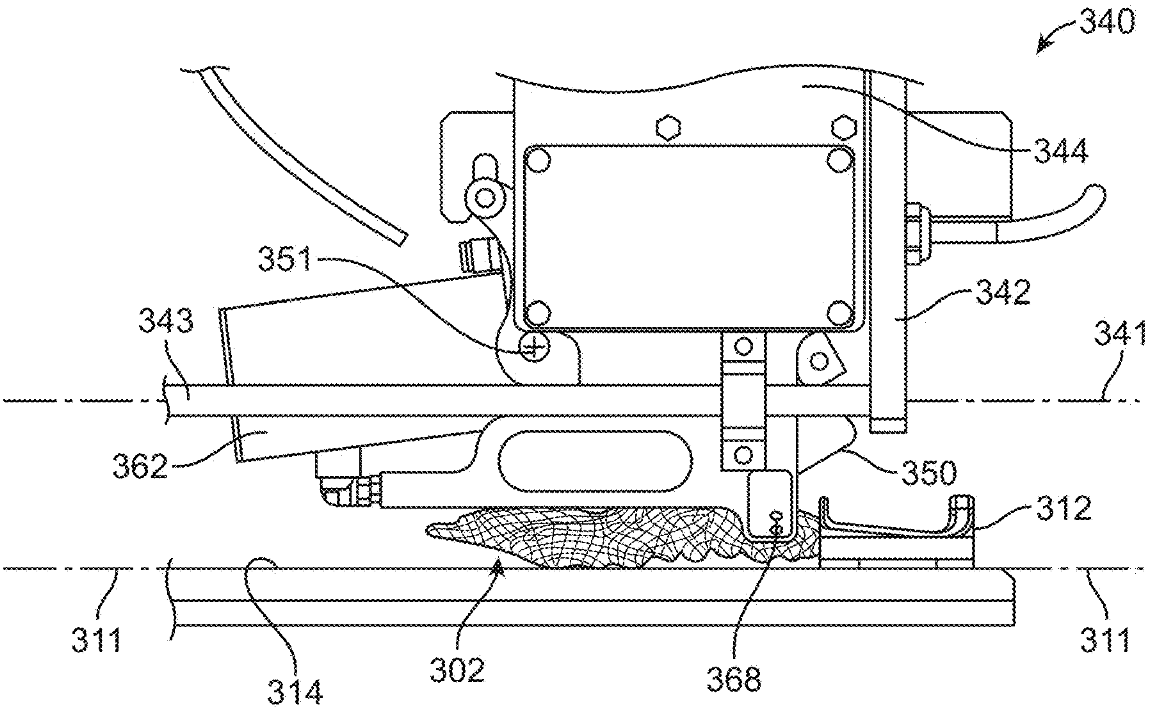
FIGS. 44-45 depict one illustrative embodiment of a heading apparatus in use to identify the location of a carapace junction on a shrimp as part of a heading process as described herein.
Figure 45:
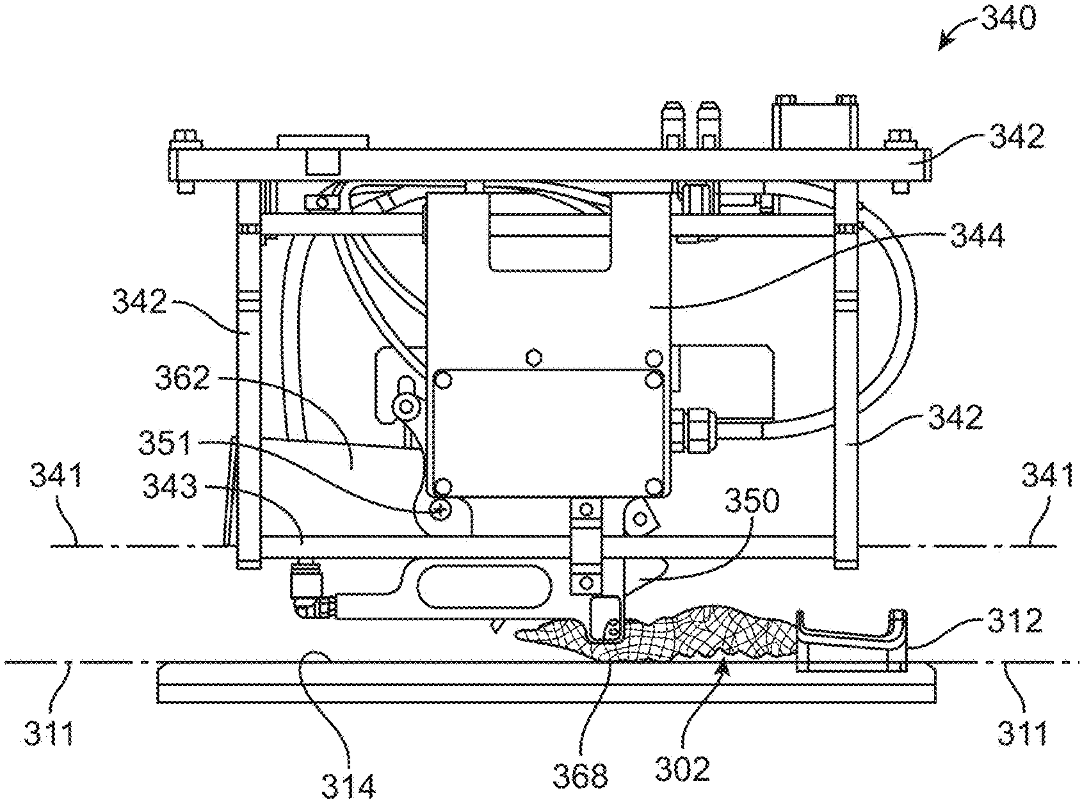

One or more embodiments of a heading apparatus as described herein may include a carapace sensor configured to detect a carapace junction between a carapace and an abdominal segment of a shrimp. FIGS. 44-45 can be used to describe detection of the carapace junction and proper positioning of the heading restraint and spoon based on detection of the carapace junction.

Many of the components of the heading apparatus 340 as depicted in FIG. 38 are also depicted in FIGS. 44-45, including heading restraint 350 and heading restraint actuator 352, both of which are located on heading shuttle 344 for rotation about axis 351. Shuttle 344 is attached to frame 342 for movement along one or more slides 343 aligned with shuttle axis 341. Also depicted in FIGS. 44-45 are a shrimp 302 located on working surface 314, the shrimp 302 restrained by a clamp 312 used to transport or convey the shrimp along the processing axis 311. Other features depicted in FIGS. 44-45 includes the spoon actuator 362 used to move the spoon 360 from its ready position adjacent the heading restraint 352 its finish position as described herein.

In one or more embodiments, the carapace sensor may detect the carapace junction located between the carapace and the first abdominal segment of a shrimp. In one or more embodiments, the controller operably connected to the carapace sensor (see, e.g., controller 390 in FIG. 34) may be configured to detect a change in opacity between a carapace and an abdominal segment of a shrimp on a working surface and identify the carapace junction based, at least in part, on that change in opacity. In general, the carapace is darker or more optically dense than the abdomen of a shrimp (due, for example, to the viscera located within the carapace and the thicker shell of the carapace) which facilitates optical detection of the carapace junction as described herein. In one or more alternative embodiments, the location of the carapace junction may be determined based on the measured length of the shrimp (measured using, e.g., one or more of the measurement apparatus and methods described herein) such that optical detection of the carapace junction is not required.

As described above in connection with FIGS. 36-37, one illustrative embodiment of a carapace sensor may include an emitter and receiver, with the emitter emitting optical energy which passes through a shrimp before reaching the receiver when a shrimp is located between the emitter and the receiver. Changes in the amount of optical energy reaching the receiver as the carapace sensor moves along a length of the shrimp can be used to identify the carapace junction.

As implemented in connection with the illustrative heading apparatus 340 and with reference to FIGS. 44-45 in addition to FIGS. 36-37, the emitter 368 and receiver 369 may be located on the shuttle 344 such that the emitter 368 and receiver 369 are located on opposite sides of a shrimp 302 located on a working surface 314 above which the heading apparatus 340 is positioned. The emitter 368 and receiver define an optical path that, in one or more embodiments, may be located above the working surface 314.

With reference to FIGS. 44-45, the shuttle 344 can be moved along a shuttle axis 341 that is aligned with the processing axis 311. That movement can be effected using a shuttle actuator as described in connection with, for example, FIGS. 34 and 35. The heading restraint 350 and spoon 360 are, as described herein, mounted on the heading apparatus shuttle 344. In one or more embodiments, a system controller (for example, controller 390 in FIG. 34) may be configured to operate the shuttle actuator 345 to position the heading apparatus shuttle 344 such that the heading restraint 350 is positioned on a first abdominal segment of a shrimp 302 on the working surface 314.

In particular, the heading restraint may be positioned adjacent the carapace junction of the shrimp 302 when the heading restraint 350 is in the restraint position on a shrimp 302 on the working surface 314. In one or more embodiments, the heading restraint 350 may preferably be located on the abdominal side of the carapace junction. When so positioned, the spoon 360 may preferably contact a shrimp 302 on the working surface 340 proximate the carapace junction of the shrimp 302 on the carapace side of the heading restraint 350 when the heading restraint is in the restraint position on the shrimp 302 on the working surface 314.

In one or more embodiments, the spoon 360 may preferably contact a shrimp 302 on the working surface 314 at the carapace junction of the shrimp 302.

As seen in FIG. 44, the heading apparatus shuttle 344 may be positioned such that the carapace sensor (as represented by emitter 368 in this view) is positioned to detect the shrimp 302 on working surface 314 within its abdomen. In particular, the carapace sensor may be positioned proximate the clamp 312. While operating the carapace sensor, the shuttle 344 may be moved towards the carapace of the shrimp 302 (that is, away from the clamp 312), with the controller identifying the carapace junction when the signal received from the receiver 369 of the carapace sensor 368/369 indicates that the amount of energy received by the receiver has fallen below a selected carapace junction threshold.

Because the opacity of individual shrimp can vary to a point at which detection of the carapace junction may be difficult if the selected carapace junction threshold is fixed, one or more embodiments of heading apparatus as described herein may include a controller that is configured to calibrate the carapace sensor on one or more abdominal segments of each shrimp 302 on the working surface 314 before operating the shuttle actuator 345 to position the heading apparatus shuttle such that the heading restraint is properly positioned on a shrimp on the abdominal side of the carapace junction.

FIG. 45 depicts the heading apparatus 340 after the shuttle 344 is moved along the abdomen of the shrimp 302 located on working surface 314 (along with the directions of both shuttle axis 341 and processing axis 311). In the depicted illustration, the carapace sensor (represented by emitter 368 in FIG. 45) is positioned at the carapace junction. With the location of the carapace junction known, the shuttle actuator 345 can be operated to move the shuttle such that the heading restraint 350, when moved from its stored position to its restraint position, is located on the abdominal side of the carapace junction such that the spoon (not seen in FIG. 45) is located proximate, preferably at, the carapace junction when the heading restraint 350 is in its restraint position.

Figure 46:
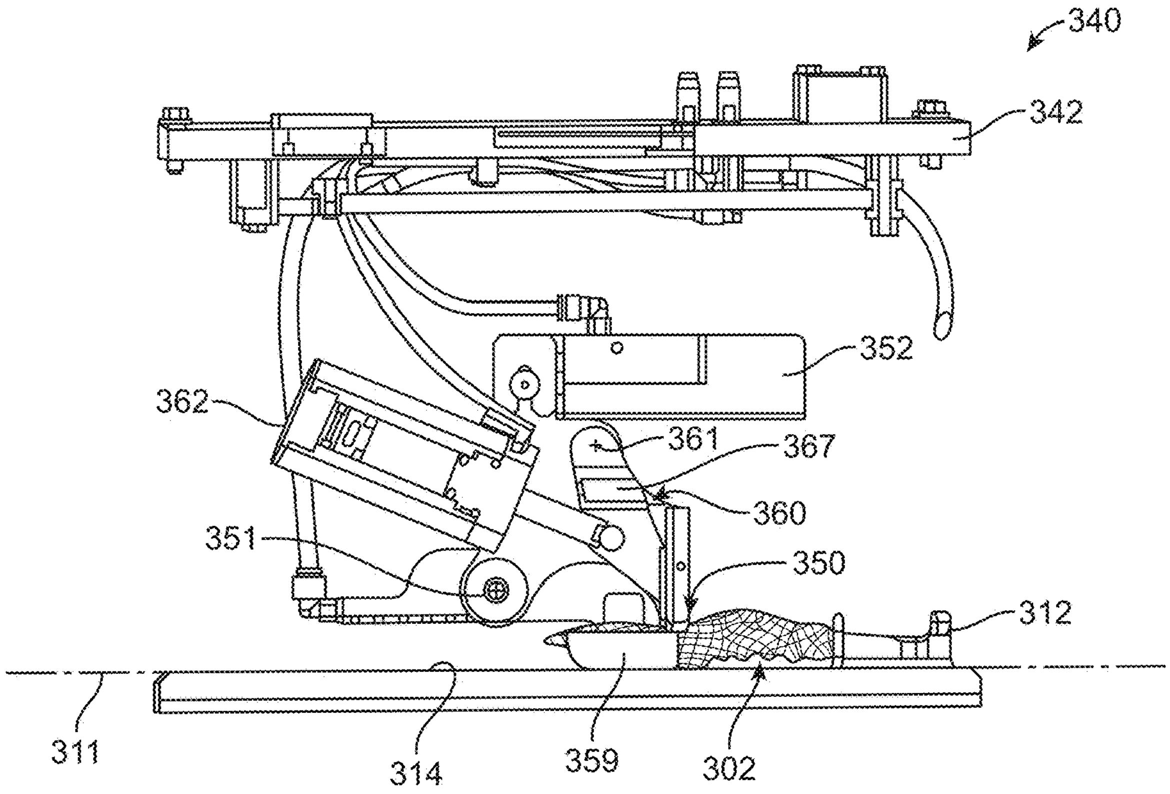
FIGS. 46-47 depict one illustrative embodiment of a heading apparatus in use to remove the carapace from a shrimp as a part of a heading process as described herein.
Figure 47:
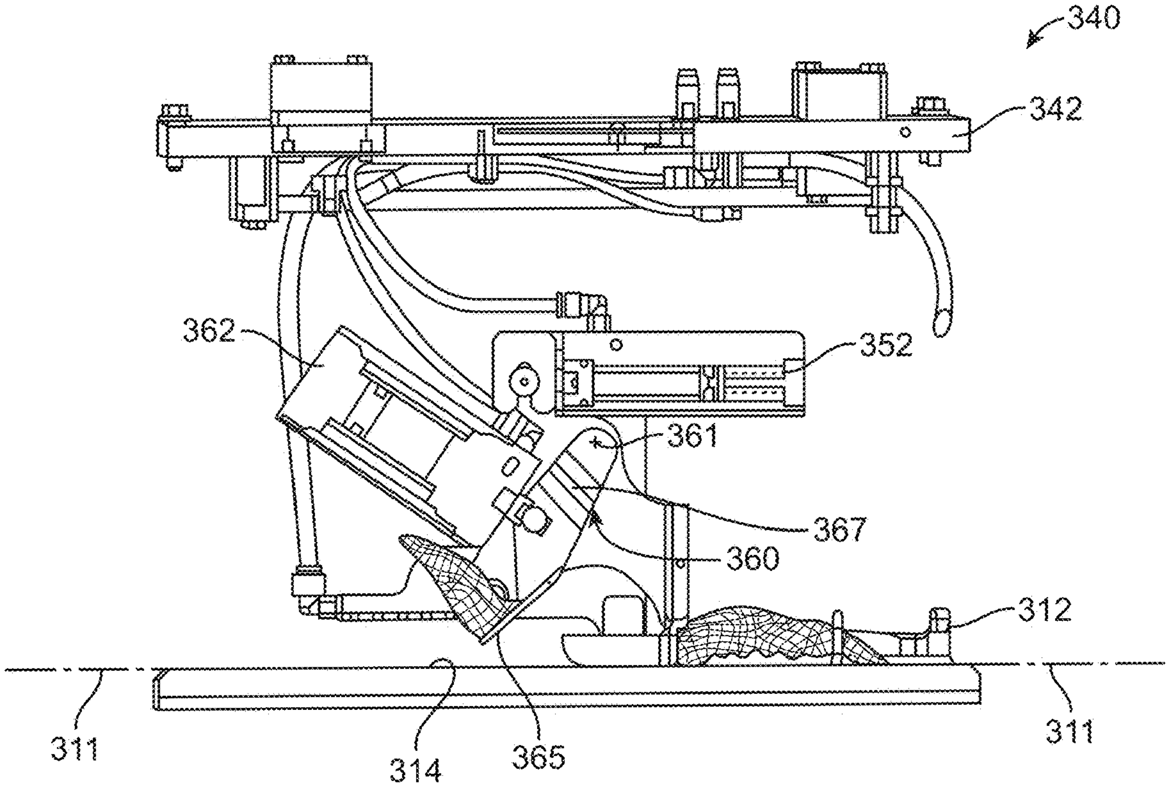

FIGS. 46-47 depicts operation of the illustrative embodiment of heading apparatus 340 to remove the head of shrimp 302. To facilitate a view of the operation of the heading apparatus, the side panels of the shuttle 344 have been removed so that components located between the side panels of the shuttle 344 are exposed. Among the components depicted in FIGS. 46-47 are heading restraint 350 and heading restraint actuator 352, along with spoon 360 (including the working portion 365 of spoon 360 in FIG. 47) and spoon actuator 362. These components are shown while the heading restraint 350 is in its restraint position on the abdomen of a shrimp 302 restrained on working surface 314 using clamp 312. Also depicted in FIGS. 46-47 are spoon axis 361 extending through the mounting portion 367 of the spoon 360.

In particular, in FIG. 46 the heading restraint 350 is shown in position on the abdomen of the shrimp 302 while the spoon 360 is in its ready position relative to the heading restraint 350 such that the working portion of the spoon is in position proximate the carapace junction, preferably at the carapace junction, of the shrimp 302. The working portion 365 of spoon 360 is not visible in FIG. 46 because it is located on the opposite side of the wings 359 used to guide the carapace of the shrimp during removal. As discussed herein, it may be preferred that the heading restraint 350 be located on the first abdominal segment of the shrimp 302 such that the heading restraint 350 could be described as being on the abdominal side of the carapace junction which, as discussed herein, is the junction between the first abdominal segment of the shrimp 302 and its carapace.

FIG. 47 depicts the heading apparatus 340 after the spoon 360 has been moved from its ready position to its finish position. In particular, spoon 360 has been rotated about spoon axis 361 such that the working portion 365 of spoon 360 is now spaced away from the heading restraint 350 which continues to restrain the abdomen of the shrimp 302 on working surface 314. Although the spoon 360 in the depicted illustrative embodiment of a heading apparatus as described herein rotates when moving between its ready position and its finish position, one or more embodiments of heading apparatus as described herein may include a working portion of a spoon that moves in a linear or translational motion when moving from its ready position to its finish position.

After completing the motion from the ready position to the finish position, one or more embodiments of the heading apparatus described herein may include movement of the spoon 360 back to its ready position along with movement of the heading restraint 350 back to its stored position so that another shrimp 302 can be moved along the processing axis 311 into the selected heading location on working surface 314.

In one or more embodiments, the heading restraint actuator 352 may be in the form of a single acting limited force piston capable of moving the heading restraint 350 between its stored position and its restraint position as described herein. The heading restraint actuator 352 may include a force limiting feature (for example, a spring return cylinder) such that the force of the heading restraint on a shrimp 302 located in the selected heading location on working surface 314 does not exceed a selected force value. Although a spring-loaded pneumatic piston is used to provide the reciprocating motion needed to move the heading restraint 350 between its stored and restraint positions, many other mechanisms could be used to provide the reciprocating motion, for example, double acting pistons, single acting pistons, spring mechanisms, hydraulic actuators, motors, magnetic drivers, etc.

Removal of the head or carapace of a shrimp using a heading apparatus as described herein may be facilitated by a spoon actuator 362 that is in the form of a damped pneumatic actuator that provides the spoon 360 with adequate force to remove the carapace of a shrimp 302 in a controlled motion. In one illustrative embodiment, a limited size orifice may be used to control the flow of a hydraulic fluid within the actuator to provide the damping action that may be beneficial to control removal of the heads of shrimp in the heading apparatus described herein.

Figure 48:
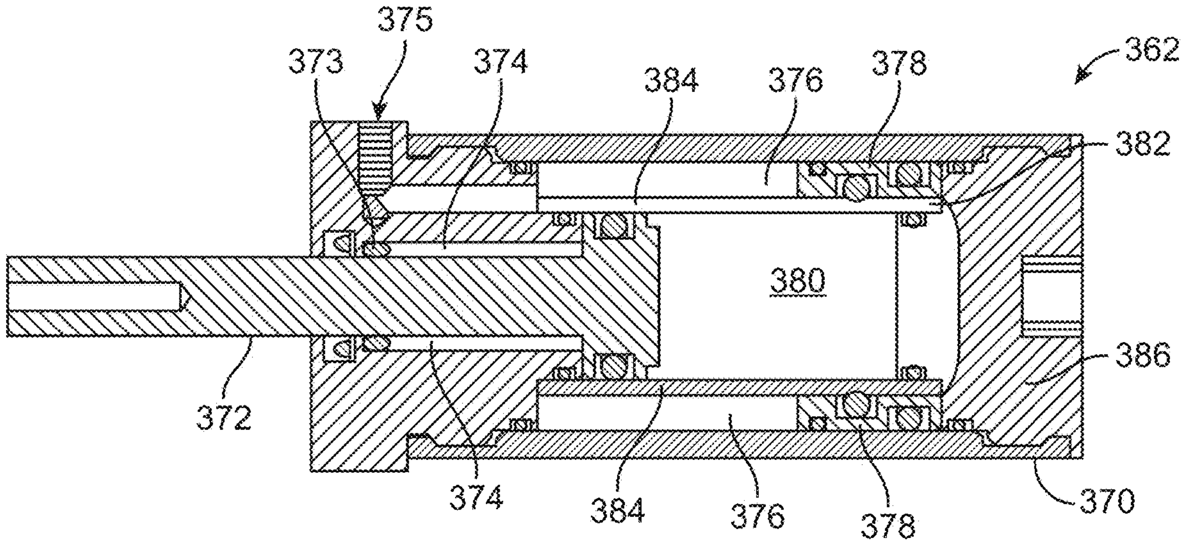
FIGS. 48-49 depict one illustrative embodiment of a damped actuator that may be used to move one or more embodiments of a spoon in one or more embodiments of a heading apparatus as described herein.
Figure 49:
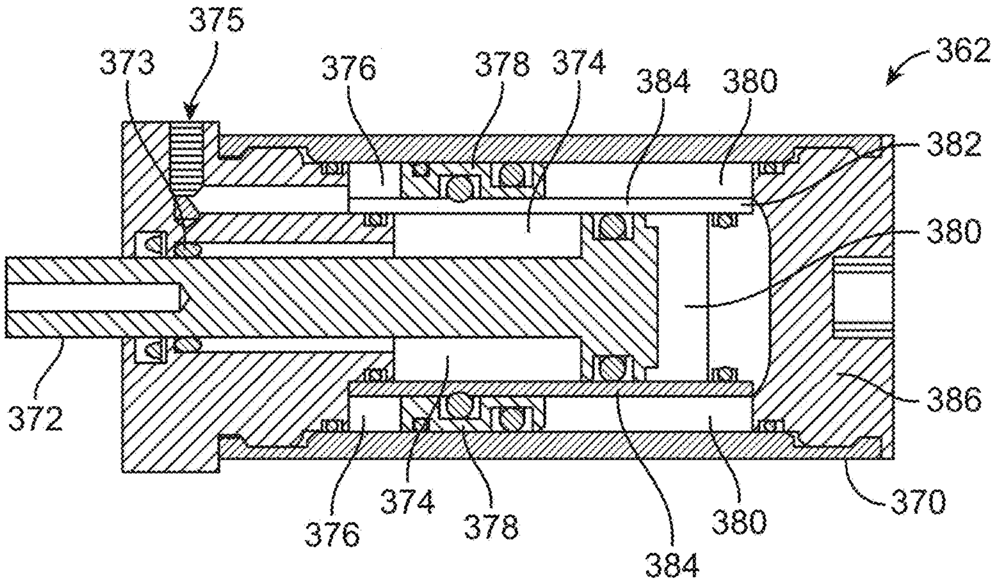

One illustrative embodiment of a damped spoon actuator 362 that may be used in one or more embodiments of a heading apparatus as described herein, is depicted in the cross-sectional views in FIGS. 48-49. As depicted in those figures, the actuator 362 is in the form of a hydraulically damped pneumatic actuator that includes a main piston 372 and a floating piston 378 located within actuator housing 370. The main piston 372 is located within an inner housing 384 that is, itself, located within the actuator housing 370. A main piston port 373 is in fluid communication with a main piston volume 374 located in the actuator housing 370. A floating piston port 375 is in fluid communication with a floating piston volume 376 also located in the actuator housing 370.

The actuator 362 also includes a working piston volume 380 located in the actuator housing 370 between the main piston 372 and the floating piston 378. A flow control orifice 382 and damping liquid are both located in the working piston volume 380. In one or more embodiments, the damping liquid may be in the form of, e.g., mineral oil, although many other hydraulic liquids could be used in place of mineral oil. The flow control orifice 382 separates the working piston volume 380 into a main portion and a floating portion, with the main portion of the working piston volume 380 being located between the main piston 372 and the orifice 382 and the floating portion of the working piston volume 380 being located between the floating piston 378 and the orifice 382.

Figure 49A:
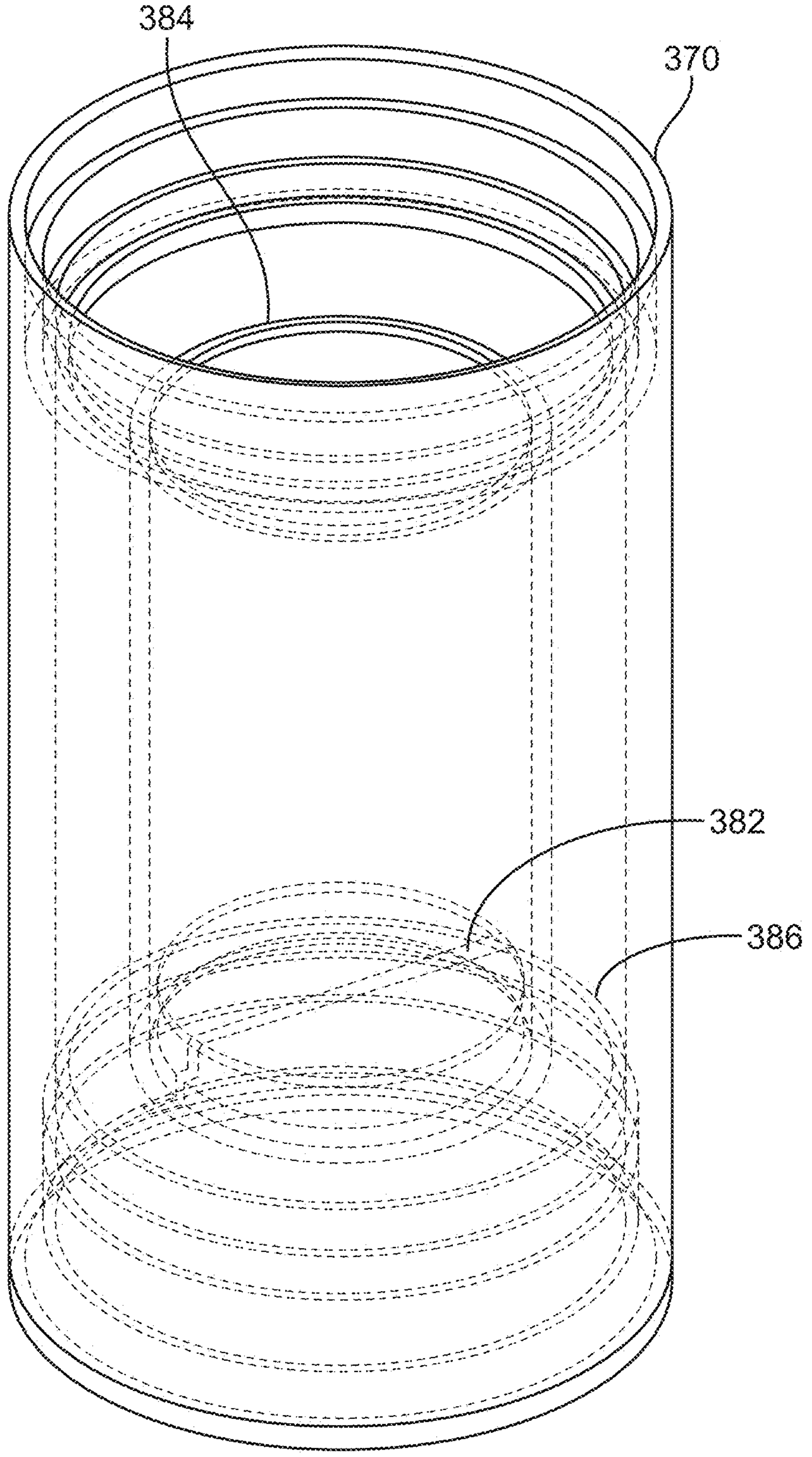
FIG. 49A is a perspective view of a portion of the damped actuator of actuator of FIGS. 48-49.

More particularly, the flow control orifice 382 provides a fluid passage between the main portion and the floating portion of the working piston volume 380. In the depicted embodiment, the flow control orifice 382 is located in end plug 386 that closes both the actuator housing 370 and the inner housing 384 at the right end of the view of damped spoon actuator 362 depicted in FIG. 49. FIG. 49A is a perspective view of the actuator housing 370, inner housing 384 and end plug 386 (with the actuator housing 370 and inner housing 384 being depicted in phantom lines to allow visualization of the end plug 386), with the flow control orifice 382 being provided in the form of a machined slot formed in end plug 386 that allows fluid to pass between the main and floating portions of the working piston volume 380 during use of the actuator 362.

The introduction of fluid such as, for example, air into the main piston volume 374 through the main piston port 373 when at least a portion of the damping liquid is located in the main portion of the working piston volume 380 (that is, the portion of the working piston volume 380 located between the main piston 372 and the orifice 382) forces the damping liquid out of the main portion of the working piston volume 380 into the floating portion through the orifice 382 to move the main piston 372 in a first direction relative to the actuator housing 370. Movement of the main piston 372 in the first direction relative to the actuator housing 370 can be seen in the movement of the main piston 372 from its position in FIG. 48 to its position in FIG. 49.

The introduction of fluid such as, for example, air into the floating piston volume 376 through the floating piston port 375 when at least a portion of the damping liquid is located in the floating portion of the working piston volume 380 (that is, the portion of the working piston volume 380 located between the floating piston 378 and the orifice 382) forces the damping liquid out of the floating portion of the working piston volume 380 into the main portion through the orifice 382 to move the main piston 372 and a second direction relative to the actuator housing 370. Movement of the main piston 372 in the second direction relative to the actuator housing 370 can be seen in the movement of the main piston 372 from its position in FIG. 49 to its position in FIG. 48.

The flow control orifice 382 may take a variety of forms such as, for example, an opening formed by drilling, milling, etc. (see, for example, FIG. 49A), a needle valve, or any other suitable flow restriction construction capable of limiting the flow rate of a liquid moving between the main and floating portions of the working piston volume 380.

In one or more embodiments of a damped actuator as described herein, the main piston volume 374 may have a maximum main piston volume that is greater than a volume of the damping liquid in the working piston volume 380. In one or more embodiments of a damped actuator as described herein, the floating piston volume 376 may have a maximum floating piston volume that is greater than the volume of the damping liquid in the working piston volume 380. In one or more embodiments of a damped actuator as described herein, both of the main piston volume 374 and the floating piston volume 376 may have maximum piston volumes that are greater than the volume of the damping liquid in the working piston volume 380.

Figure 50:
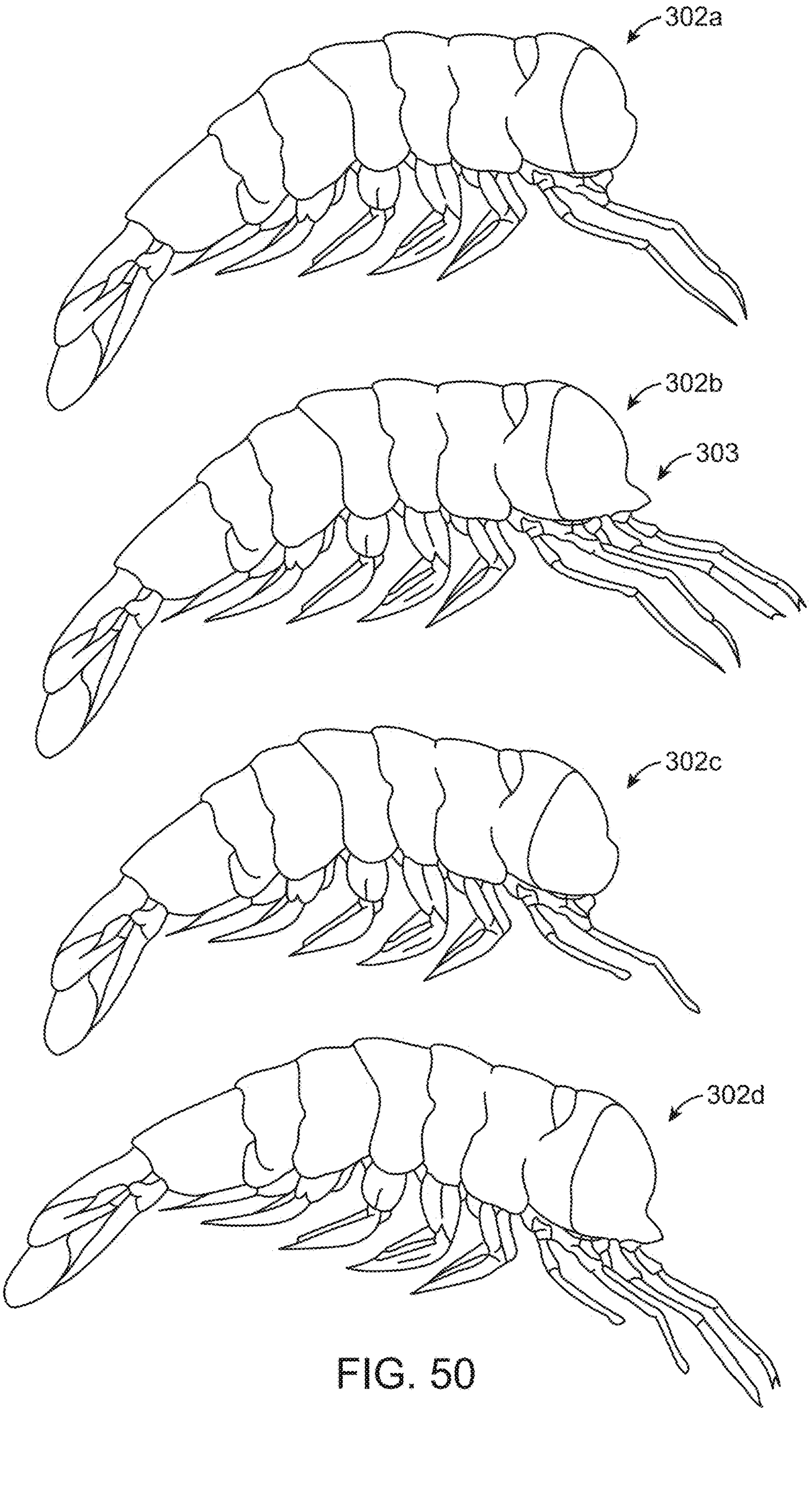
FIG. 50 depicts a variety of shrimp after a heading process.

FIG. 50 depicts a variety of shrimp processed by one illustrative embodiment of a heading apparatus as described herein. In particular, the shrimp depicted in FIG. 50 illustrate one potential advantage of a heading apparatus and methods of heading as described herein. The shrimp 302*a*, 302*c*, and 302*d* differ from the shrimp 302*b* in that the shrimp 302*b* retains a significant portion of the neck meat 303. Proper shaping and positioning of the heading restraint and spoon in a heading apparatus as described herein, along with use of a force limited actuator to move the heading restraint from its stored position to its restraint position and a velocity limited damped actuator to move the spoon from its ready position to its finish position may, result in retention of a significant amount of the neck meat 303 on shrimp processed using the heading apparatus and methods described herein. It should, however, be understood that in one or more embodiments, a clean cut during removal of the carapace may be preferred over retention of the neck meat. In one or more embodiments, increasing the force of the heading restraint may assist in severing the shrimp at the carapace junction in a cleaner, more defined manner.

Peeling Apparatus & Methods

As discussed herein, one or more embodiments of the shrimp processing systems and methods described herein may include a peeling apparatus and methods of removing the shells of shrimp. The peeling apparatus may, in one or more embodiments, the capable of removing the shell segments on the dorsal side of the abdomen of shrimp (the abdominal somites) as well as removing the pleopods (swimmerets) along with the pereiopods (walking legs) found on the ventral side of the abdomen of shrimp. In one or more alternative embodiments, the peeling apparatus and methods described herein may only remove the pleopods (swimmerets) along with the pereiopods (walking legs) found on the ventral side of the abdomen of shrimp, leaving the shell segments on the dorsal side of the abdomen of shrimp intact.

The shrimp processing systems and methods described herein involve a peeling process performed on each shrimp individually while the shrimp is located in a selected location in a peeling apparatus as described herein. In one or more embodiments, the shrimp may be restrained by a clamp acting on its abdomen at the junction between the rearmost (for example, sixth) abdominal shell segment and the tail/uropod of each shrimp during the peeling process.

Figure 51:
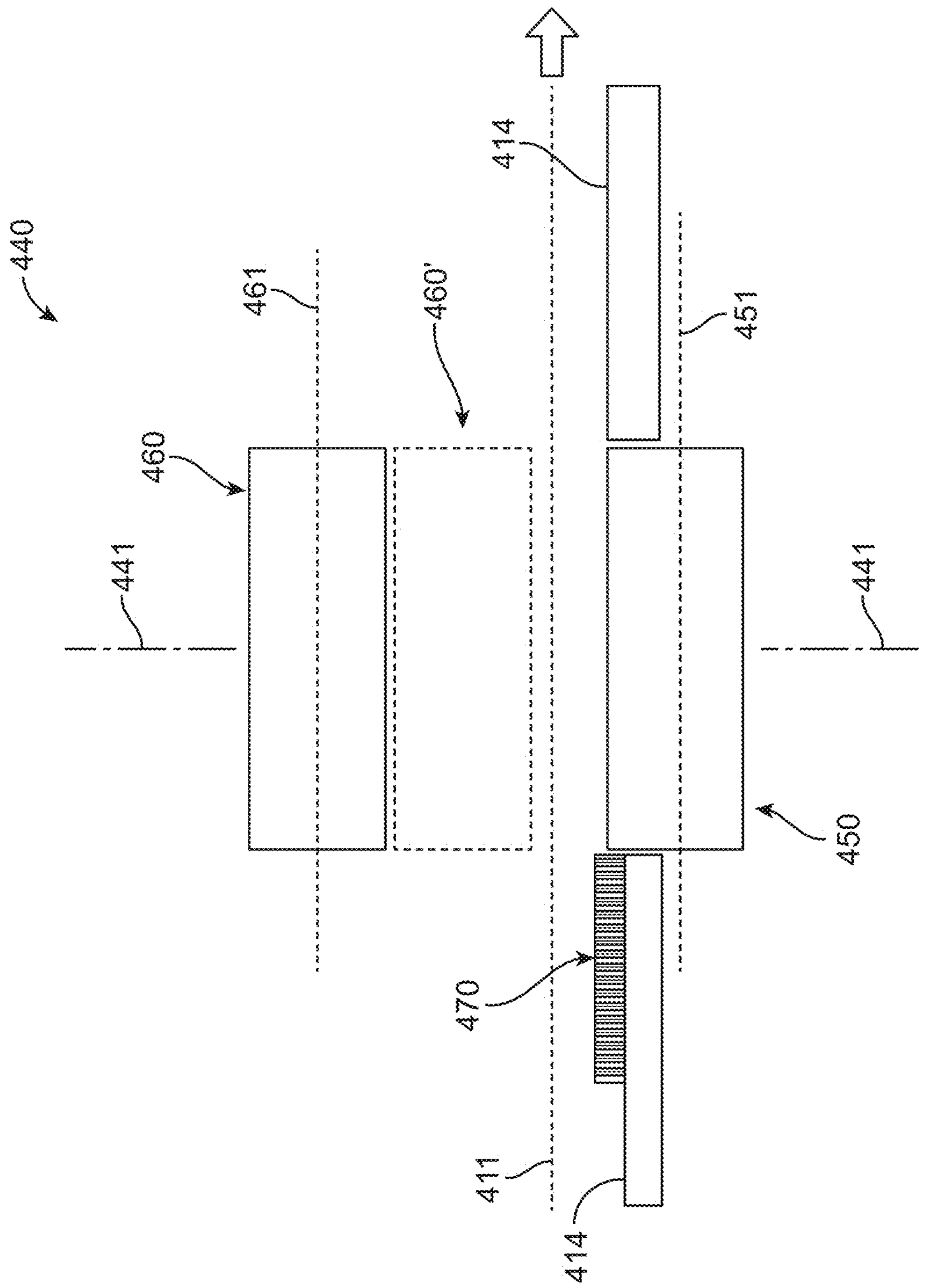
FIGS. 51-52 are schematic diagrams of one illustrative embodiment of a peeling apparatus that may be used in one or more embodiments of a shrimp processing system as described herein.
Figure 52:
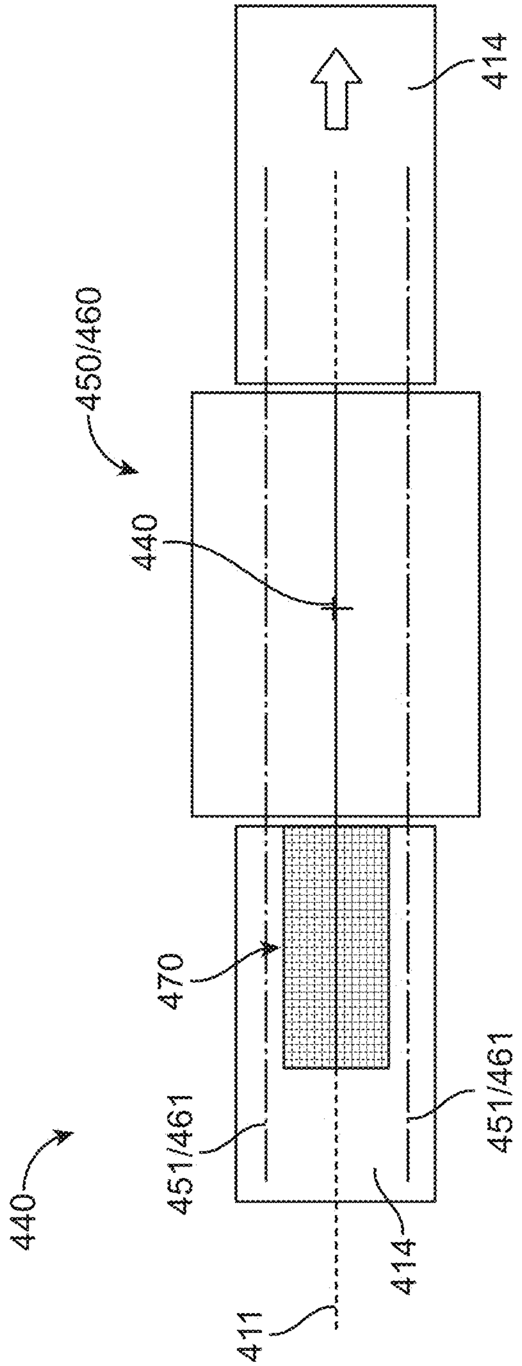
Figure 53:
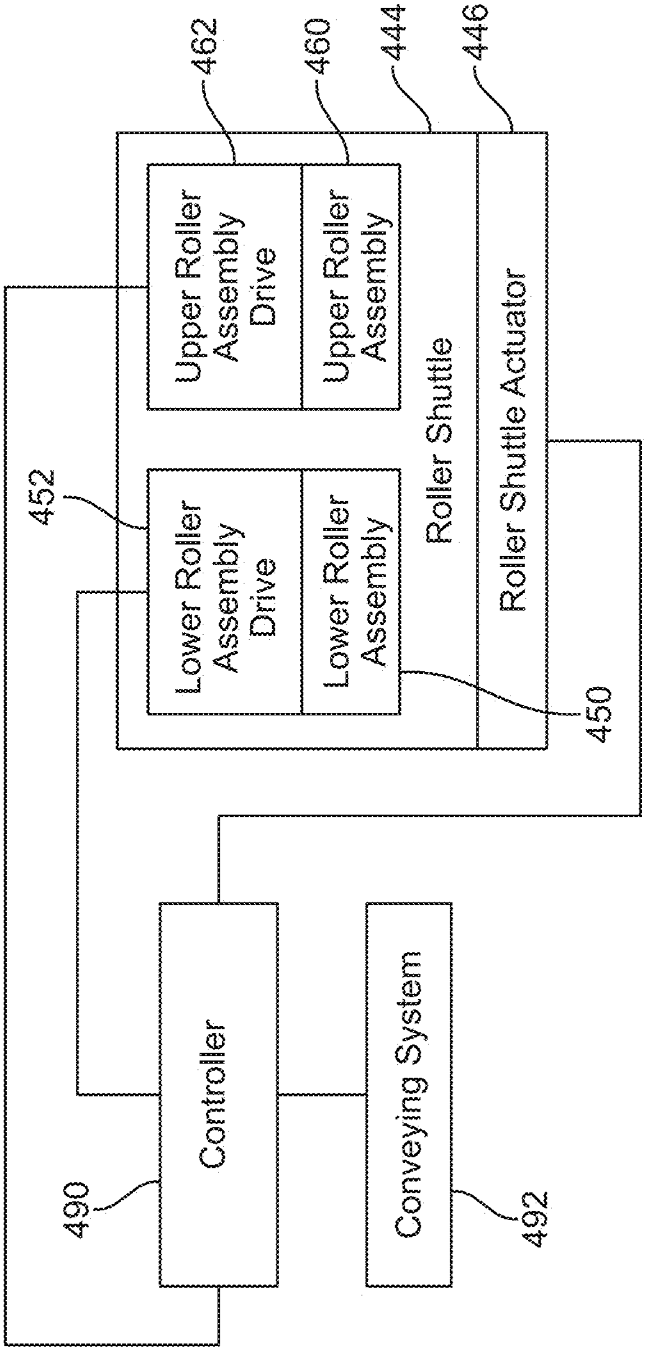
FIG. 53 is a schematic block diagram of a control system that may be used in one illustrative embodiment of a peeling apparatus that may be used in one or more embodiments of a shrimp processing system as described herein.

FIGS. 51-52 are simplified diagrams depicting one illustrative embodiment of a peeling apparatus 440 as described herein, while FIG. 53 depicts a peeling apparatus control system in the form of a schematic block diagram. The peeling apparatus 440 depicted in FIG. 51 includes a lower roller assembly 450 and an upper roller assembly 460. The lower roller assembly 450 and upper roller assembly 460 are positioned on opposite sides of a processing axis 411 passing through the peeling apparatus 440 as depicted in FIGS. 51-52. As discussed herein, the processing axis 411 defines the path of a shrimp through the various stations in processing systems as described herein including, for example, the peeling apparatus 440 depicted in FIGS. 51-52.

As in other apparatus used in shrimp processing systems as described herein, the shrimp moving along processing axis 411 may be supported by a working surface 414. In the depicted embodiment of peeling apparatus 440, the working surface 414 is separated into two sections located on each side of the lower roller assembly 450 an upper roller assembly 460, with a shrimp being supported between the lower roller assembly 450 an upper roller assembly 460 during the actual peeling process. As a result, working surfaces 414 serve to support a shrimp moving into the space between lower roller assembly 450 an upper roller assembly 460 and after the shrimp leaves the space between the roller assemblies 450 and 460.

The lower roller assembly 450 includes a pair of lower rollers mounted side-by-side for rotation about axes 451 and the upper roller assembly 460 includes a pair of upper rollers mounted side-by-side for rotation about axes 461. In the view depicted in FIG. 51, only one of the lower rollers of lower roller assembly 450 and only one of the upper rollers of upper roller assembly 460 are visible because the second rollers in each assembly are positioned behind the upper and lower rollers viewed in FIG. 51.

FIG. 52 is an upper view taken along a roller shuttle axis 441 that extends through the lower roller assembly 450 and upper roller assembly 460 in a direction generally transverse to the processing axis 411. As a result, the pair of upper rollers of upper roller assembly 460 are visible in FIG. 52 while the pair of lower rollers 450 are not visible in FIG. 52 because they are positioned beneath the upper roller assembly 460.

One or more embodiments of peeling apparatus as described herein include a roller shuttle that is configured to move one or both of the lower roller assembly 450 and the upper roller assembly 460 between a receiving position and an operating position. The lower roller assembly 450 and upper roller assembly 460 are located farther from each other when the lower roller assembly 450 and the upper roller assembly 460 are in the receiving position than when the lower roller assembly 450 an upper roller assembly 460 are in the operating position. With reference to FIG. 51, the peeling apparatus 440 is designed such that the upper roller assembly 460 moves while the lower roller assembly 450 remains stationary when the lower roller assembly 450 an upper roller assembly 460 are moved from their receiving position to their operating position. It should, however, be understood that peeling apparatus as described herein may be designed such that the lower roller assembly 450 moves while the upper roller assembly 460 remains stationary or, alternatively, both the lower roller assembly 450 and the upper roller assembly 460 move when moving the roller assemblies 450 and 460 between their receiving and operating positions.

Movement of the upper roller assembly 460 is illustrated in FIG. 51, where upper roller assembly 460 as depicted in solid lines is in the receiving position while upper roller assembly 460' (in broken lines) depicts the position of the upper roller assembly 460 when the upper and lower roller assemblies 450 and 460 are in their operating positions to remove the shell of a shrimp located between the upper and lower roller assemblies 450 and 460.

Another feature depicted in FIGS. 51 to 52 that may be found in one or more embodiments of peeling apparatus as described herein is an alignment device 470 positioned on the working surface 414 such that shrimp being moved between the lower roller assembly 450 an upper roller assembly 460 along the processing axis 411 pass over the alignment device 470. As discussed herein, shrimp are moved through the processing stations along a processing axis 411 with the shrimp oriented tail first. In other words, the tail of the shrimp passes between upper and lower roller assemblies 450 and 460 followed by the abdomen of the shrimp.

In one or more embodiments, the shrimp may be oriented such that the dorsal side of the shrimp faces the upper roller assembly 460 while the ventral side of the shrimp faces lower roller assembly 450. As a result, pleopods and perciopods located on the ventral side of a shrimp preferably contact the alignment device 470 such that the pleopods and pereiopods may be aligned along the ventral side of the shrimp to facilitate their removal by the lower roller assembly 450. More specifically, the pleopods and pereiopods (if present) may preferably be aligned such that they extend along the abdomen of the shrimp and away from its tail.

The alignment device 470 may take a variety of forms including, for example, a bed of bristles facing upward away from the working surface 414 along a direction aligned with shuttle axis 441. Although a bed of bristles may be used for alignment device 470, many other textured surfaces could be used to provide the alignment functions described herein. For example, posts, roughened surfaces (for example, sandpaper-like or other structured surfaces, etc.), channels, etc. may be used in place of a bed of bristles for alignment of the pleopods and pereiopods on a shrimp passing over the alignment device 470. One example of a potentially suitable alignment device may be a section of a brush having polyester bristles with a diameter of approximately 0.2 millimeters (see, for example, "Food-Grade Tight-Seal Strip Brush" No. T7442T11 from McMaster Carr Company (mcmaster.com)).

FIG. 53 is a schematic block diagram depicting one control system that may be used in connection with the peeling apparatus 440 depicted in FIGS. 51-52. The control system includes a controller 490 and a conveying system 492 operably connected to the controller. As mentioned herein, the conveying system 492 can be used to move shrimp into and out of the peeling apparatus 440. The controller 490 is also operably connected to both a lower roller assembly drive 452 and an upper roller assembly drive 462, as well as a roller shuttle actuator 446.

In one or more embodiments, the lower roller assembly drive 452 is operably connected to the pair of lower rollers and configured to rotate a first lower roller about a first lower roller axis 451 passing through the first lower roller and rotate a second lower roller about a second lower roller axis 451 passing through the second lower roller. The upper roller assembly drive 462 is operably connected to the pair of upper rollers and configured to rotate a first upper roller about a first upper roller axis 461 passing through the first upper roller and rotate a second upper roller about a second upper roller axis 461 passing through the second upper roller.

The controller 490 is also operably connected to the roller shuttle actuator used to move one or both of the lower roller assembly 450 and the upper roller assembly 460 between their receiving and operating positions as described herein.

Although the controller 490 is depicted in the form of a single controller in which all control functions may be performed by a single controller (although backup and/or redundant controllers may be provided to assist in the case of failure of a primary controller), one or more alternative embodiments of peeling apparatus may include a distributed set of controllers, with those portions of the apparatus requiring a controller having a dedicated controller and, potentially, a network may be used to interconnect the various controllers to facilitate processing of shrimp by the peeling apparatus. Further, the controller 490 (or any other controllers used in a peeling apparatus as described herein) may be separate from or integrated into a system controller such as, e.g., controller 90 depicted in connection with a control system used to control a shrimp processing system as depicted in FIG. 2.

The controllers used in one or more embodiments of peeling apparatus as described herein may be provided in any suitable form and may, for example, include memory and a controller. The controller may, for example, be in the form of one or more microprocessors, Field-Programmable Gate Arrays (FPGA), Digital Signal Processors (DSP), microcontrollers, Application Specific Integrated Circuit (ASIC) state machines, etc. The controllers may include one or more of any suitable input devices configured to allow a user to operate the apparatus (e.g., keyboards, touchscreens, mice, trackballs, etc.), as well as display devices configured to convey information to a user (e.g., monitors (which may or may not be touchscreens), indicator lights, etc.).

Figure 54A:
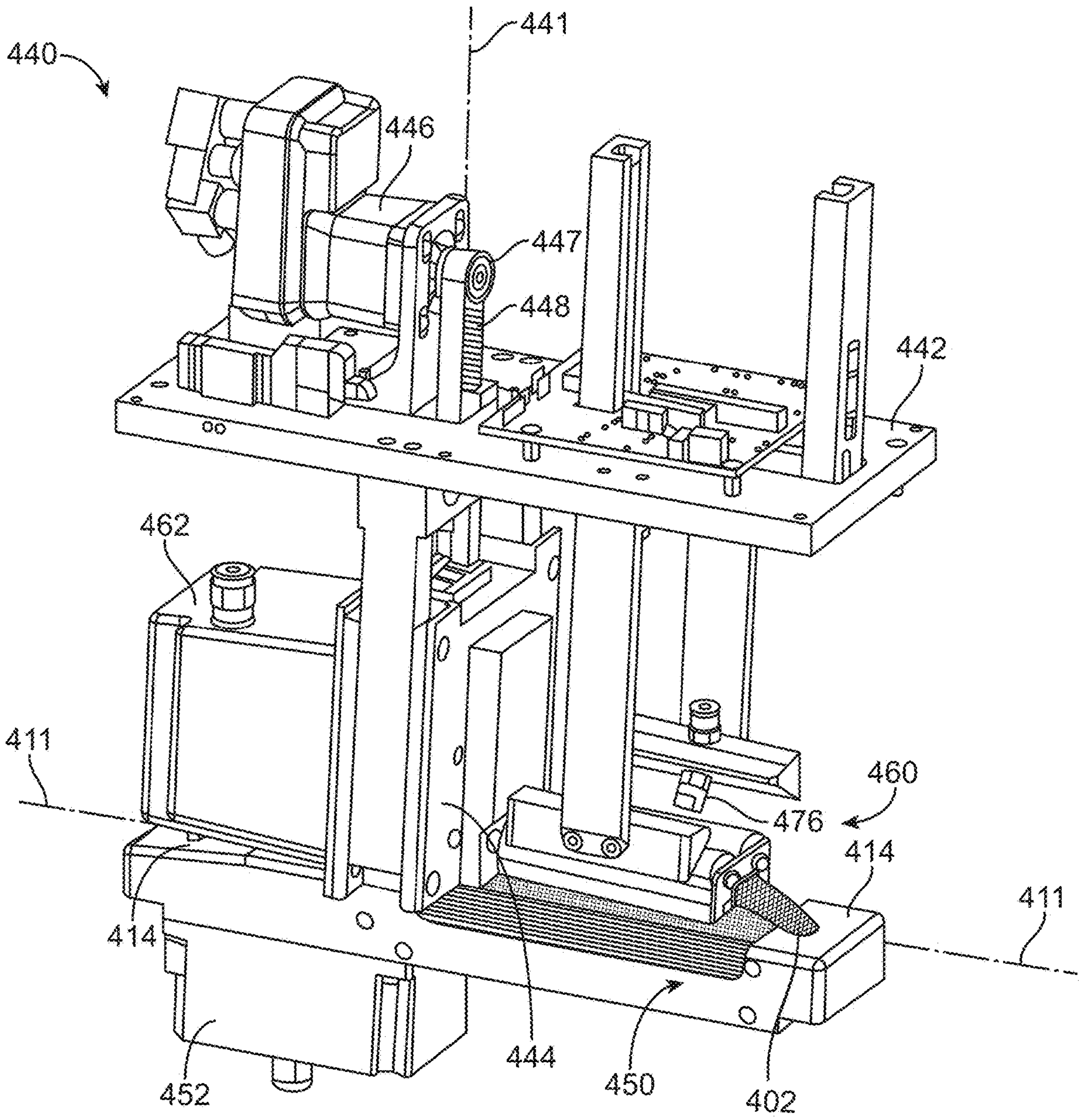
FIG. 54A is a perspective view of one illustrative embodiment of a peeling apparatus as described herein.
Figure 54B:
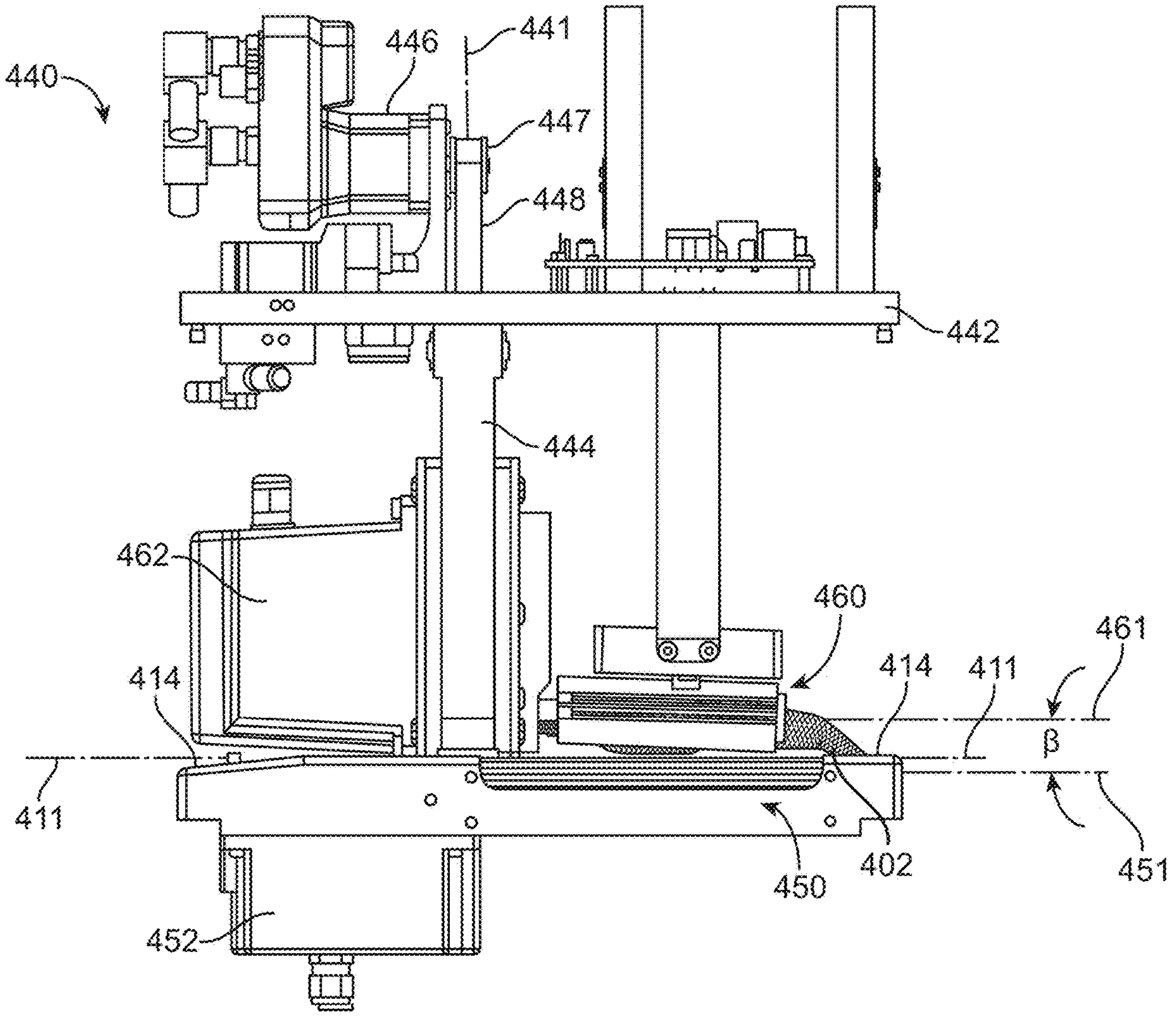
FIG. 54B is a side view of the illustrative embodiment of a peeling apparatus of FIG. 54A, with the upper and lower roller assemblies in the operating position as described herein.
Figure 54C:
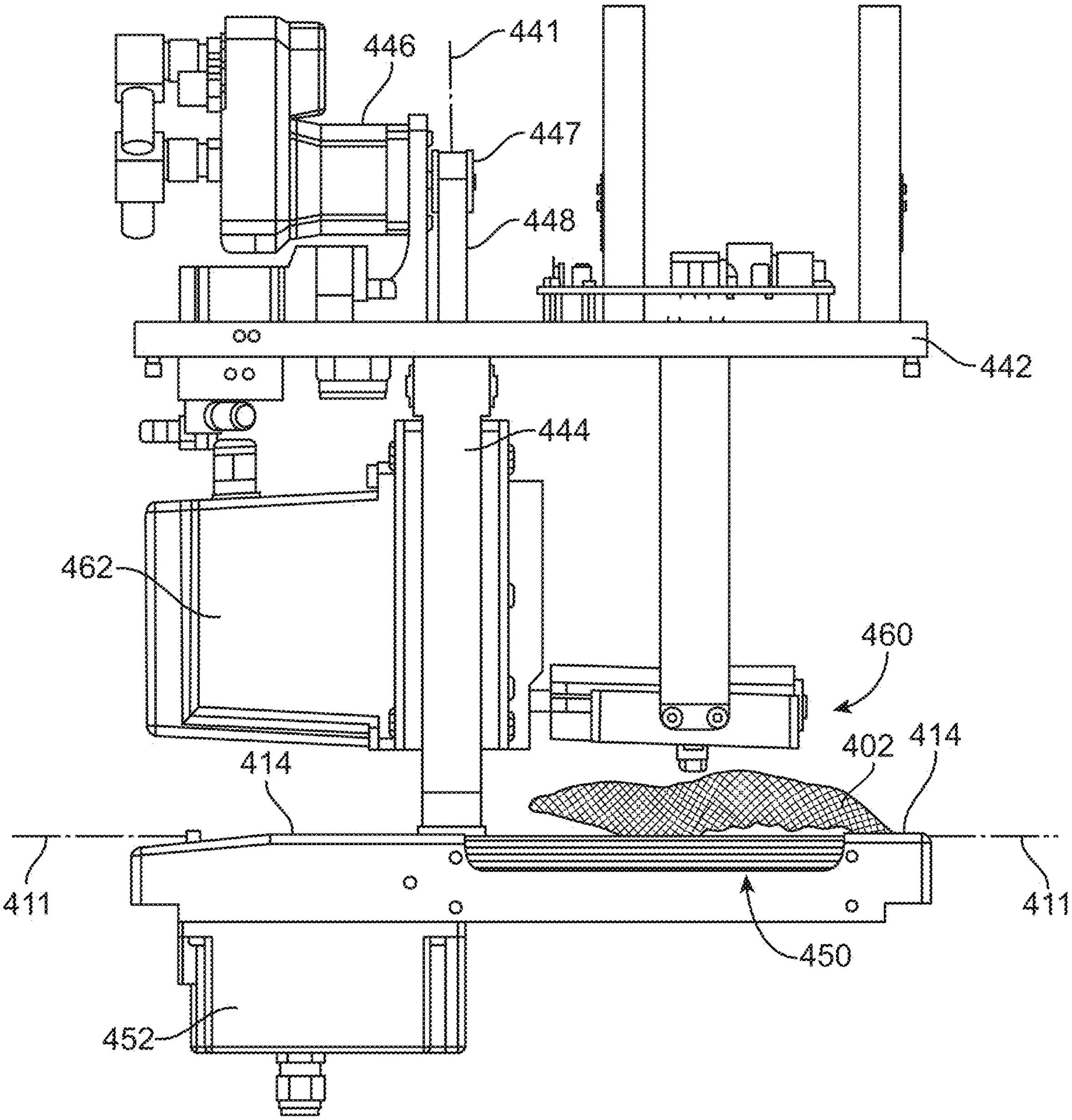
FIG. 54C is a side view of the illustrative embodiment of a peeling apparatus of FIG. 54A, with the upper and lower roller assemblies in the receiving position as described herein.

One illustrative embodiment of a peeling apparatus as described herein is depicted in FIGS. 54A-54D. In particular, FIG. 54A is a perspective view of the depicted illustrative embodiment of a peeling apparatus, FIG. 54B is a side view of the illustrative embodiment of a peeling apparatus of FIG. 54A, with the upper and lower roller assemblies in the operating position as described herein; and FIG. 54C is a side view of the illustrative embodiment of a peeling apparatus of FIG. 54A, with the upper and lower roller assemblies in the receiving position as described herein. At least a portion of a schematic depiction of a shrimp 402 is provided in each of FIGS. 54A-54D, these figures do not include a clamp used to retain the tail of the shrimp 402 on the working surface 414 on the downstream side of the peeling apparatus 440. It should be understood, however, that the tail of the shrimp 402 is retained on that downstream working surface 414 during the peeling process by a clamp similar to, e.g., clamps 212 and 312 depicted in connection with the vein severing and heading apparatus described herein.

The peeling apparatus includes a lower roller assembly 450 including a pair of lower rollers and an upper roller assembly 460 including a pair of upper rollers. Each of the lower rollers 450 rotates about its own axis 451, while each of the upper rollers 460 rotate about their own axes 461. Those axes 451 and 461 may, in one or more embodiments, preferably be generally aligned with a processing axis 411 along which shrimp pass when moving into and out of the peeling apparatus 440.

In the depicted illustrative embodiment, upper roller assembly 460 is attached to a shuttle 444 used to move the upper roller assembly 460 towards and away from the lower roller assembly 450 (to move the roller assemblies between their operating position (see FIGS. 54A & 54B) and their receiving position (see FIG. 54C)). The shuttle 444 is supported on a frame 442 which also supports roller shuttle actuator 446 operably connected to roller shuttle 444 using a drive pulley 447 and belt 448 in the depicted embodiment. In the depicted embodiment, roller shuttle actuator 446 may be in the form of an electric motor rotating drive pulley 447. It should, however, be understood that many other drive mechanisms can be used to move roller shuttle 444 towards and away from the lower roller assembly 450. For example, hydraulic and/or pneumatic pistons, magnetic drives, etc. could all be used in place of the electric motor and drive belt system depicted in connection with the illustrative embodiment of peeling apparatus 440 depicted in FIGS. 54A-54C. Further, in one or more embodiments, the weight of the roller shuttle alone 444 may be selected and/or adjusted to apply the desired force on the dorsal surface of a shrimp 402 located in the peeling apparatus 440 such that no driving force is required other than gravity.

Lower roller assembly 450 and upper roller assembly 460 are positioned between a pair of working surfaces 414, one of which is located upstream of the roller assemblies 450 and 460 and the other of which is located downstream of those roller assemblies. As a result, shrimp moving into and out of the peeling position between the lower roller assembly 450 and the upper roller assembly 460 move off of the upstream working surface 414 and onto the downstream working surface 414 as they pass through the peeling apparatus 440 along processing axis 411.

Other components depicted in FIGS. 54A-54C include a lower roller assembly drive 452 operably connected to the lower rollers of lower roller assembly 450 and an upper roller assembly drive 462 operably connected to the upper rollers of the upper roller assembly 460. In the depicted illustrative embodiment, the upper roller assembly drive 462 may preferably be mounted on the roller shuttle 444 such that the upper roller assembly drive 462 moves with the upper roller assembly 460 to simplify driving of the upper rollers about their axes as described herein.

Although the axes 451 and 461 about which the rollers of the lower and upper roller assemblies 450 and 460 rotate may be generally aligned with the processing axis 411, in one or more embodiments, one or more of the lower roller axes 451 may not be parallel with one or more of the upper roller axes 461. For example, in one or more embodiments one or more of the lower roller axes 451 may converge with the upper roller axis 461 directly above the corresponding lower roller when moving along the processing axis 411 in the processing direction as described herein. The convergence between the lower roller axes 451 and upper roller axes 461 is schematically depicted in FIG. 54B, where angle β (beta) is the angle formed between the lower roller axes 451 and the upper roller axes 461. In one or more embodiments, the convergence angle β (beta) may be greater than 0°, 1° or more, 2° or more, 3° or more, 4° or more, or 5° or more. At an upper end, the convergence angle β (beta) may be 5° or less, 4° or less, 3° or less, 2° or less, 1° or less, or greater than 0°. Convergence of the lower roller axes 451 and the upper roller axes 461 may, in one or more embodiments, beneficially result in removal of the shell segments closer to the tail of a shrimp before removal of the shell segments located closer to the carapace of the shrimp. This is beneficial because the shell segments overlap slightly at their junctions, with the trailing edge of the shell segment closer to the carapace being located over the leading edge of the next successive shell segment.

Another optional feature that may be found in one or more embodiments of peeling apparatus as described herein are cleaning nozzles 476 directed at the upper rollers of upper roller assembly 460. The cleaning nozzles 476 may be configured to direct water or other cleaning fluids on the rollers of both the lower roller assembly and the upper roller assembly to remove pleopods, perciopods, shell segments and other debris between peeling processes.

Figure 54D:
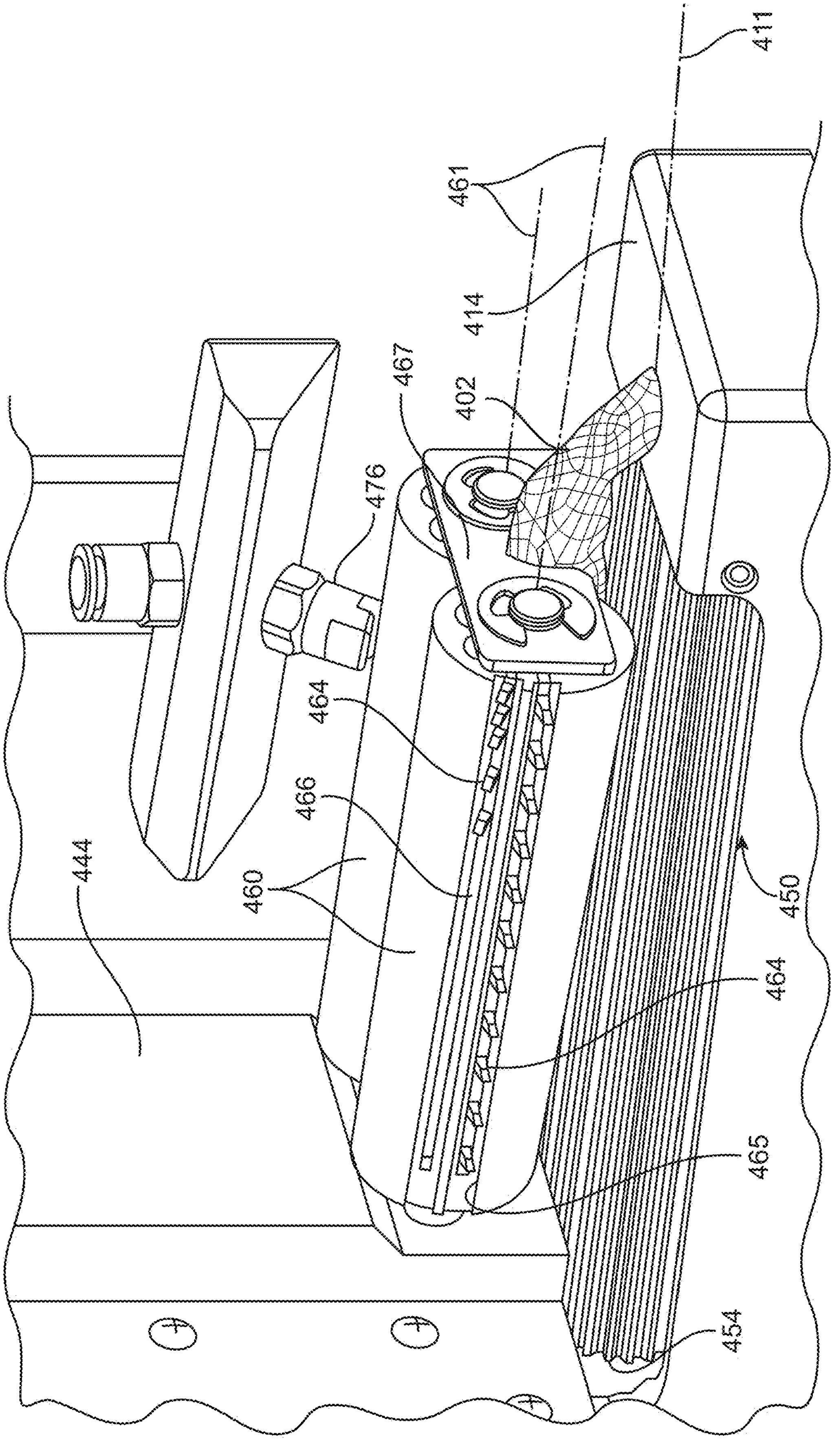
FIG. 54D is an enlarged perspective view of a portion of the peeling apparatus depicted in FIG. 54A.

FIG. 54D depicts the upper and lower roller assemblies 450 and 460 in an enlarged view. One feature depicted in the enlarged view of FIG. 54D are ribs 454 extending outwardly away from the lower roller and extending along the length of the lower roller. Also seen in the enlarged view of FIG. 54D are shell engagement pins 464 extending outwardly from the upper rollers 460.

Another feature depicted in FIG. 54D is the support plate 467 connecting the ends of upper rollers 460 located opposite the roller shuttle 444 from which upper rollers 460 extend. The support plate 467 assists in maintaining the proper relationship between the pair of upper rollers 460 as they rotate to remove shell segments from shrimp as described herein.

Figure 55A:
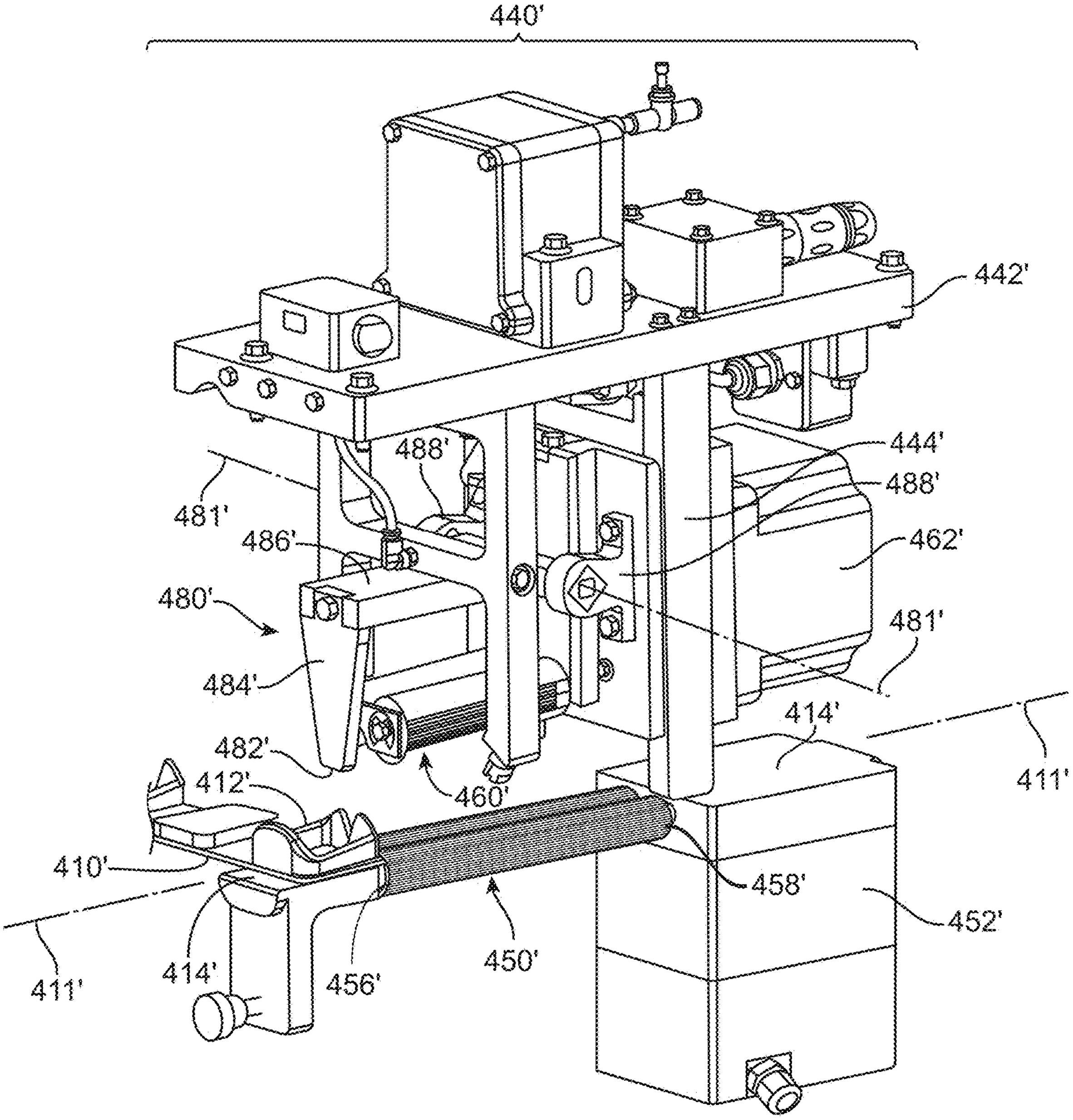
FIG. 55A is a perspective view of another illustrative embodiment of a peeling apparatus as described herein with the upper and lower roller assemblies in the receiving position as described herein.
Figure 55B:
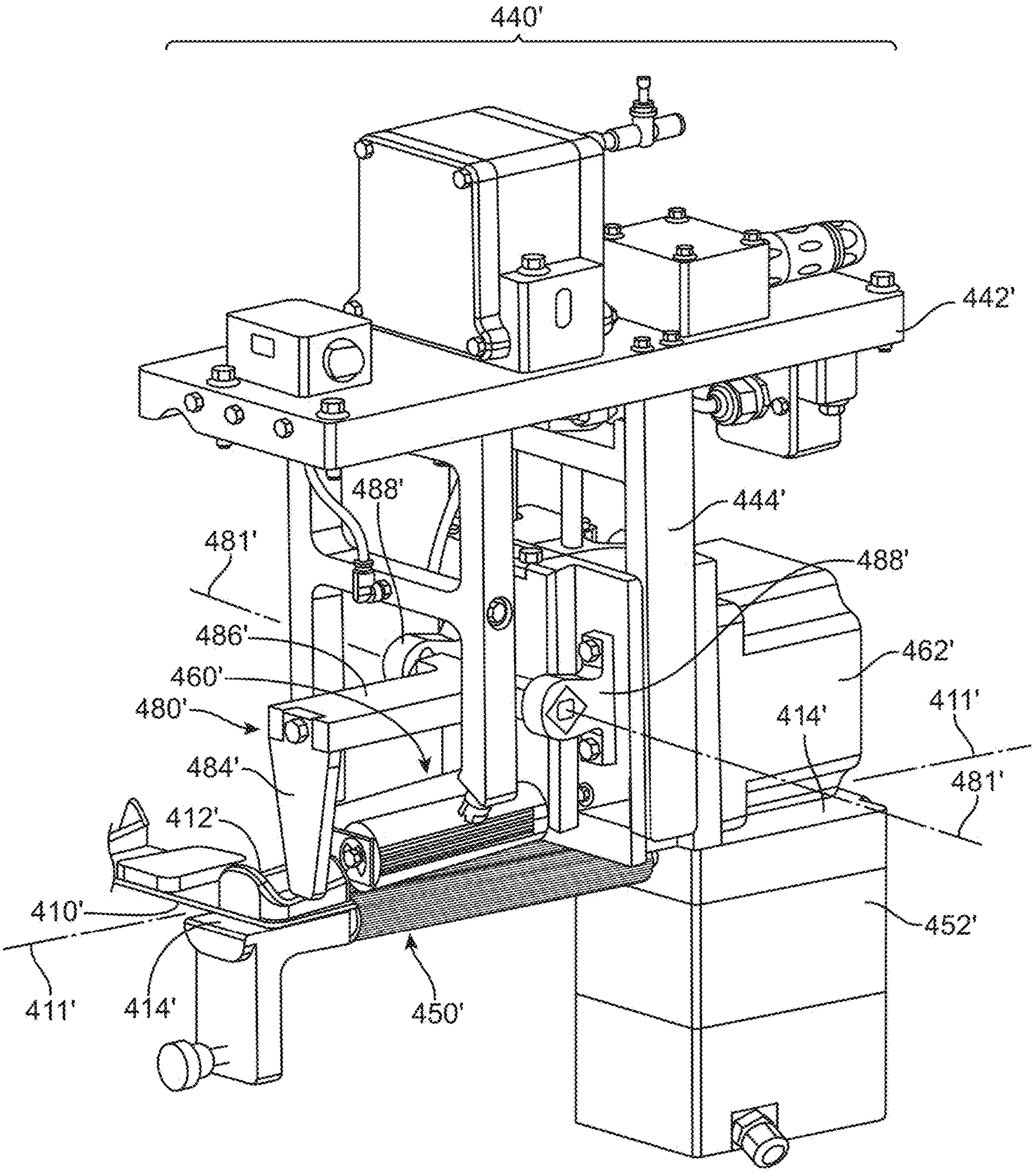
FIG. 55B is a perspective view of the peeling apparatus of FIG. 55A, with the upper and lower roller assemblies in the operating position as described herein.
Figure 55C:
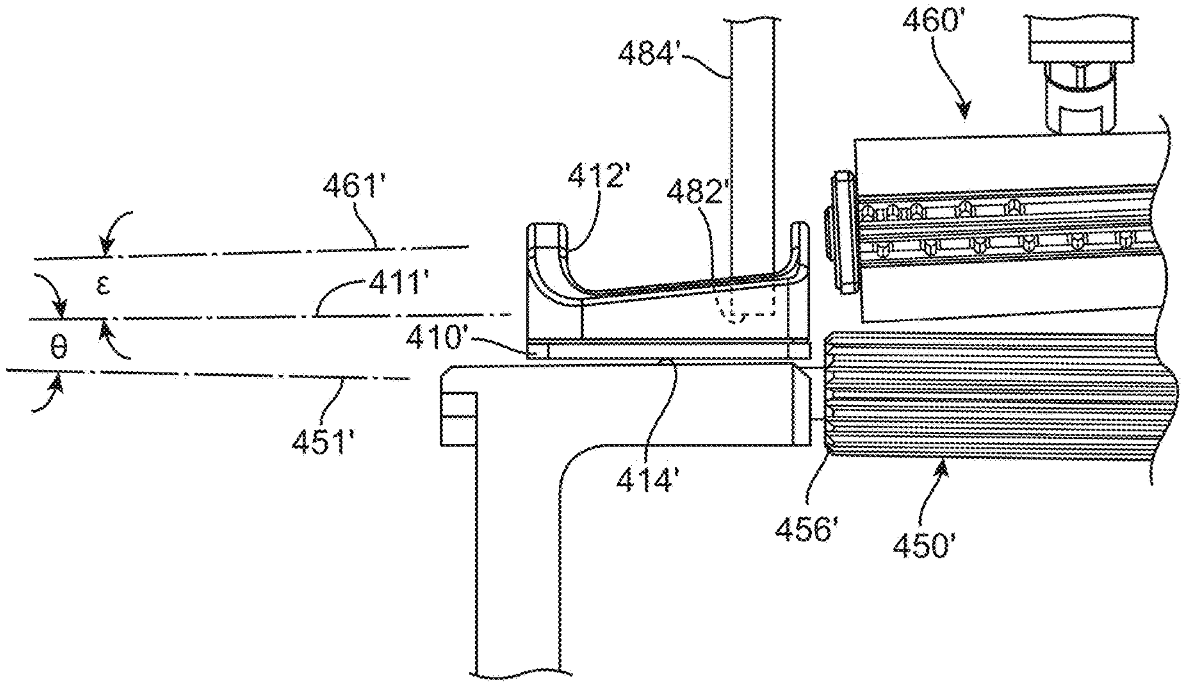
FIG. 55C is an enlarged side view of the peeling apparatus of FIG. 55B, the view depicting the relationship between the clamp, working surface and lower rollers of this illustrative embodiment.
Figure 55D:
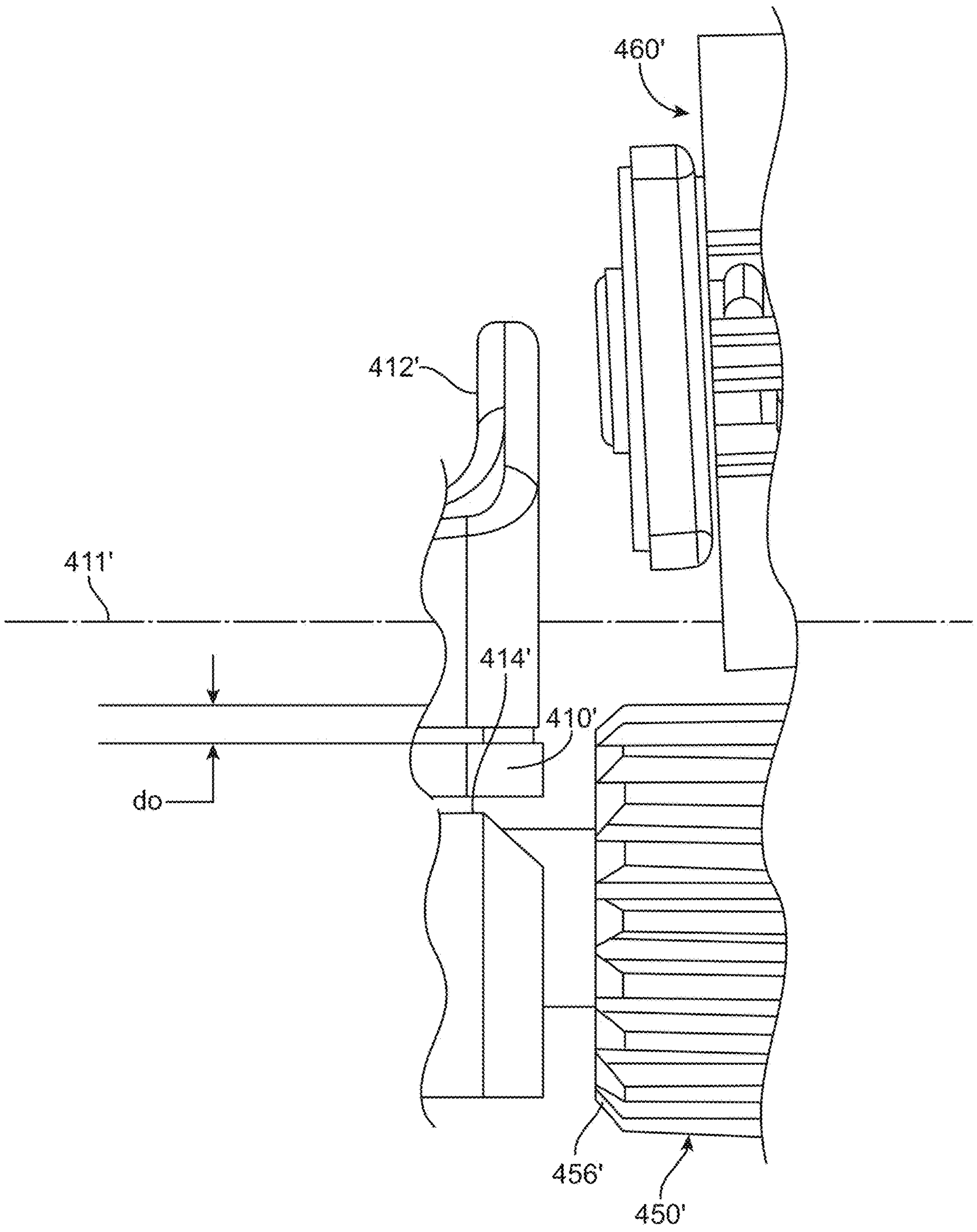
FIG. 55D is a further enlarged view of a portion of the peeling apparatus depicted in FIG. 55C.

Another illustrative embodiment of a peeling apparatus as described herein is depicted in FIGS. 55A-55D. In particular, FIG. 55A is a perspective view of another illustrative embodiment of a peeling apparatus 440' as described herein with the upper and lower roller assemblies in the receiving position as described herein; FIG. 55B is a perspective view of the peeling apparatus 440' of FIG. 55A, with the upper and lower roller assemblies in the operating position as described herein; FIG. 55C is an enlarged side view of the peeling apparatus of FIG. 55B depicting the relationship between a clamp, working surface and lower rollers of this illustrative embodiment; and FIG. 55D is a further enlarged view of a portion of the peeling apparatus depicted in FIG. 55C.

The peeling apparatus 440' includes a lower roller assembly 450' including a pair of lower rollers and an upper roller assembly 460' including a pair of upper rollers. Each of the lower rollers 450' rotates about its own axis 451', while each of the upper rollers 460' rotate about their own axes 461'. Those axes 451' and 461' may, in one or more embodiments, preferably be generally aligned with a processing axis 411' along which shrimp pass when moving into and out of the peeling apparatus 440'. The lower rollers 450' extend between tail ends 456' and head ends 458', with the tail ends 456' being located downstream of the head ends 458' (although not numbered, the upper rollers of the peeling apparatus described herein also extend between tail ends and head ends that are also arranged with the tail ends located downstream of the head ends of the upper rollers).

In the depicted illustrative embodiment, upper roller assembly 460' is attached to a shuttle 444' used to move the upper roller assembly 460' towards and away from the lower roller assembly 450' in a manner similar to that described herein in connection with peeling apparatus 440 in FIGS. 54A-54D.

Lower roller assembly 450' and upper roller assembly 460' are positioned between a pair of working surfaces 414', one of which is located upstream of the roller assemblies 450' and 460' and the other of which is located downstream of those roller assemblies. As a result, shrimp moving into and out of the peeling position between the lower roller assembly 450' and the upper roller assembly 460' move off of the upstream working surface 414' and onto the downstream working surface 414' as they pass through the peeling apparatus 440' along processing axis 411'.

Other components depicted in FIGS. 55A-55B include a lower roller assembly drive 452' operably connected to the lower rollers of lower roller assembly 450' and an upper roller assembly drive 462' operably connected to the upper rollers of the upper roller assembly 460'. In the depicted illustrative embodiment, the upper roller assembly drive 462' may preferably be mounted on the roller shuttle 444' such that the upper roller assembly drive 462' moves with the upper roller assembly 460' to simplify driving of the upper rollers about their axes as described herein.

Although the axes 451' and 461' about which the rollers of the lower and upper roller assemblies 450' and 460' rotate may be generally aligned with the processing axis 411', in one or more embodiments, one or more of the lower roller axes 451' may not be parallel with one or more of the upper roller axes 461' and/or the processing axis 411'. For example, in one or more embodiments one or more of the lower roller axes 451' may converge with the upper roller axis 461' directly above the corresponding lower roller when moving along the processing axis 411' in the processing direction as described herein. In the illustrative embodiment of peeling apparatus 440', one or both of the lower roller axes 451' may also converge with the processing axis 411' when moving along the processing axis 411'.

The convergence between the lower roller axes 451', upper roller axes 461', and processing axis 411' is schematically depicted in FIG. 55C, where angle θ (theta) is the angle formed between the lower roller axis 451' and the processing axis 411'. In one or more embodiments, the convergence angle θ (theta) may be greater than 0°, 1° or more, 2° or more, 3° or more, 4° or more, or 5° or more. At an upper end, the convergence angle θ (theta) may be 5° or less, 4° or less, 3° or less, 2° or less, 1° or less, or greater than 0°.

Also depicted in FIG. 55C, angle ¿ (epsilon) is the angle formed between the upper roller axis 461' and the processing axis 411'. In one or more embodiments, the convergence angle & (epsilon) may be greater than 0°, 1° or more, 2° or more, 3° or more, 4° or more, or 5° or more. At an upper end, the convergence angle & (epsilon) may be 5° or less, 4° or less, 3° or less, 2° or less, 1° or less, or greater than 0°.

Convergence between any pair of the lower roller axes 451', upper roller axes 461', and processing axis 411' may, in one or more embodiments, beneficially result in removal of the shell segments closer to the tail of a shrimp before removal of the shell segments located closer to the carapace of the shrimp. This is beneficial because the shell segments overlap slightly at their junctions, with the trailing edge of the shell segment closer to the carapace being located over the leading edge of the next successive shell segment.

Another optional feature that may be found in one or more embodiments of peeling apparatus as described herein is an offset between the tail ends 456' of the lower rollers 450' and the working surface 414' adjacent the tail ends 456' of the lower rollers 450'. That offset, indicated as do in FIG. 55D, results in the tail ends 456' of the lower rollers 450' being located closer to the tail ends of the corresponding upper rollers 460' than the adjacent portion of the working surface 414' as seen in FIG. 55D as measured in a direction transverse to the lower roller axis 451'. The offset do results in slight raising of the ventral surface of a shrimp having its tail retained in the clamp 412' located above the working surface 414' as compared to an alternate arrangement in which the tail ends of the lower rollers are flush with or even lower than the working surface 414'. The offset do may improve the removal of pleopods and swimmerets on the ventral surface of a shrimp being peeled in the peeling apparatus as well as the shell segments located closer to the tail of the shrimp.

Another optional feature depicted in connection with the alternative embodiment of the peeling apparatus 440' depicted in FIGS. 55A-55D is the addition of a compression arm 480' to the peeling apparatus 440'. In the depicted illustrative embodiment, the compression arm 480' terminates in a working end 482' that is configured to act on the dorsal surface of the tail of shrimp retained in the clamp 412'. In one or more embodiments, the working end 482' provides a compressive force to the tail of the shrimp to assist in retaining the shrimp in the clamp 412' during the peeling process. That compressive force is applied through the members 484' and 486' that, together, support the working end 482'. The working surface 482' of the compression arm 480' is, in the depicted embodiment, attached to the roller shuttle 444' through members 484' and 486'. In the depicted embodiment, the compressive force provided at the working surface 482' is controlled by a resilient connection between the member 486' and the supports 488' attached to the roller shuttle 44', with the resilient connection allowing the member 486' to rotate about compression axis 481'. The resilient connection may include one or more of elastomeric materials, torsion springs, etc.

In one or more embodiments, the compression arm 480' may be described as being configured to move between a raised position as seen in FIG. 55A and a compression position as seen in FIG. 55B (and partially in FIG. 55D). The working end 482' of the compression arm 480' is located closer to the working surface 414' of the peeling apparatus 440' when the compression arm 480' is in the compression position of FIGS. 55B and 55D) than when the compression arm 480' is in the raised position of FIG. 55A.

In embodiments in which the compression arm 480' is operably connected to the roller shuttle 444', the compression arm 480' is in the raised position when the lower roller assembly 450' and the upper roller assembly 460' are in the receiving position (as seen in, e.g., FIG. 55A), and the compression arm 480' is in the compression position when the lower roller assembly 450' and the upper roller assembly 460' are in the operating position (as seen in, e.g., FIG. 55B).

In one or more embodiments of any peeling apparatus as described herein, the lower rollers may be used to remove pleopods and any pereiopods present on the ventral surface of a shrimp located between the upper and lower roller assemblies 450 and 460. To facilitate capture of those features, the lower rollers may include raised features to assist with capture of the pleopods and any perciopods on the ventral surface of a shrimp located above the lower rollers. In one embodiment, the raised features may be in the form of ribs extending along the length of the lower rollers 450, with the ribs defining, for each roller an inner diameter and an outer diameter wherein the inner diameter is located at the base of each rib and the outer diameter is located at the outermost location of each rib.

Figure 56:
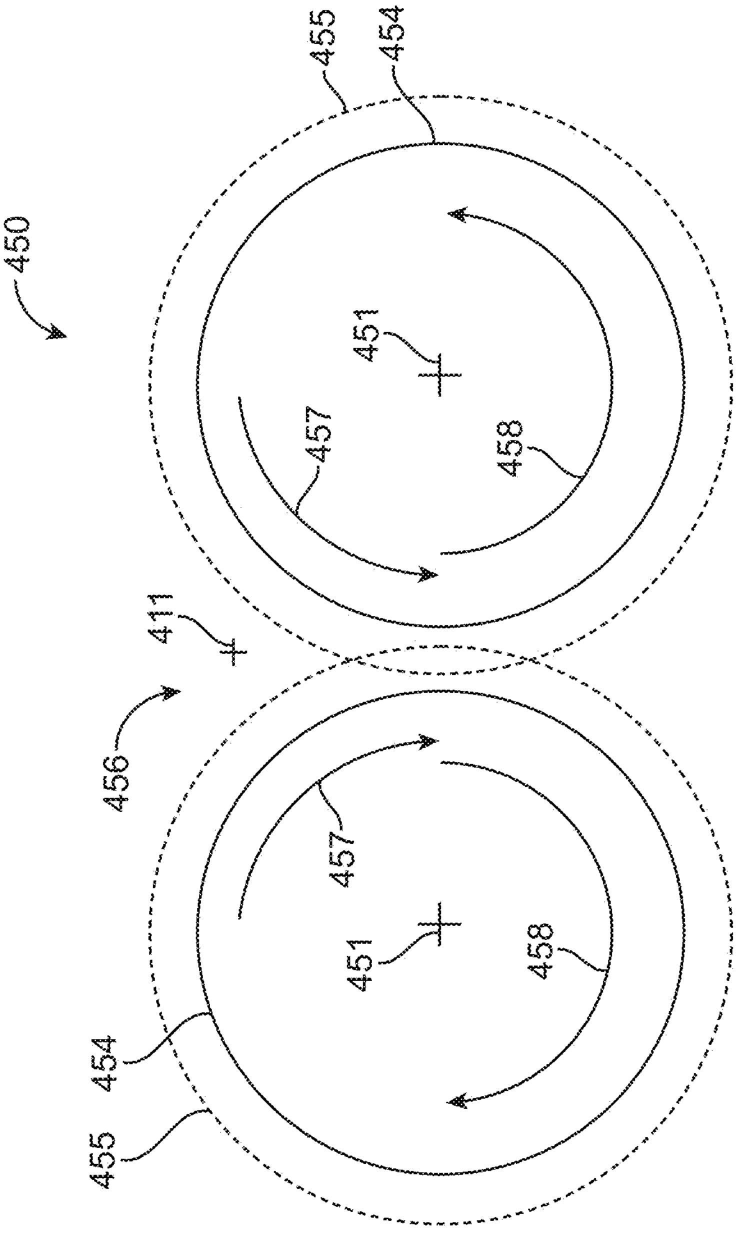
FIG. 56 is a schematic diagram illustrating the relationship between one illustrative embodiment of a lower roller assembly, as well as rotation of the rollers in the lower roller assembly in one or more embodiments of a peeling apparatus as described herein.

FIG. 56 schematically depicts one illustrative embodiment of a pair of lower rollers 450 that are configured to capture and remove pleopods and any perciopods present on the ventral surface of a shrimp located between the upper and lower roller assemblies 450 and 460. The concepts illustrated in connection with rollers 450 may be used in connection with any peeling apparatus or method described herein. Each of the rollers includes an inner diameter 454 that would represent the base of the raised features on each lower roller. Each of the rollers also includes an outer diameter 455 that would represent the outermost portions of the raised features on each lower roller. As seen in FIG. 56, it may be preferred that the outer diameter of one roller is located between the inner and outer diameters of the opposing roller such that the raised features interfere as the rollers rotate about their axes 451.

Interference between the raised features on the pair of lower rollers 450 may involve a complementary meshing of those raised features (for example, ribs from one roller fit within the spaces between the ribs on the opposing roller) and/or the interference may involve deformation of one or both sets of raised features on the lower rollers 450. In place of elongated ribs, one or more alternative types of raised features may include for example, elastomeric netting wrapped on rollers 450, structured surfaces on the rollers 450 in the form of pins or posts, knurling, etc. Furthermore, the raised features on the rollers 450 may be the same or different. For example, in one or more embodiments, one roller may be provided with elongated ribs that extend along the length of the roller while the opposing roller may be provided with no raised features or with a different set of raised features. The raised features may be, in one or more embodiments, constructed of elastomeric or resilient materials that deform during the capture and/or removal of pleopods and any perciopods on a shrimp positioned between the rollers 450.

Figure 58:
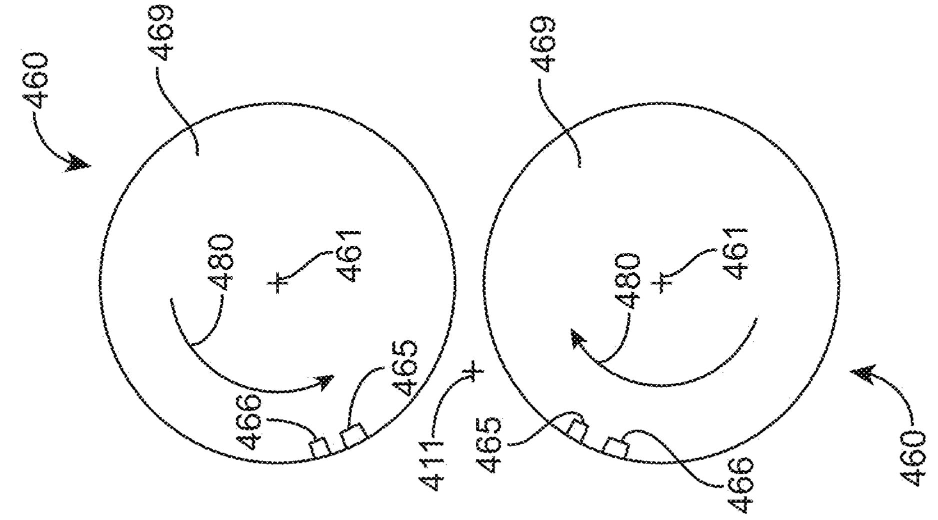
FIG. 58 is a schematic diagram of the upper rollers of FIG. 57 taken along their respective axes.
Figure 57:
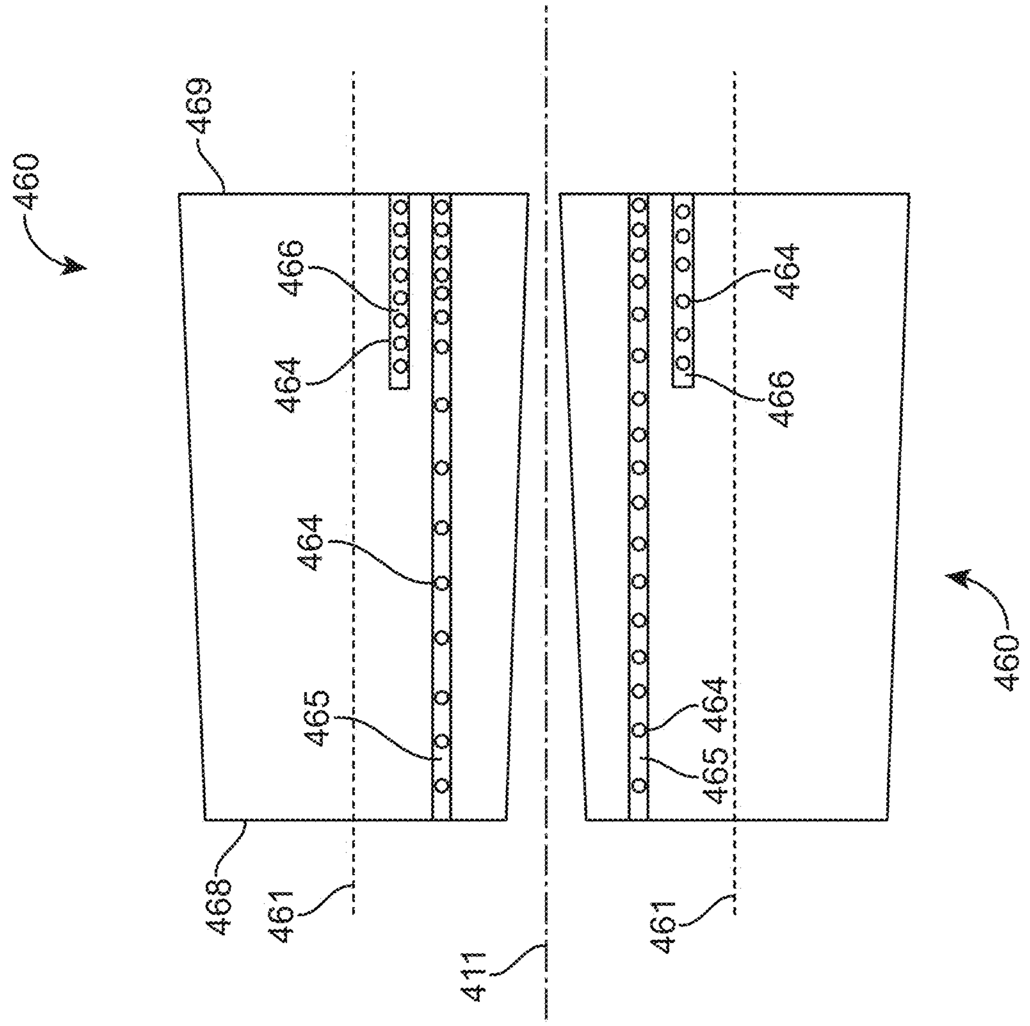
FIG. 57 is a schematic diagram illustrating one illustrative embodiment of a pair of upper rollers that may be used in one or more embodiments of a peeling apparatus as described herein.

FIGS. 57-58 depict one illustrative embodiment of a pair of upper rollers 460 that may be used in one or more embodiments of a peeling apparatus as described herein. The upper rollers 460 may define a head end 468 and a tail end 469, with the head end 468 being located upstream of the tail end 469 along the processing axis 411. In other words, the head ends 468 of the upper rollers 460 are located farther from the tail of a shrimp being processed than the tail ends 469. The rollers 460 each rotate about an axis 461 and are positioned on opposite sides of the processing axis 411 along which shrimp move into and out of position between the upper rollers 460 for peeling.

One or both of the upper rollers 460 may, in one or more embodiments, include shell engagement pins 464 protruding outwardly from the outer surfaces of the upper roller 460 (see, also, pins 464 on rollers 460 in FIG. 54D). The shell engagement pins 464 may be configured to pierce or otherwise capture the shell segments on the abdomen of a shrimp when forced against the shrimp. For example, in one or more embodiments, the shell engagement pins 464 may have tapered bodies having a cross-sectional area that decreases when moving away from the axis of the roller on which the shell engagement pins 464 are located. In one or more embodiments, shell engagement pins 464 may be located in a recess 465 or 466 formed into the outer surface of one or both of the upper rollers 460.

In one or more embodiments, a surface area density of the shell engagement pins 464 may increase when moving along the upper roller axis 461 from the head end 468 towards the tail end 469 of the rollers 460. The surface area density of the shell engagement pins 464 may increase using a variety of approaches. For example, in one or more embodiments, the spacing between pins 464 may decrease when moving from the head end 468 towards the tail end 469 of the rollers 460. Decreasing spacing can be seen in, for example, pins 464 located in recesses 465 on rollers 460.

Another manner in which spacing between pins 464 may decrease when moving from the head end 468 towards the tail end 469 of the rollers 460 is by including more than one row of pins 464. For example, in the illustrative embodiments of upper rollers 460 depicted in FIG. 57, a second row of pins 464 is provided on each of the rollers 460. In one or more embodiments, a first row of pins 464 may extend over or 80% or less, 70% or less, 60% or less, or 50% or less of a length of the upper roller as measured from its head end 468 to its tail end 469. A second row of shell engagement pins may extend over a distance of 50% or more, 60% or more, 70% or more, 80% or more, 90% or more, or substantially all of a length of the upper roller 460 as measured from its head end 468 to its tail end 469.

Another optional feature depicted in connection with the upper rollers of FIG. 57 is that one or both of the rollers 460 may be tapered such that the roller 460 forms a frusto-conical body that tapers when moving from the tail end 469 towards the head end 468 of the roller 460. In one or more embodiments, the frusto-conical bodies may define an apex angle of 10° or less, 8° or less, 6° or less, 4° or less, or 2° or less as measured relative to the axis 461 about which the rollers 460 rotate during use. The use of tapered rollers may enhance contact between the shell engagement pins 464 and the shell of a shrimp by adapting more closely to the shape of the abdomen of a shrimp positioned between the upper rollers 460.

The use of tapered upper rollers 460 may also assist in removing the shell segments closer to the tail of a shrimp before removing the shell segments located closer to the carapace of the shrimp. As discussed above in connection with the converging upper and lower roller axes, removal of the rearmost shell segments first is beneficial because the shell segments overlap slightly at their junctions, with the trailing edge of the shell segment closer to the carapace being located over the leading edge of the next successive shell segment. In one or more embodiments, tapered rollers may be used in addition to or in place of converging upper and lower roller axes.

Operation of the lower roller assembly 450 an upper roller assembly 460 to remove shell segments from the dorsal side of a shrimp and pleopods and pereiopods from the ventral side of the abdomen of a shrimp can be described with reference to FIGS. 51, 54, 56 and 58.

With reference to FIG. 56, the controller (see, for example, controller 490 in FIG. 53) operably connected to the lower roller assembly drive 452 used to rotate lower rollers 450 as described herein may be configured to operate the lower roller assembly drive 452 to rotate each of the lower rollers about a capture arc, with the opposing rollers 450 rotating in opposite directions over their respective capture arcs. As depicted in FIG. 56, each of the rollers 450 may be rotated over a capture arc 457.

In one or more embodiments, the capture arc may be defined by time and/or by distance. For example, the capture arcs 457 may be the result of rotating the rollers 450 for a selected period of time using the lower roller assembly drive. Alternatively, the capture arcs 457 may be the result of rotating the rollers 450 over a selected rotational distance. For example, the capture arcs 457 may involve rotation over an arc of 20° or more, 30° or more, 45° or more, 60° or more, 75° or more, 90° or more, etc.

In still other embodiments, the capture arcs 457 may be variable. For example, in one or more embodiments, the lower roller assembly drive may rotate one or both of the rollers 450 until a selected amount of resistance to rotation is encountered with that resistance defining capture of the pleopods and pereiopods present on the ventral side of a shrimp.

Rotating the first and second rollers 450 about their respective capture arcs 457 may, in one or more embodiments, collect and hold at least one pleopod, a majority of the pleopods on the ventral side of the shrimp, and preferably all of the pleopods and any pereiopods that remain after heading on the ventral side of the abdomen of a shrimp located between the upper and lower roller assemblies 450 and 460. In addition, capture of the pleopods and perciopods may also assist in positioning and/or straightening the abdomen of the shrimp before attempting to remove shell segments from the dorsal side of the shrimp abdomen.

After rotating the lower rollers of the lower roller assembly 450 about their respective capture arcs, the roller shuttle actuator 446 may be operated to move the upper roller assembly 460 towards the lower roller assembly 450 such that the upper and lower roller assemblies 450 and 460 are moved from the receiving position to the operating position in which the upper rollers of upper roller assembly 460 contact the shell segments on the dorsal side of the shrimp abdomen.

In one or more embodiments, the roller shuttle actuator 446 may be configured to provide a limited force to the abdomen of a shrimp located between the lower and upper roller assemblies 450 and 460. For example, in one or more embodiments in which the roller shuttle actuator 446 is in the form of an electric motor, a torque sensor may be used to determine the force applied to a shrimp located between the lower and upper roller assemblies 450 and 460 as the upper roller assembly is moved against the abdomen of the shrimp. Many other techniques and methods of controlling the force applied to the abdomen of a shrimp located between the lower and upper roller assemblies 450 and 460 force may, alternatively, be used (for example, pressure-controlled pneumatic cylinder or force-limited pneumatic cylinder, etc.).

After the roller shuttle actuator 446 moves the roller shuttle 444 carrying upper roller assembly 460 into place such that the upper rollers of upper roller assembly 460 contact the dorsal side of the shrimp abdomen with a sufficient force, the upper roller assembly drive 462 may be operated by the controller to rotate each of the upper rollers 460 about a peeling arc sufficient to remove shell segments from the abdomen of a shrimp.

FIG. 58 depicts one example of a pair of peeling arcs 480. In one or more embodiments, the peeling arcs 480 of the upper rollers 460 may be in opposite directions. In other words, the upper rollers 460 may be rotated in opposite directions such that the shell segments on the dorsal side of a shrimp located between upper rollers 460 are drawn into the gap between the rollers 460 as the shell segments are removed from the abdomen of the shrimp. In one or more embodiments, the peeling arcs 480 may involve rotation of the rollers 460 over an arc of 90° or more, 120° or more, 150° or more, 180° or more, 240° or more, 300° or more, or 360° or more.

At essentially the same time as upper rollers 460 are rotating about their peeling arcs 480, the lower roller assembly drive 452 may rotate the lower rollers 450 about their axes over a removal arc to remove the pleopods and pereiopods from the ventral side of the abdomen of the shrimp at the same time as the upper rollers 460 are removing the shell segments from the dorsal side of the abdomen of the shrimp. As a result, the shell segments on the dorsal side of a shrimp abdomen and the pleopods and pereiopods on the ventral side of the shrimp abdomen may be removed at the same time.

In one or more embodiments, the removal arcs over which the lower rollers 450 are rotated (see, for example, removal arcs 458 in FIG. 56) may be greater than the capture arcs 457 over which the lower rollers 450 are rotated to capture the pleopods and pereiopods before attempting to remove the shell segments from the dorsal side of the abdomen of the shrimp. In one or more embodiments, the removal arcs may involve rotation of the lower rollers of the lower roller assembly over an arc of 60° or more, 70° or more, 80° or more, 90° or more, 120° or more, 150° or more, 180° or more, 240° or more, 300° or more, or 360° or more.

After operating the lower roller assembly to remove the pleopods and pereiopods on the ventral side of the shrimp and the shell segments from the dorsal side of the shrimp, the conveying system may be used to remove the shrimp from its position between the lower and upper roller assemblies 450 and 464 further processing. In general, however, it should be noted that the peeling station may preferably be located at the end of a shrimp processing system line such that the shrimp is, after being processed by a peeling apparatus as described herein ready to be unloaded from a clamp or other restraint and if desired, sorted based on size or other physical characteristics known about the shrimp from its processing in any of the other stations in a shrimp processing system described herein.

As discussed above, one or more embodiments of peeling apparatus and methods described herein may only remove the pleopods (swimmerets) along with the pereiopods (walking legs) found on the ventral side of the abdomen of shrimp, leaving the shell segments on the dorsal side of the abdomen of shrimp intact. Such shrimp may, for example, be marketed as “shell-on” shrimp and/or “peel and eat” shrimp, with the peeling process being simplified because the pleopods (swimmerets) along with the pereiopods (walking legs) found on the ventral side of the abdomen of shrimp will have already been removed from the abdomen of the shrimp.

The peeling apparatus described above can be used to perform this selective removal process by simply holding the upper rollers of the upper roller assembly 460 stationary about perspective axes while the lower rollers are operated as discussed above to remove the pleopods (swimmerets) along with the pereiopods (walking legs) found on the ventral side of the abdomen of shrimp. It may, however, be beneficial to move the upper roller assembly 460 and lower roller assembly 450 between the receiving and operating positions as discussed above, with the upper roller assembly

460 serving to stabilize the shrimp during removal of the pleopods (swimmerets) along with the pereiopods (walking legs).

Although removal of the pleopods (swimmerets) along with the pereiopods (walking legs) while leaving the shell segments on the dorsal side of the abdomen of shrimp intact may be accomplished using the peeling apparatus and methods described and discussed above in connection with FIGS. 51-58, one or more alternative embodiments of peeling apparatus and methods may involve replacing the upper roller assembly with a stabilizing unit which can be referred to herein as an upper assembly.

Figure 59:
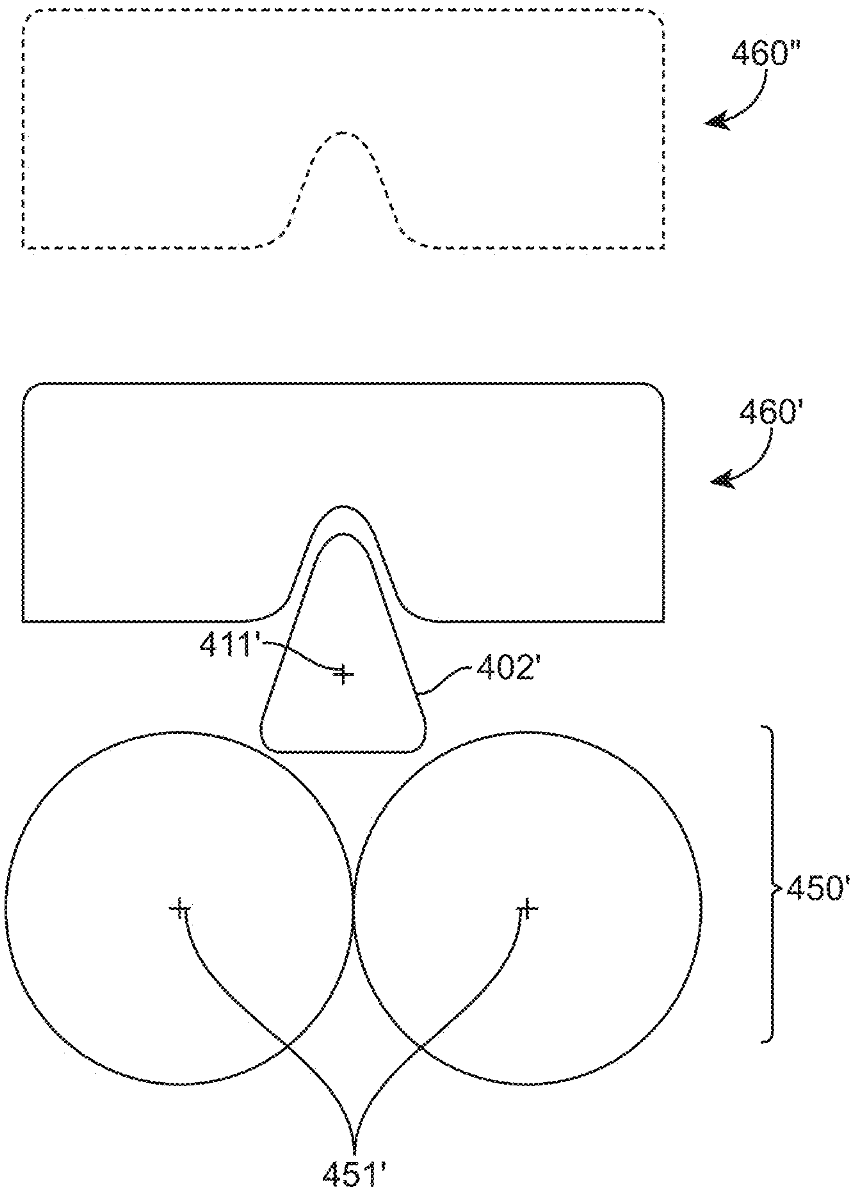
FIG. 59 is a schematic diagram depicting one illustrative embodiment of an alternative peeling apparatus configured to remove the pleopods and pereiopods from the ventral surface of the abdomen of shrimp while leaving the shell segments on the dorsal surface intact.

One illustrative embodiment of an arrangement in which an upper assembly is used to replace an upper roller assembly is depicted schematically in FIG. 59. More specifically, a lower roller assembly 450' is depicted including lower rollers that rotate about lower roller axes 451' in a manner similar to that described above with respect to lower roller assembly 450. Also depicted in FIG. 59 are an abdomen of the shrimp 402' depicted in a cross-sectional view. The abdomen of the shrimp 402' extends along a processing axis 411' which is generally aligned with the lower roller axes 451'.

FIG. 59 also includes an upper assembly 460' it can be used to stabilize the dorsal surface of the shrimp 402' during removal of the pleopods (swimmerets) along with the pereiopods (walking legs) in a manner similar to that described above with respect to the peeling apparatus depicted and described in connection with FIGS. 51-58.

The upper assembly 460' and the lower roller assembly 450' are movable towards and away from each other between a receiving position and an operating position in a manner similar to that described above with respect to the peeling apparatus depicted and described in connection with FIGS. 51-58. Although either or both of the upper assembly 460' and lower roller assembly 450' may be moved to place those components in the receiving position or operating position as desired, upper assembly 460' is shown spaced apart from the lower roller assembly 450' in a receiving position as upper assembly 460" (in broken lines). It should be understood that, alternatively, the lower roller assembly 450' could be moved towards a stationary upper assembly 460' as discussed herein in connection with the peeling assembly depicted and described in connection with FIGS. 51-58.

Shell Segment Separator Apparatus & Methods

As discussed herein, one or more embodiments of the shrimp processing systems and methods described herein may include a shell segment separator apparatus and methods of separating shell segments of shrimp. As discussed herein, it should be understood that the shell segment separator separates the shell segments located on the dorsal surface of the abdomen of shrimp processed using systems and described herein. Separation of adjacent pairs of shell segments may, in one or more embodiments, assist in clean removal (during peeling) of abdominal shell segments located forward (that is, closer to the carapace) of the rearmost abdominal shell segment (where the rearmost abdominal shell segment is the shell segment located forward of the tail of the shrimp).

In some species of shrimp, physiological structures or connections between the rearmost abdominal shell segment and the adjacent abdominal shell segment may result in tearing of either or both of the rearmost abdominal shell segment and an adjacent abdominal shell segment. In shrimp including, for example, six abdominal shell segments (see, for example, FIG. 3), removal of the abdominal shell segments without separating the fifth and sixth abdominal shell segments as described herein may result in tearing of either or both of the fifth or sixth abdominal shell segments.

As with other shrimp processing systems and methods described herein, the shell segment separator apparatus is performed on each shrimp individually while the shrimp is located in a selected location relative to the shell segment separator apparatus as described herein. In one or more embodiments, the shrimp may be restrained by a clamp acting on its abdomen at the junction between the rearmost (for example, sixth) abdominal shell segment and the tail/uropod of each shrimp.

Figure 60:
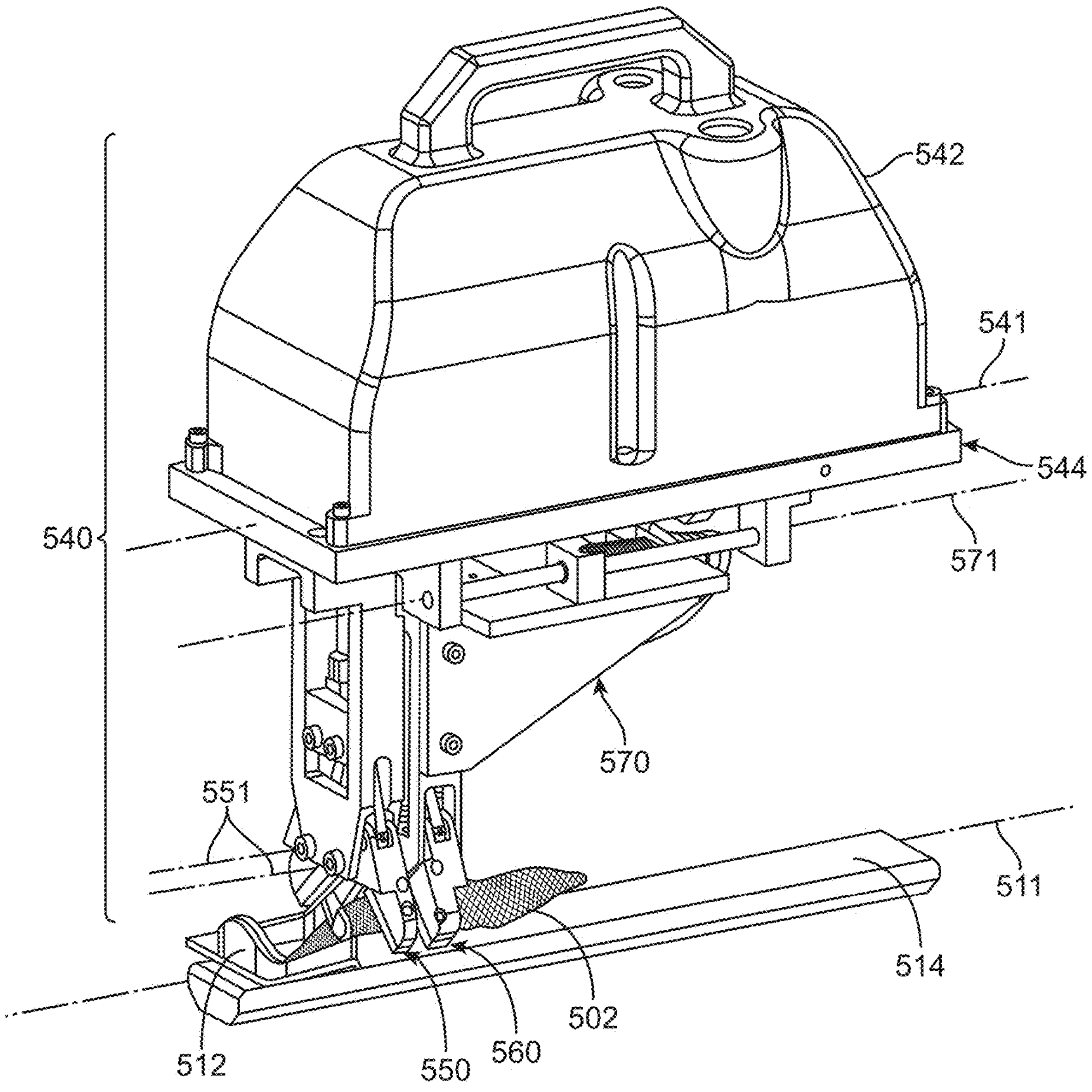
FIG. 60 is a perspective view of one illustrative embodiment of a shell segment separator apparatus that may be used in one or more embodiments of a shrimp processing system as described herein.
Figure 61:
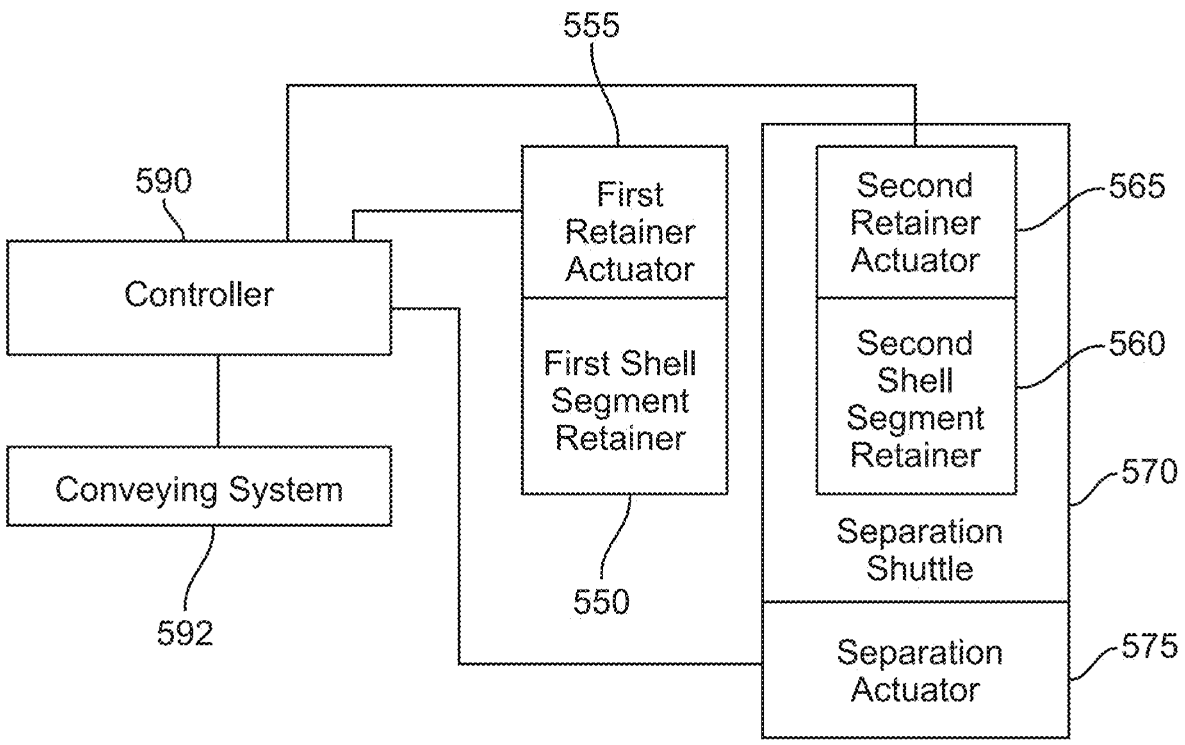
FIG. 61 is a schematic block diagram of a control system that may be used in one illustrative embodiment of a shell segment separator apparatus that may be used in one or more embodiments of a shrimp processing system as described herein.

FIG. 60 is a perspective view of one illustrative embodiment of a shell segment separator apparatus 540 as described herein, while FIG. 61 depicts a shell segment separator apparatus control system in the form of block diagram. The shell separator apparatus 540 depicted in FIG. 60 includes a first shell segment retainer 550 and a second shell segment retainer 560 positioned along a processing axis 511 passing through the shell segment separator apparatus 540. As discussed herein, the processing axis 511 defines the path of shrimp through the various stations in processing systems as described herein including, for example, the shell segment separator apparatus 540 depicted in FIG. 60. Also seen in FIG. 60 is a shrimp 502 restrained by a clamp 512, with the shrimp 502 in a selected location on a working surface relative to the shell segment separator apparatus 540.

The shell segment separator apparatus 540 also includes a carriage 544 located above the working surface 514 with the carriage 544 being movable along a carriage axis 541 to position the working portions of the shell segment separator 540 relative to the shrimp when the shrimp is in a selected location on working surface 514. In addition, the shell segment separator apparatus 540 also includes a separation shuttle 570 configured to move along a shuttle axis 571 to move the second shell segment retainer 560 relative to the first shell segment retainer 550 to separate adjacent shell segments on shrimp 502 as described herein. The actuators used to physically move the carriage 544 and the separation shuttle 570 along their respective axes are located within housing 542 of shell segment separator apparatus 540 as depicted in FIG. 60. Although the depicted actuators provide translational motion to separate adjacent shell segments, rotary motion could be used, especially if the rotary motion is relative to an axis of rotation displaced far enough away from the processing axis 511 that results, functionally, in motion that approximates linear movement along the processing axis 511 at the location where the shell segments are separated as described herein.

FIG. 61 is a schematic block diagram depicting one control system that may be used in connection with the shell segment separator apparatus 540 depicted in FIG. 60. The control system includes a controller 590 and a conveying system 592 operably connected to the controller 590. As mentioned herein, the conveying system 592 can be used to move shrimp into and out of the selected location relative to the shell segment separator apparatus 540. The controller 590 is also operably connected to the first retainer actuator 555 the second retainer actuator 565 and a separation actuator 575.

The first retainer actuator 555 is provided to move the first shell segment retainer 550 between its ready configuration and its retention configuration. The second retainer actuator 565 is provided to move the second shell segment retainer 560 between its ready configuration and its retention configuration. The separation actuator 575 is provided to move the second shell segment retainer 560 between its initial position and a separation position after operating the first retainer actuator 555 to move the first shell segment retainer 550 from its ready configuration to its retention configuration and after operating the second retainer actuator 565 to move the second shell segment retainer 560 from its ready configuration to its retention configuration. In the depicted illustrative embodiment, the separation actuator 575 moves the separation shuttle 570 on which the second shell segment retainer is located to move the second shell segment retainer 560 between its initial position and its separation position.

Figure 62:
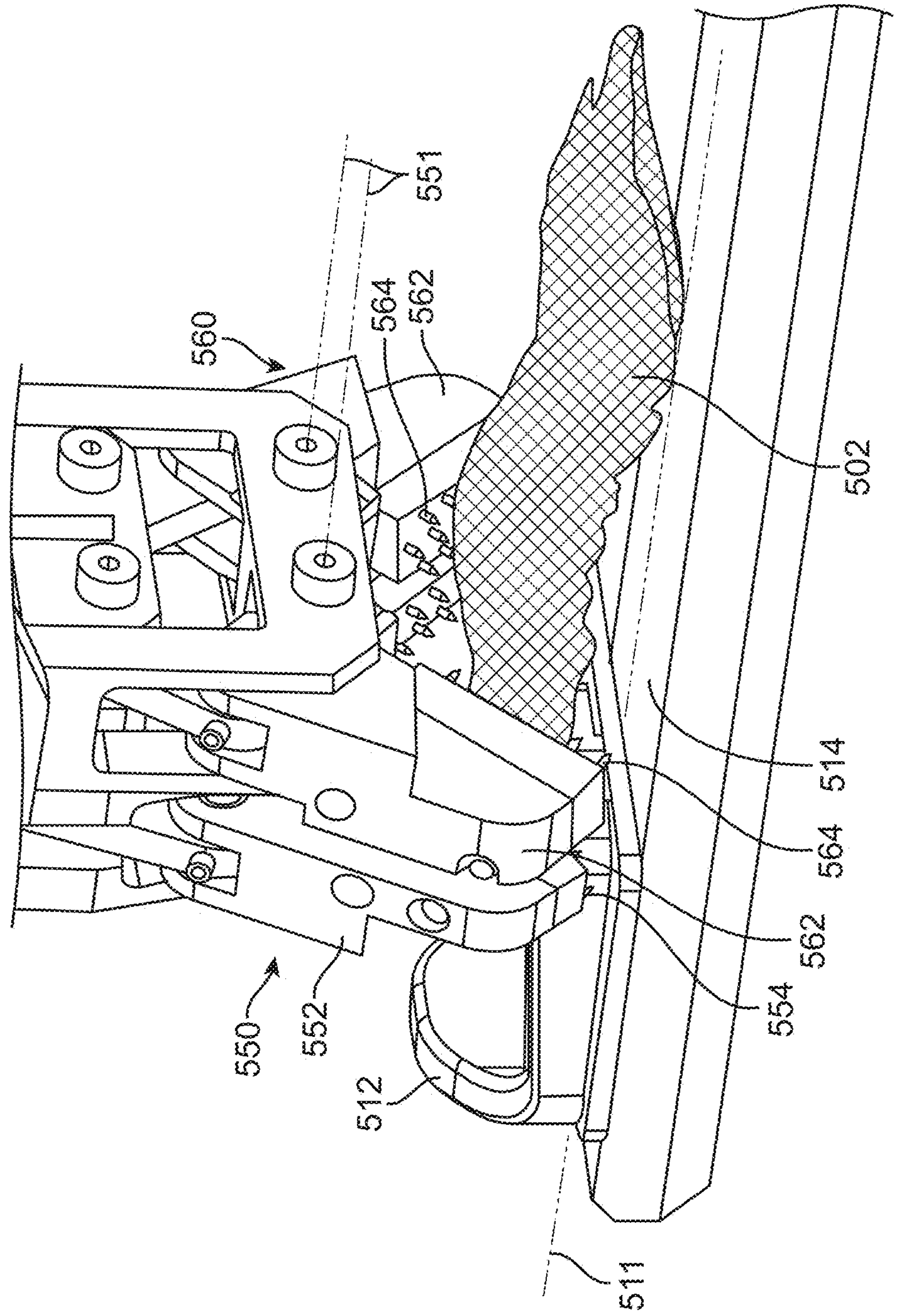
FIGS. 62 and 63 are enlarged perspective views of the shell segment separator apparatus of FIG. 60 with the first and second shell segment retainers in the ready configuration.
Figure 63:
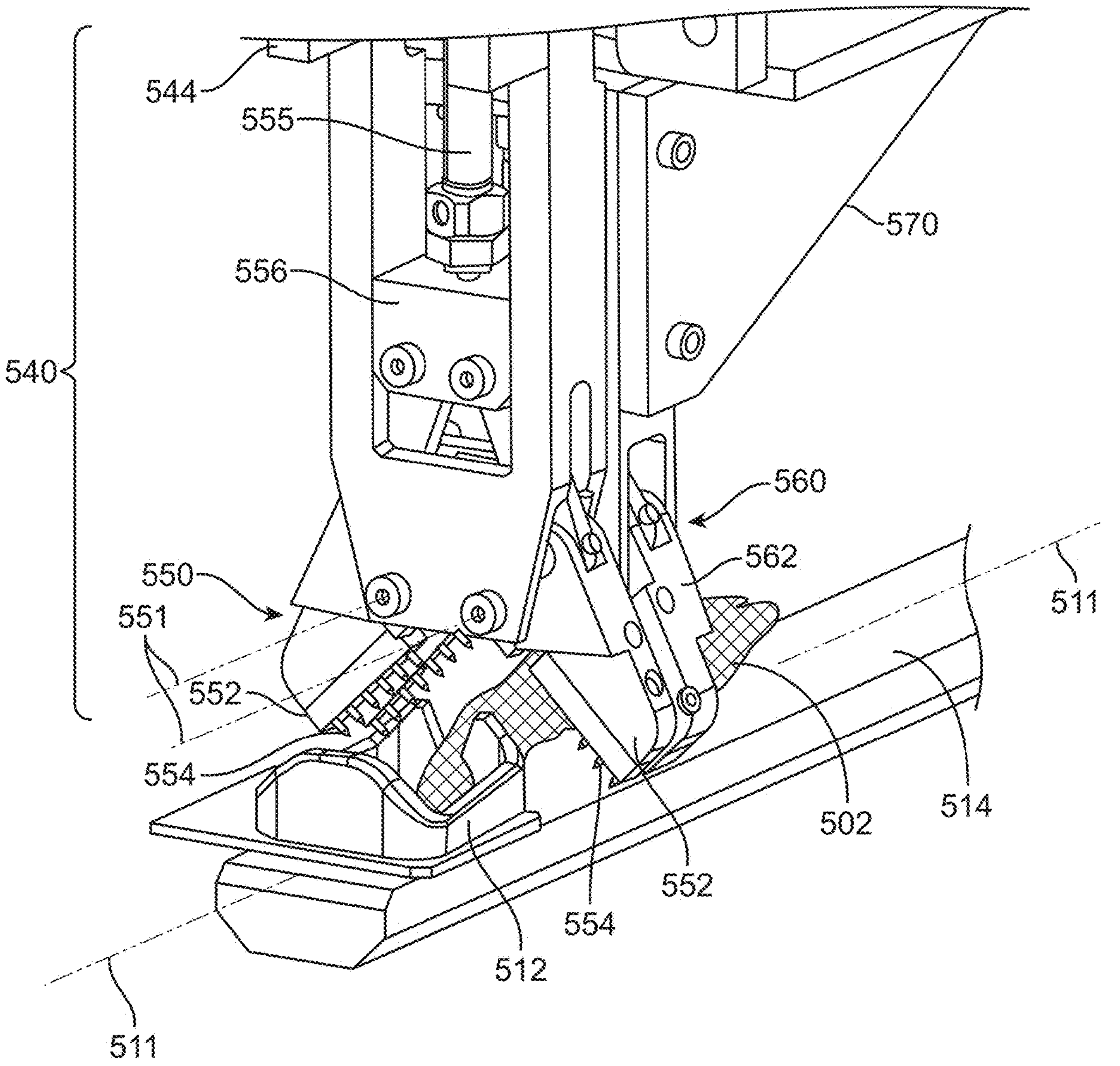

FIGS. 62 and 63 are enlarged perspective views of the shell segment separator apparatus of FIG. 60 with the first and second shell segment retainers 550 and 560 in their respective ready configurations. As depicted in the figures, a shrimp 502 is restrained in a clamp 512 in a selected location on working surface 514, with the shrimp up 02 aligned along the processing axis 511.

In the depicted illustrative embodiment, the first shell segment retainer 550 includes a pair of jaws 552 that are configured to rotate about axes 551. Each of the jaws 552 includes one or more pins 554 that are configured to pierce an abdominal shell segment of the shrimp 502 when moved to their retention configuration as described herein. Although both jaws 552 includes pins 554, it should be understood that in one or more alternative embodiments, pins may not be located on both jaws 552 of a first shell segment retainer 550 of a shell segment separator apparatus as described herein.

With reference to FIG. 63, a first retainer actuator 555 is depicted and is configured to move a shuttle 556 relative to the carriage 544 to rotate jaws 552 about their respective axes 551. Although the depicted first retainer actuator 555 is in the form of a pneumatic cylinder, any of the actuators described herein may take any suitable form including, for example, electric motors, hydraulic motors, pistons (hydraulic and/or pneumatic), solenoids, etc. Similarly, the second shell segment retainer 560 includes a pair of jaws 562 that are configured to rotate about axes 551. Each of the jaws 562 also includes one or more pins 564 that are configured to pierce an abdominal shell segment of a shrimp 502 when moved to their retention configuration as described herein. Again, although both jaws 562 include pins 564, it should be understood that in one or more alternative embodiments, pins may not be located on both jaws 562 of a second shell segment retainer 560 of a shell segment separator apparatus as described herein.

While first shell segment retainer 550 is fixed in position relative to the carriage 544, the second shell segment retainer 560 is mounted on separation shuttle 570 for movement relative to the first shell segment retainer 560 and carriage 544. As described herein, the first shell segment retainer 550 and second shell segment retainer 560 are mounted on carriage 544 for movement along the processing axis 511. Movement of the carriage 544 moves the first and second shell segment retainers 550 and 560 relative to the clamp 512 restraining shrimp 502 on working surface 514 so that the first shell segment retainer 550 and second shell segment retainer 560 can be properly positioned with the junction of a pair of adjacent shell segments located between the first shell segment retainer 550 and second shell segment retainer 560.

Proper positioning of the shell segment separator apparatus 540 relative to the clamp 512 and/or shrimp 502 on working surface 514 may be achieved using, in one or more embodiments, data from a measurement apparatus as described herein, with the general location of the selected junction between adjacent shell segments being determined based on the size of each shrimp.

Figure 64:
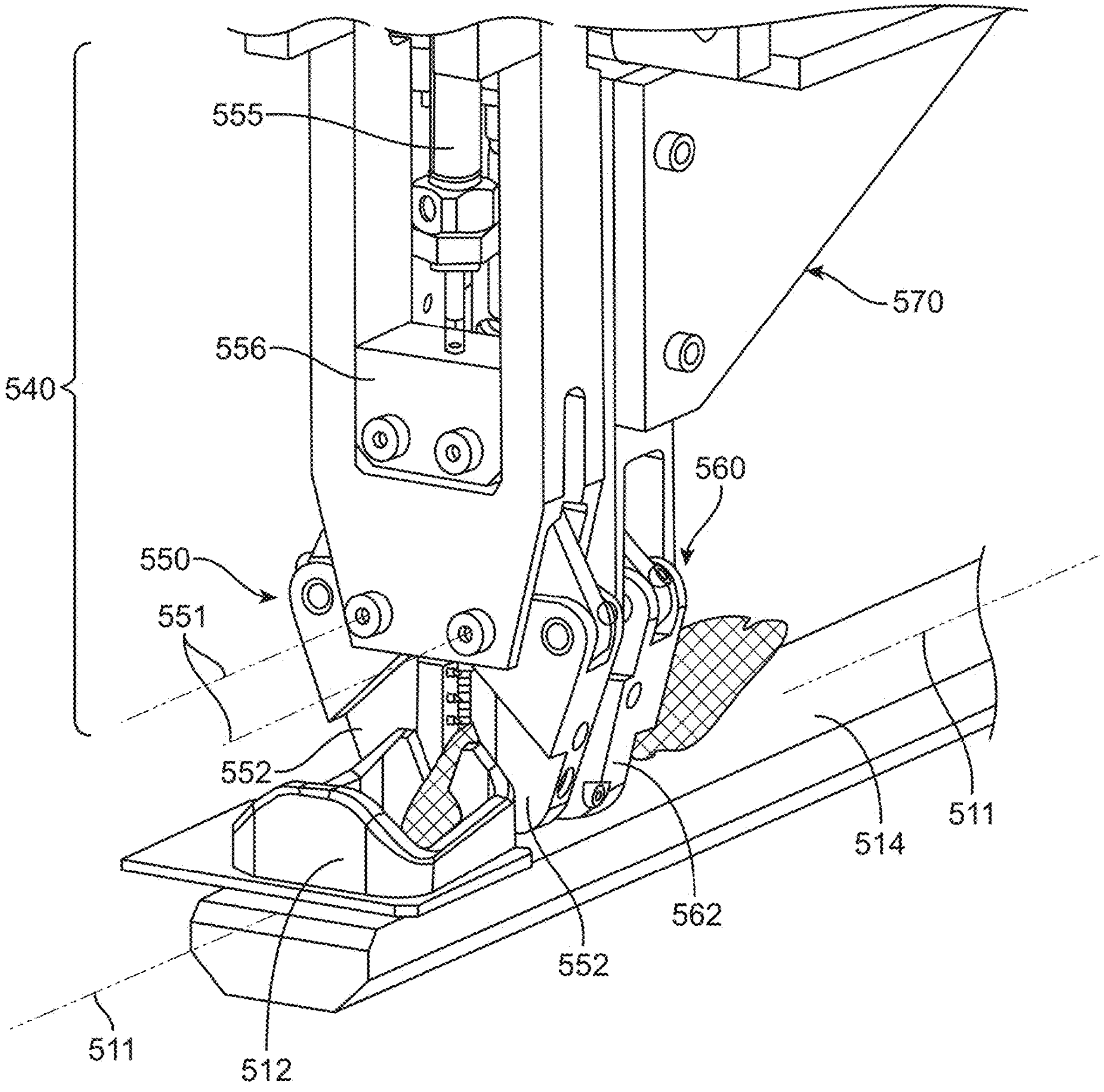
FIG. 64 is an enlarged perspective view of the shell segment separator apparatus of FIG. 63 with the first and second shell segment retainers in the retention configuration.

FIG. 64 is an enlarged perspective view of the shell segment separator apparatus of FIG. 63 with the first and second shell segment retainers 550 and 560 in their respective retention configurations. With respect to the illustrative embodiments of the first and second shell segment retainers 550 and 560, the retention configurations of both shell segment retainers involves rotation of their respective jaws from the ready configurations seen in FIGS. 62-63 to the retention configurations seen in FIG. 64. In particular, the jaws 552 of first shell segment retainer 550 and jaws 562 of the second shell segment retainer 560 are located farther apart when in their respective ready configurations than when in their respective retention configurations (see, for example, FIG. 64).

Although both jaws 552 of first shell segment retainer 550 and both jaws 562 of the second shell segment retainer 560 rotate when moving between their respective ready configurations and retention configurations, in one or more alternative embodiments, the respective retainer actuators used to move the shell segment retainers between their ready and retention configurations make the jaw of one or both of the first shell segment retainer 550 and second shell segment retainer 560.

With reference to the depicted illustrative embodiments of the first shell segment retainer 550 and second shell segment retainer 560, the first shell segment retainer 550 and the second shell segment retainer 560 may both be described as being located closer to the working surface 514 when in their respective retention configurations than when in their respective ready configurations.

Referring to FIGS. 62-64, the differences between the ready configuration and retention configuration for the first shell segment retainer 550 may be described as follows: the first shell segment retainer 550 is configured to allow for positioning of a shrimp (for example, shrimp 502) between the first shell segment retainer 550 and the working surface 514 when the first shell segment retainer 550 is in the ready configuration as seen in FIGS. 62-63. Further, the first shell segment retainer 550 is configured to retain the first shell segment of a shrimp (for example, shrimp 502) located between the first shell segment retainer 550 and the working surface 514 in a selected location on the working surface when the first shell segment retainer 550 is in its retention configuration as seen in FIG. 64. With respect to the depicted illustrative embodiment of first shell segment retainer 550, it can be seen that positioning of a shrimp (for example, shrimp 502) between the first shell segment retainer 550 and the working surface 514 when the first shell segment retainer 550 is in its retention configuration as seen in FIG. 64 would be difficult, if not impossible.

Again referring to FIGS. 62-64, the differences between the ready configuration and the retention configuration for the second shell segment retainer 560 may be described as follows: the second shell segment retainer is configured to allow for positioning of a shrimp (for example, shrimp 502) between the second shell segment retainer 560 and the working surface 514 when the second shell segment retainer 560 is in the ready configuration as seen in FIGS. 62-63. Further, the second shell segment retainer 560 is configured to retain a second shell segment of a shrimp (for example, shrimp 502) located between the second shell segment retainer 560 and the working surface 514 in a selected location relative to the second shell segment retainer 560 when the second shell segment retainer is in its retention configuration as seen in FIG. 64. With respect to the depicted illustrative embodiment of the second shell segment retainer 560 it can be seen that positioning of a shrimp (for example, shrimp 502) between the second shell segment retainer 560 and the working surface 514 when the second shell segment retainer 560 is in its retention configuration as seen in FIG. 64 would be difficult, if not impossible.

Figure 65:
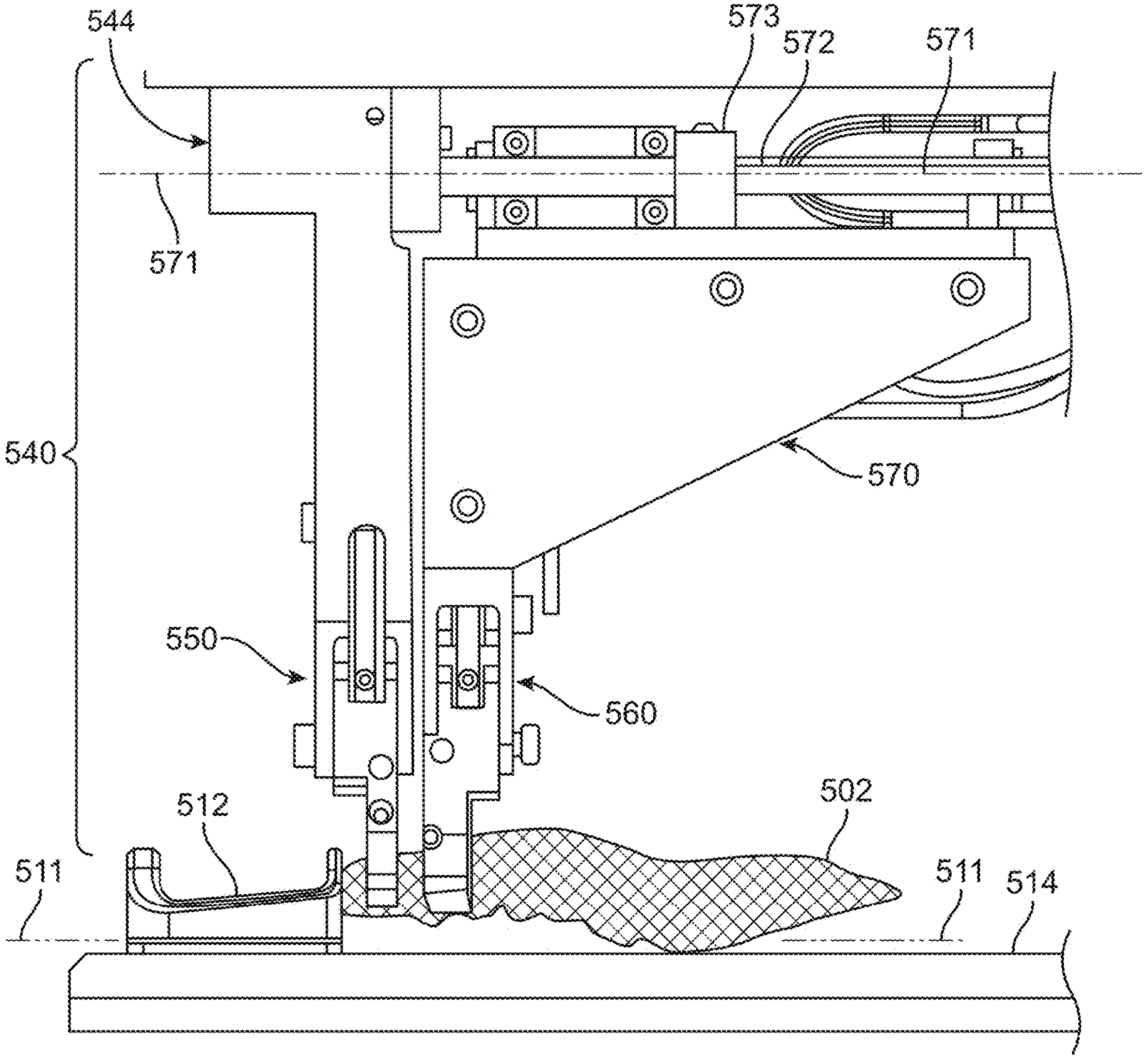
FIG. 65 is a side view of the shell segment separator apparatus of FIG. 64, with the second shell segment retainer in the initial position.

Operation of the depicted illustrative embodiment of shell segment separator apparatus 540 can be discussed with reference to FIGS. 65-66. FIG. 65 is a side view of the shell segment separator apparatus of FIG. 64, with the second shell segment retainer 560 in its initial position, while FIG. 66 is a side view of the shell segment separator apparatus 540 of FIG. 64 after the second shell segment retainer 560 has been moved from the initial position to the separation position.

Figure 66:
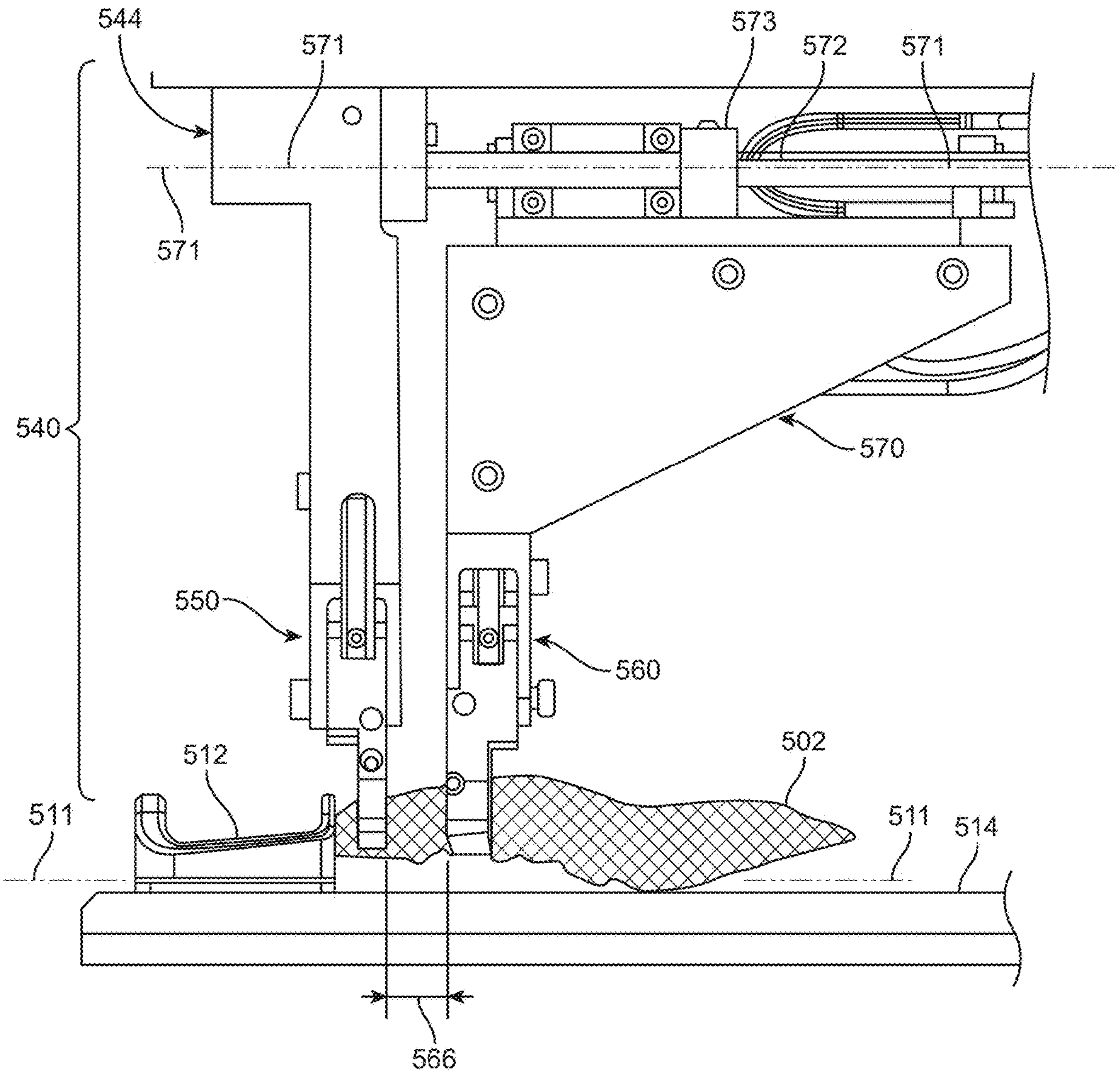
FIG. 66 is a side view of the shell segment separator apparatus of FIG. 64 after the second shell segment retainer has been moved from the initial position to the separation position.

In the depicted illustrative embodiment of shell segment separator apparatus 540, a separation actuator is used to move the second shell segment retainer 560 from the initial position seen in FIG. 65 to the separation position seen in FIG. 66. The second shell segment retainer 560 is located further away from the first shell segment retainer 550 when the second shell segment retainer 560 is in the separation position seen in FIG. 66 than when the second shell segment retainer 560 is in the initial position seen in FIG. 65. As seen in FIGS. 65-66, the second shell segment retainer 560 may also be described as moving away from the clamp 512 retaining a shrimp 502 in a selected location relative to the shell segment separator apparatus 540. The second shell segment retainer 560, in the depicted illustrative embodiment, moves along the processing axis 511 when moving between its initial position and separation position, with the first shell segment retainer 550 and the second shell segment retainer 560 being aligned on the processing 511.

As described herein, the separation actuator moves the second shell segment retainer 560 from its initial position to its separation position after operating the first shell segment retainer 550 from its ready configuration to its retention configuration and after operating the second retainer actuator to move the second shell segment retainer 560 from its ready configuration to its retention configuration. In one or more embodiments, the initial position and the separation position may be separated from each other along the processing axis 511 by a selected separation distance 566 (see FIG. 66).

As a result, movement of the second shell segment retainer 560 to its separation position moves the shell segment retained by the second shell segment retainer 560 away from the shell segment retained by the first shell segment retainer 550, thereby separating the two shell segments as discussed herein. That separation or movement between the two adjacent shell segments breaks or severs connections between the adjacent shell segments to allow for clean separation at the junction between the two adjacent shell segments as described herein. Separation of the adjacent shell segments is not intended to remove the adjacent shell segments from the abdomen of the shrimp. Rather, the shell segments remain attached to the abdomen of the shrimp after separation using the shell segment separation apparatus described herein.

In one or more embodiments, the positions of the first shell segment retainer 550 and the second shell segment retainer 560 can be described relative to the clamp 512 used to restrain a shrimp in the selected location relative to the shell segment separator apparatus 540. For example, the first shell segment retainer 550 may be described as being located between the second shell segment retainer 560 and the clamp 512 along the processing axis 511. In one or more embodiments, the first shell segment retainer 550 may preferably be held stationary or in a fixed position relative to the clamp 512 while the second shell segment retainer 560 is movable relative to both the first shell segment retainer 550 and the clamp 512 (using, in the depicted illustrative embodiment, the second retainer shuttle 570). In one or more alternative embodiments, however, the first shell segment retainer 550 may also move relative to the clamp 512 and/or the second shell segment retainer 560.

Although the illustrative embodiment of the shell segment separator apparatus depicted in FIGS. 60 and 62-66 includes shell segment retainers having jaws that move between the ready and retention configurations, shell segment separator apparatus described herein may not include movable jaws. FIGS. 67-70 depict one alternative illustrative embodiment of a shell segment separator apparatus that does not include movable jaws.

Figure 67:
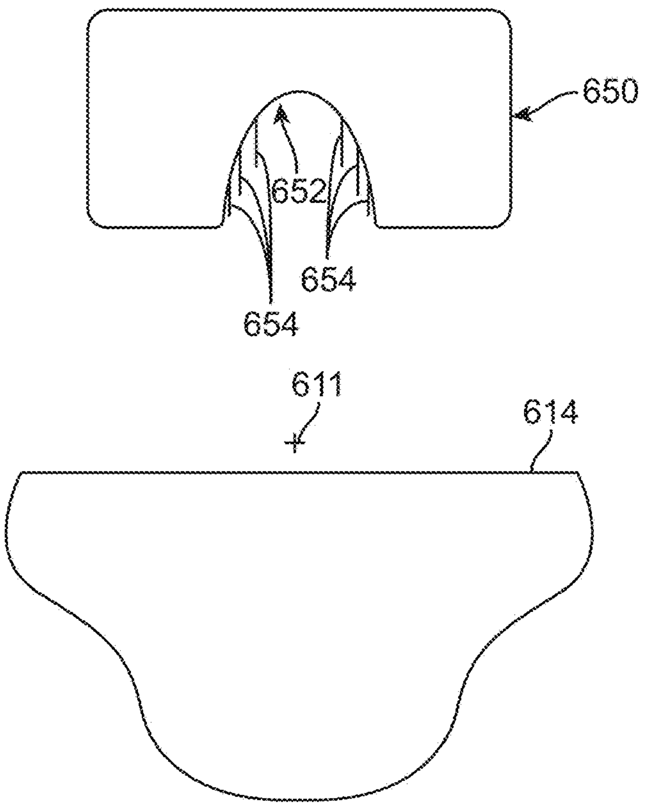
FIG. 67 depicts another illustrative embodiment of a shell segment separator apparatus that may be used in one or more embodiments of a shrimp processing system as described herein in which the depicted shell segment retainer is in the ready configuration, the view being taken along a processing axis passing through the shell segment separator apparatus.

The shell segment separator apparatus depicted in FIGS. 67-70 includes shell segment retainers 650 and 660 positioned opposite (e.g., above) a working surface 614 along which a processing axis 611 extends. Because the shell segment retainers 650 and 660 are aligned along the processing axis 611, only shell segment retainer 650 is visible in FIGS. 67 and 68. In FIG. 67, the shell segment retainers 650 and 660 are in the ready configuration in which the shell segment retainers 650 and 660 are spaced apart from the working surface 614 by a distance sufficient to allow for positioning of a shrimp between the shell segment retainers 650 and 660 and the working surface 614.

Figure 68:
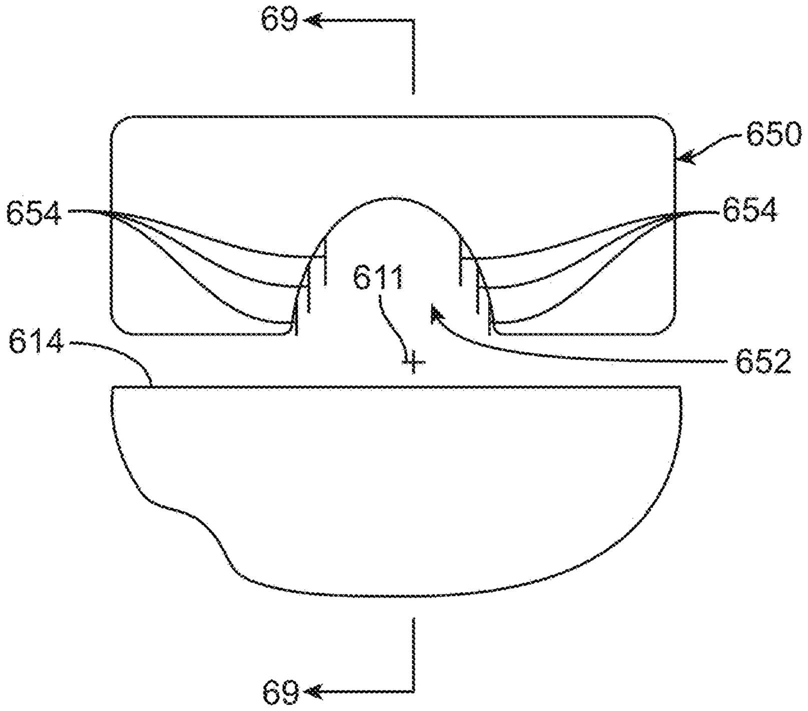
FIG. 68 depicts the shell segment separator apparatus of FIG. 67 with the depicted shell segment retainer in the retention configuration.
Figure 69:
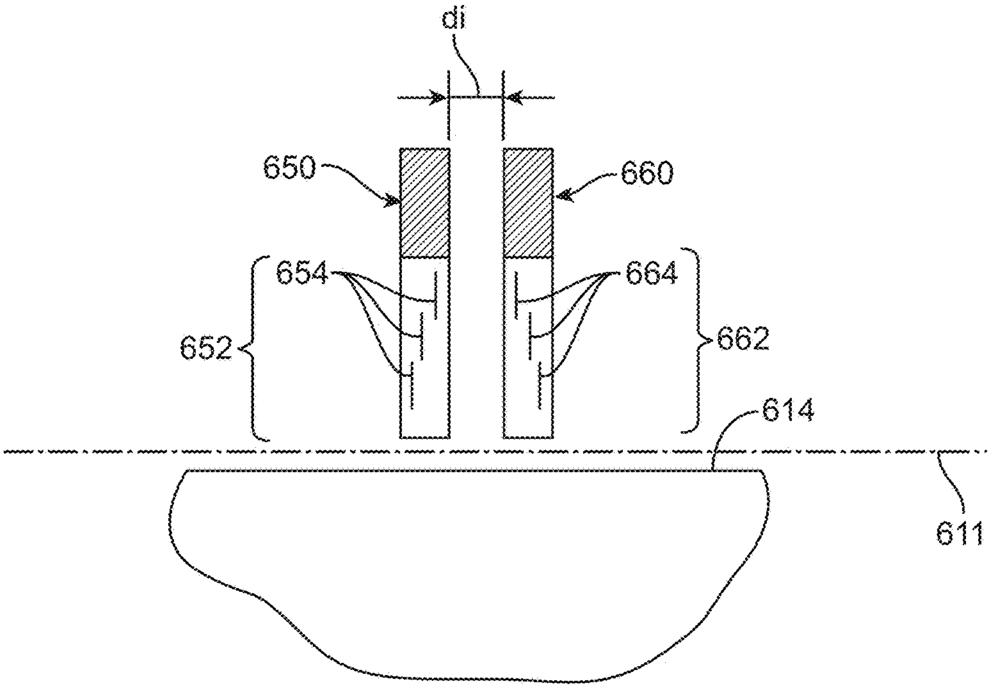
FIG. 69 is a cross-sectional view of the shell segment separator apparatus of FIG. 68 taken along line 69-69 in FIG. 68 with the first and second shell segment retainers in an initial position.
Figure 70:
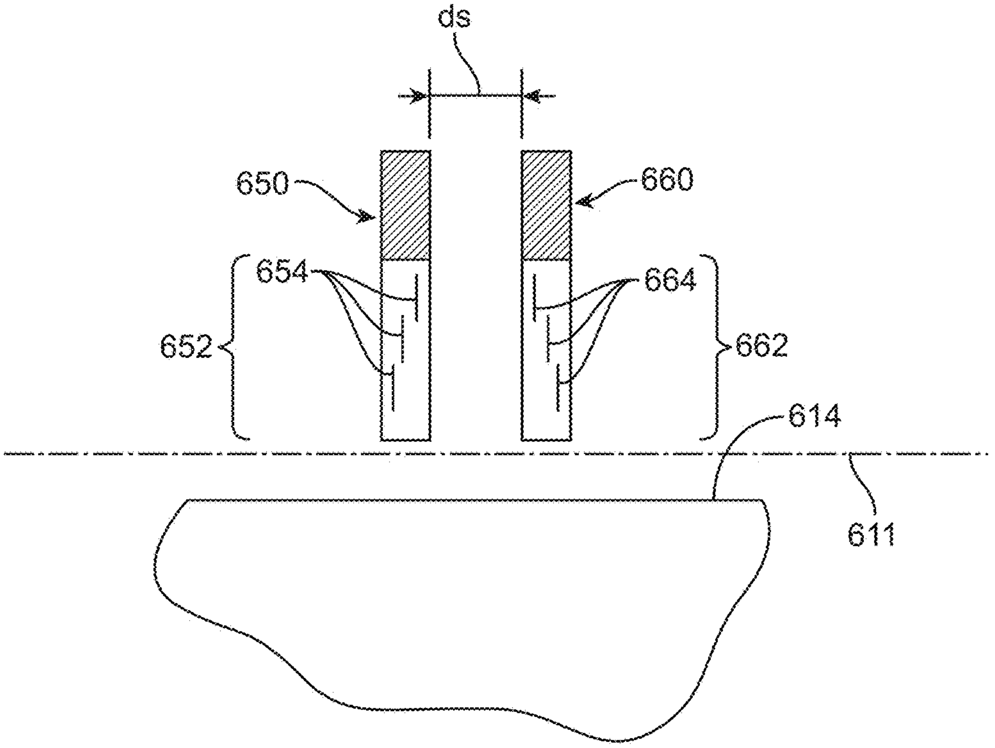
FIG. 70 is a view of the shell segment separator apparatus of FIG. 69 with the first and second shell segment retainers moved to a separation position.

In contrast, the shell segment retainers 650 and 660 are in their retention configurations in FIGS. 68-70 such that shell segments of a shrimp positioned between the shell segment retainers 650 and 660 and the working surface 614 in a selected location on the working surface 614 are retained in the selected location. In the depicted embodiment, the shell segment retainers 650 and 660 are located closer to the working surface 614 in their retention configurations than when the shell segment retainers are in their ready configurations.

The depicted illustrative embodiment of shell segment retainer 650 as depicted in FIGS. 67-70 includes a notch 652 configured to receive the abdomen of a shrimp such that the notch rests on or faces the dorsal surface of a shrimp in the selected location on working surface 614 with its ventral surface facing or resting on the working surface 614. Similarly, the depicted illustrative embodiment of shell segment retainer 660 as depicted in FIGS. 69-70 includes a notch 662 configured to receive the abdomen of a shrimp such that the notch 662 rests on or faces the dorsal surface of a shrimp in the selected location on working surface 614 with its ventral surface facing or resting on the working surface 614.

The illustrative embodiment of shell segment retainer 650 as depicted in FIGS. 67-70 also includes pins 654 positioned in the notch 652 such that the pins engage (e.g., pierce) a shell segment on the dorsal surface of a shrimp in the selected location on working surface 614 with its ventral surface facing or resting on the working surface 614. Similarly, the depicted illustrative embodiment of shell segment retainer 660 as depicted in FIGS. 69-70 also includes pins 664 positioned in the notch 662 such that the pins 664 engage (e.g., pierce) a shell segment on the dorsal surface of a shrimp in the selected location on working surface 614 with its ventral surface facing or resting on the working surface 614.

The cross-sectional views of FIGS. 69-70 can be used to describe movement of the shell segment retainers 650 and 660 from the initial position (see, e.g., FIG. 69) to the separation position (see, e.g., FIG. 70). In particular, the shell segment retainers 650 and 660 are closer together when in the initial position of FIG. 69 than when in the separation position of FIG. 70. In other words, the distance di between the shell segment retainers 650 and 660 in the initial position of FIG. 69 is less than the distance ds between the shell segment retainers 650 and 660 in the separation position of FIG. 70 (or, conversely, the distance ds between the shell segment retainers 650 and 660 in the separation position of FIG. 70 is greater than the distance di between the shell segment retainers 650 and 660 in the initial position of FIG. 69. Although not depicted, it should be understood that yet another illustrative embodiment of a shell segment separator apparatus could include one shell segment retainer having movable jaws as depicted in, e.g., FIGS. 60 and 62-66 and one shell segment retainer including a notch and pins as depicted in, e.g., FIGS. 67-70.

In terms of methods, shell segment separation may involve separating adjacent shell segments on an abdomen of a shrimp (for example, shrimp 502), with the method including retaining a first shell segment on an abdomen of a shrimp in a fixed location relative to a processing axis (for example, a processing axis 511), moving a second shell segment on the abdomen of the shrimp away from the first shell segment in a direction aligned with the processing axis while retaining the first shell segment in the fixed location. Moreover, the first and second shell segments remain attached to the abdomen of the shrimp after separation of the adjacent shell segments.

In one or more embodiments of the shell segment separation as described herein, the adjacent shell segments may be described as the rearmost abdominal shell segment of the shrimp (that is, the shell segment closest to the tail of the shrimp) and the adjacent shell segment located on the opposite side of the rearmost abdominal shell segment. In terms of shrimp having, for example, six abdominal shell segments, the rearmost abdominal shell segment would be the sixth shell segment, while the adjacent or second abdominal shell segment would be the fifth shell segment. In the depicted illustrative embodiment, the shell segment separator apparatus 540 holds the sixth shell segment in a fixed location using the first shell segment retainer 550 while the shell segment separator apparatus 540 moves the fifth shell segment away from the sixth shell segment using the second shell segment retainer 560.

Although the shell segment separator apparatus and methods of using the same may preferably involve separation of the rearmost and adjacent shell segments, alternative embodiments of the shell segment separator apparatus and methods described herein may involve separation of any adjacent pair of shell segments on shrimp processed using the shrimp processing systems described herein.

Illustrative Aspects

Following are illustrative aspects of the shrimp heading and/or deveining apparatus and methods described herein.

In independent aspect F1, one or more embodiments of a shrimp processing apparatus comprise: a lower roller assembly comprising a first lower roller, a second lower roller, and a lower roller assembly drive operably connected to the first and second lower rollers, wherein the lower roller assembly drive is configured to rotate the first lower roller about a first lower roller axis and rotate the second lower roller about the second lower roller axis, wherein the first lower roller axis is aligned with the second lower roller axis; an upper assembly; a roller shuttle configured to move one or both of the lower roller assembly and the upper assembly between a receiving position and an operating position, wherein the lower roller assembly and the upper assembly are located farther from each other in a direction transverse to the first lower roller axis and the first upper roller axis when the lower roller assembly and the upper assembly are in the receiving position than when the lower roller assembly and the upper assembly are in the operating position; and a controller operably connected to the lower roller assembly drive and the roller shuttle, the controller configured to: operate the roller shuttle to move one or both of the lower roller assembly and the upper assembly between the receiving position and the operating position; operate the lower roller assembly drive to rotate the first lower roller about the first lower roller axis over a first capture arc and rotate the second lower roller about the second lower roller axis over a second capture arc, wherein the first lower roller and second lower roller rotate in opposite directions over their respective capture arcs; operate the roller shuttle to move the lower roller assembly and the upper assembly from the receiving position to the operating position after rotating the first lower roller and second lower roller in opposite directions over their respective capture arcs; and operate the lower roller assembly drive to rotate the first lower roller about the first lower roller axis over a first removal arc and rotate the second lower roller about the second lower roller axis over a second removal arc, wherein the first lower roller and the second lower roller rotate in opposite directions over their respective removal arcs while the lower roller assembly and the upper assembly are in the operating position.

In aspect F2 according to aspect F1, the first lower roller comprises a first lower roller outer surface comprising raised features that define a first inner diameter and a first outer diameter, wherein the second lower roller comprises a second lower roller outer surface comprising raised features that define a second inner diameter and a second outer diameter, wherein the first and second lower roller outer surfaces overlap between the first and second lower rollers such that the second outer diameter is located between the first inner and outer diameters between the first and second lower rollers.

In aspect F3 according to any one of aspects F1 to F2, the first lower roller comprises a plurality of ribs extending outward away from the first lower roller axis, wherein the plurality of ribs extend along a length of the first lower roller. In aspect F4 according to aspect F3, the plurality of ribs extend along the length of the first roller in a direction aligned with the first lower roller axis. In aspect F5 according to any one of aspects F3 to F4, the plurality of ribs are constructed of a resilient elastomeric material.

In aspect F6 according to any one of aspects F1 to F5, the second lower roller comprises a second plurality of ribs extending outward away from the second lower roller axis, wherein the second plurality of ribs extend along a length of the second lower roller. In aspect F7 according to aspect F6, the second plurality of ribs extend along the length of the second roller in a direction aligned with the second lower roller axis. In aspect F8 according to any one of aspects F6 to F7, the second plurality of ribs are constructed of a resilient elastomeric material.

In aspect F9 according to any one of aspects F1 to F8, the capture arc is equal to or smaller than the removal arc.

In aspect F10 according to any one of aspects F1 to F9, the roller shuttle comprises a force-limited drive configured to stop movement of the lower roller assembly and the upper assembly from the receiving position to the operating position when the upper assembly contacts a shrimp located between the upper assembly and the lower roller assembly.

In aspect F11 according to any one of aspects F1 to F10, the roller shuttle moves the upper assembly when moving the lower roller assembly and the upper assembly from the receiving position to the operating position.

In aspect F12 according to any one of aspects F1 to F11, the controller is configured to operate the roller shuttle to move the lower roller assembly and the upper assembly to the receiving position from the operating position after operating the lower roller assembly drive to rotate the first lower roller about the first lower roller axis over the first capture arc and rotate the second lower roller about the second lower roller axis over the second capture arc. In aspect F13 according to aspect F12, the controller is configured to operate the lower roller assembly drive to rotate the first lower roller about the first lower roller axis over the first removal arc and to rotate the second lower roller about the second lower roller axis over the second removal arc after operating the roller shuttle to move the lower roller assembly and the upper assembly to the receiving position from the operating position.

In aspect F14 according to any one of aspects F1 to F13, the first lower roller and the second lower roller each extend from a tail end to a head end along the first and second lower roller axes, and wherein the apparatus comprises a working surface located adjacent the tail ends of the first and second lower rollers, wherein the working surface adjacent the tail ends of the first and second rollers is offset from the tail ends of the first and second lower rollers such that the tail end of the first lower roller is located closer to the upper assembly than the working surface as measured in a direction transverse to the first lower roller axis, and wherein the tail end of the second lower roller is located closer to the upper assembly than the working surface as measured in a direction transverse to the second lower roller axis.

In aspect F15 according to any one of aspects F1 to F14, the first lower roller and the second lower roller each extend from a tail end to a head end along the first and second lower roller axes, and wherein the apparatus further comprises: a working surface located adjacent the tail ends of the first and second lower rollers, the working surface; and a compression arm configured to move between a raised position and a compression position, wherein the compression arm comprises a working end located closer to the working surface when the compression arm is in the compression position than when the compression arm is in the raised position. In aspect F16 according to aspect F15, the compression arm is operably connected to the roller shuttle such that the compression arm is in the raised position when the lower roller assembly and the upper assembly are in the receiving position, and wherein the compression arm is in the compression position when the lower roller assembly and the upper assembly are in the operating position.

Independent aspect F17 comprises a method of processing shrimp to remove pleopods and/or swimmerets from shrimp using the apparatus of any one of aspects F1 to F16.

In independent aspect H1, one or more embodiments of a method of removing pleopods from a shrimp comprise: capturing a plurality of pleopods attached to an abdomen of a shrimp between a first lower roller and a second lower roller by rotating each of the first and second lower rollers over a capture arc, wherein the first and second lower rollers are rotated in opposite directions; contacting the abdominal shell segments of the shrimp with an upper assembly after rotating the first and second lower rollers over their respective capture arcs; and rotating the first lower roller over a first removal arc and rotating the second lower roller over a second removal arc after contacting the abdominal shell segments of the shrimp with the upper assembly, wherein the first lower roller and the second lower roller rotate in opposite directions over their respective removal arcs.

In aspect H2 according to aspect H1, the capturing comprises capturing a majority of the pleopods on the shrimp, and wherein rotating the first and second lower rollers about their removal arcs removes the majority of pleopods from the shrimp.

In aspect H3 according to any one of aspects H1 to H2, the method comprises moving the shrimp into a peeling position between the first and second lower rollers before rotating each of the first and second lower rollers over their respective capture arcs.

In aspect H4 according to any one of aspects H1 to H3, before capturing the plurality of pleopods, the method comprises aligning the plurality of pleopods attached to the abdomen of the shrimp such that the plurality of pleopods extend away from the tail of the shrimp. In aspect H5 according to aspect H4, aligning the plurality of pleopods comprises sliding the shrimp over a plurality of bristles before the shrimp is located between the first and second lower rollers.

Any references and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A shrimp processing apparatus comprising:

a lower roller assembly comprising a first lower roller, a second lower roller, and a lower roller assembly drive operably connected to the first and second lower rollers, wherein the lower roller assembly drive is configured to rotate the first lower roller about a first lower roller axis and rotate the second lower roller about a second lower roller axis, wherein the first lower roller axis is aligned with the second lower roller axis;

an upper assembly;

a roller shuttle configured to move one or both of the lower roller assembly and the upper assembly between a receiving position and an operating position, wherein the lower roller assembly and the upper assembly are located farther from each other in a direction transverse to the first lower roller axis when the lower roller assembly and the upper assembly are in the receiving position than when the lower roller assembly and the upper assembly are in the operating position; and a controller operably connected to the lower roller assembly drive and the roller shuttle, the controller configured to:

operate the roller shuttle to move one or both of the lower roller assembly and the upper assembly between the receiving position and the operating position;

operate the lower roller assembly drive to rotate the first lower roller about the first lower roller axis over a first capture arc and rotate the second lower roller about the second lower roller axis over a second capture arc, wherein the first lower roller and second lower roller rotate in opposite directions over their respective capture arcs;

operate the roller shuttle to move the lower roller assembly and the upper assembly from the receiving position to the operating position after rotating the first lower roller and second lower roller in opposite directions over their respective capture arcs; and operate the lower roller assembly drive to rotate the first lower roller about the first lower roller axis over a first removal arc and rotate the second lower roller about the second lower roller axis over a second removal arc, wherein the first lower roller and the second lower roller rotate in opposite directions over their respective removal arcs while the lower roller assembly and the upper assembly are in the operating position.

2. A shrimp processing apparatus according to claim 1, wherein the capture arc is equal to or smaller than the removal arc.

3. A shrimp processing apparatus according to claim 1, wherein the first lower roller comprises a first lower roller outer surface comprising raised features that define a first inner diameter and a first outer diameter, wherein the second lower roller comprises a second lower roller outer surface comprising raised features that define a second inner diameter and a second outer diameter, wherein the first and second lower roller outer surfaces overlap between the first and second lower rollers such that the second outer diameter is located between the first inner and outer diameters between the first and second lower rollers.

4. A shrimp processing apparatus according to claim 1, wherein the first lower roller comprises a plurality of ribs extending outward away from the first lower roller axis, wherein the plurality of ribs extend along a length of the first lower roller.

5. A shrimp processing apparatus according to claim 4, wherein the plurality of ribs extend along the length of the first roller in a direction aligned with the first lower roller axis.

6. A shrimp processing apparatus according to claim 4, wherein the second lower roller comprises a second plurality of ribs extending outward away from the second lower roller axis, wherein the second plurality of ribs extend along a length of the second lower roller.

7. A shrimp processing apparatus according to claim 6, wherein the second plurality of ribs extend along the length of the second roller in a direction aligned with the second lower roller axis.

8. A shrimp processing apparatus according to claim 1, wherein the roller shuttle comprises a force-limited drive configured to stop movement of the lower roller assembly and the upper assembly from the receiving position to the operating position when the upper assembly contacts a shrimp located between the upper assembly and the lower roller assembly.

9. A shrimp processing apparatus according to claim 1, wherein the roller shuttle moves the upper assembly when moving the lower roller assembly and the upper assembly from the receiving position to the operating position.

10. A shrimp processing apparatus according to claim 1, wherein the controller is configured to operate the roller shuttle to move the lower roller assembly and the upper assembly to the receiving position from the operating position after operating the lower roller assembly drive to rotate the first lower roller about the first lower roller axis over the first capture arc and rotate the second lower roller about the second lower roller axis over the second capture arc.

11. A shrimp processing apparatus according to claim 10, wherein the controller is configured to operate the lower roller assembly drive to rotate the first lower roller about the first lower roller axis over the first removal arc and to rotate the second lower roller about the second lower roller axis over the second removal arc after operating the roller shuttle to move the lower roller assembly and the upper assembly to the receiving position from the operating position.

12. A shrimp processing apparatus according to claim 1, wherein the first lower roller extends from a tail end to a head end along the first lower roller axis and the second lower roller extends from a tail end to a head end along the second lower roller axis, and wherein the apparatus comprises a working surface located adjacent the tail end of the first lower roller, wherein the working surface adjacent the tail end of the first roller is offset from the tail end of the first lower roller such that the tail end of the first lower roller is located closer to the upper assembly than the working surface as measured in a direction transverse to the first lower roller axis.

13. A shrimp processing apparatus according to claim 1, wherein the apparatus further comprises:

a working surface located proximate the first lower roller and the second lower roller; and a compression arm configured to move between a raised position and a compression position, wherein the compression arm comprises a working end located closer to the working surface, the first lower roller, and the second lower roller when the compression arm is in the compression position than when the compression arm is in the raised position.

14. A shrimp processing apparatus according to claim 13, wherein the compression arm is operably connected to the roller shuttle such that the compression arm is in the raised position when the lower roller assembly and the upper assembly are in the receiving position, and wherein the compression arm is in the compression position when the lower roller assembly and the upper assembly are in the operating position.

15. A method of removing pleopods from a shrimp, the method comprising:

capturing a plurality of pleopods attached to an abdomen of a shrimp between a first lower roller and a second lower roller by rotating the first lower roller about a first lower roller axis extending through the first lower roller in a first direction over a first capture arc and rotating the second lower roller about a second lower roller axis in a second direction over a second capture arc, wherein the first direction and the second direction are opposite directions;

contacting the abdominal shell segments of the shrimp with an upper assembly after rotating the first lower roller over the first capture arc and rotating the second lower roller over the second capture arc; and rotating the first lower roller about the first lower roller axis in the first direction over a first removal arc and rotating the second lower roller about the second lower roller axis over a second removal arc after contacting abdominal shell segments on a dorsal surface of the shrimp with the upper assembly, wherein the first lower roller and the second lower roller rotate in opposite directions over their respective removal arcs.

16. A method according to claim 15, wherein the method comprises moving the shrimp into a peeling position between the first and second lower rollers before rotating each of the first and second lower rollers over their respective capture arcs.

17. A method according to claim 15, wherein before capturing the plurality of pleopods, the method comprises aligning the plurality of pleopods attached to the abdomen of the shrimp such that the plurality of pleopods extend away from the tail of the shrimp.

18. A method according to claim 15, wherein shell segments on a dorsal side of the abdomen of the shrimp remain attached to the shrimp after rotating the first lower roller and the second lower roller over their respective removal arcs.

19. A method according to claim 15, wherein the method comprises removing only the pleopods found on the ventral side of the abdomen of the shrimp while leaving the abdominal shell segments on a dorsal side of an abdomen of the shrimp intact.

20. A method of removing pleopods from a shrimp, the method comprising:

capturing a plurality of pleopods attached to an abdomen of a shrimp between a first lower roller and a second lower roller by rotating each of the first and second lower rollers over a capture arc, wherein the first and second lower rollers are rotated in opposite directions;

contacting the abdominal shell segments of the shrimp with an upper assembly to stabilize the dorsal surface of the shrimp during removal of the pleopods along with the pereiopods after rotating the first and second lower rollers over their respective capture arcs; and rotating the first lower roller over a first removal arc and rotating the second lower roller over a second removal arc after contacting the abdominal shell segments of the shrimp with the upper assembly, wherein the first lower roller and the second lower roller rotate in opposite directions over their respective removal arcs.

21. A method according to claim 20, wherein the capturing comprises capturing a majority of the pleopods on the shrimp, and wherein rotating the first and second lower rollers about their removal arcs removes the majority of pleopods from the shrimp.

22. A method according to claim 20, wherein the method comprises moving the shrimp into a peeling position between the first and second lower rollers before rotating each of the first and second lower rollers over their respective capture arcs.

23. A method according to claim 20, wherein before capturing the plurality of pleopods, the method comprises aligning the plurality of pleopods attached to the abdomen of the shrimp such that the plurality of pleopods extend away from the tail of the shrimp.

24. A method according to claim 20, wherein shell segments on a dorsal side of the abdomen of the shrimp remain attached to the shrimp after rotating the first lower roller and the second lower roller over their respective removal arcs.

25. A method according to claim 20, wherein the method comprises removing only the pleopods found on the ventral side of the abdomen of the shrimp while leaving the abdominal shell segments on a dorsal side of an abdomen of the shrimp intact.

* * * * *